US012680523B2

(12) United States Patent
Geberth

(10) Patent No.: US 12,680,523 B2
(45) Date of Patent: Jul. 14, 2026

(54) VARIABLE ORIFICE FUEL INJECTION NOZZLE

(71) Applicant: John Geberth, West Palm Beach, FL (US)

(72) Inventor: John Geberth, West Palm Beach, FL (US)

( * ) Notice: Subject to any disclaimer, the term of this patent is extended or adjusted under 35 U.S.C. 154(b) by 267 days.

(21) Appl. No.: 18/314,606

(22) Filed: May 9, 2023

(65) Prior Publication Data

US 2023/0358196 A1 Nov. 9, 2023

Related U.S. Application Data

(60) Provisional application No. 63/339,805, filed on May 9, 2022.

(51) Int. Cl.
*F02M 61/04* (2006.01)
*F02M 61/18* (2006.01)

(52) U.S. Cl.
CPC ...... *F02M 61/045* (2013.01); *F02M 61/1853* (2013.01)

(58) Field of Classification Search
CPC ............. F02M 61/045; F02M 61/1853; F02M 63/0005; F02M 61/18; F02M 61/182; F02M 61/1806; B05B 1/3013
See application file for complete search history.

(56) References Cited

U.S. PATENT DOCUMENTS

| | | | |
|---|---|---|---|
| 1,981,874 A | 11/1934 | Mock | |
| 2,183,284 A | 12/1939 | Wiebicke | |
| 2,317,618 A * | 4/1943 | King | F02M 61/10 239/586 |
| 2,914,257 A | 11/1959 | Wiant | |
| 3,195,520 A | 7/1965 | Simko | |
| 3,294,072 A | 12/1966 | Simco et al. | |
| 3,315,650 A | 4/1967 | Bishop et al. | |
| 3,838,821 A | 10/1974 | Berlyn | |
| 4,006,719 A | 2/1977 | Kanda et al. | |
| 4,019,473 A | 4/1977 | Kamiya | |
| 4,046,111 A | 9/1977 | Nagano | |
| 4,186,708 A | 2/1980 | Bowler | |
| 4,318,377 A | 3/1982 | Occella et al. | |
| 4,372,264 A | 2/1983 | Trucco | |
| 4,389,986 A | 6/1983 | Tanasawa | |

(Continued)

FOREIGN PATENT DOCUMENTS

| | | | |
|---|---|---|---|
| FR | 2865242 A1 * | 7/2005 | F02M 59/105 |
| GB | 2148394 | 5/1985 | |

(Continued)

*Primary Examiner* — Christopher R Dandridge
(74) *Attorney, Agent, or Firm* — Collard & Roe, P.C.

(57) ABSTRACT

The present device involves a fuel injector nozzle and control system for delivering a fine atomized fuel that is evenly mixed throughout the compressed air charge across a wide range of throttle positions. The system includes a pintle rod that is incrementally moveable to release a high pressure atomized stream of fuel through one or more apertures to vary the size of the opening through which the fuel is directed into the compressed air charge. The atomized fuel is delivered in a manner that allows the fine particles of fuel to be evenly distributed throughout the compressed air charge for more complete and consistent combustion.

28 Claims, 120 Drawing Sheets

(56) References Cited

U.S. PATENT DOCUMENTS

| | | | |
|---|---|---|---|
| 4,394,963 | A | 7/1983 | Iwata |
| 4,413,780 | A | 11/1983 | Skinner et al. |
| 4,543,929 | A | 10/1985 | Kataoka et al. |
| 4,574,754 | A | 3/1986 | Rhoades, Jr. |
| 4,685,432 | A | 8/1987 | Saito et al. |
| 4,753,213 | A | 6/1988 | Schlunke et al. |
| 4,770,138 | A | 9/1988 | Onishi |
| 4,788,942 | A | 12/1988 | Pouring et al. |
| 4,852,525 | A | 8/1989 | Ishida |
| 5,054,444 | A | 10/1991 | Morikawa |
| 5,078,107 | A | 1/1992 | Morikawa |
| 5,086,737 | A | 2/1992 | Watanabe et al. |
| 5,105,781 | A | 4/1992 | Fortnagel et al. |
| 5,277,159 | A | 1/1994 | Webster |
| 5,322,043 | A | 6/1994 | Shriner et al. |
| 5,329,901 | A | 7/1994 | Onishi |
| 5,357,924 | A | 10/1994 | Onishi |
| 5,522,357 | A | 6/1996 | Nogi et al. |
| 5,553,579 | A | 9/1996 | Yoshida et al. |
| 5,553,588 | A | 9/1996 | Gono et al. |
| 5,605,125 | A | 2/1997 | Yaoita |
| 5,709,190 | A | 1/1998 | Suzuki |
| 5,722,362 | A | 3/1998 | Takano et al. |
| 5,813,385 | A | 9/1998 | Yamauchi et al. |
| 6,109,540 | A * | 8/2000 | Coldren ............. F02M 61/1806 239/87 |
| 6,224,001 | B1 * | 5/2001 | Cooke ................ F02M 51/0603 239/533.9 |
| 6,340,017 | B1 * | 1/2002 | Dick .................... F02M 61/182 239/533.11 |
| 6,386,175 | B2 | 5/2002 | Yang |
| 9,920,674 | B2 * | 3/2018 | Stroia .................. F02M 61/045 |
| 2001/0017324 | A1 | 8/2001 | Coldren et al. |
| 2006/0243829 | A1 * | 11/2006 | Oomori ................ F02M 51/061 239/584 |

FOREIGN PATENT DOCUMENTS

| | | | | |
|---|---|---|---|---|
| GB | 2488929 | * | 9/2012 | ............. F02M 63/00 |
| GB | 2488929 A | * | 9/2012 | ......... F02M 63/0003 |
| JP | S61218772 | | 9/1986 | |
| JP | 2000027733 | | 1/2000 | |

* cited by examiner

120

50

VARIABLE ORIFICE FUEL INJECTION NOZZLE

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/339,805, entitled "VARIABLE ORIFICE FUEL INJECTION NOZZLE", filed May 9, 2022. The contents of the above referenced application are incorporated herein by reference in its entirety.

FIELD OF INVENTION

The present invention generally relates to fuel delivery systems for internal combustion engines; and more particularly, to a nozzle for a fuel injector that delivers a fine atomized fuel in a stream capable of penetrating the compressed air charge to prevent stratified fuel mixtures across a wide throttle band.

BACKGROUND INFORMATION

Fuel injection is the introduction of fuel into an internal combustion engine having reciprocating pistons, most commonly automotive engines, by the means of a mechanical or electronic injector. An ideal fuel injection system could precisely provide exactly the right amount of fuel under all engine operating conditions. This would typically mean a precise air-fuel ratio (lambda) control, which allows for easy engine operation, even at low engine temperatures (cold start), good adaptation to a wide range of altitudes and ambient temperatures, exactly governed engine speed (including idle and redline speeds), good fuel efficiency, and the lowest achievable exhaust emissions.

In practice, an ideal fuel injection system does not exist, but there is a huge variety of different fuel injection systems with certain advantages and disadvantages. The term "fuel injection" comprises various distinct systems with fundamentally different functional principles. There are two main functional principles of mixture systems for internal combustion engines: internal mixture formation, and external mixture formation. A fuel injection system that uses external mixture formation is called a manifold injection system; there exist two types of manifold injection systems, multipoint injection (port injection) and single-point injection (throttle-body injection).

Internal mixture systems can be separated into common rail and independent injection systems. There exist several different varieties of both common rail and independent injection systems. The most common internal mixture formation fuel injection system is the direct injection system typically used on diesel engines and high end gasoline automobiles. Common rail direct injection allows fuel, such as gasoline, alcohol or diesel, to be directly injected into the cylinder of the engine. However, common rail injection is a relatively complex system, which is why some passenger cars utilize a multi-point manifold injection system instead.

Conventional direct injection engines typically include a piston having a depression in the top face thereof (typically referred to as a bowl) and a swirl or tumble control valve located in the intake port to produce a swirl or tumble of the air entering the combustion chamber. As fuel is injected into the combustion chamber, the fuel impinges against the bottom of the bowl or cylinder wall and it is likely that a portion of the fuel will stick to the piston surface or cylinder wall, causing an undesirable wall-wetting condition. As the remainder of the fuel is burned, the flame propagating toward the piston surface is unable to completely burn the liquid fuel film on the piston surface. This results in undesirable soot formation during combustion.

In an attempt to eliminate the wetting, some direct injection systems attempt to create a stratified charge, with the richest portion of the charge positioned at the top portion of the cylinder. The stratified charge is made by directing a liquid stream against a flat surface to break up the fluid into tiny particles that cannot penetrate the high density compressed air charge present in the cylinder. A stratified charge engine is one in which the combustion chamber contains stratified layers of different air/fuel mixtures. Thus, the strata closest to the top of the cylinder contain a fuel mixture rich of stoichiometry, and subsequent strata contain progressively leaner mixtures. While these mixtures sometimes function well for low throttle conditions, they fall significantly short under higher throttle conditions, resulting in high combustion temperatures that cause NOX production while still producing soot from the rich portion of the mixture.

With port injection, the fuel expelled from the fuel injector impinges on the valve and intake port. At cold startup, the valve and port will be cool and the fuel will not vaporize as desired, causing high hydrocarbon emissions and soot. During transient conditions, valve and port wetting by the fuel results in a longer response time from the change of fuel injection pulse width to the change in fuel that enters the cylinder. This increases the difficulty in fuel metering control, fuel consumption, and hydrocarbon/carbon monoxide emissions.

The term electronic fuel injection refers to any fuel injection system having an engine control unit to control the amount of fuel delivered by the injection system.

Thus, what is needed in the art is a fuel injector nozzle that can be utilized with direct or port injectors to deliver a fine atomization of fuel while utilizing the expulsion of the fuel to create a rolling turbulence in the air to evenly distribute the fuel in the cylinder without wetting the walls or the piston. The system should also utilize the heat from compression by entraining the heated air into the atomized fuel to create vapor that is carried throughout the combustion chamber for clean fuel burn and controlled flame front propagation.

Finally, there are size and manufacturing needs that a fuel injector nozzle system must satisfy in order to achieve acceptance by the end user. The system must be easily and quickly adaptable to pre-existing as well as new diesel injector designs. Further, the system should not require excessive machining or difficult to manufacture components. Moreover, the system must assemble together in such a way so as not to detract from the function of the injector to which it is attached.

Thus, the present invention provides a nozzle assembly that connects to new or pre-existing fuel injectors which overcomes the disadvantages of prior art. The nozzle structure of the present invention not only provides for relative ease in the assembly, it also permits a lightweight overall structure that can withstand the harsh environment of an internal combustion engine.

SUMMARY OF THE INVENTION

Briefly, the invention involves a fuel injector nozzle and control system for delivering a fine atomized fuel that is evenly mixed throughout the compressed air charge across a wide range of throttle positions. The system includes a pintle rod that is incrementally moveable to release a high pressure atomized stream of fuel through one or more apertures to vary the size of the opening through which the fuel is directed into the compressed air charge. In at least one embodiment, the fuel is supplied to the injector through a volume controlling valve. The fuel injector itself includes a pressure spring that requires the fuel to maintain its desired pressure regardless of the fuel volume. The fuel injector nozzle is provided with a plurality of apertures; thus, the more fuel that is required, the more apertures that are uncovered. This construction requires the fuel to leave the nozzles of the fuel injector at a predetermined pressure, providing better fuel distribution throughout the combustion chamber volume. The atomized fuel is delivered in a manner that allows the fine particles of fuel to be evenly distributed throughout the compressed air charge for more complete and consistent combustion.

Accordingly, it is an objective of the present invention to provide a fuel injector nozzle that can provide a variable area orifice.

It is a further objective of the present invention to provide a fuel injector nozzle that provides more complete combustion by providing a more homogenous mixture of fuel and air.

It is yet a further objective of the present invention to provide a fuel injector nozzle that eliminates cylinder wetting.

It is another objective of the present invention to provide a fuel injector nozzle capable of mixing hot compressed air with an atomized fuel to vaporize a portion of the fuel charge before combustion.

It is yet another objective of the present invention to provide a fuel injector nozzle that provides an atomized mist of fuel by varying the size and/or number of apertures through which the fuel is delivered so that the aperture varies based upon the fuel volume requirements of the engine.

It is still yet another objective of the present invention to provide a fuel delivery system that includes a valve to control the volume of the fuel delivered and a constant pressure pintle in the injector that is constructed to uncover fuel delivery apertures as the volume is increased, thus maintaining fuel delivery pressure across the entire operational range of the engine from idle to full throttle operation.

Other objectives and advantages of this invention will become apparent from the following description taken in conjunction with the accompanying drawings wherein are set forth, by way of illustration and example, certain embodiments of this invention. The drawings constitute a part of this specification, include exemplary embodiments of the present invention, and illustrate various objects and features thereof.

BRIEF DESCRIPTION OF THE FIGURES

FIG. 103 shows a perspective view of the metering valve separated from the fuel injector;

FIG. 104 is a section view taken along lines 104-104 of FIG. 100;

FIG. 105 shows an exploded perspective view of the metering valve and the fuel injector;

FIG. 106A shows a section view taken along lines 106A-106A of FIG. 102;

FIG. 106B shows a section view taken along lines 106B-106B of FIG. 102;

FIG. 106C shows a section view taken along lines 106C-106C of FIG. 102;

FIG. 106D shows a section view taken along lines 106D-106D of FIG. 102;

FIG. 106E shows a section view taken along lines 106E-106E of FIG. 102;

FIG. 107 shows a partial section view taken along lines 104-104 of FIG. 100, illustrated with the flow control rod removed and part of the flow control valve body in phantom;

FIG. 108 shows a partial section view taken along lines 104-104 of FIG. 100, illustrating the flow control valve and servo cam;

FIG. 109 shows the fuel return valve for allowing fuel to drain back to the fuel tank or vapor system;

FIG. 110 is a partial perspective view illustrating the fuel control valve body and servo cam;

Figure 111:
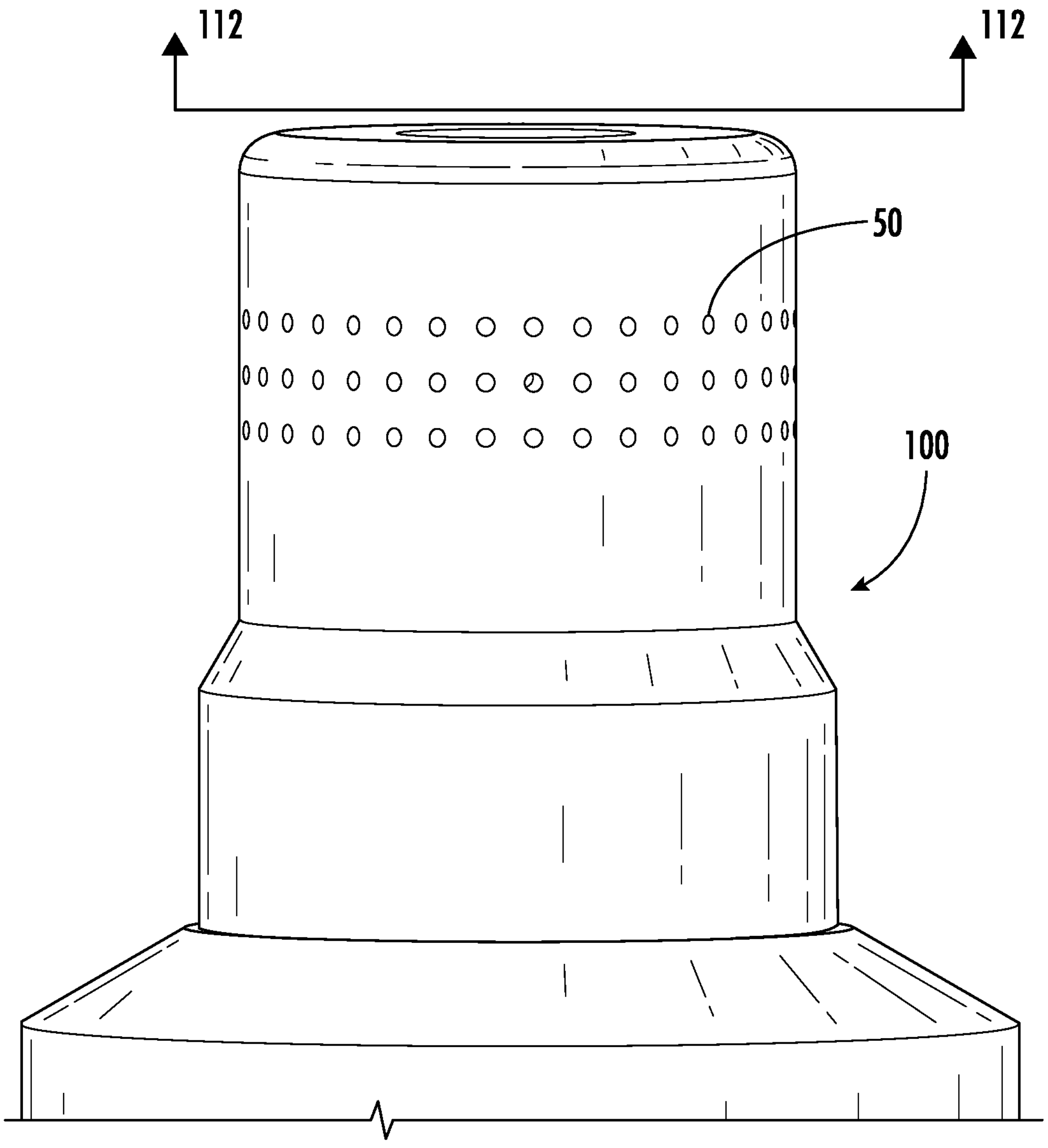
Figure 112:
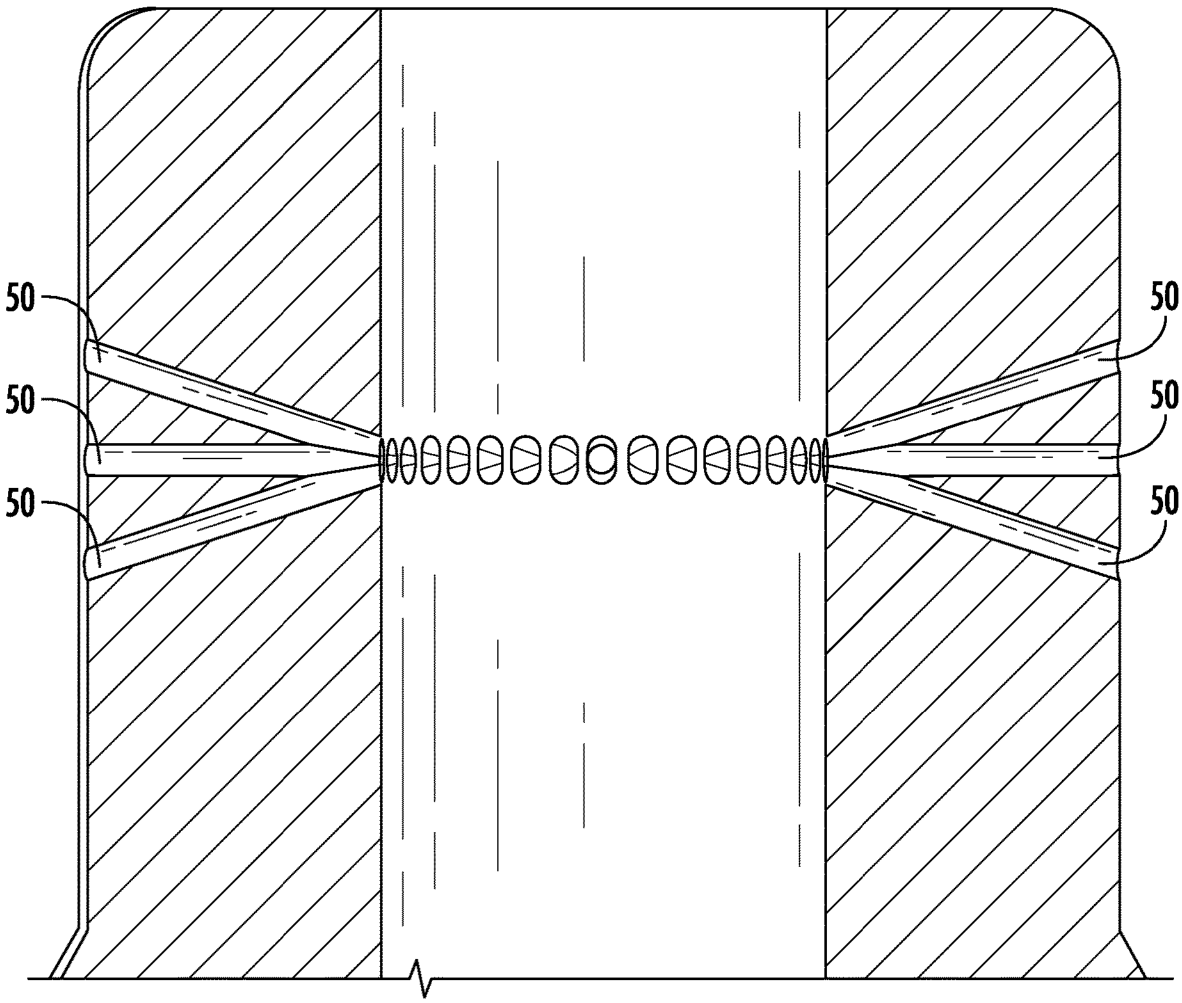

FIG. 111 shows a nozzle design including divergent apertures from each single internal aperture; and FIG. 112 is a partial section view taken along lines 112-112 of FIG. 111 illustrating the divergent hole pattern.

DETAILED DESCRIPTION OF THE PREFERRED EMBODIMENTS

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring generally to FIGS. 1A-19D, a variable orifice fuel injector nozzle 100, attachable to a fuel injector 102, for providing a fine atomized fuel charge to the combustion chamber 23 of an internal combustion engine is illustrated. The variable orifice fuel injector nozzle 100 is suitable for use with mechanical or electronically controlled fuel injection systems. In a mechanical fuel injection system, the injector is spring loaded to a closed position and is opened by fuel pressure. In an electronically controlled fuel injection system, the injector is also spring loaded to a closed position, however, the fuel injector is opened by an electromagnet, solenoid or linear motor built into the injector body. The electronic control unit determines how long the injector stays open to deliver fuel. In general, the present injection nozzle is constructed and arranged to vary the size and/or number of orifices through which the pressurized fuel is delivered to the engine so that as the fuel is expelled from the nozzle it maintains an elevated fuel pressure. Because the orifice size is controlled by the fuel pressure in some embodiments, the atomized fuel can be driven through the high density compressed air charge in the cylinder with higher velocity to create a significantly more homogenized air/fuel mixture in the cylinder for more complete and cleaner combustion. Thus, a minimum fuel pressure causes the exit orifices to be partially uncovered, letting fuel flow to the cylinder. Should the fuel pressure increase for a larger fuel charge, the fuel apertures are further uncovered or more orifices are uncovered to allow the delivery of more fuel at the same or similar pressure. Once all the fuel apertures are uncovered, the fuel pressure may continue to rise as it is delivered through the apertures. The higher fuel pressure is capable of being driven further into the highly dense compressed air charge for combustion. In some embodiments, the heated compressed air is mixed with the atomized fuel as it is expelled from the nozzle to cause a portion of the atomized fuel to become a vapor mixed with the heated air. The nozzle of the present invention is suitable for use with single point injection systems 10, multi-point injection systems 12, and direct injection systems 14 without departing from the scope of the invention.

Referring generally to all of the figures, and more specifically to FIGS. 1A-7C, a radial flow injector nozzle 200 including a radial flow pintle rod 216 having controlled linear movement based upon desired fuel flow is illustrated. The variations in fuel flow volume cause the fuel pintle rod 216 to move linearly, sequentially exposing radially positioned orifices, causing the fuel to be directed to different areas within the cylinder 20 or piston 22, both vertically and/or radially. The radial flow injector nozzle includes a nozzle body 24, plunger 26, spring 28, rear stop 30, and orifice body 32. The nozzle body 24 is preferably constructed from metal or ceramic, and is constructed and arranged to be secured to a front portion of a fuel injector 102. The nozzle body 24 may be secured by fastener, weldment, adhesive, casting or the like, so long as the nozzle is suitably secured to the injector to not become detached during operation and use. The plunger 26 and spring 28 cooperate to move the radial flow pintle rod 216 along the longitudinal axis 38 in response to a linear motor, servo or sufficient fuel pressure to overcome the resistance to movement provided by the spring 28. In this manner, the plunger 26 can be moved in precise increments to cause movement of the radial flow pintle rod 216 to release fuel into the cylinder 20. The radial flow pintle rod 216 is guided by the orifice body 32 and includes a rear stop surface 40 which cooperates with the pintle flange 34 to limit forward movement of the radial flow pintle rod 216. An undercut 64 is positioned behind the forward end 58 of the pintle rod to provide for fuel flow between the outer diameter of the pintle rod 216 and the inner bore 60 of the orifice body 32. The undercut 64 also provides a spool surface 66 for flow of pressurized fuel around the rod. In a most preferred embodiment, the spool surface 66 includes a sharp outer corner 68. The sharp corner 68 provides accurate stopping and starting of the fuel flow, as well as providing a cutter for chopping up any small particles that may enter the fuel flow. Since the orifices are very small, e.g. about 0.002 inches in diameter, dirt particles in the fuel larger than this in diameter will not pass through the nozzle orifices 50. In a most preferred embodiment, the orifice body 32 is constructed from a metal, such as carbide, tool steel or ceramic, to have a hardness higher than 45 Rockwell C scale. The reciprocating action of the pintle rod 216, in combination with the sharp corner 68, provides a chopping action with respect to any particles stuck in the nozzle orifices 50. This allows the particles to be reduced in size sufficiently to pass through the nozzle orifices. The rear stop 30 provides a return stop surface 42 to prevent the flow of fuel through the nozzle when no external forces are present to move the radial flow pintle rod 216 forward. The flow path of the fluid, e.g. fuel, is through the core chamber 44 of the nozzle body 24, through the fuel ports 46 in the rear stop 30 and through the ducts 48 in the orifice body 32 to the nozzle orifices 50. The nozzle orifices 50 are arranged in a radial pattern around the perimeter of the orifice body 32. In a preferred embodiment, the nozzle orifices 50 are positioned at different heights with respect to each other so that as the forward end 58 of the radial flow pintle rod 216 is moved forward, more orifice apertures 50 are opened to release the liquid fuel. This construction allows the pressure of the liquid fuel to remain at higher pressures inside of the injector for low to mid throttle positions of the engine. The higher pressures cause the liquid to experience a larger pressure drop when exiting each nozzle orifice 50, causing the fuel to break into smaller particles that still carry sufficient momentum to penetrate the high density compressed air charge in the cylinder 20 of the engine 54. In a most preferred embodiment, the nozzle orifices 50 are directed through the orifice body 32 at various orifice angles 52 to cause the fuel to be directed throughout the cylinder vertically, thereby avoiding a stratified fuel charge in the cylinder. In a preferred embodiment, the nozzle orifice diameter 56 is between about 0.001 inches and 0.015 inches or 0.0254 millimeters to 0.381 millimeters. However, it should be noted that other nozzle orifice diameters may be utilized so long as the liquid fuel is atomized prior to reaching the wall of the cylinder 20 to prevent cylinder wetting. It should also be noted that larger nozzle orifice diameters 56 may require higher fluid (fuel) pressures to create the pressure drop necessary to cause the atomization before the fuel reaches the wall of the cylinder 20. The forward end 58 of the radial flow pintle rod 216 is constructed as a cylinder to slip fit within the inner bore 60 of the orifice body 32. This construction prevents the unwanted flow of liquid fuel around the forward end 58, while the movement of the rear surface 62 of the forward end 58 across the nozzle orifices 50 shears any small particles of dirt and debris that may block the orifice, thereby keeping the small diameter orifice from clogging. This construction allows orifice diameters as small as 0.002 of an inch or 0.0508 millimeters to be utilized without clogging issues.

Referring generally to the figures and more specifically to FIGS. 1 and 8-11, an alternative embodiment of the variable orifice injector nozzle 300 is illustrated. In this embodiment, the pintle rod 316 is constructed and arranged to convert longitudinal flow to radial flow with the utilization of a stepped deflection disc 70. The pintle rod 316 is positioned within the nozzle body 124 along the longitudinal axis 38. The nozzle body 124 includes a central aperture 72 containing the pintle rod 316. The forward end 74 of the nozzle body 124 includes an angled seat 76 which cooperates with an angled surface 78 of the pintle rod 316 to control the flow of liquid fuel through the nozzle 300. In operation, liquid fuel is directed through a fuel port 80 and around the diameter of the pintle rod 316 to the nozzle orifice 150. When the pintle rod 316 is retracted into the nozzle body 124, the liquid fuel is allowed to flow through the nozzle orifice 150 where it collides with the stepped deflection disc 82, causing the liquid fuel to be atomized and directed in a radial and downward pattern. The steps 70 of the stepped deflection disc 82 are sized to cause the atomized fuel to be distributed in two distinct radial patterns to cause the atomized fuel to be distributed more consistently throughout the volume of the combustion chamber 23. A backing plate 84 limits the longitudinal movement of the pintle rod 316 to control the pressure in which the liquid fuel is expelled through the nozzle 300. Stem 86 extends through the backing plate 84 for longitudinal operation of the pintle rod 316.

Figure 12:
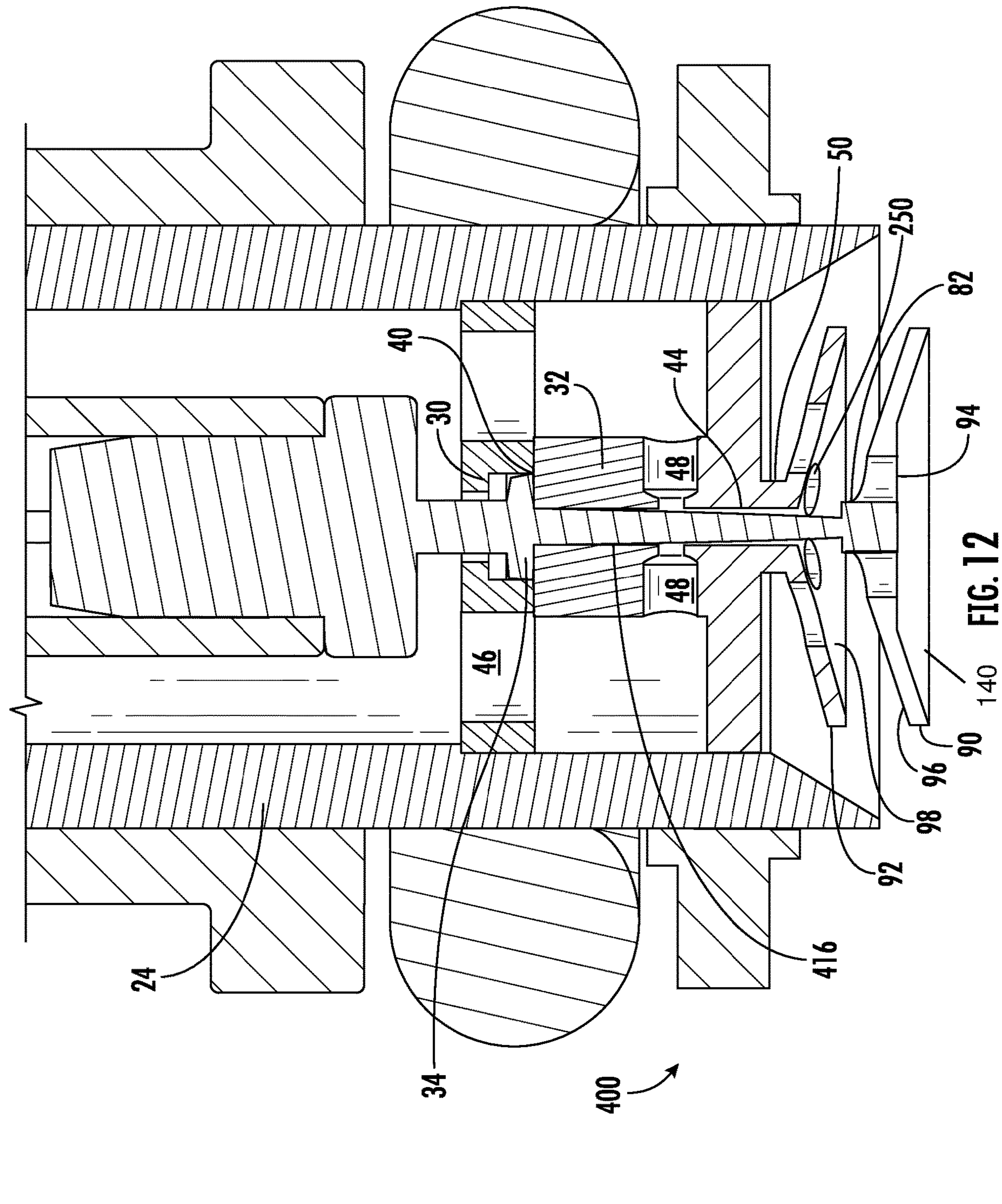
FIG. 12 shows a section view of an alternative embodiment having an air induction disk positioned on the distal end of the pintle rod.
Figure 13:
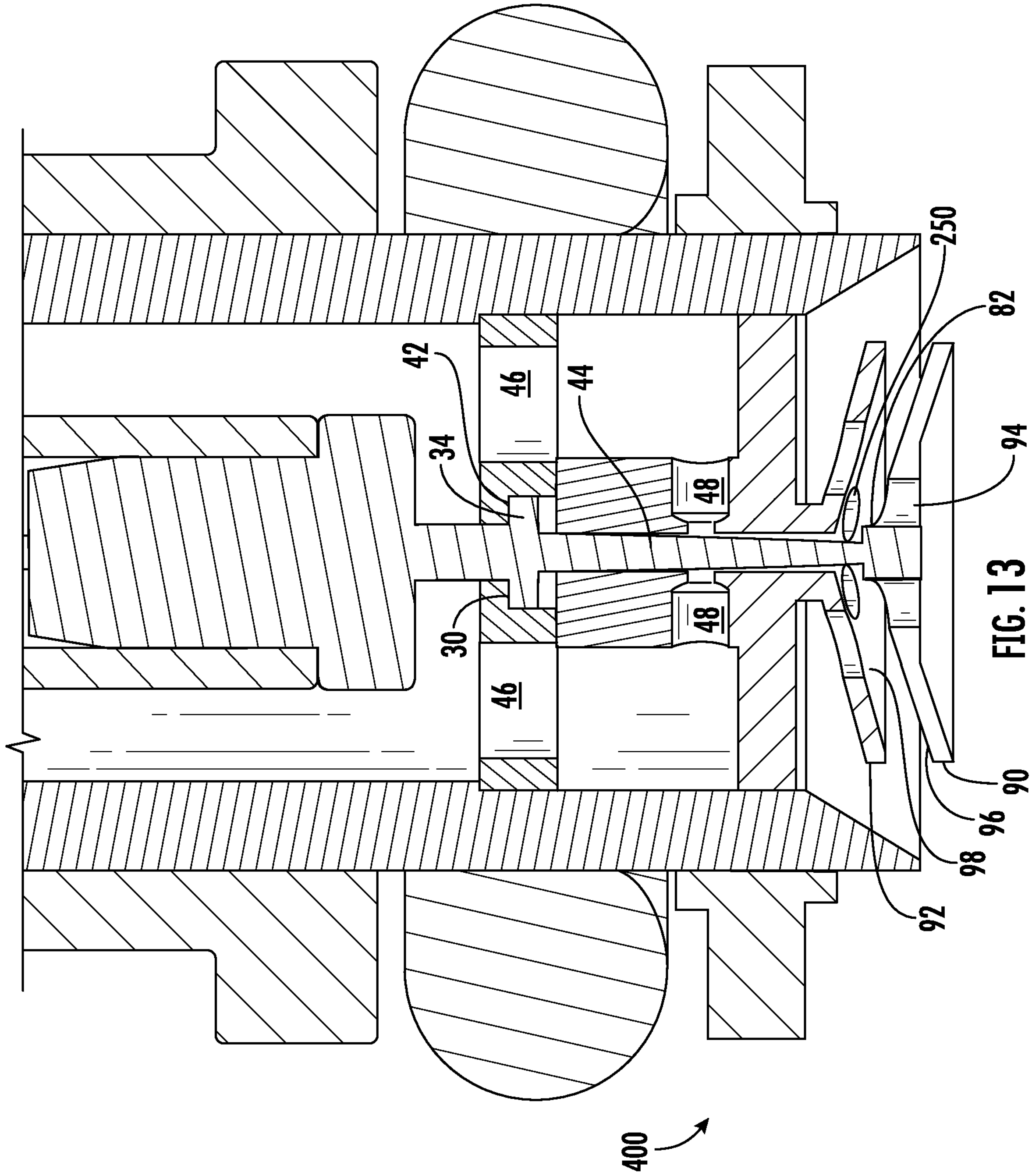
FIG. 13 shows a section view of the embodiment shown in FIG. 12, illustrating the pintle rod in a closed position.
Figure 14:
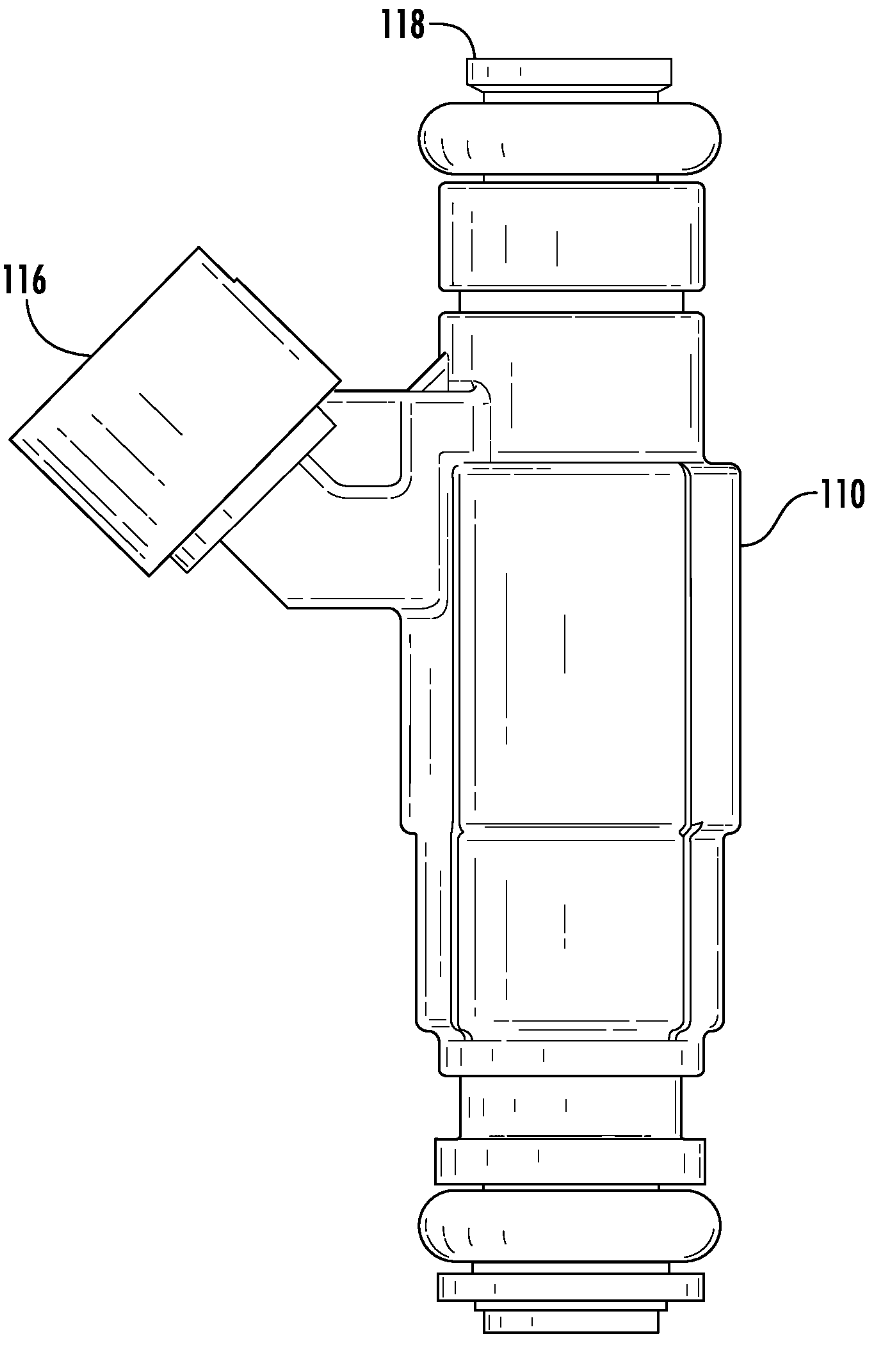
FIG. 14 shows a side view of an injector cartridge suitable for use with any of the illustrated pintle rods and orifice combinations shown.
Figure 15:
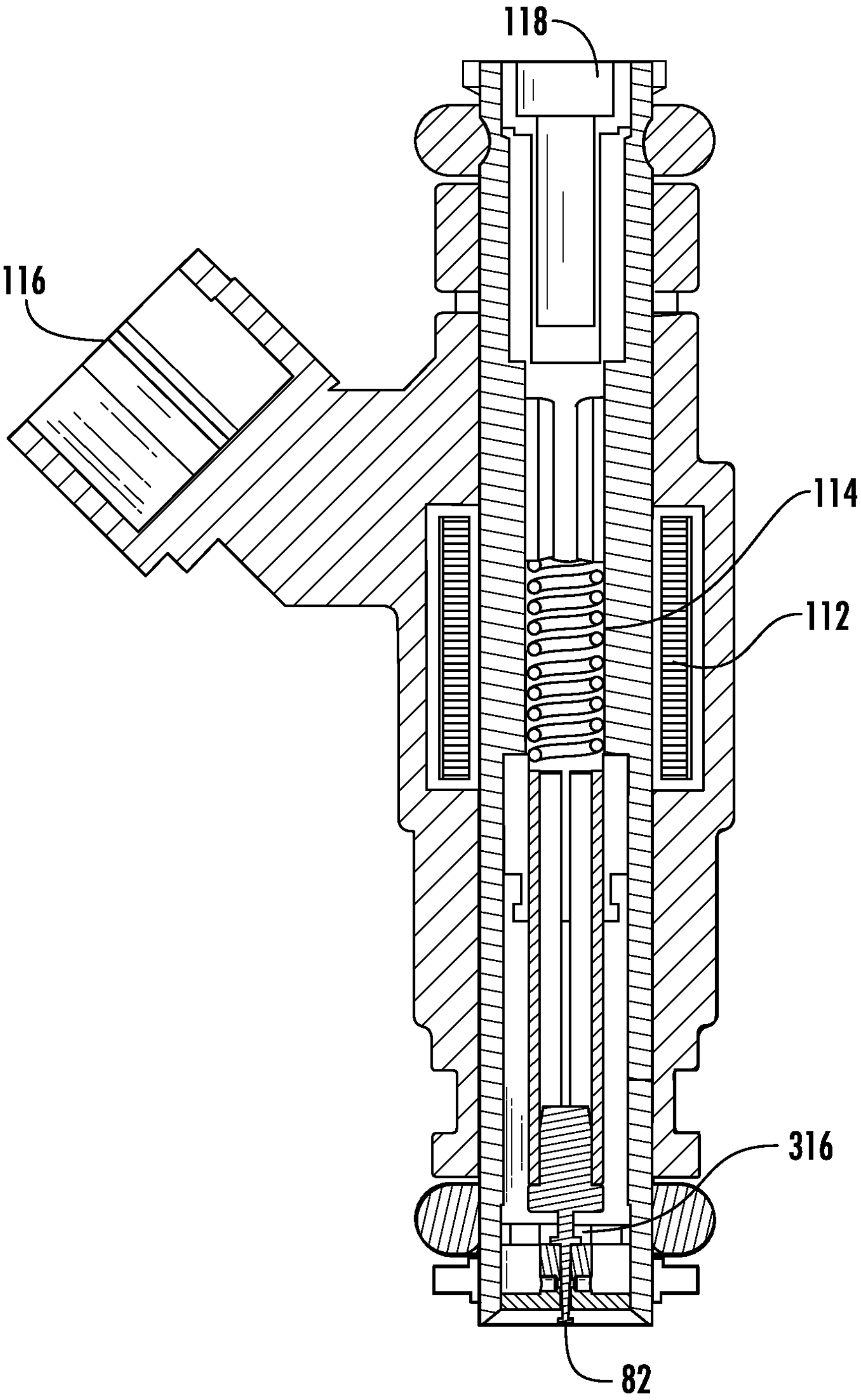
FIG. 15 shows a section view along the longitudinal centerline of the injector cartridge illustrating the cartridge with the pintle rod illustrated in FIGS. 8-11.
Figure 16:
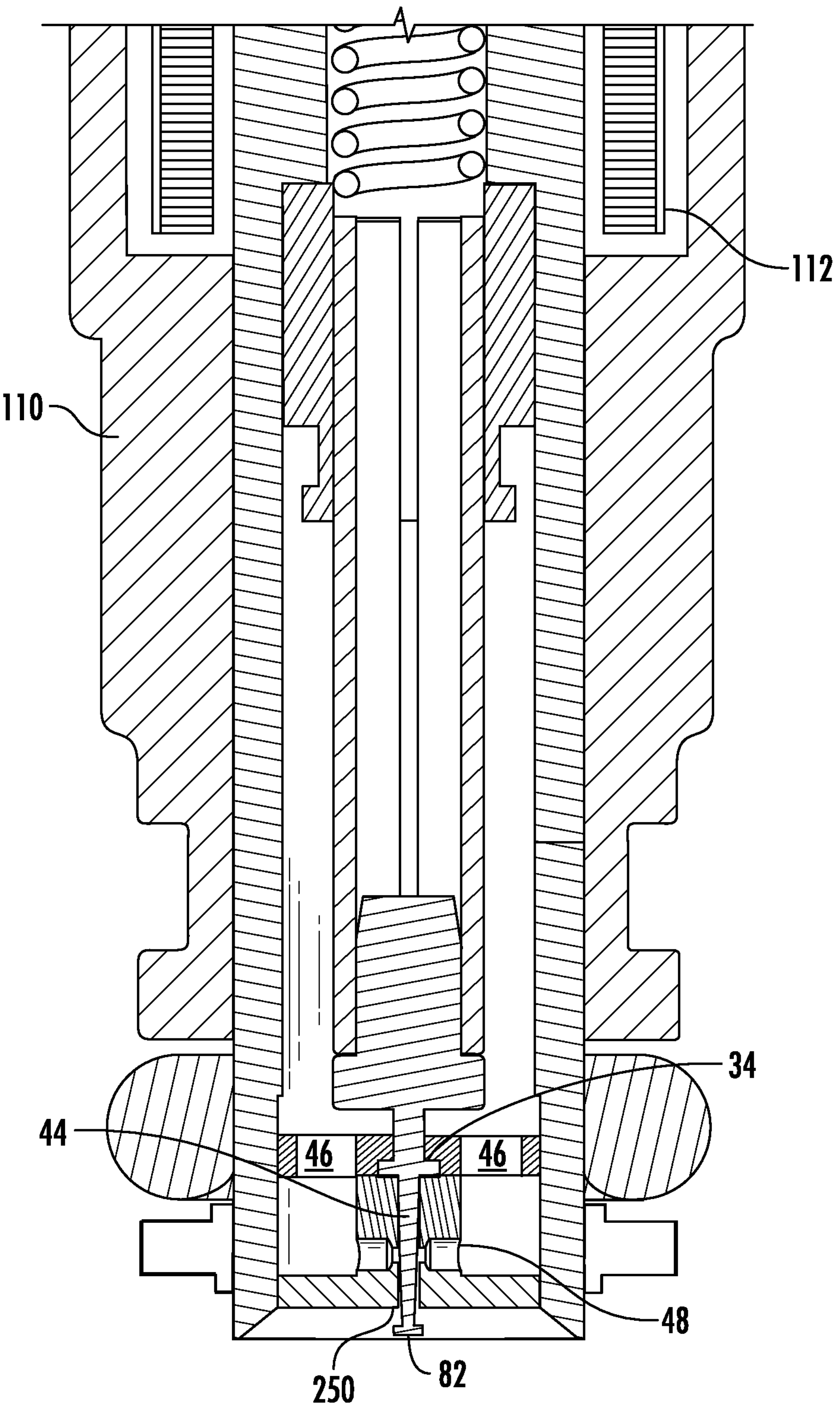
FIG. 16 shows a partial section view of the injector cartridge shown in FIG. 15, illustrating the pintle rod in a closed position.
Figure 17:
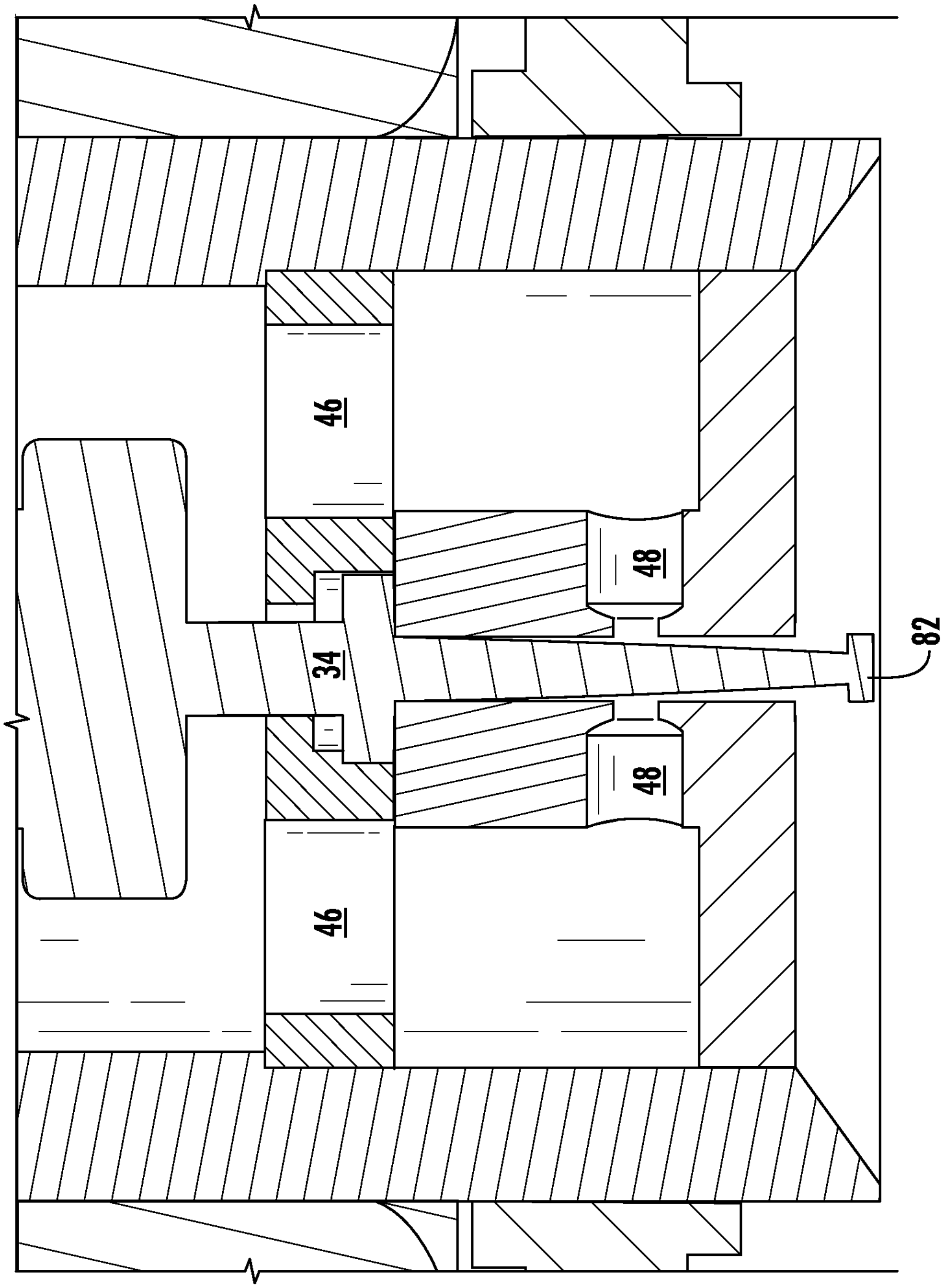
FIG. 17 shows a partial section view of the injector cartridge shown in FIG. 15, illustrating the pintle rod in a closed position.
Figure 18:
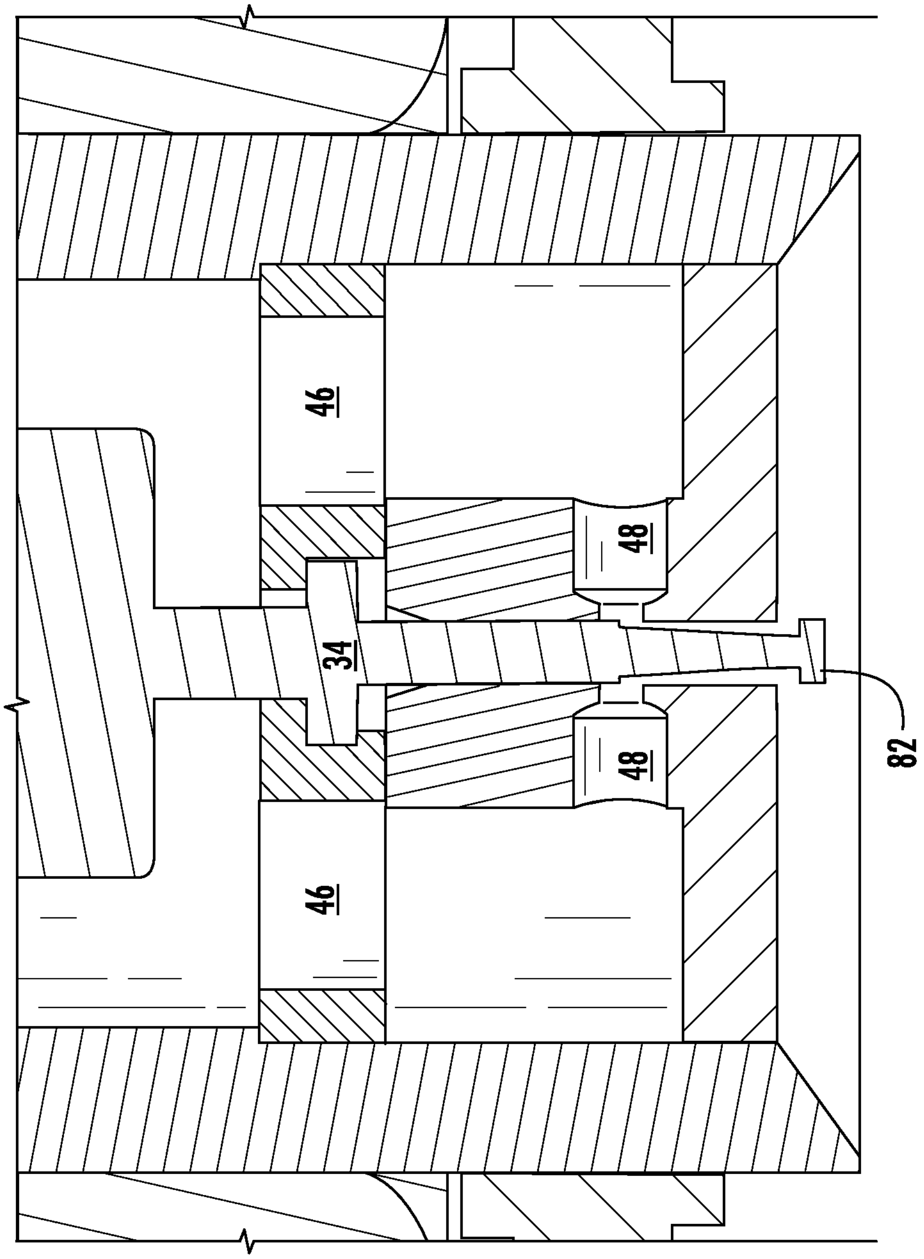
FIG. 18 shows a partial section view of the injector cartridge shown in FIG. 15, illustrating the pintle rod in an open position.

Referring generally to the figures and more specifically to FIGS. 12 and 13, an alternative embodiment of the variable orifice injection nozzle 400 is illustrated. In this embodiment, the pintle rod 416 includes an air induction disc 90 on a distal end thereof. The air induction disc 90 cooperates with a second air induction plate 92 to cause hot compressed air from the combustion chamber 23 to be drawn into the nozzle orifice 250 to be mixed with the liquid fuel as it is atomized when striking the air induction disc 90. This construction causes a portion of the atomized fuel to be vaporized and mixed with the hot air, also creating turbulence within the combustion chamber 23 to better distribute the fuel throughout the combustion chamber 23. The air induction disc 90 includes vent apertures 94 which cause a portion of the fuel air mixture to be distributed downward in the combustion chamber 23, while a top surface 96 of the air induction disc 90 and a bottom surface 98 of the air induction plate 92 cause a portion of the air-fuel mixture to be distributed radially within the combustion chamber 23. This construction thereby provides mechanical means to distribute the air-fuel mixture to different portions of the combustion chamber 23 to avoid stratified fuel charges. The pintle rod 416 is guided by the orifice body 32 and includes a rear stop surface 40 which cooperates with the pintle flange 34 to limit forward movement of the pintle rod 416. The rear stop 30 provides a return stop surface 42 to prevent the flow of fuel through the nozzle when no external forces are present to move the pintle rod 416 forward. The flow path of the fluid, e.g. fuel, is through the core chamber 44 of the nozzle body 24, through the fuel ports 46 in the rear stop 30, and through the ducts 48 in the orifice body 32 to the nozzle orifice 250.

Figure 19A:
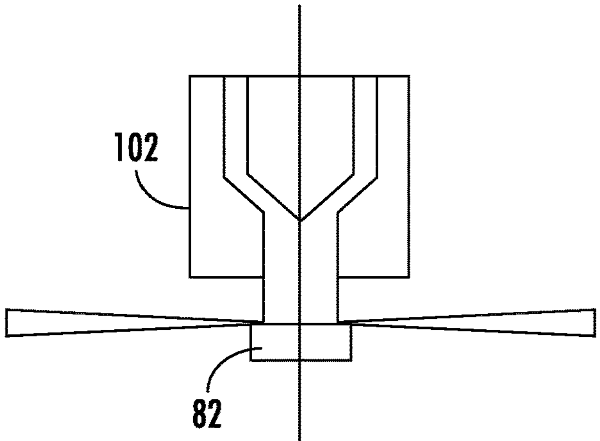
FIG. 19A shows a fuel distribution diagram for the embodiment illustrated in FIGS. 1-7.
Figure 19B:
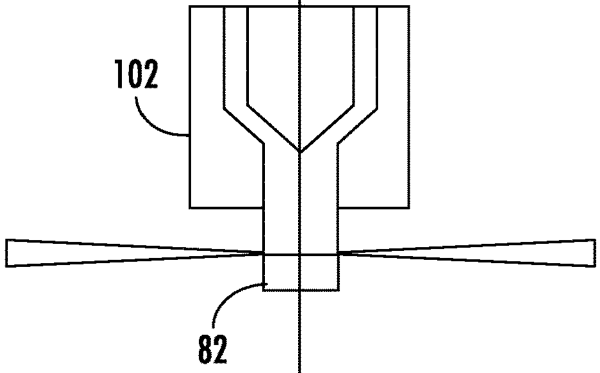
FIG. 19B shows a fuel distribution diagram for the embodiment illustrated in FIGS. 1-7.
Figure 19C:
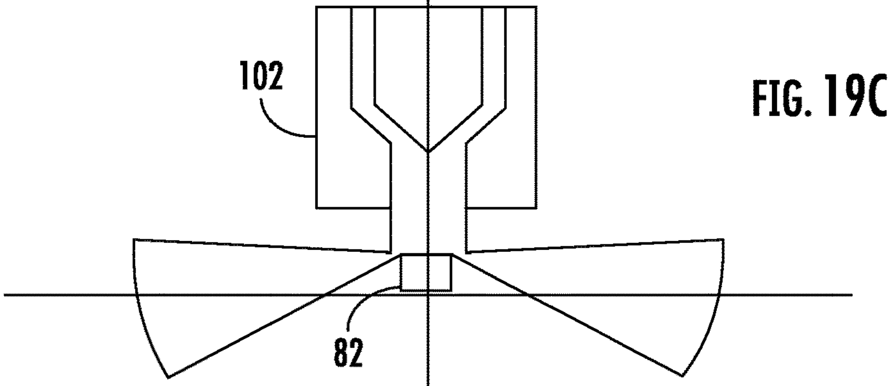
FIG. 19C shows a fuel distribution diagram for the embodiment illustrated in FIGS. 1-7.
Figure 19D:
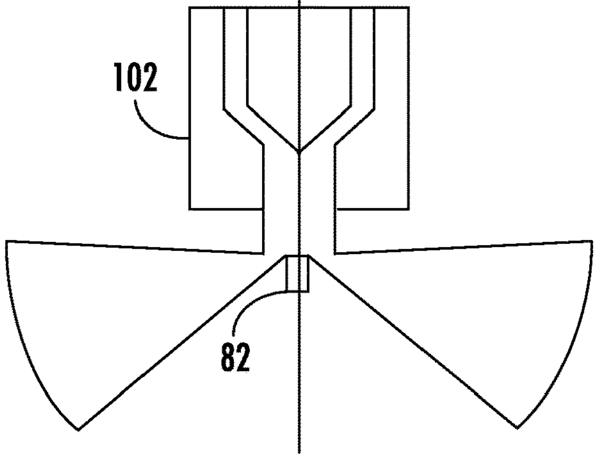
FIG. 19D shows a fuel distribution diagram for the embodiment illustrated in FIGS. 1-7.

Referring generally to the figures and more specifically to FIGS. 14-19D, an alternative embodiment is illustrated. This embodiment is the same as the embodiment illustrated in FIGS. 12-13 without the air induction disc 90 and air induction plate 92. Thus, the liquid fuel is directed at the deflection disc 82 to cause the liquid fuel to atomize and be deflected outward and downward. In this manner, the diameter of the deflection disc 82 can be altered to control the pattern in which the atomized liquid fuel is dispersed within the combustion chamber 23. For example, FIGS. 19A-19B illustrate a large diameter deflection disc causing the atomized fuel to be dispersed in a thin radial pattern. FIGS. 19C-19D illustrate how reducing the diameter of the deflection disc 82 causes the atomized fuel distribution pattern to be deflected not only radially, but vertically toward the bottom of the combustion chamber 23. Thus, the smaller the deflection disc 82 is in diameter, the further toward the bottom of the combustion chamber 23 the atomized fuel is directed. The diameter of the atomized fuel pattern may be the same or smaller in diameter to prevent cylinder wall wetting. This construction allows the fuel distribution pattern to be modified to prevent atomized fuel stratification within the combustion chamber 23. The present system may be incorporated into a standard fuel injection cartridge 102 commonly used for port injection, as well as a direct injection injector (not shown) without departing from the scope of the invention. Electronic injection cartridges 102 typically include a linear motor 112, solenoid, or the like for operation of the pintle rod 316 to control flow of the liquid fuel. Springs 114 or the like are used to return the pintle rod 316 to a fuel flow stop position. Thus, the solenoid 112 is utilized to allow fuel flow. An electrical connector 116 is provided to connect the injector to the electrical harness of the engine, which is commonly connected to an on-board computer or controller (not shown). A fuel connector 118 is provided for connection to the fuel supply line.

Figure 20:
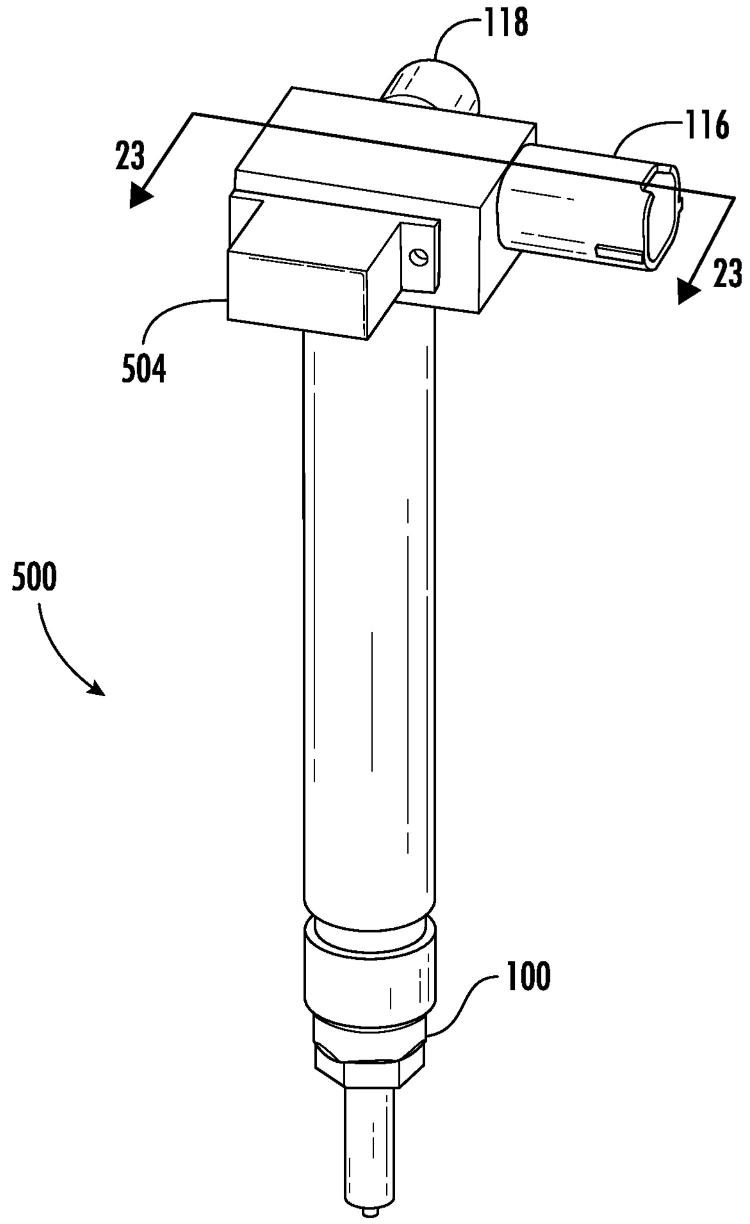
FIG. 20 shows a perspective view of an embodiment of the fuel injector nozzle including a servo mechanism incorporated into a direct injection cartridge injector.
Figure 21:
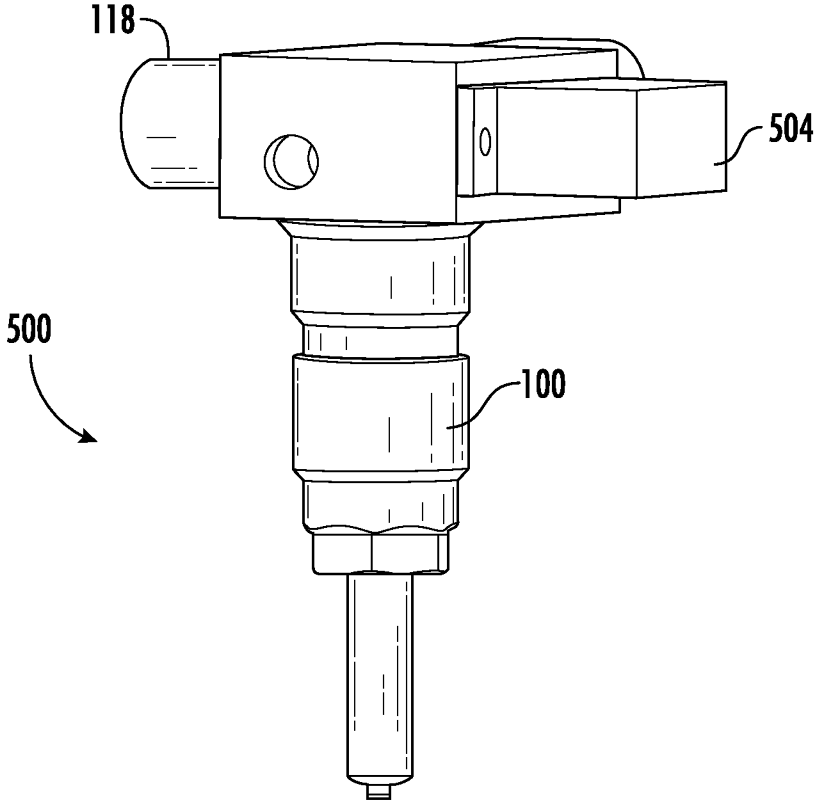
FIG. 21 shows a perspective view of an embodiment of the fuel injector nozzle including a servo mechanism incorporated into a direct injection cartridge injector.
Figure 22:
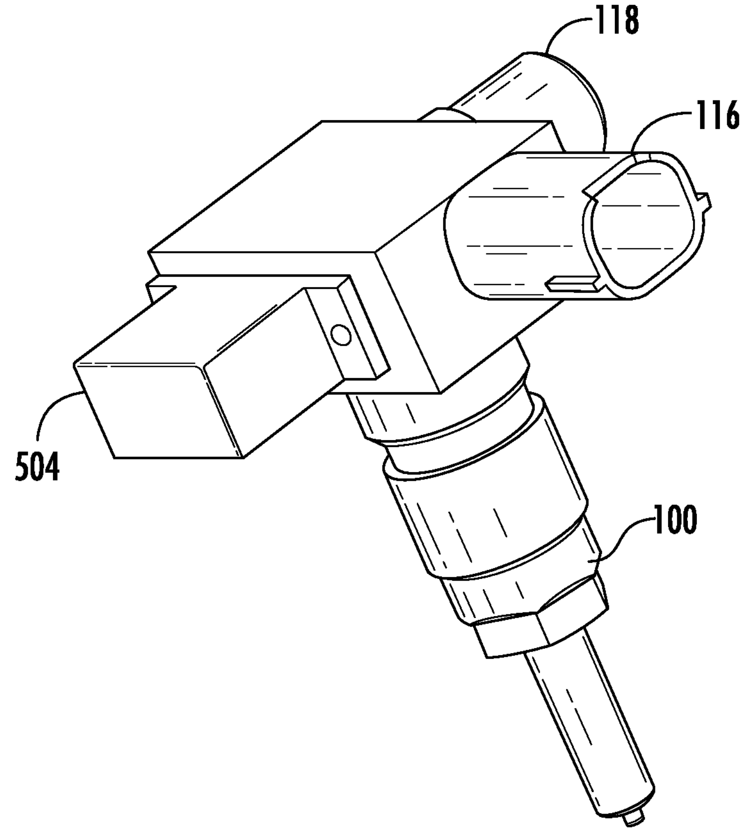
FIG. 22 shows a perspective view of an embodiment of the fuel injector nozzle including a servo mechanism incorporated into a direct injection cartridge injector.
Figure 23:
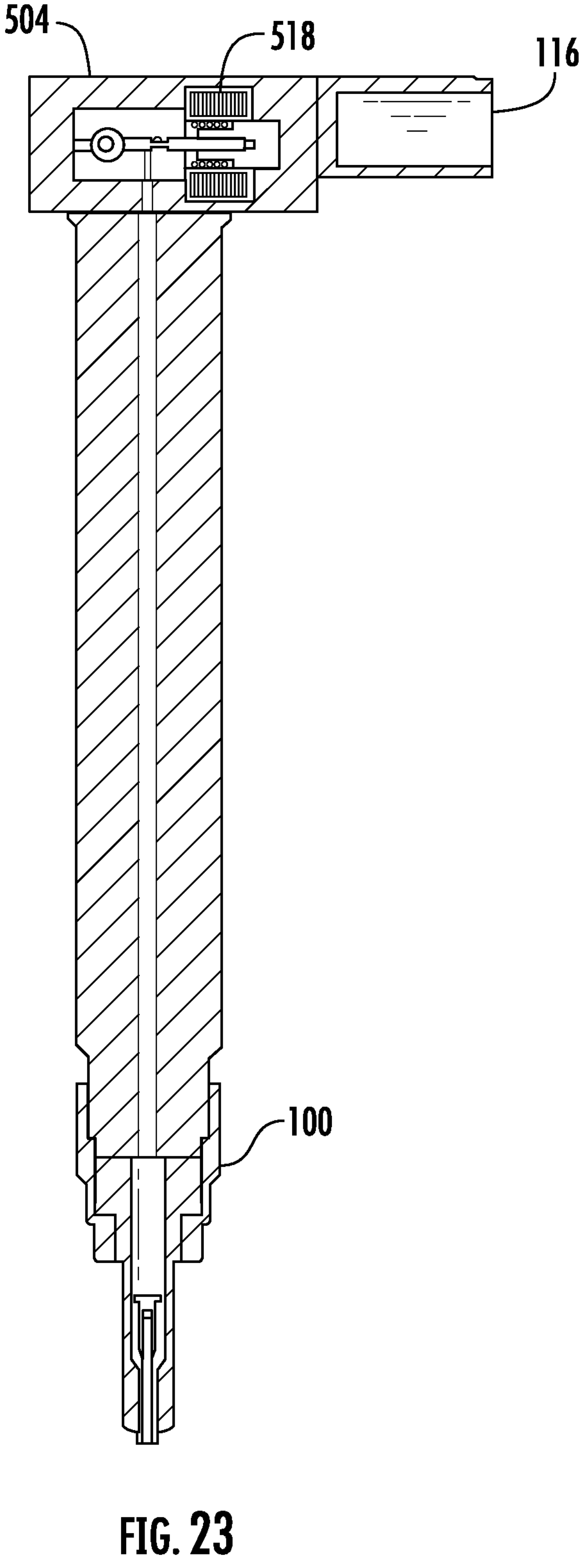
FIG. 23 shows a section view taken along lines 23-23 of FIG. 20.
Figure 24:
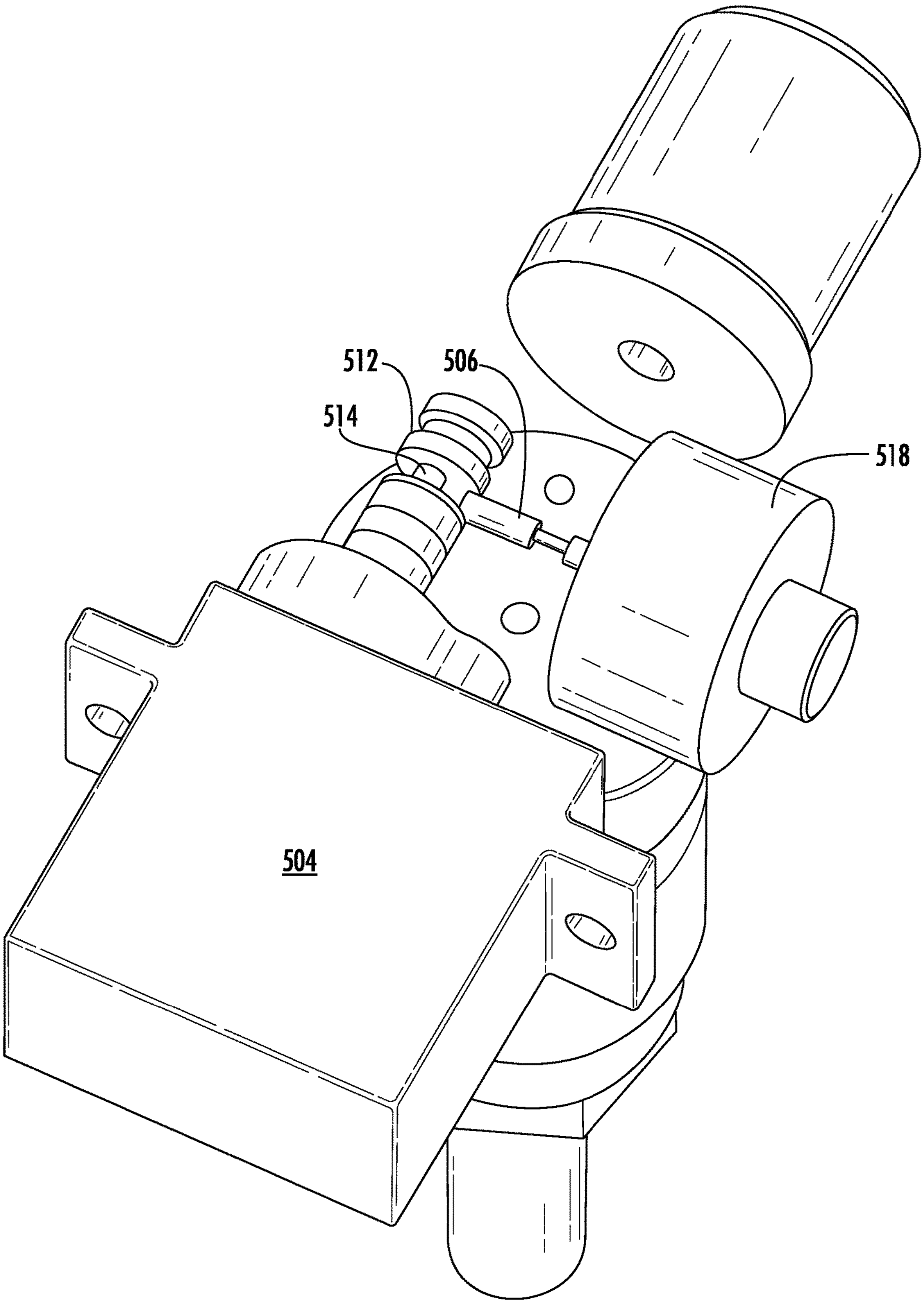
FIG. 24 shows a partial view illustrating the servo mechanism in cooperation with a fuel supply needle.
Figure 25:
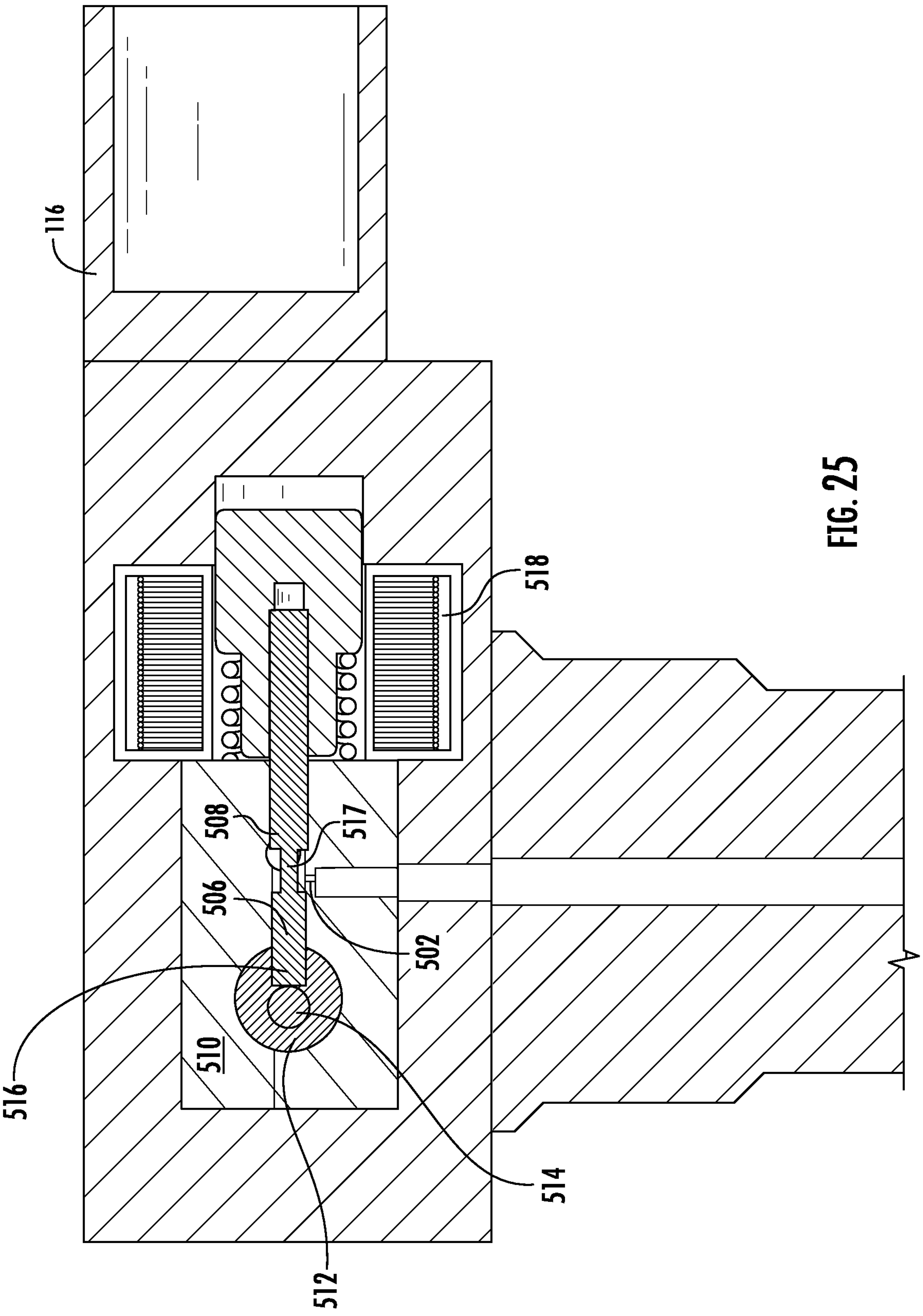
FIG. 25 shows a partial view of FIG. 23, illustrating the fuel supply needle in a fully open position.
Figure 26:
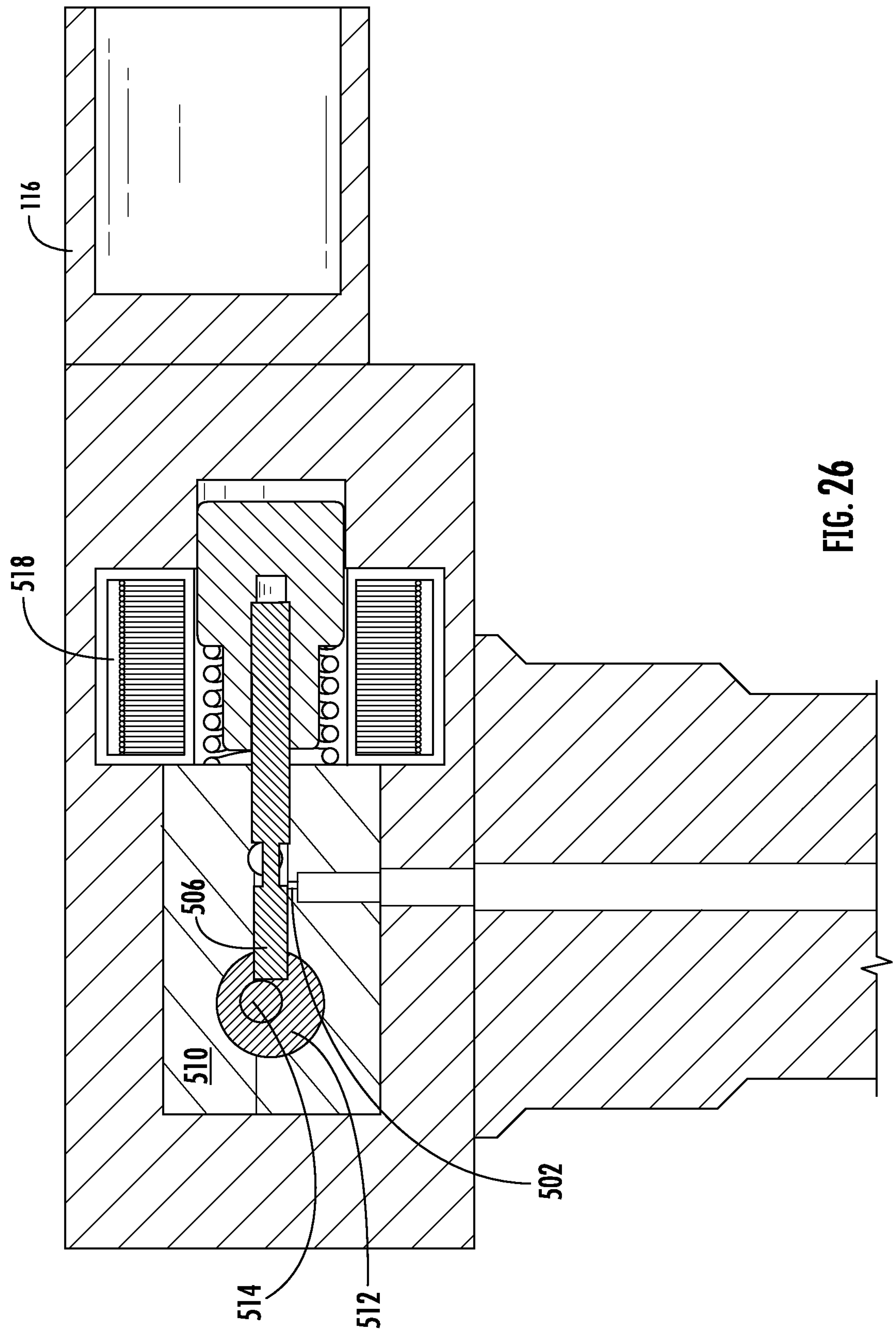
FIG. 26 shows a partial view of FIG. 23, illustrating the fuel supply needle in a partially open position.
Figure 27:
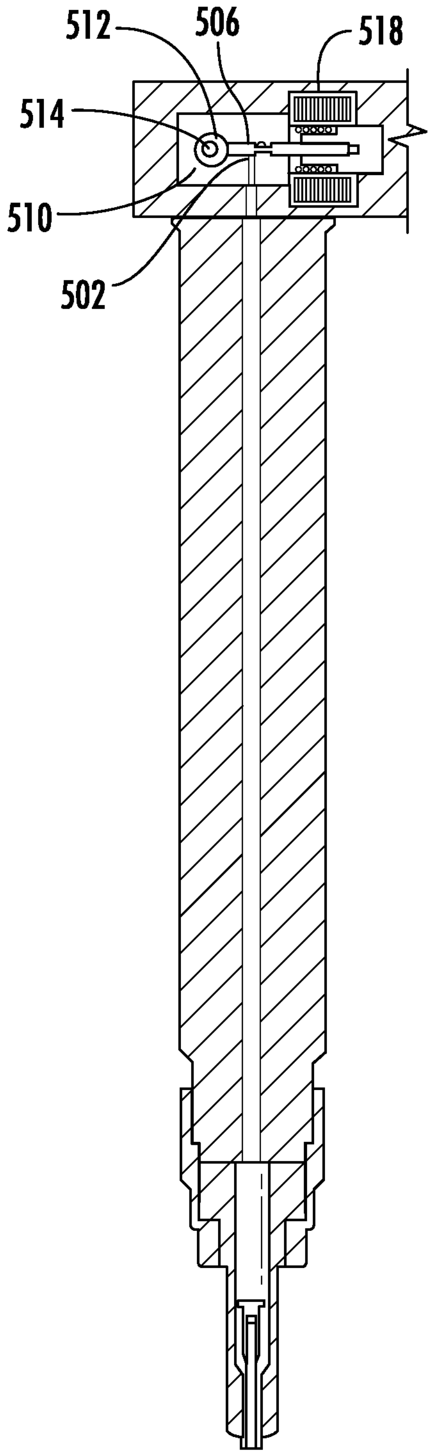
FIG. 27 shows a section view of FIG. 23, illustrating the fuel supply needle in a closed position.
Figure 28:
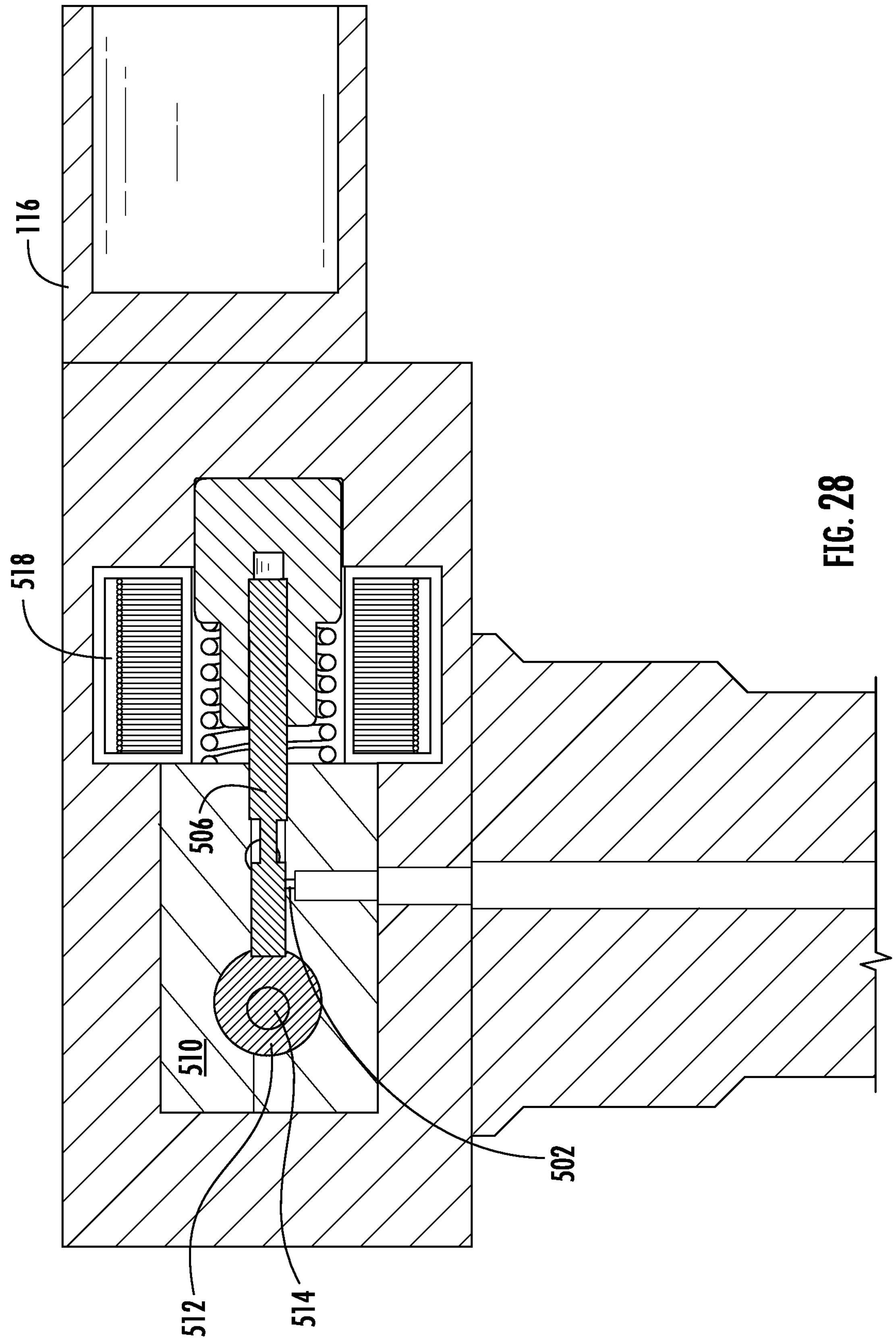
FIG. 28 shows a partial view of FIG. 23, illustrating the fuel supply needle in a closed position.
Figure 29:
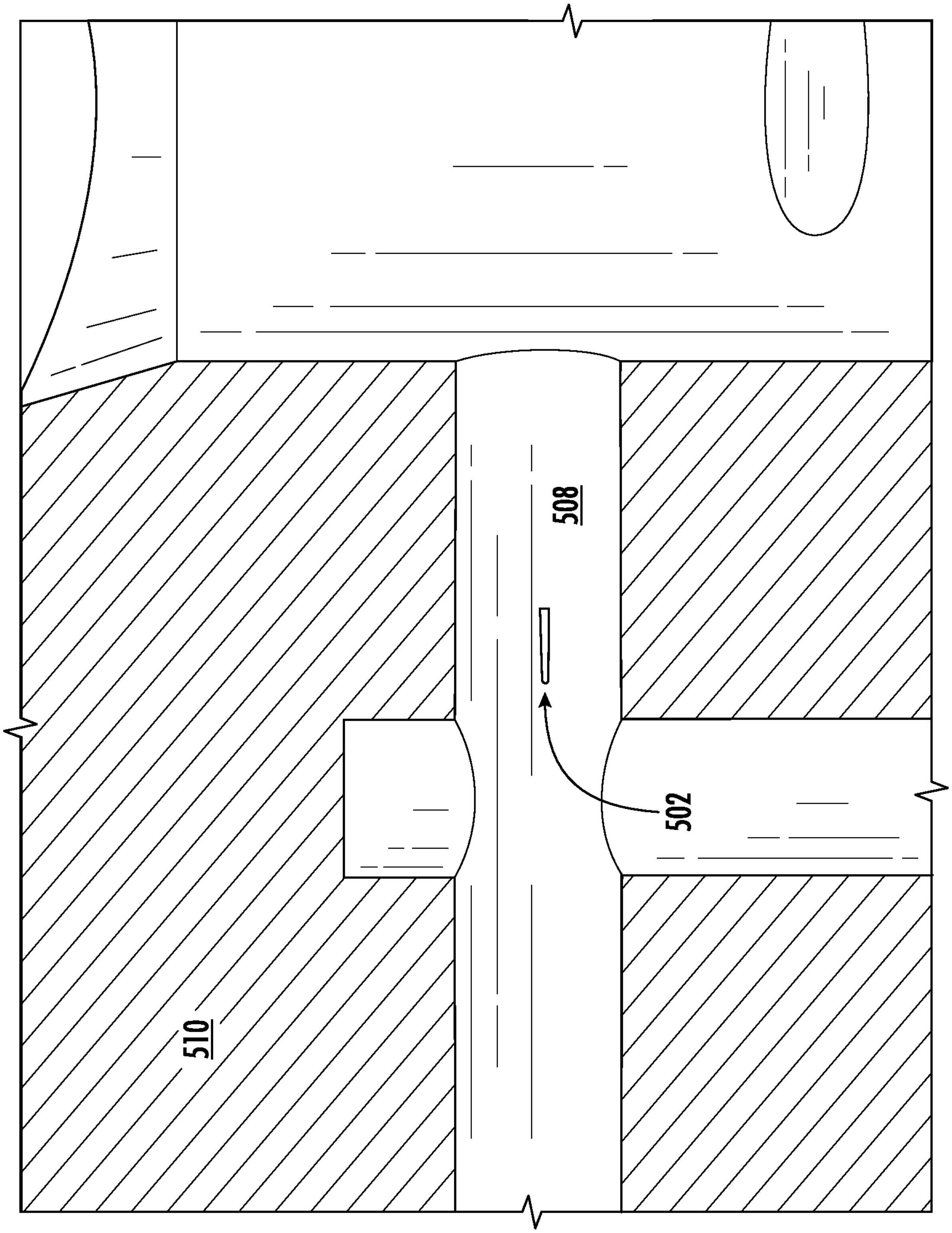
FIG. 29 shows a partial view of the liquid fuel orifice.
Figure 30:
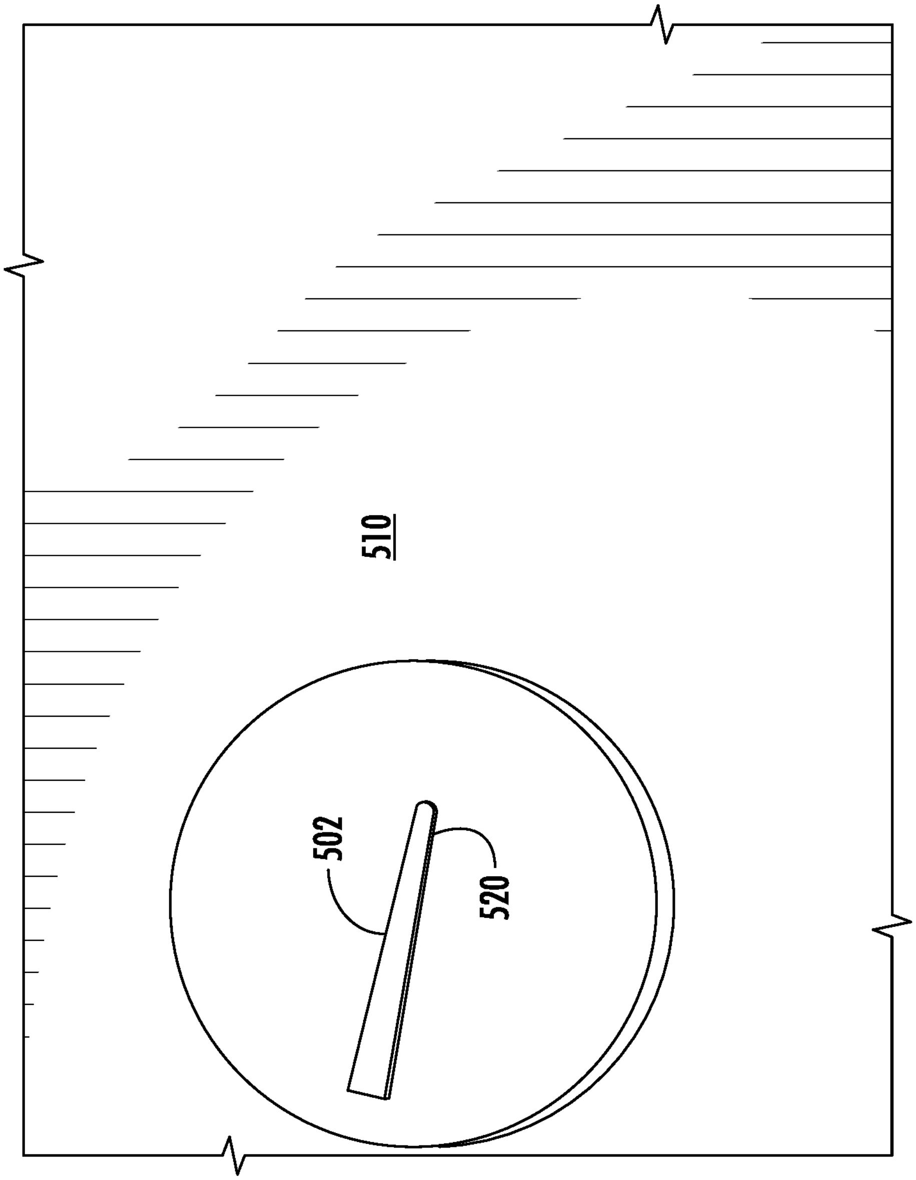
FIG. 30 shows a partial view of the liquid fuel orifice.
Figure 31:
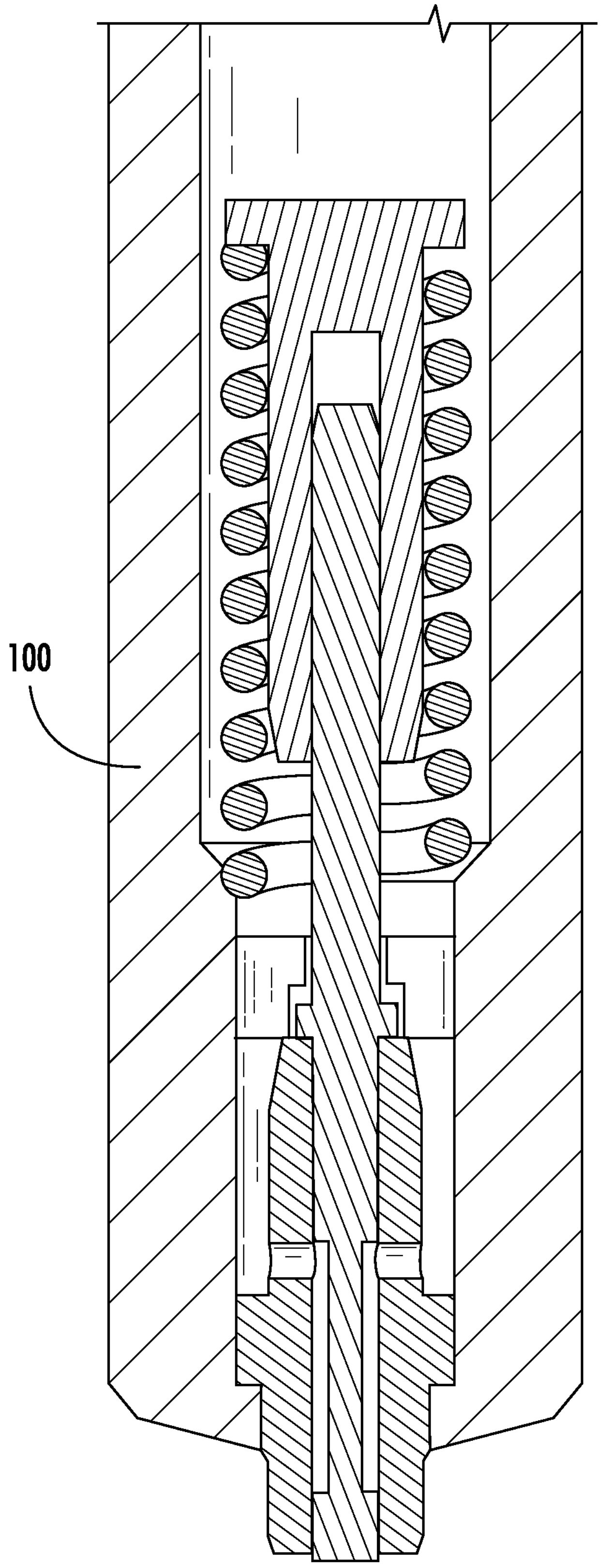
FIG. 31 shows a partial view of FIG. 23, illustrating the radial flow injector nozzle in combination with the servo flow control system.

Referring generally to the figures and more specifically to FIGS. 20-31, a servo controlled metering valve 500 is illustrated. The servo controlled metering valve 500 includes a fuel delivery aperture 502 that can be varied in size and/or shape to provide liquid fuel to the injector nozzle at a predetermined pressure regardless of volume, which may include any of the nozzles included herein, as well as other known nozzles. The servo controlled metering valve 500 may be a direct injection type as illustrated in FIG. 20, or a port injector as illustrated in FIGS. 21 and 22, without departing from the scope of the invention. The servo 504 limits the movement of a metering rod 506. The metering rod 506 slides in a metering rod bore 508 positioned within a metering block 510. The servo 504 includes a metering cam 512 having an offset journal 514. The offset journal 514 may cooperate with a distal end 516 of the metering rod 506 to limit the movement of the metering rod 506 within the metering rod bore 508. The metering rod 506 includes a stepped portion 517 which allows the flow of liquid fuel through the fuel delivery aperture 502, while the diameter of the metering rod 506 covers and prevents liquid flow through the fuel delivery aperture 502. The metering rod 506 is translated by a solenoid 518 to cause the stepped portion 517 of the metering rod 506 to cooperate with the fuel delivery aperture 502. In this manner, the flow volume of the liquid fuel passing through the variable orifice fuel nozzle 100 is controlled. Thus, the liquid fuel is delivered to the injector at a predetermined minimum pressure regardless of volume. The fuel delivery aperture 502 includes the unique shape of a circular segment having a radiused apex point 520. This construction approximates a circular aperture when the metering rod 506 is positioned for low throttling, as shown in FIG. 26, and provides increased flow when the metering rod 506 is moved to allow higher throttling positions, e.g. higher volume flows, as shown in FIG. 25. This construction also provides precise metering of liquid fuel with the provision of the offset journal 514, upon which the metering rod 506 contacts to provide precise positioning. The servo 504 is generally an electrically operated motor having a gear train and position feedback to provide precise rotational positioning of the metering cam 512. By delivering the liquid fuel at a predetermined high pressure, a pressure control spring can be utilized in the injector nozzle to uncover apertures as the volume increases so that the liquid fuel is expelled from the injector nozzle at high pressure and thus high velocities regardless of the volume. Thus, as a non-limiting example, at low volumes, maybe only one or two apertures are uncovered to allow fuel to flow into the cylinder; but, under higher throttle positions 10, 20 or more, apertures may be uncovered to handle the volume while still controlling the pressure drop out of the nozzle. This allows the liquid fuel to be better atomized and pushed further through the dense compressed air in the cylinder. The construction also allows smaller fuel apertures to provide better atomization of the liquid fuel to reduce cylinder and piston wetting.

Figure 32:
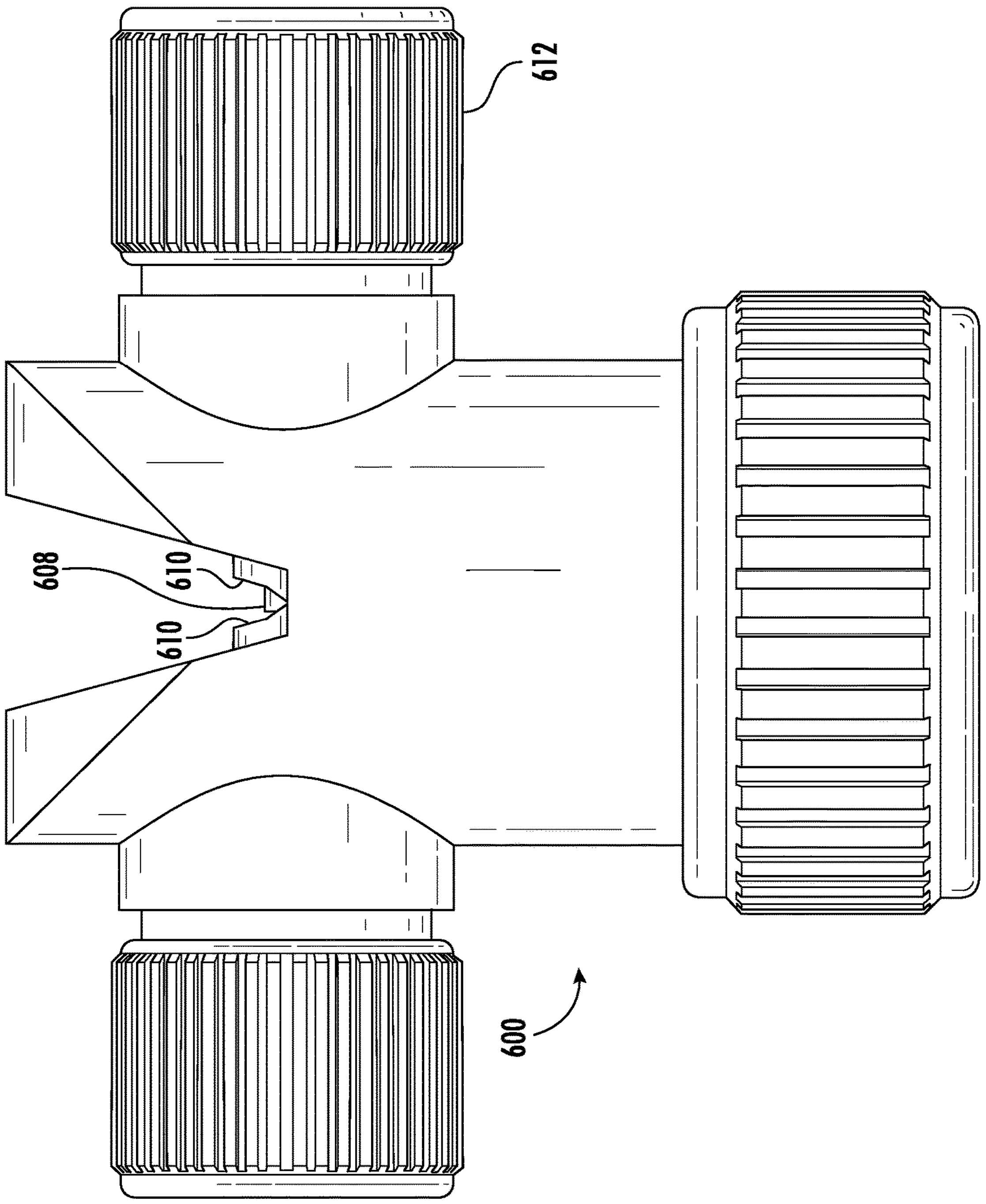
FIG. 32 shows an embodiment of the present fuel nozzle operated from a right angle.
Figure 33:
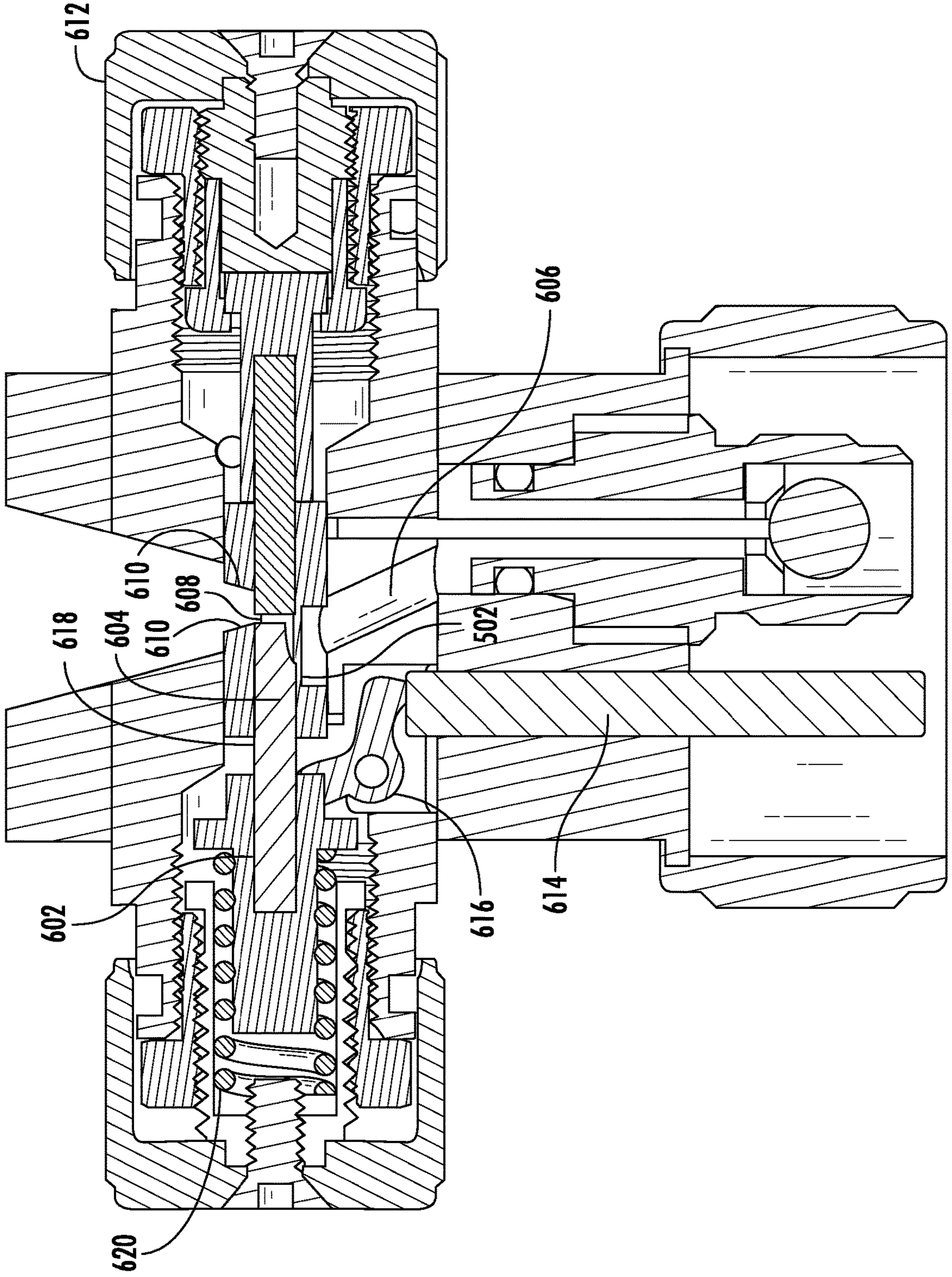
FIG. 33 shows the embodiment of FIG. 32 sectioned along a longitudinal centerline of the device.
Figure 34:
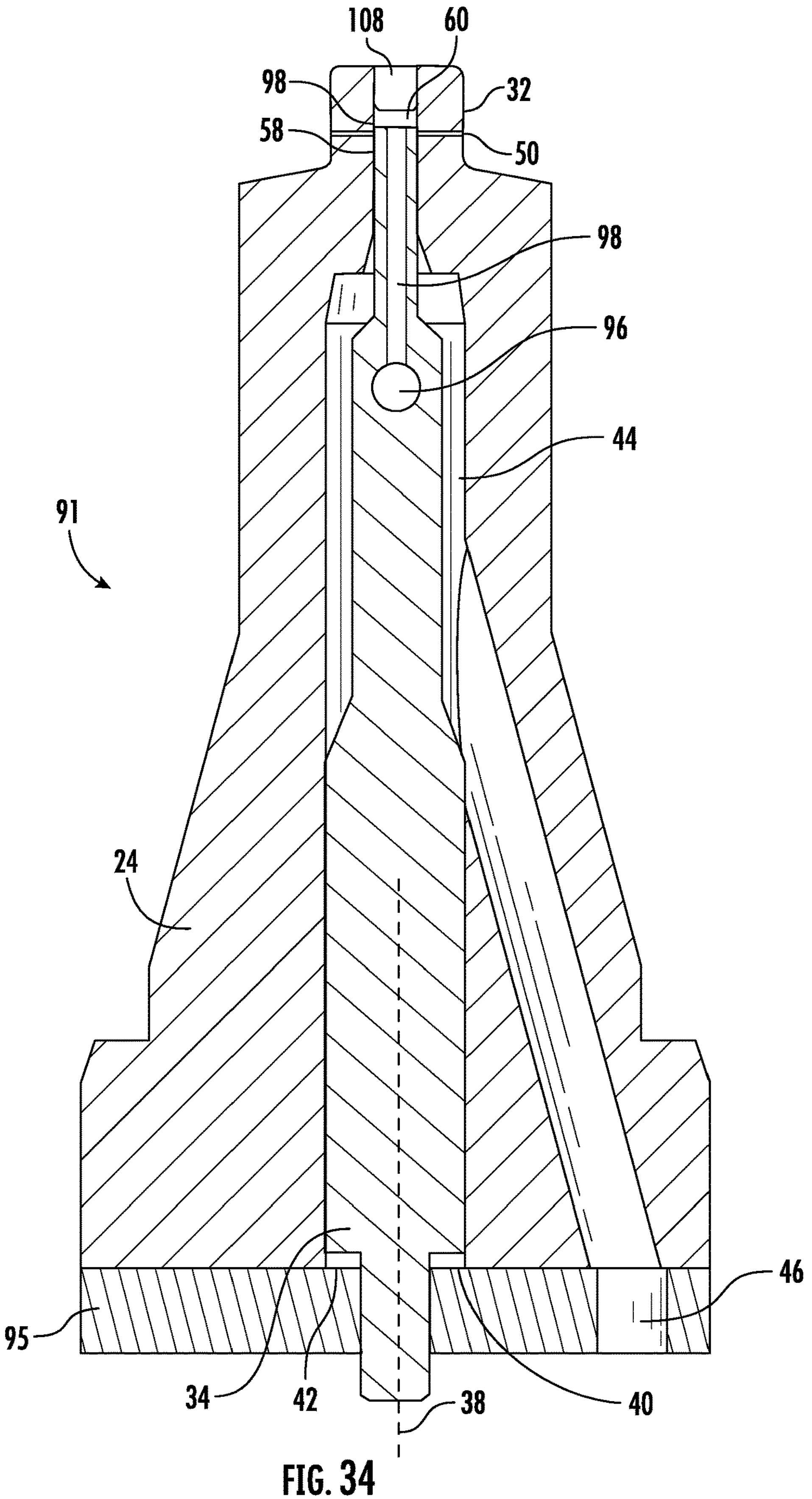
FIG. 34 shows a section view taken along the longitudinal centerline of an injector nozzle, illustrating the tubular pintle in a closed position.
Figure 35:
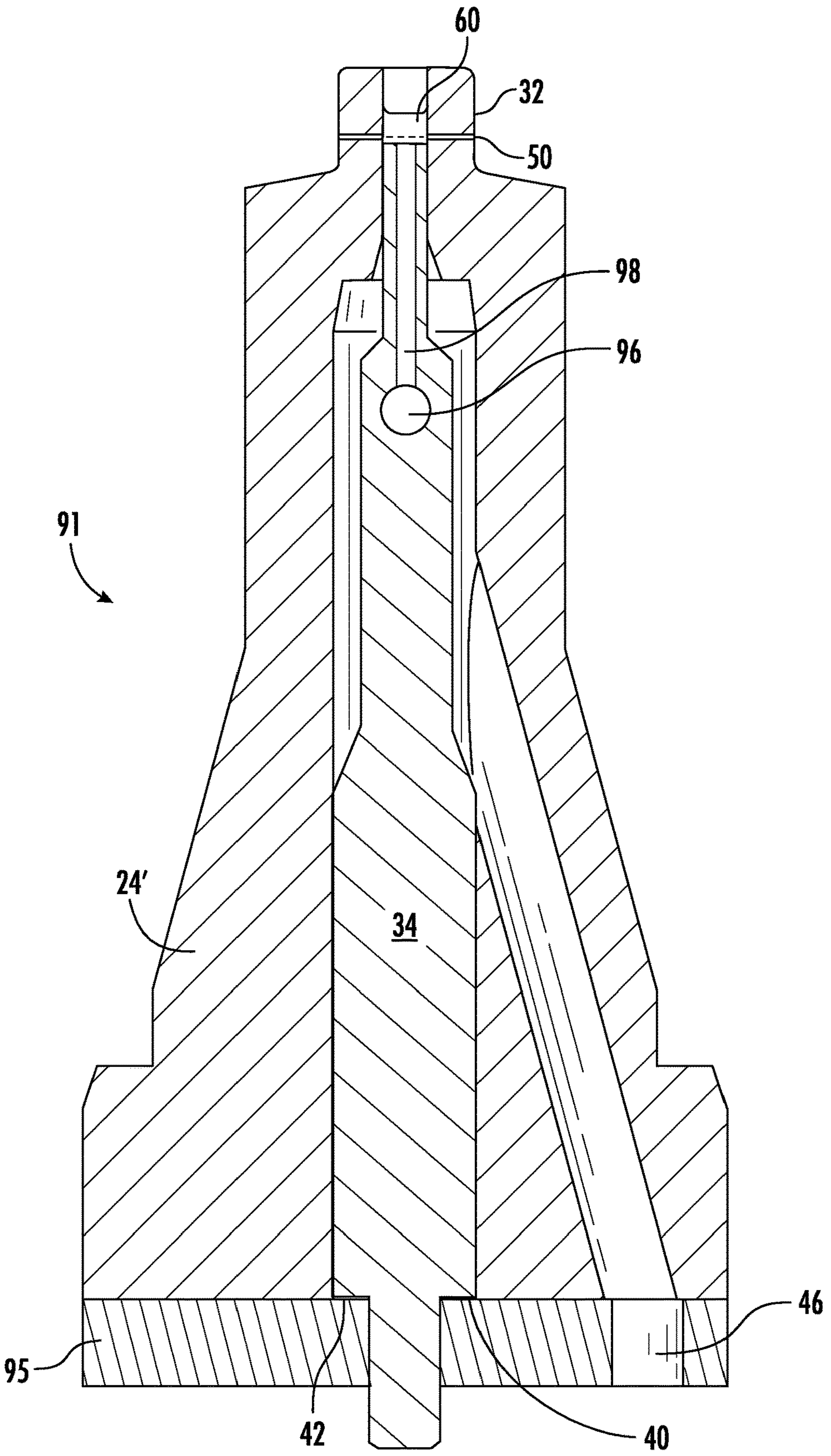
FIG. 35 shows a section view of the embodiment illustrated in FIG. 34, illustrating the pintle in an open position.
Figure 36:
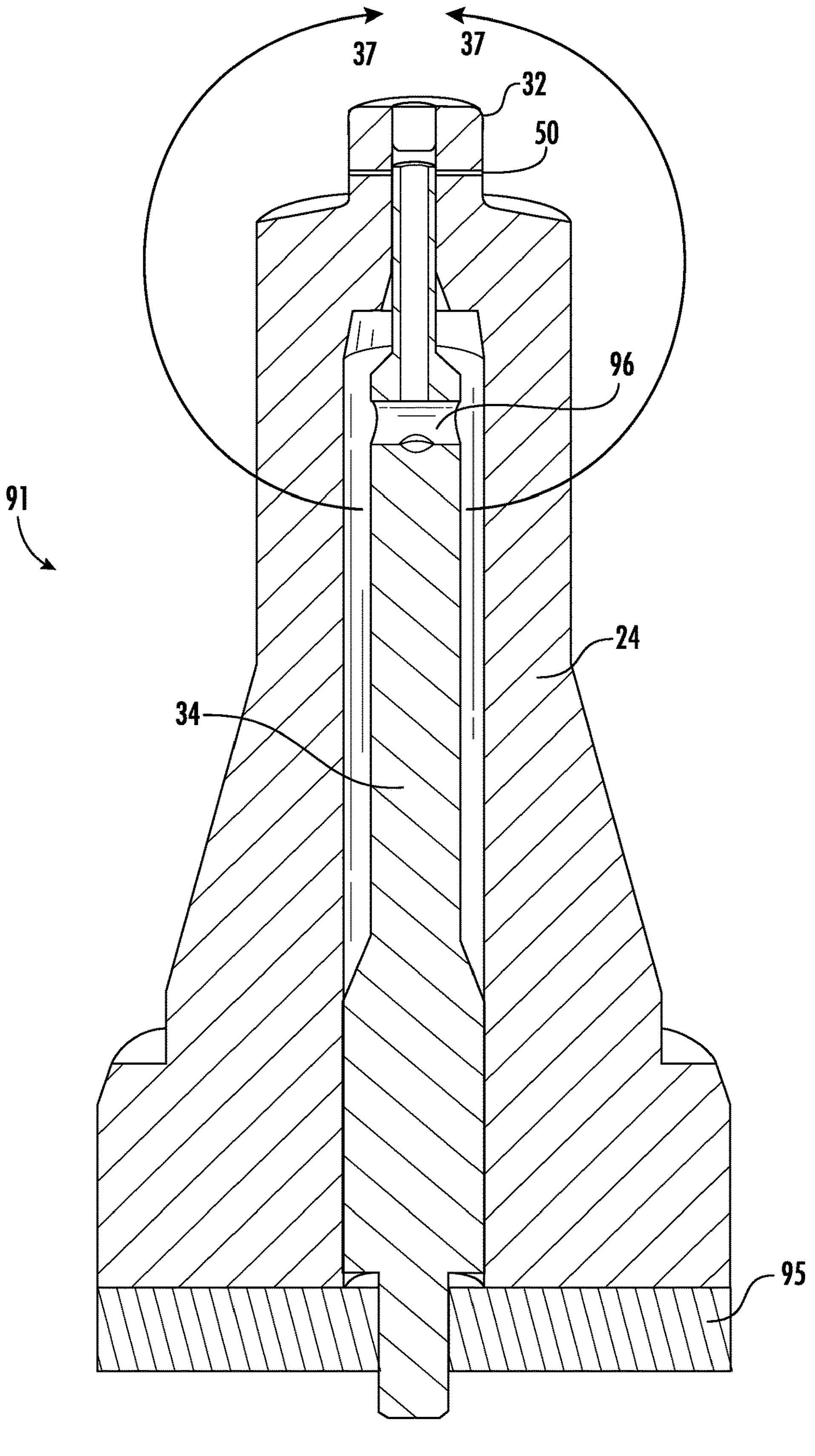
FIG. 36 shows a section view of the embodiment illustrated in FIG. 34 sectioned along a right angle plane with respect to FIG. 34.
Figure 37:
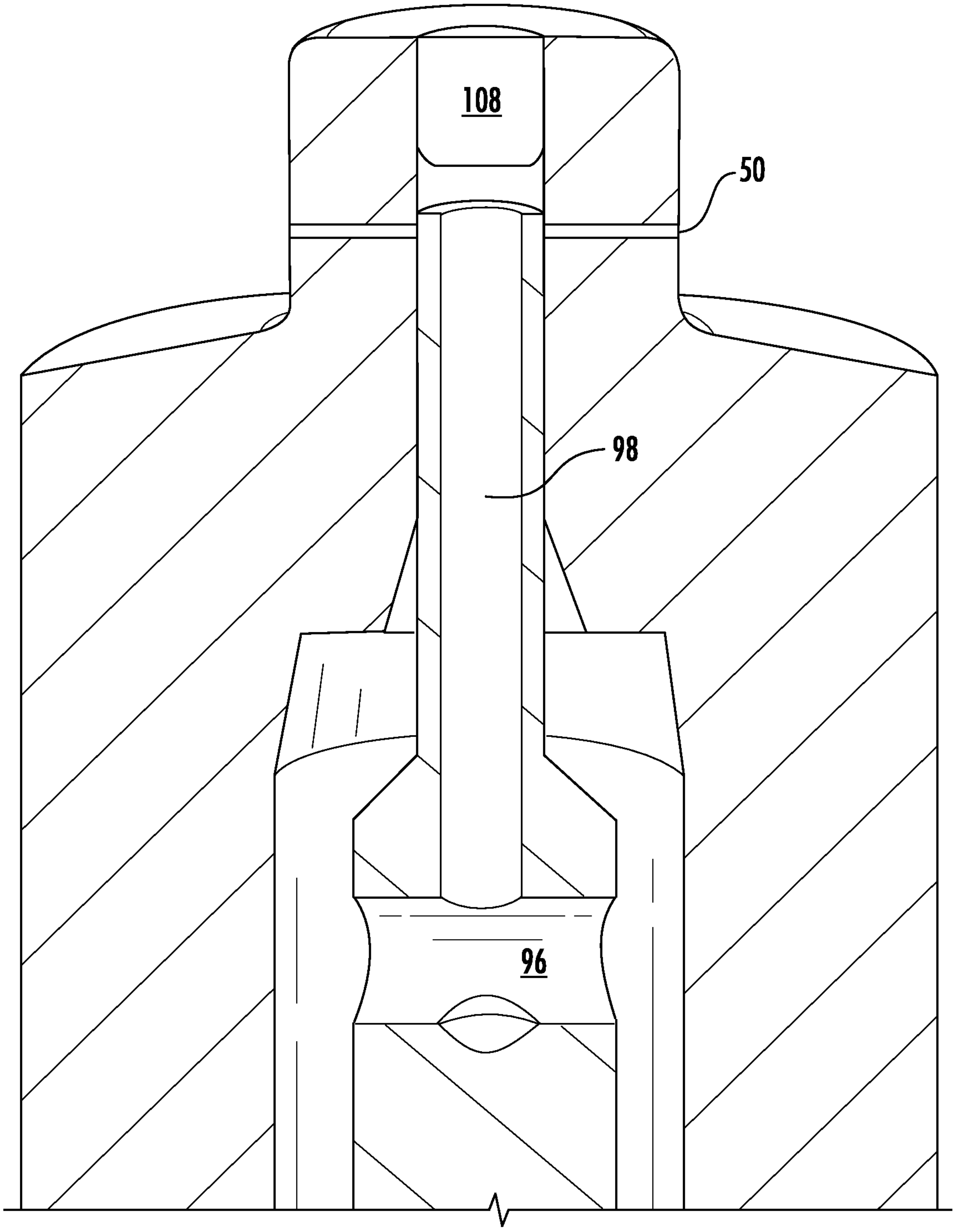
FIG. 37 shows a partial section view taken along lines 37-37 of FIG. 36.
Figure 38:
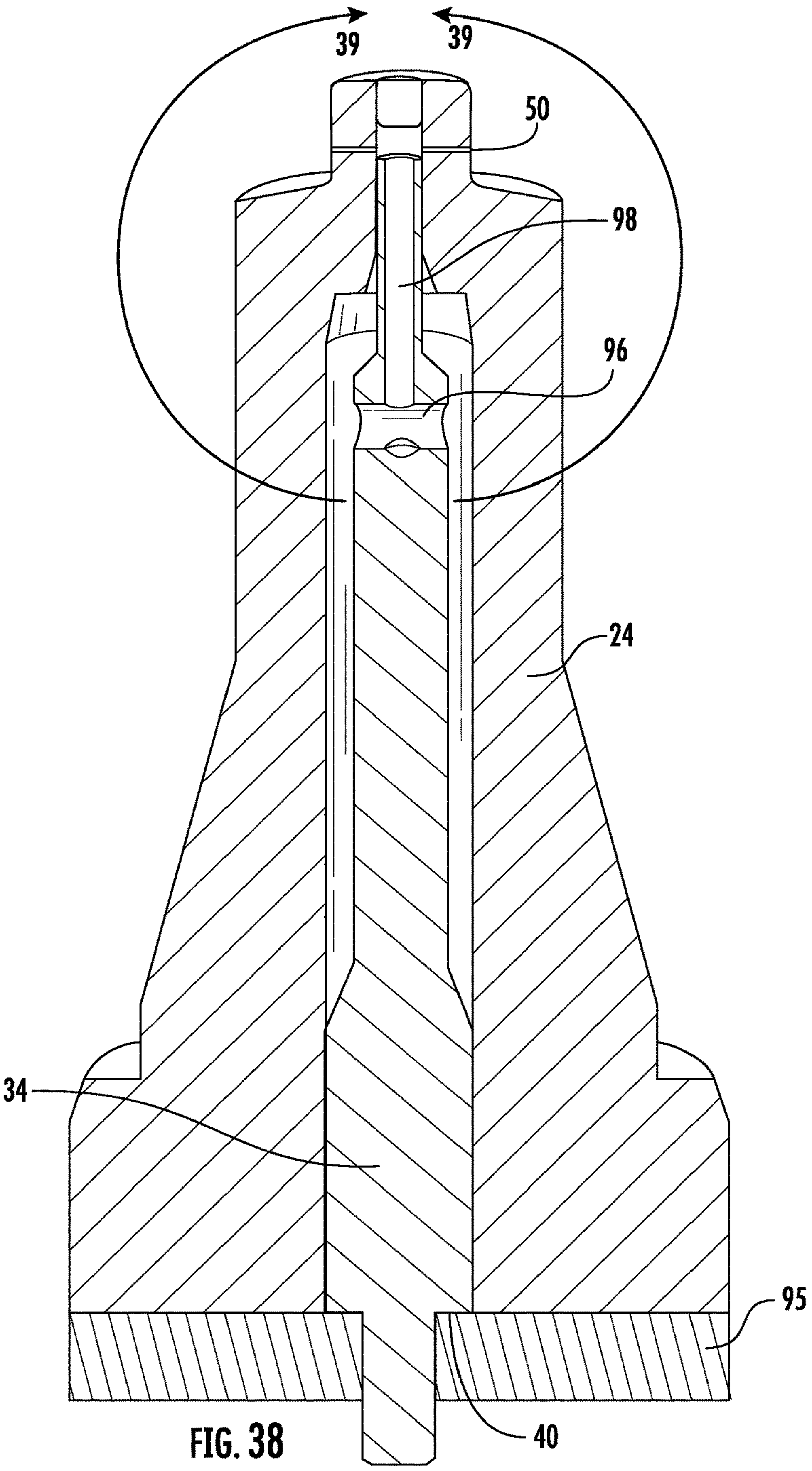
FIG. 38 shows a section view of the embodiment illustrated in FIG. 34 sectioned along a right angle plane with respect to FIG. 34.
Figure 39:
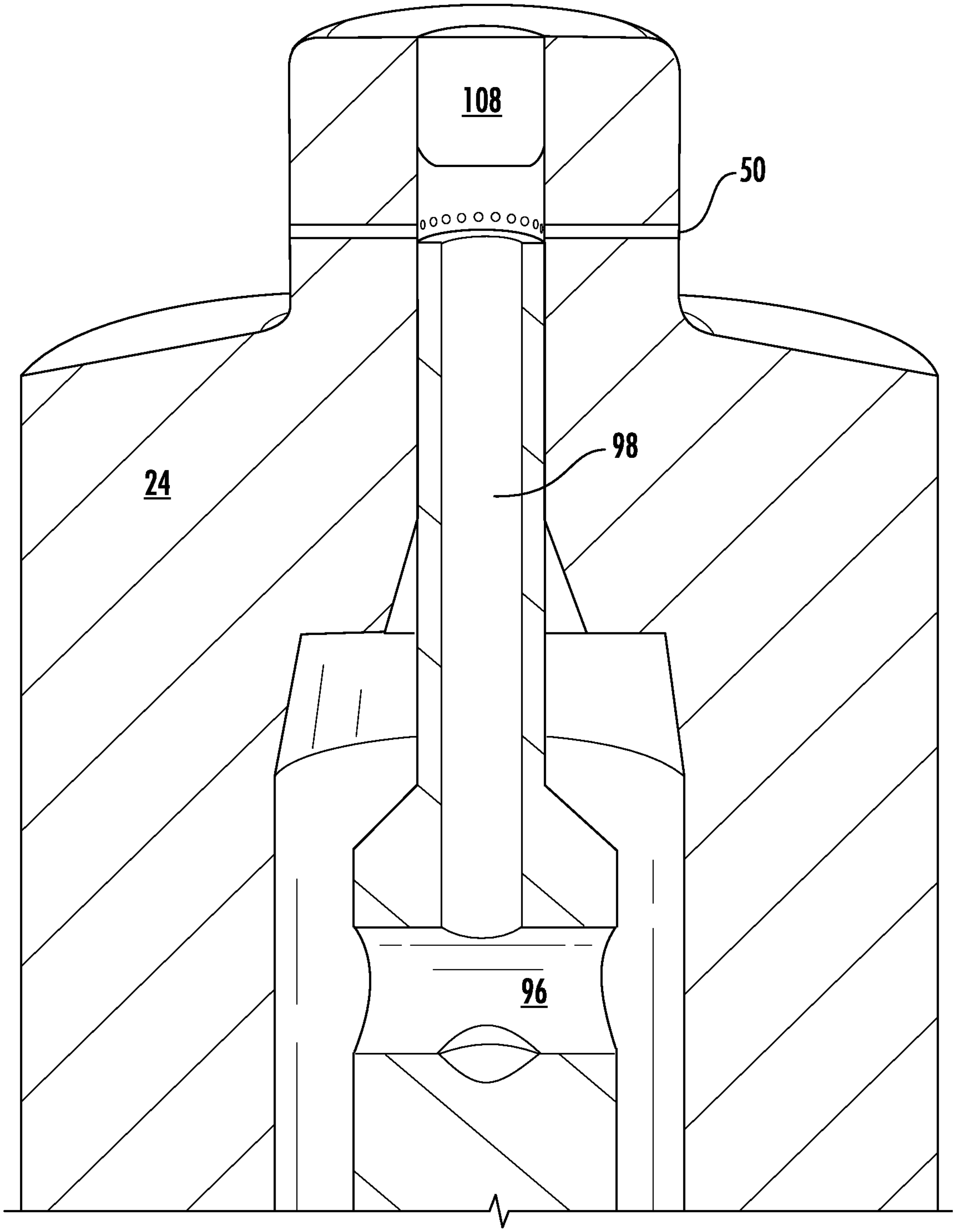
FIG. 39 shows a partial section view taken along lines 39-39 of FIG. 38.
Figure 40:
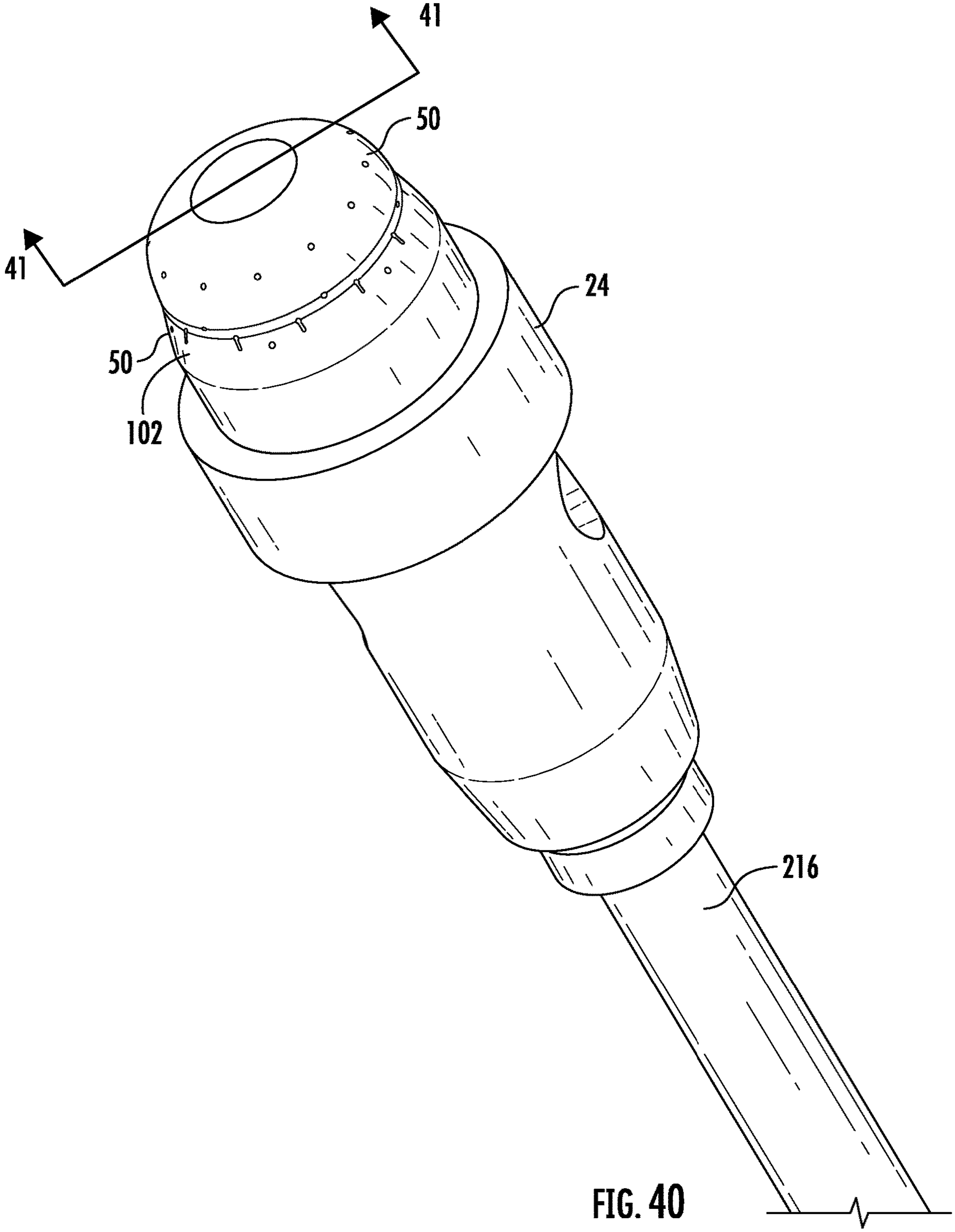
FIG. 40 shows another embodiment of an injector nozzle.
Figure 41:
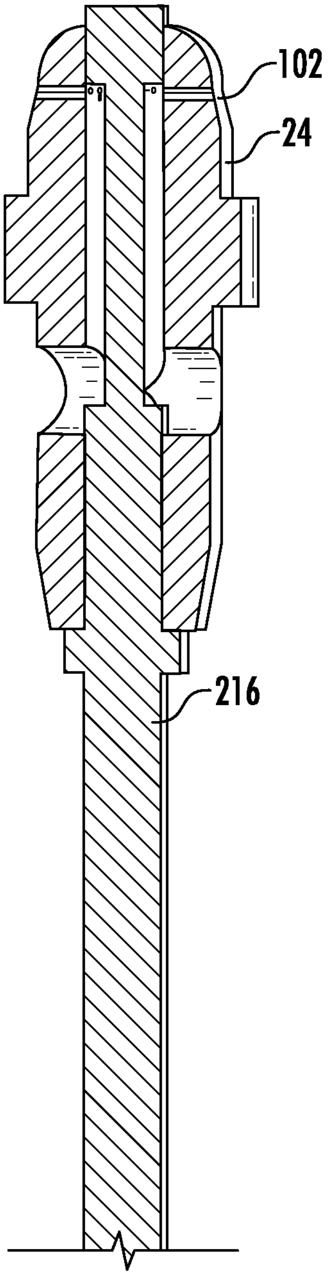
FIG. 41 shows a section view taken along lines 41-41 of FIG. 40.
Figure 42:
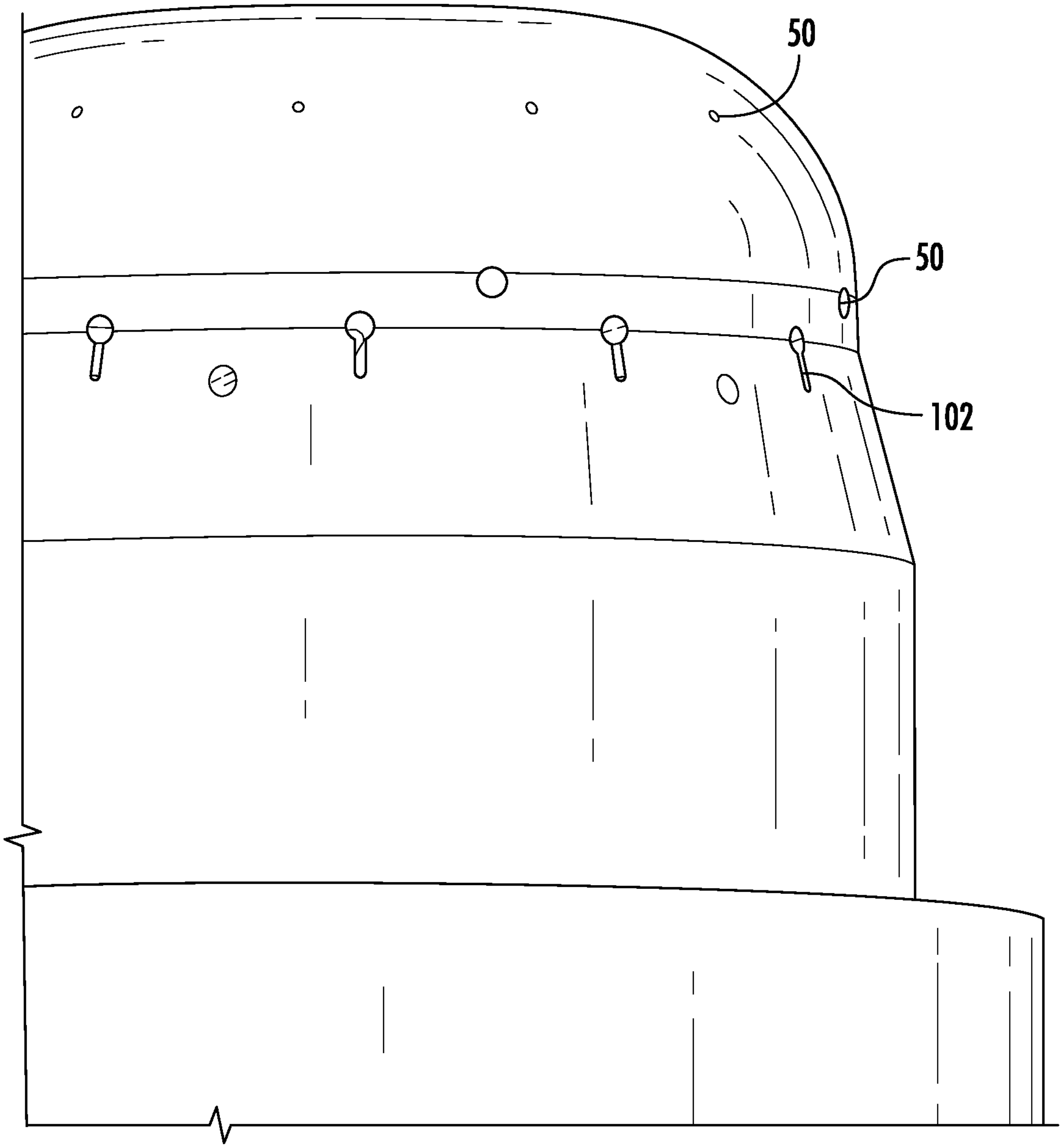
FIG. 42 shows a partial enlarged view of the nozzle orifices.

Referring generally to the figures and more specifically to FIGS. 32-33, a right angle metering valve embodiment 600 of the variable orifice fuel nozzle 100 is illustrated. This embodiment includes a right angle metering rod 602. The right angle metering rod 602 includes a deflection surface 604 that deflects the liquid fuel flowing through a supply channel 606 as it passes through the fuel delivery aperture 502 so that the high velocity liquid is directed to impinge against an anvil surface 608 to cause the liquid fuel to be atomized. Control surfaces 610 are provided to control the dispersed pattern of the atomized fuel. A control knob 612 allows the user, servo, or stepper motor to change the linear position of the anvil surface 608 to provide variation in the pattern. In this manner, the anvil surface 608 can be moved closer to or farther away from the metering rod 602 and deflection surface 604. Push rod 614 and cantilever 616 cooperate to move the metering rod 602 within the metering rod bore 618. Solenoids, linear motors, servos and the like may be utilized for operation of the push rod 614. Spring member 620 returns the metering rod 602 to its home position, covering the fuel delivery aperture 502. It should be noted that while the forgoing device atomizes the fuel by directing it against the flat surface, the atomized fuel may be directed through a fuel injector nozzle without departing from the scope of the invention.

Figure 1A:
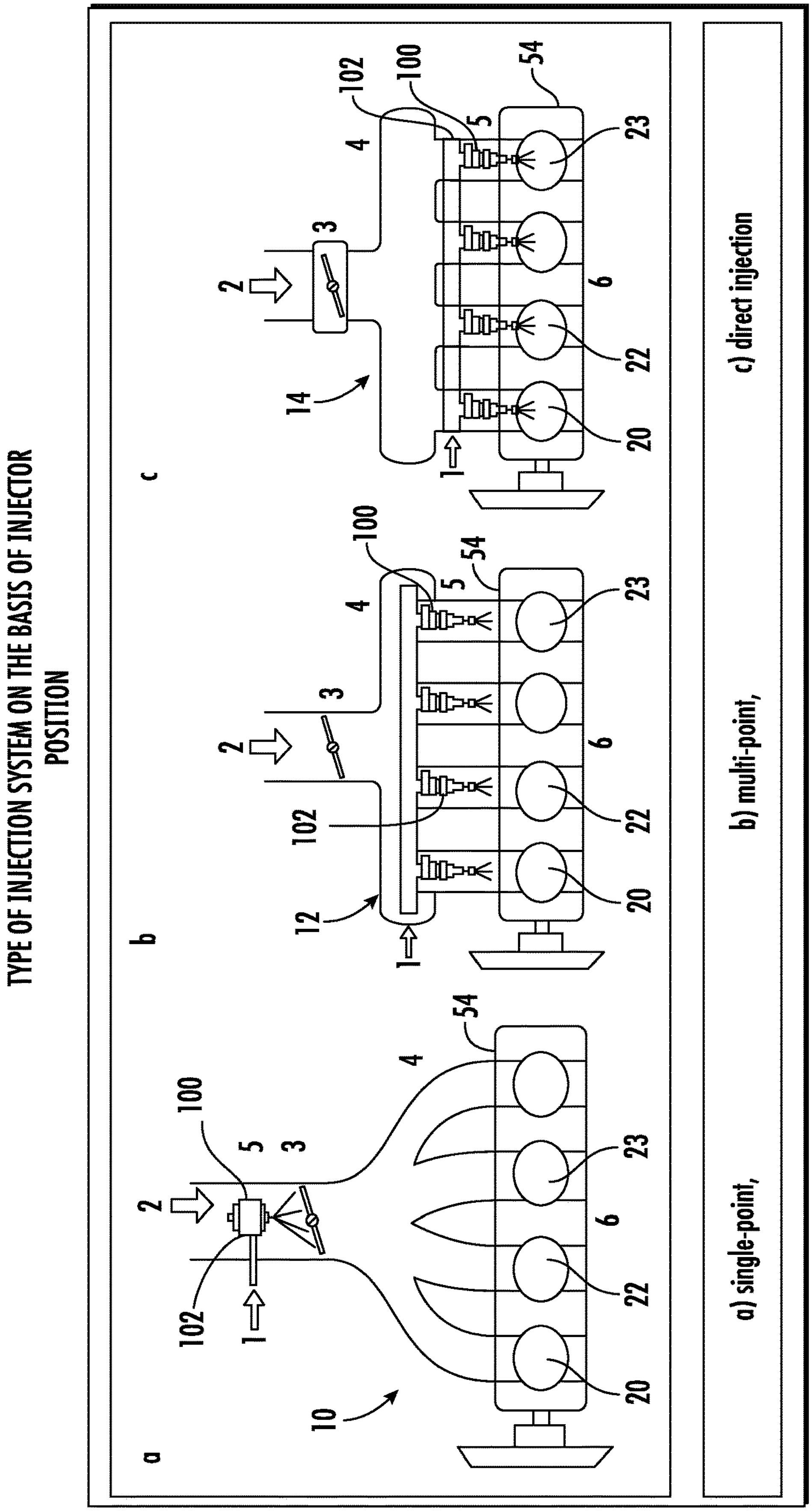
FIG. 1A shows a schematic view illustrating various types of injection systems based upon injector position.
Figure 1B:
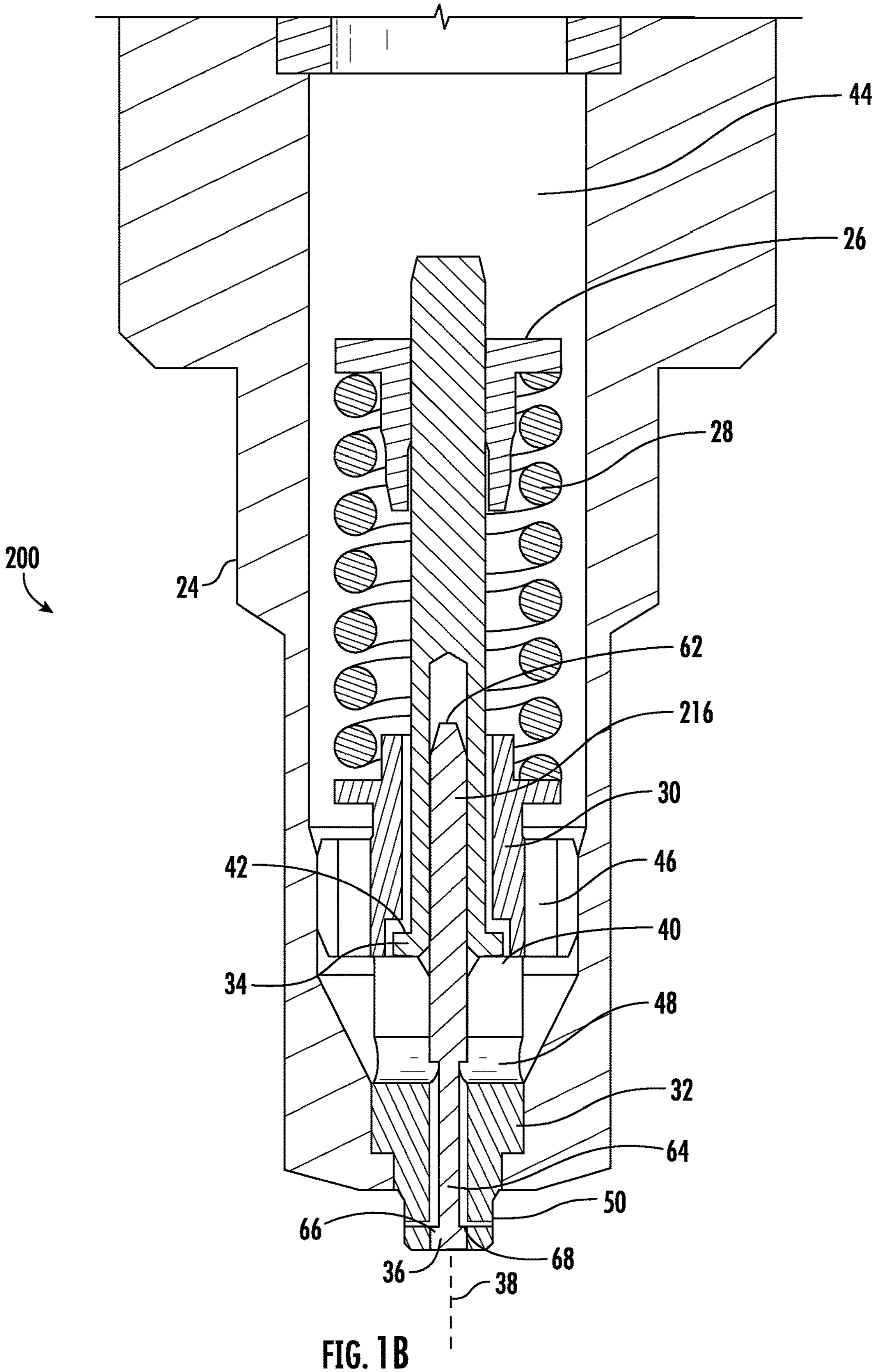
FIG. 1B shows a section view taken along the longitudinal centerline of the injector nozzle.
Figure 1C:
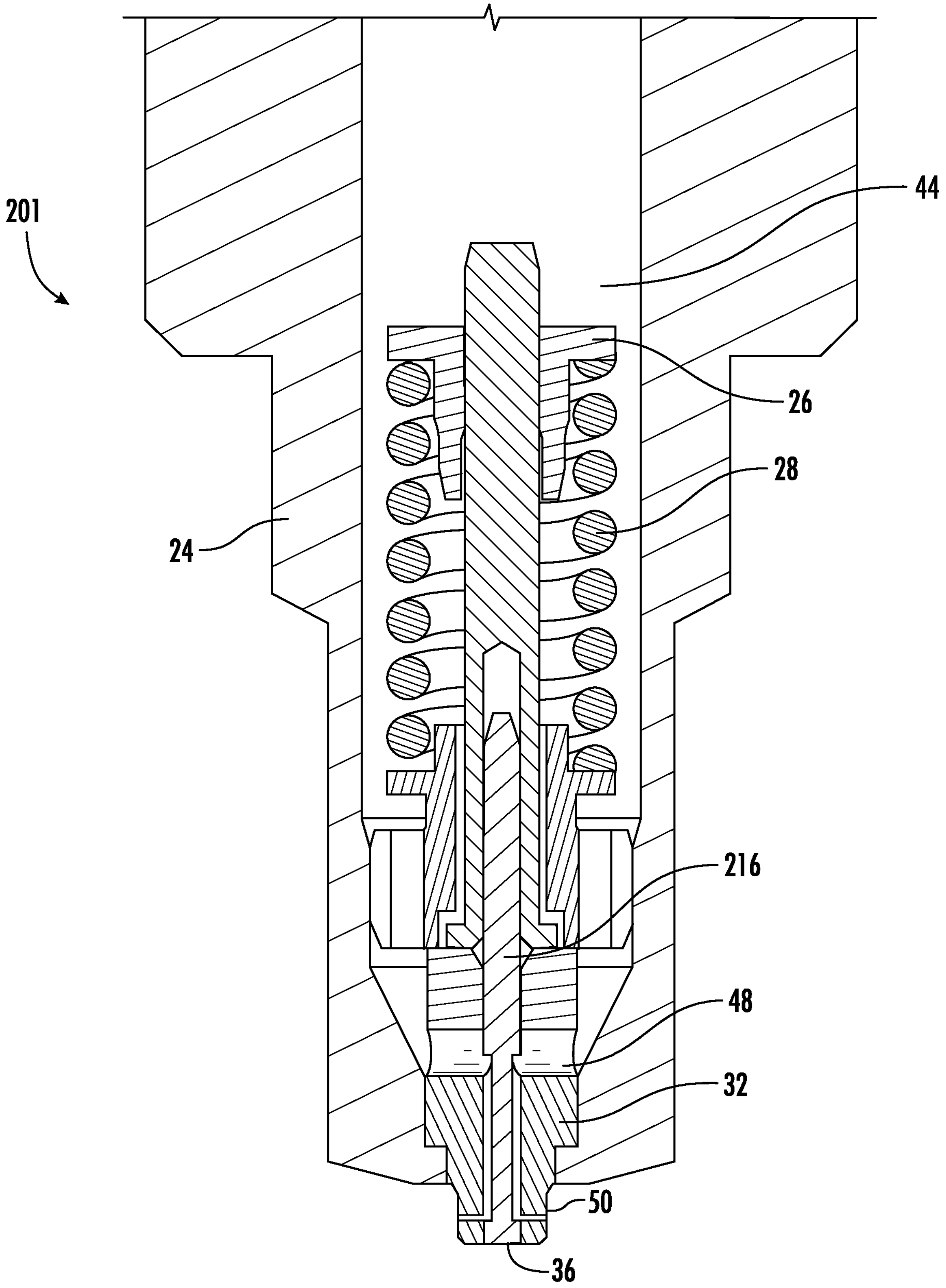
FIG. 1C shows a section view of an alternative embodiment taken along the longitudinal centerline of the injector nozzle.
Figure 2:
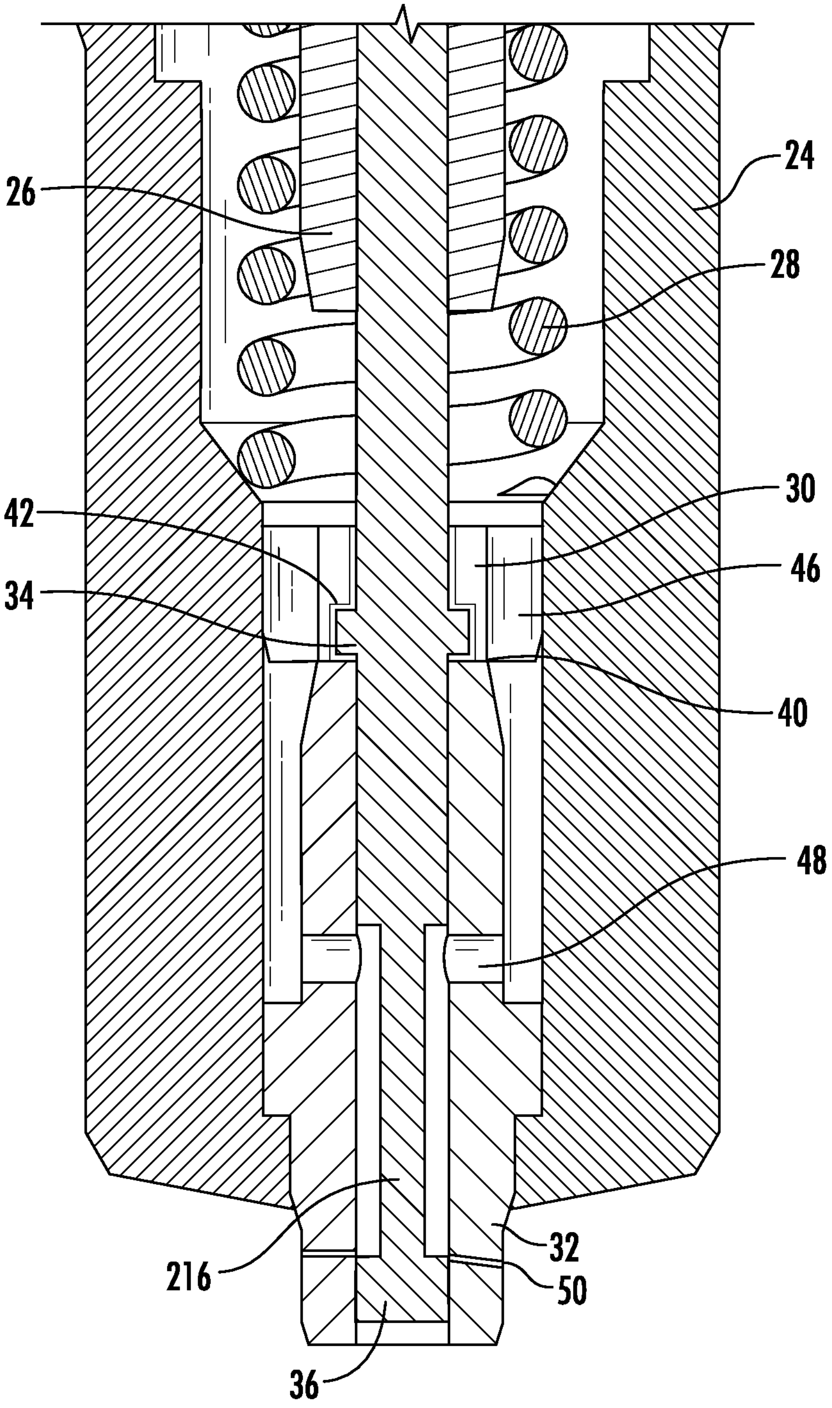
FIG. 2 shows a partial section view of the embodiment illustrated in FIG. 1B.
Figure 3A:
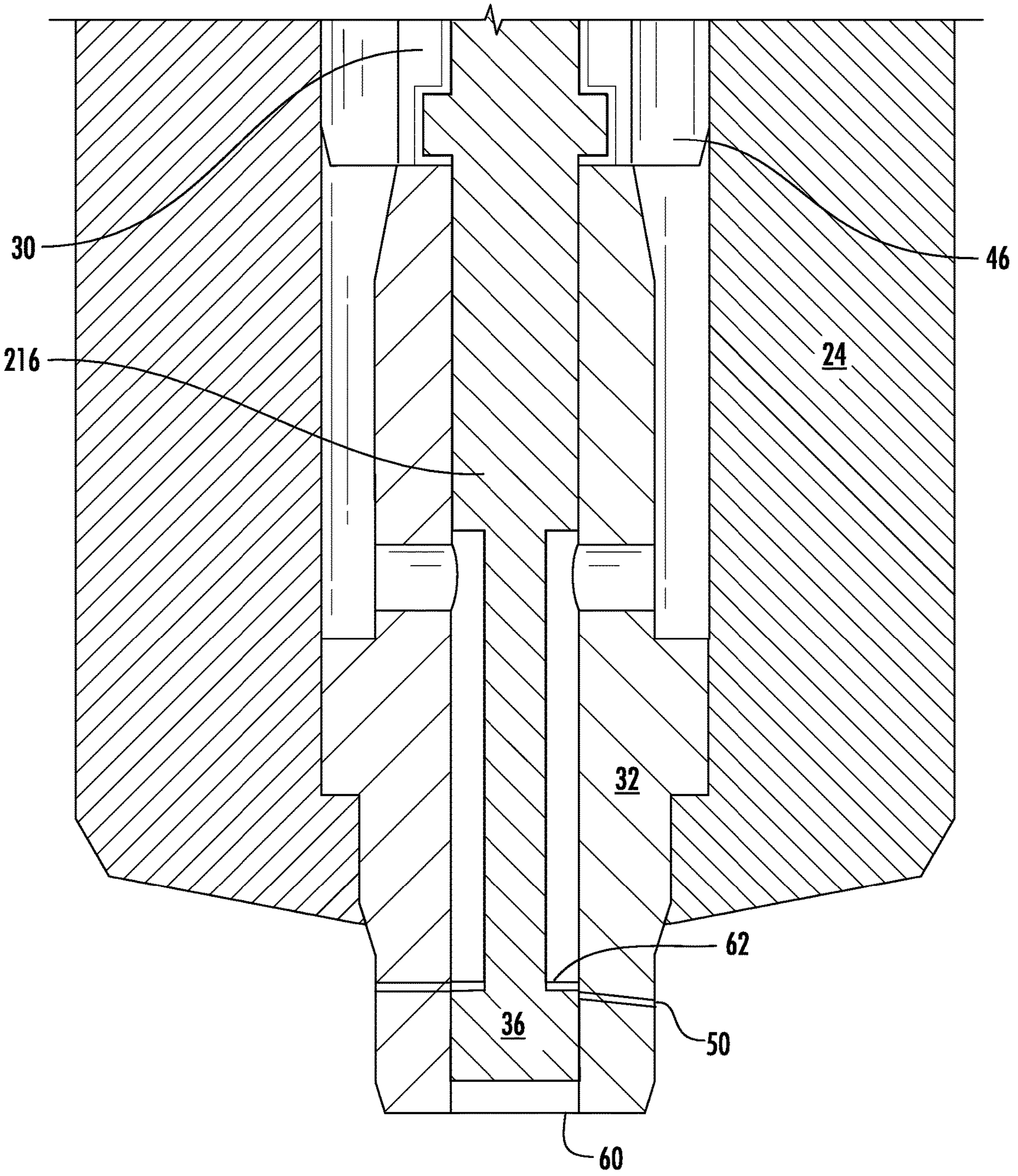
FIG. 3A shows a partial section view of the embodiment shown in FIG. 1B, illustrating the pintle rod in a closed position.
Figure 3B:
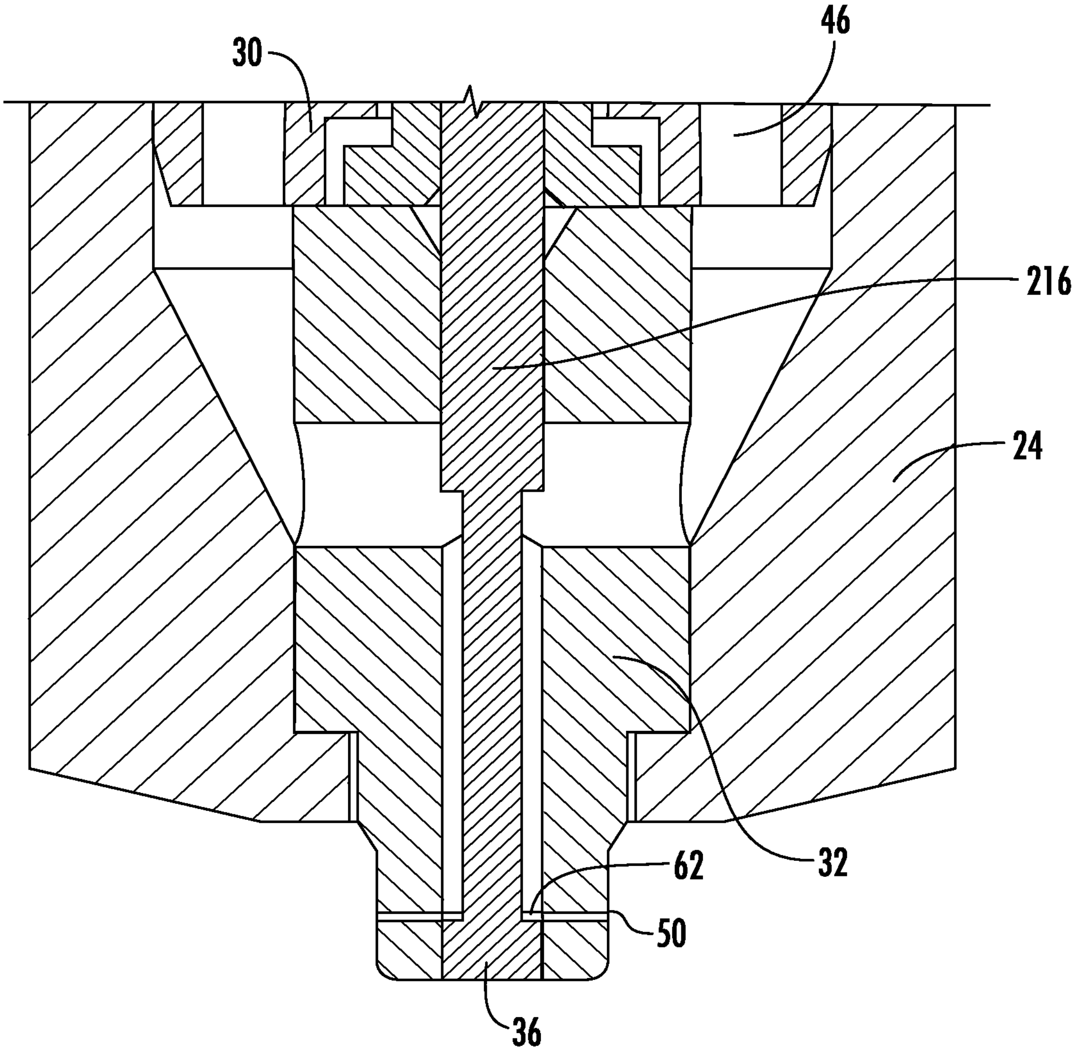
FIG. 3B shows a partial section view of an alternative embodiment shown in FIG. 1B, illustrating the pintle rod in a closed position.
Figure 4:
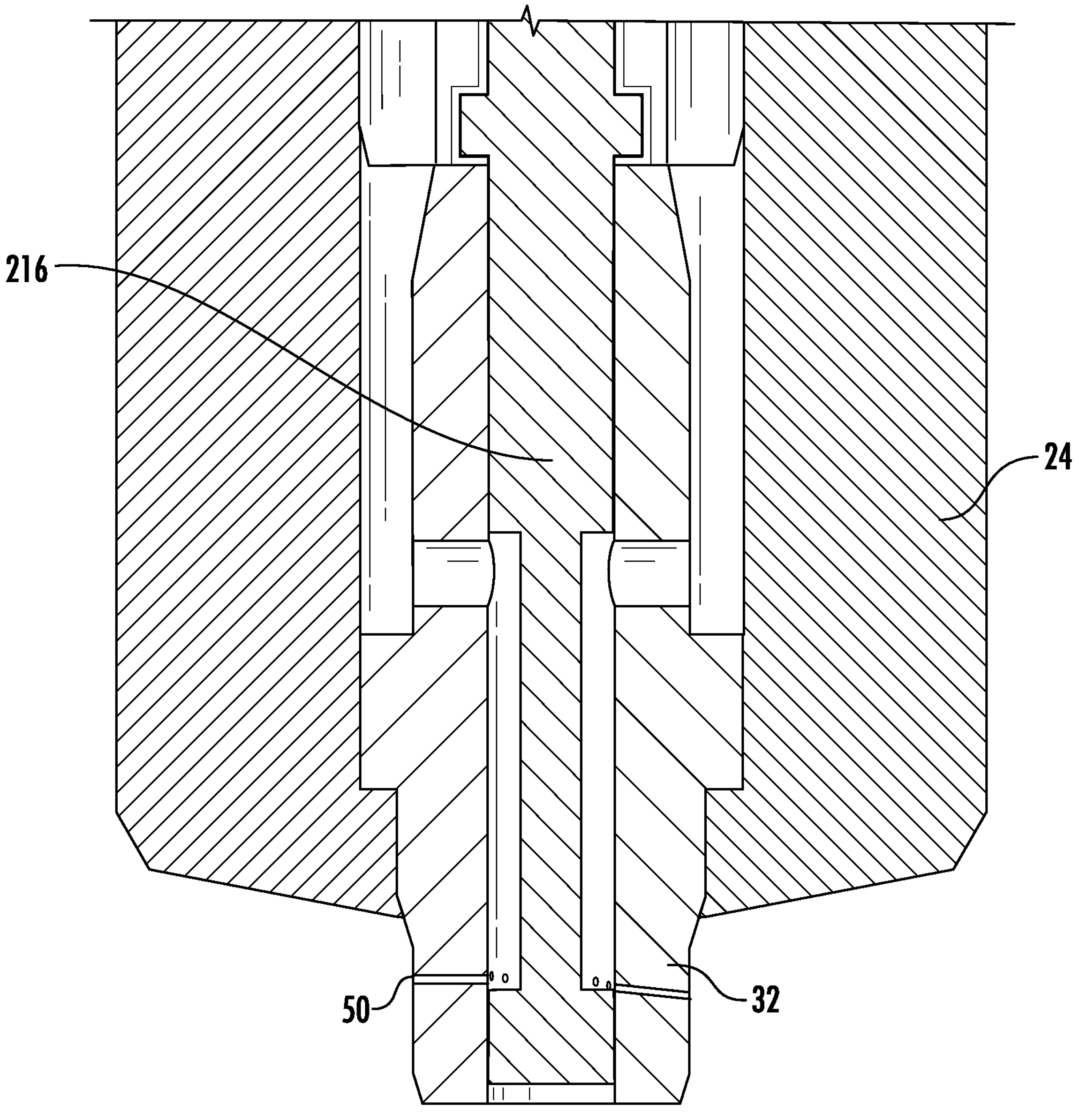
FIG. 4 shows a partial section view of the embodiment shown in FIG. 1B, illustrating the pintle rod in an open position.
Figure 5:
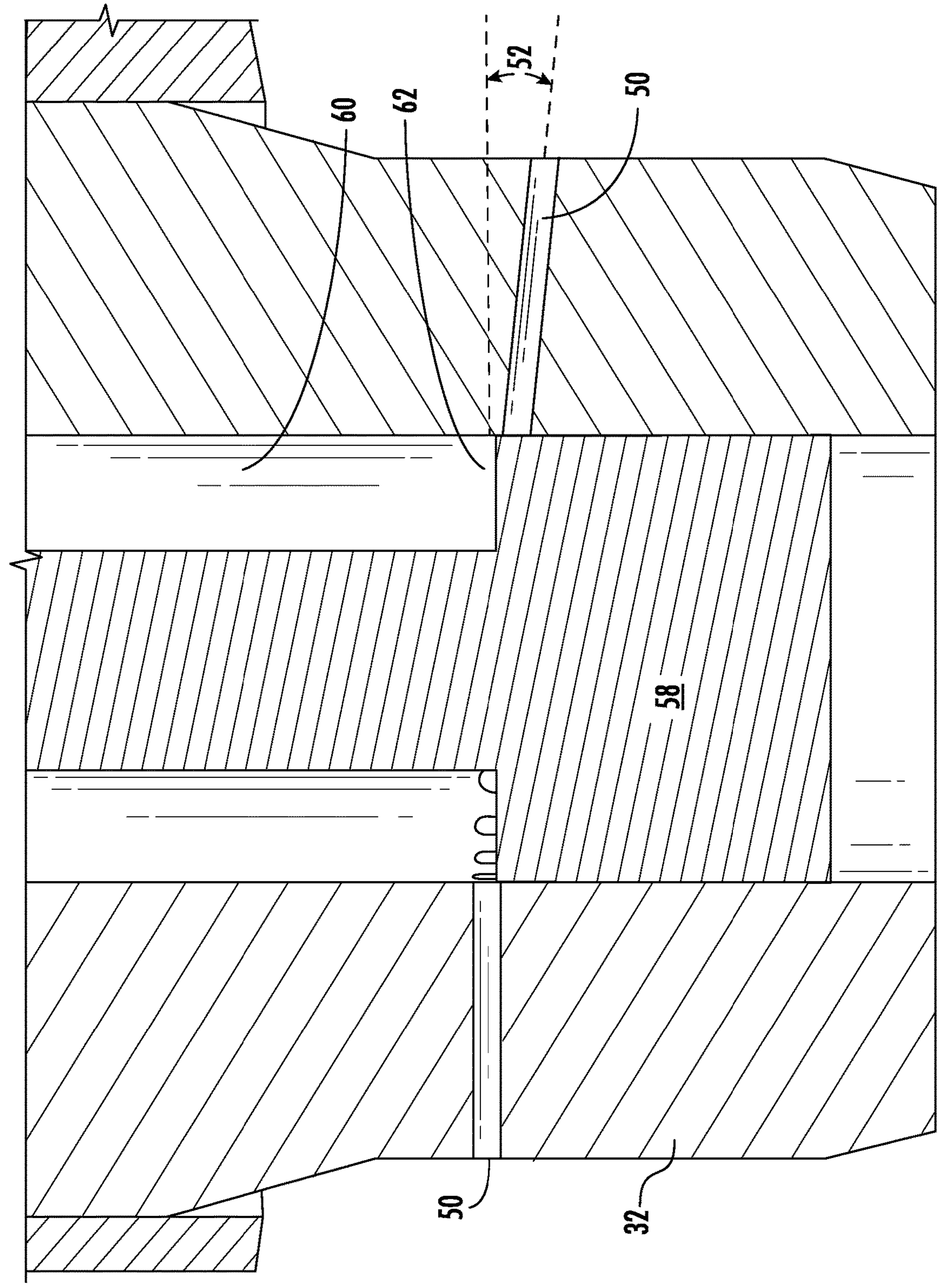
FIG. 5 shows a partial section view of the embodiment shown in FIG. 1B, illustrating the pintle rod in a partially open position.
Figure 6:
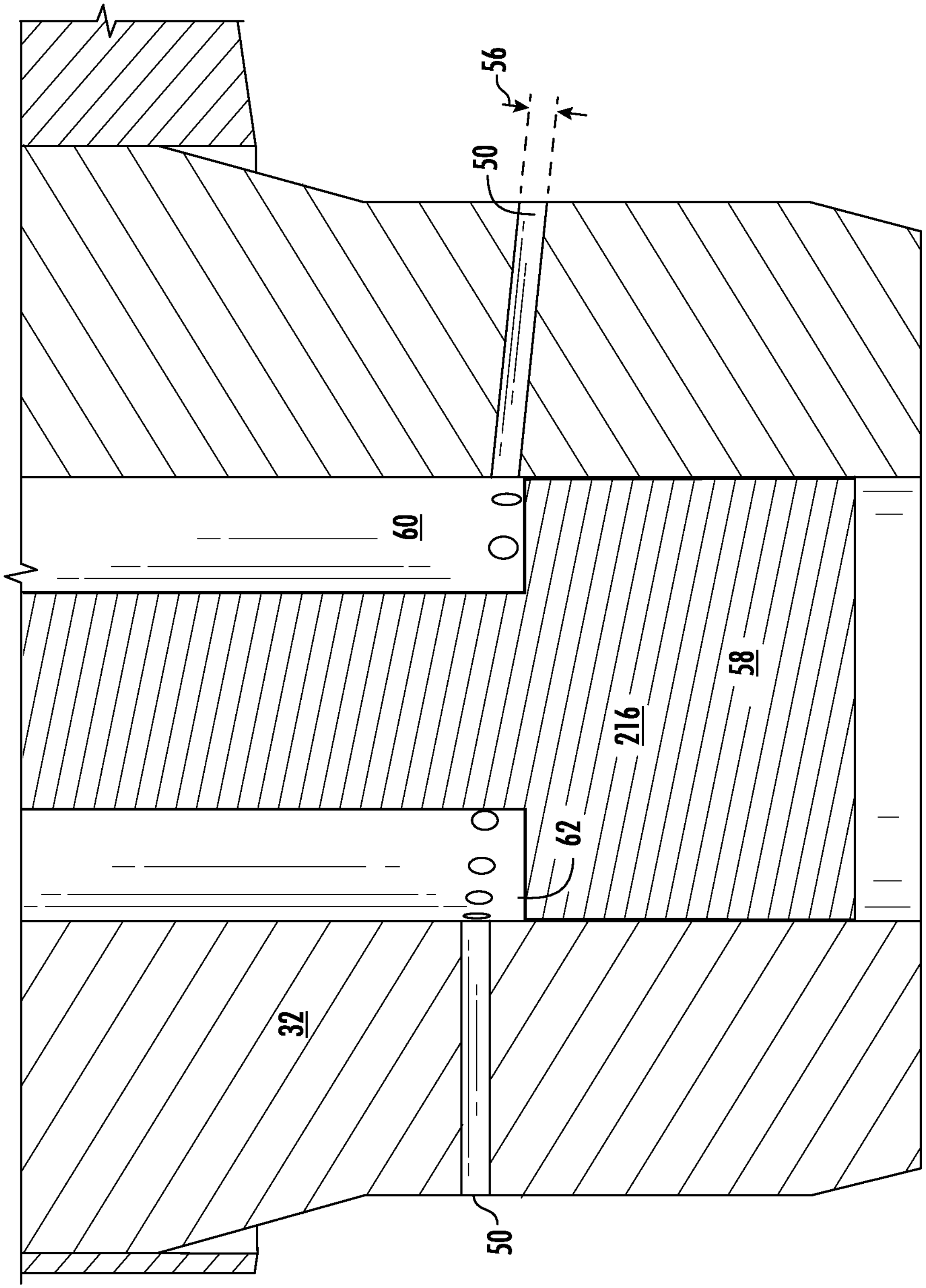
FIG. 6 shows a partial section view of the embodiment shown in FIG. 1B, illustrating the pintle rod in an open position.
Figure 7A:
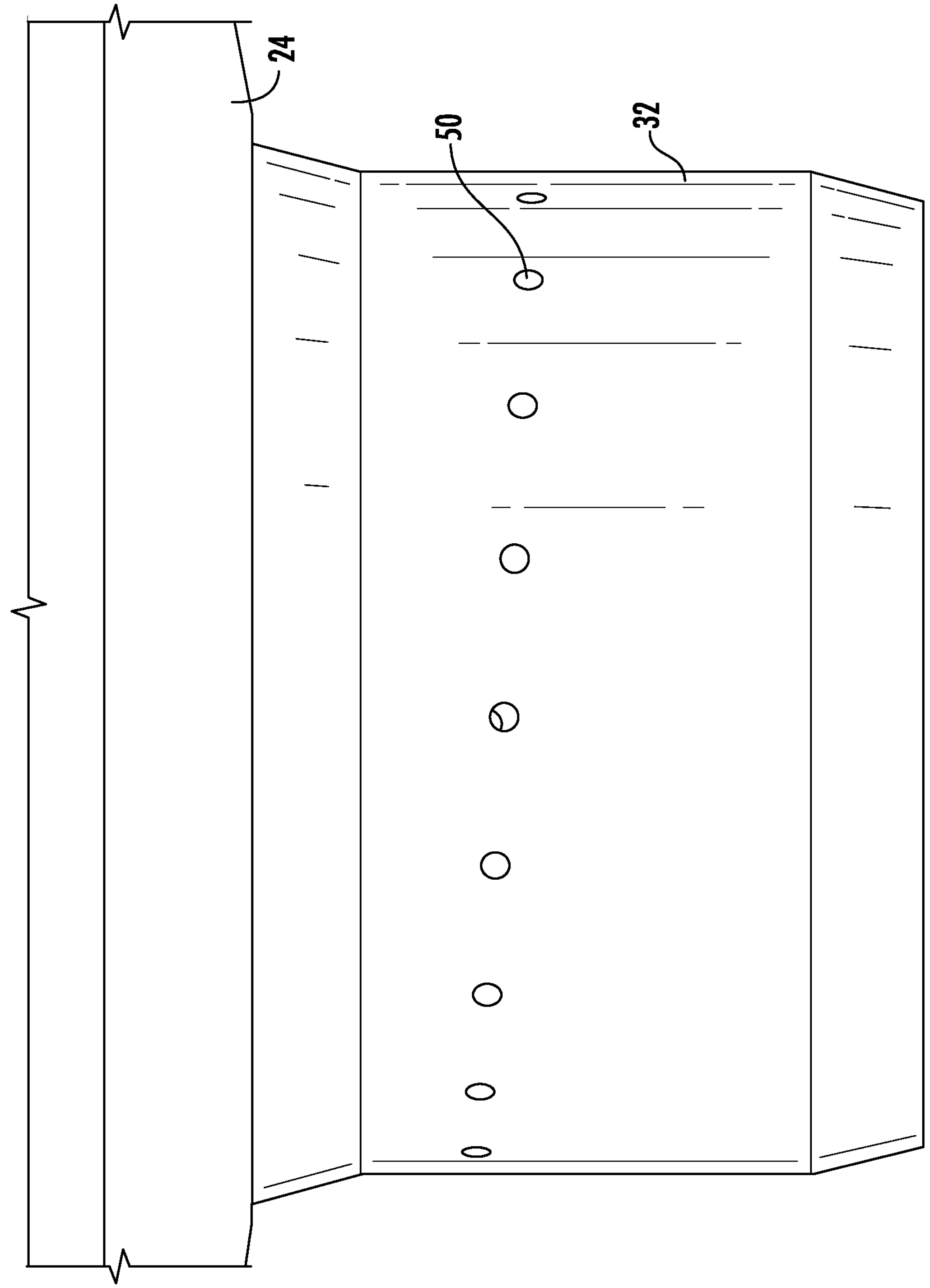
FIG. 7A shows a partial side view of the embodiment shown in FIG. 1B, illustrating the fuel orifices.
Figure 7B:
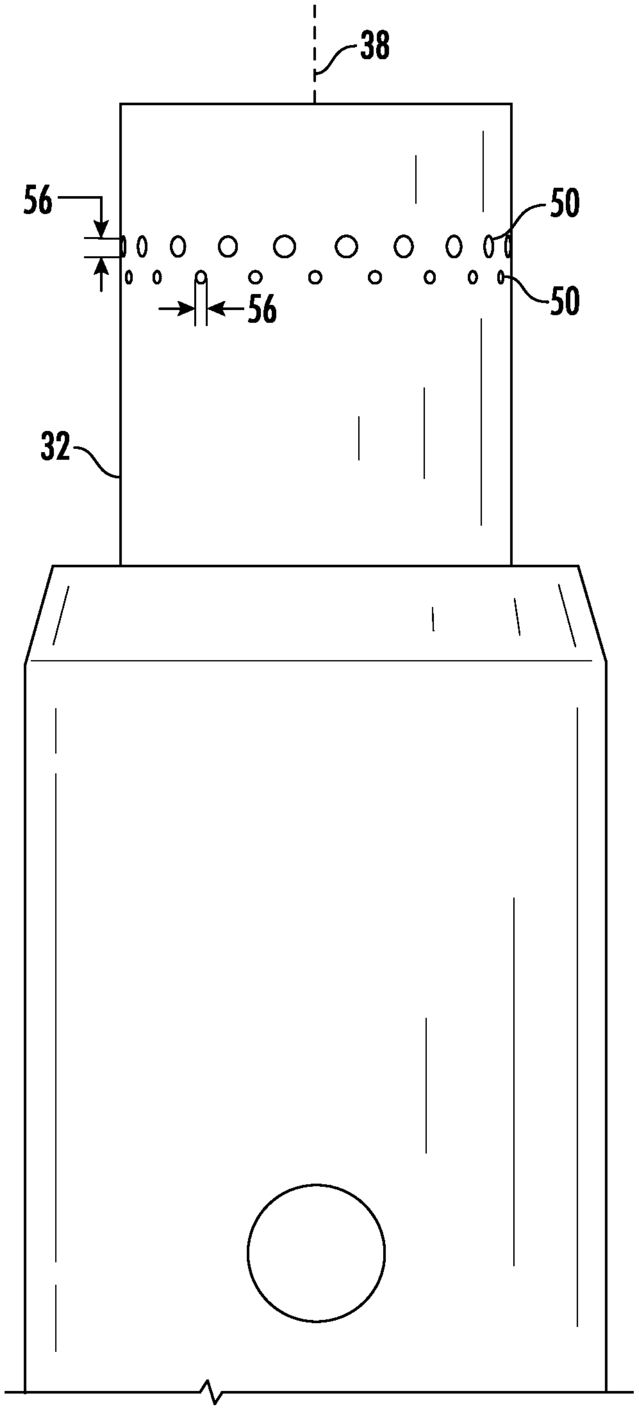
FIG. 7B shows a side view of the embodiment shown in FIG. 1B, illustrating a plurality of rings of fuel orifices.
Figure 7C:
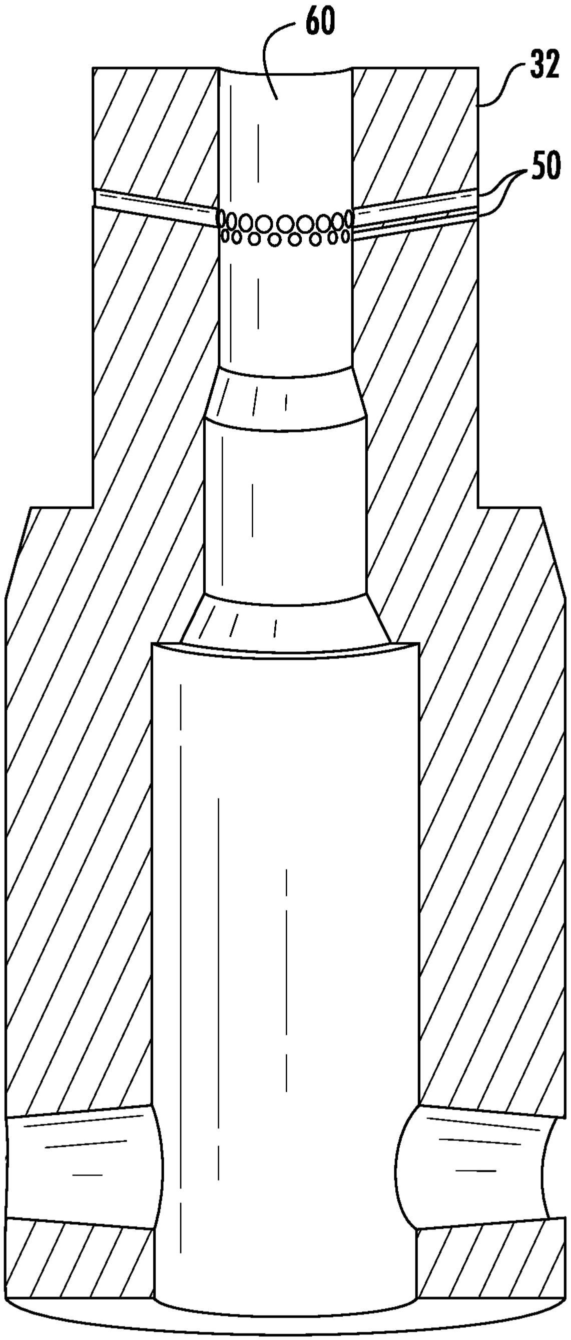
FIG. 7C shows a section view of the orifice body shown in FIG. 7B, illustrating the inside of the orifice body.
Figure 8:
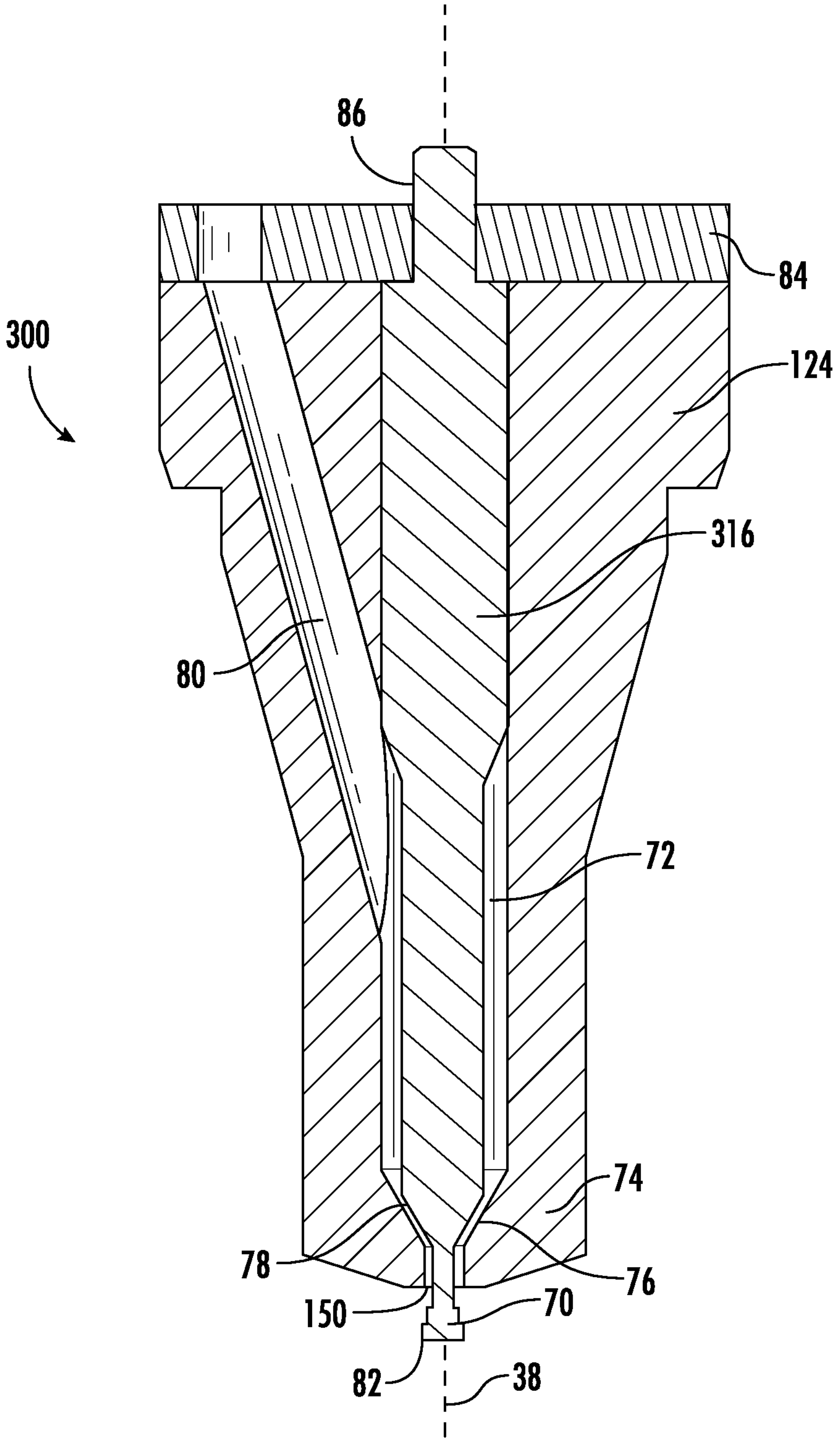
FIG. 8 shows a section view of an alternative embodiment, illustrating a different pintle rod and fuel orifice construction.
Figure 9:
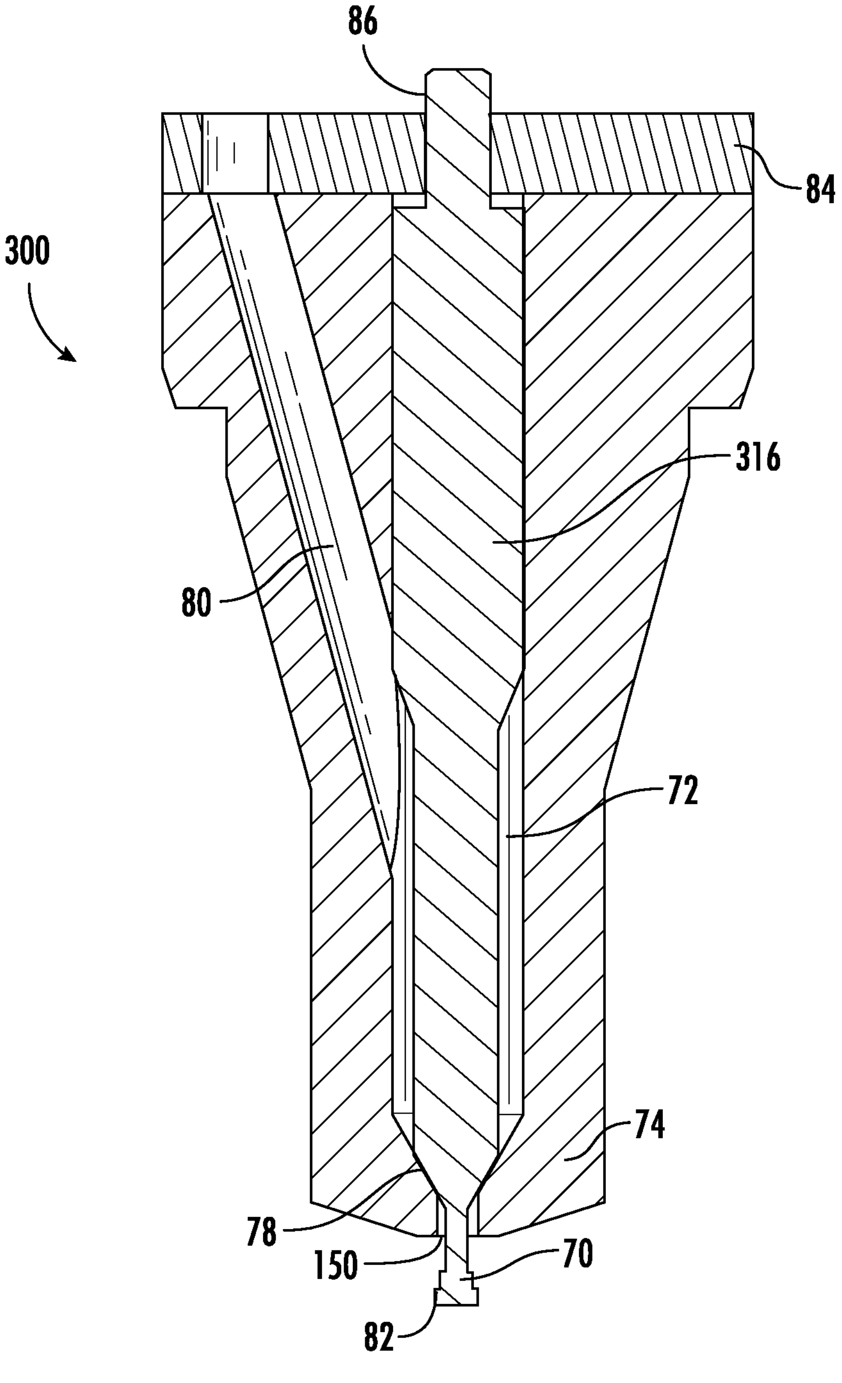
FIG. 9 shows a section view of the embodiment shown in FIG. 8, illustrating the pintle rod in a closed position.
Figure 10:
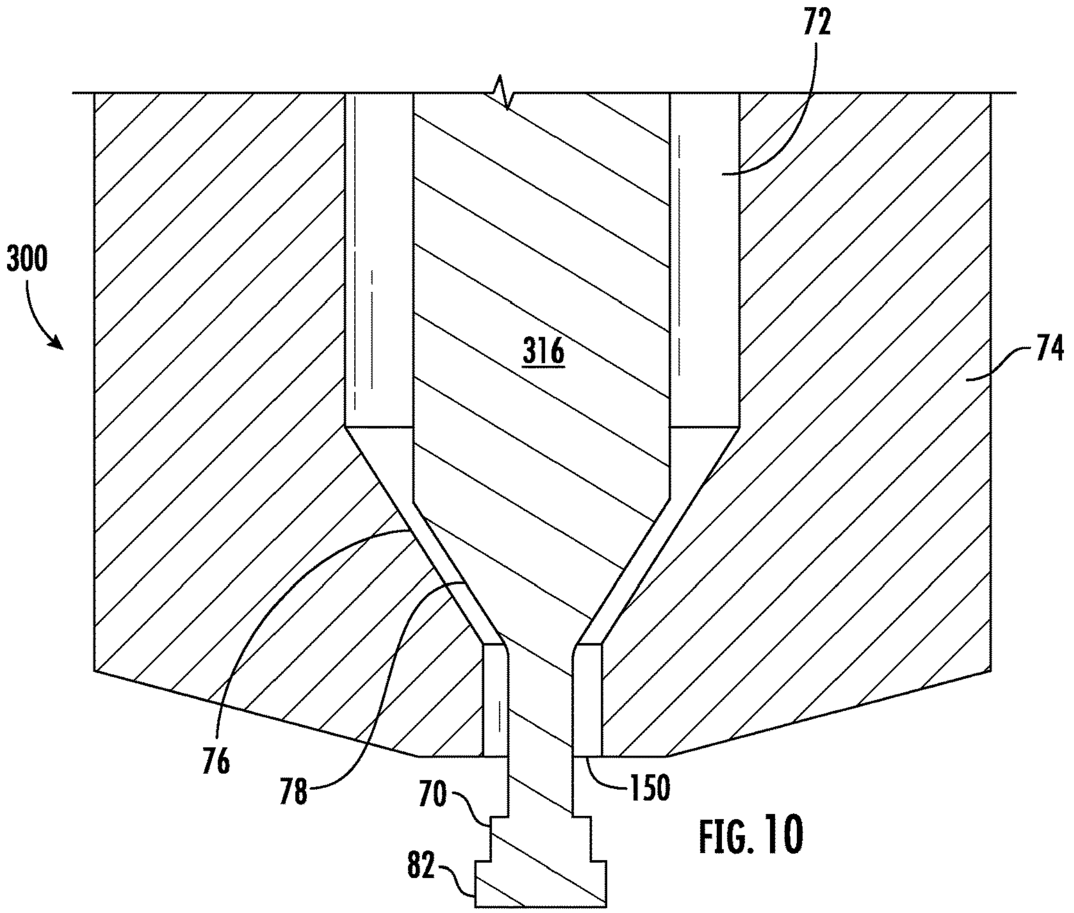
FIG. 10 shows a partial section view of the embodiment shown in FIG. 8, illustrating the pintle rod in an open position.
Figure 11:
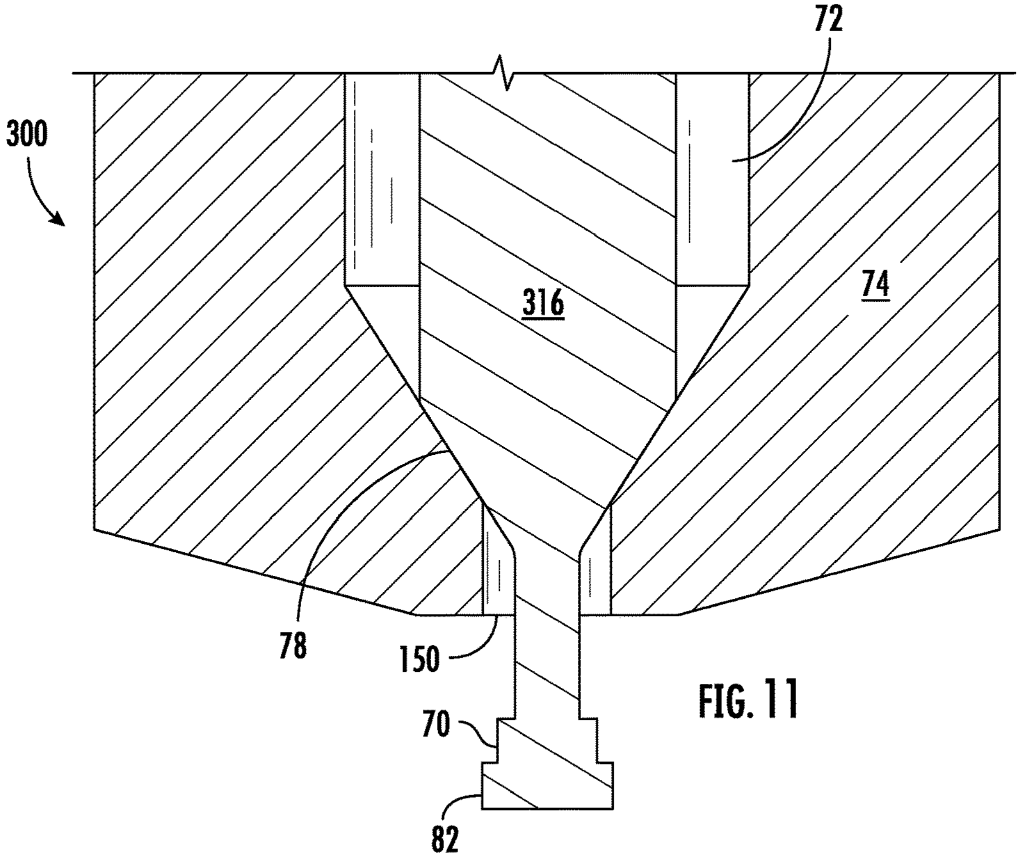
FIG. 11 shows a partial section view of the embodiment shown in FIG. 8, illustrating the pintle rod in a closed position.
Figure 43:
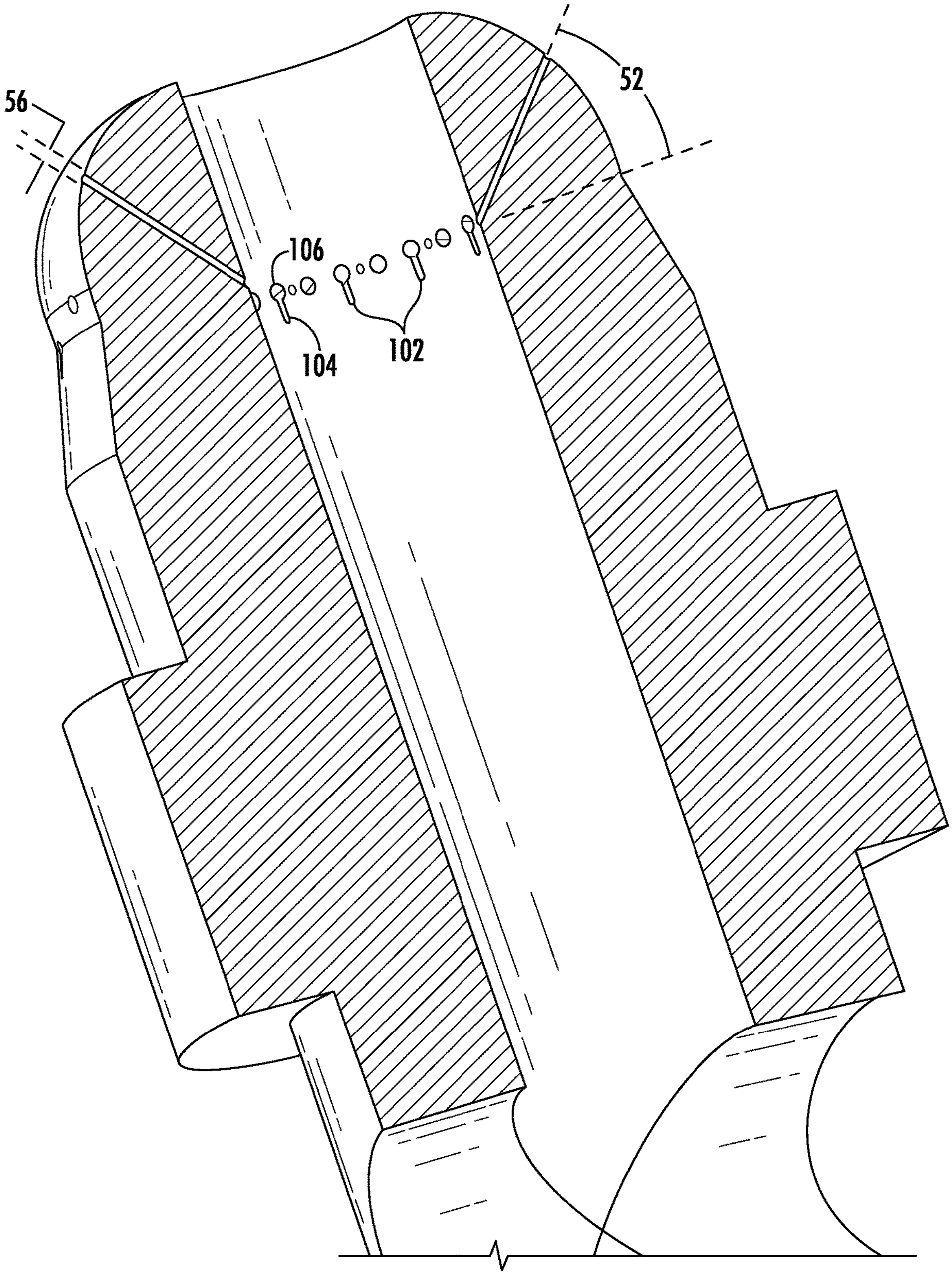
FIG. 43 shows a partial section view illustrating nozzle orifice flow paths.
Figure 44:
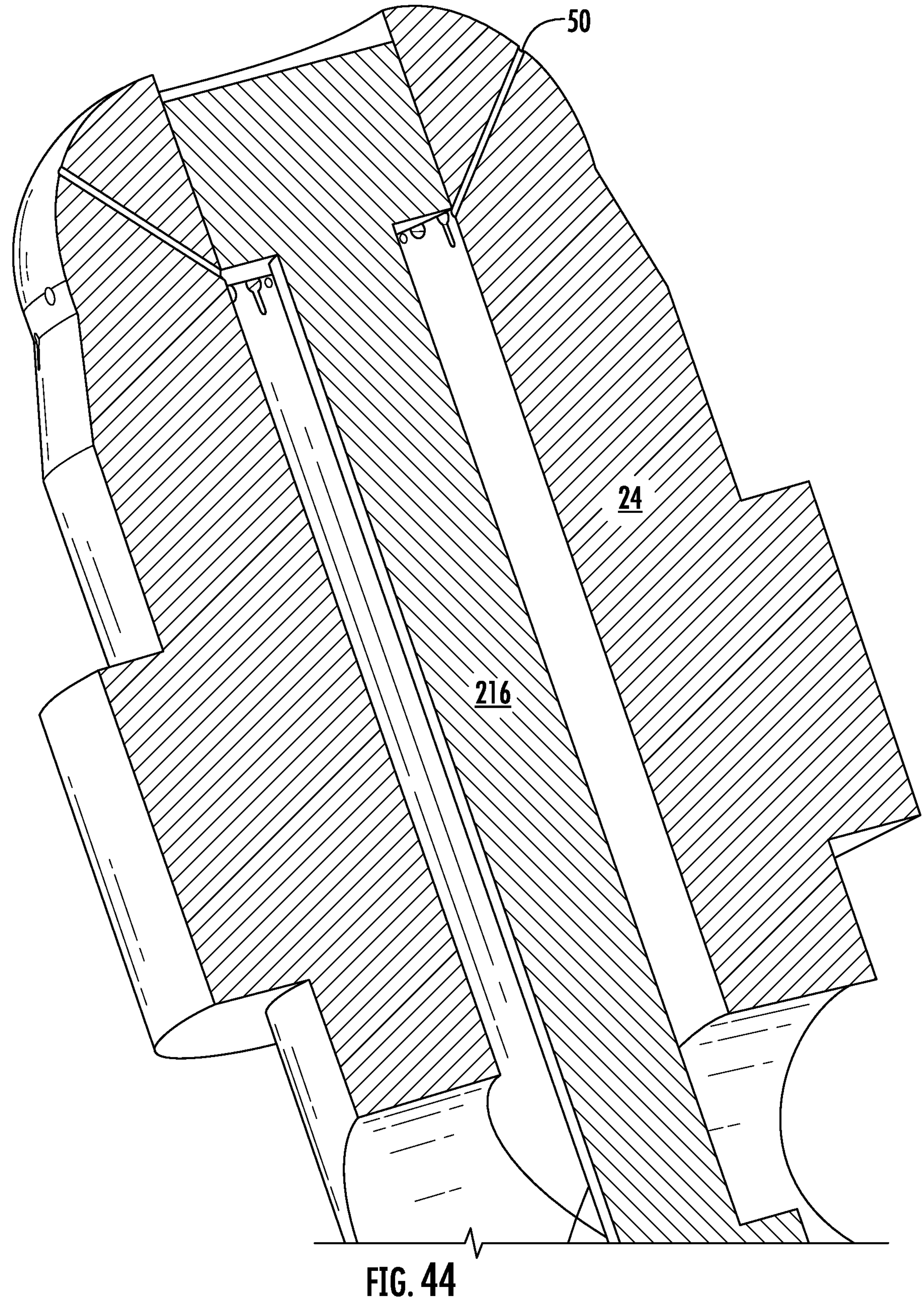
FIG. 44 shows a partial section view with the pintle rod.
Figure 45:
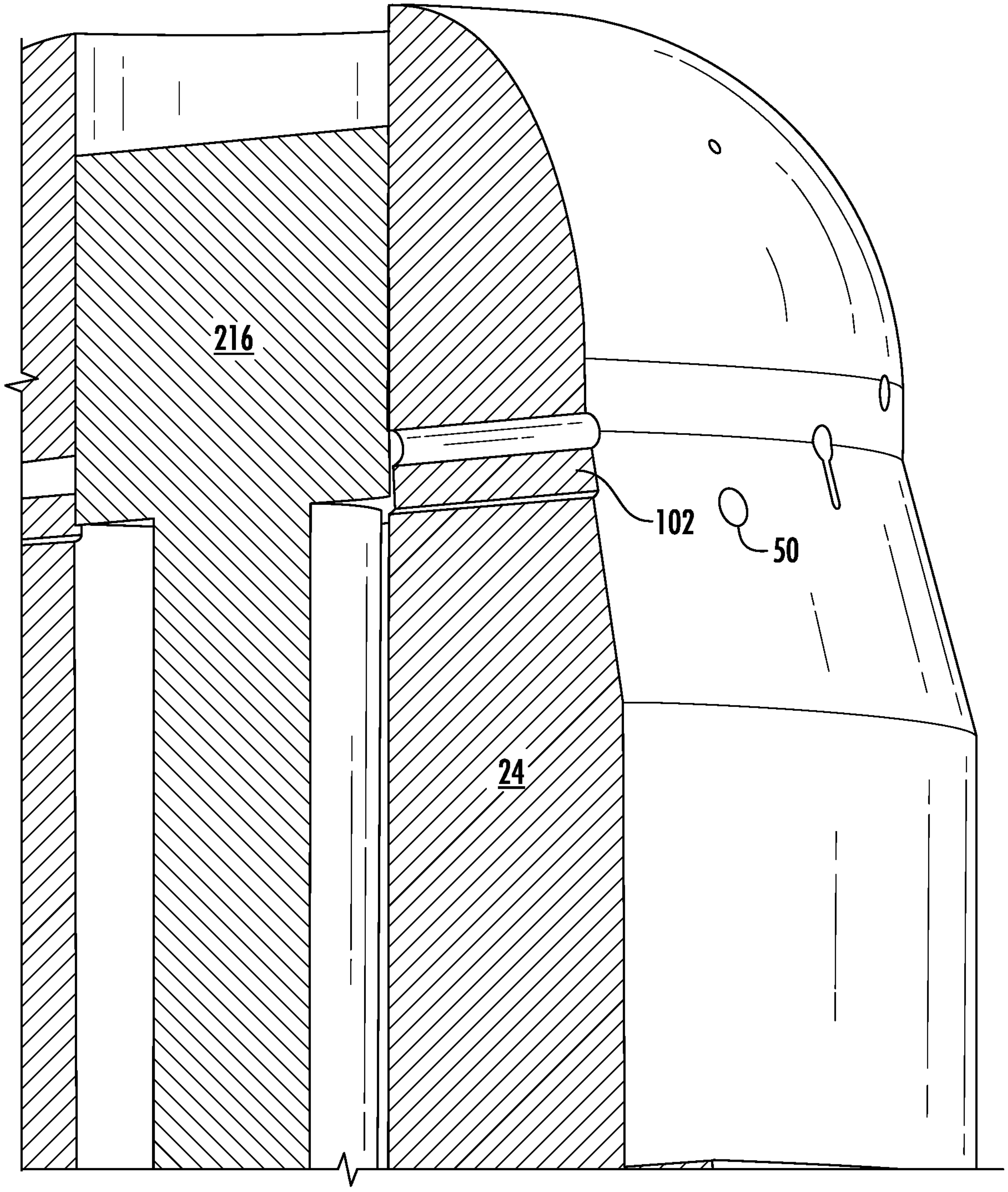
FIG. 45 shows a partial section view illustrating a keyhole aperture for fuel flow.
Figure 46:
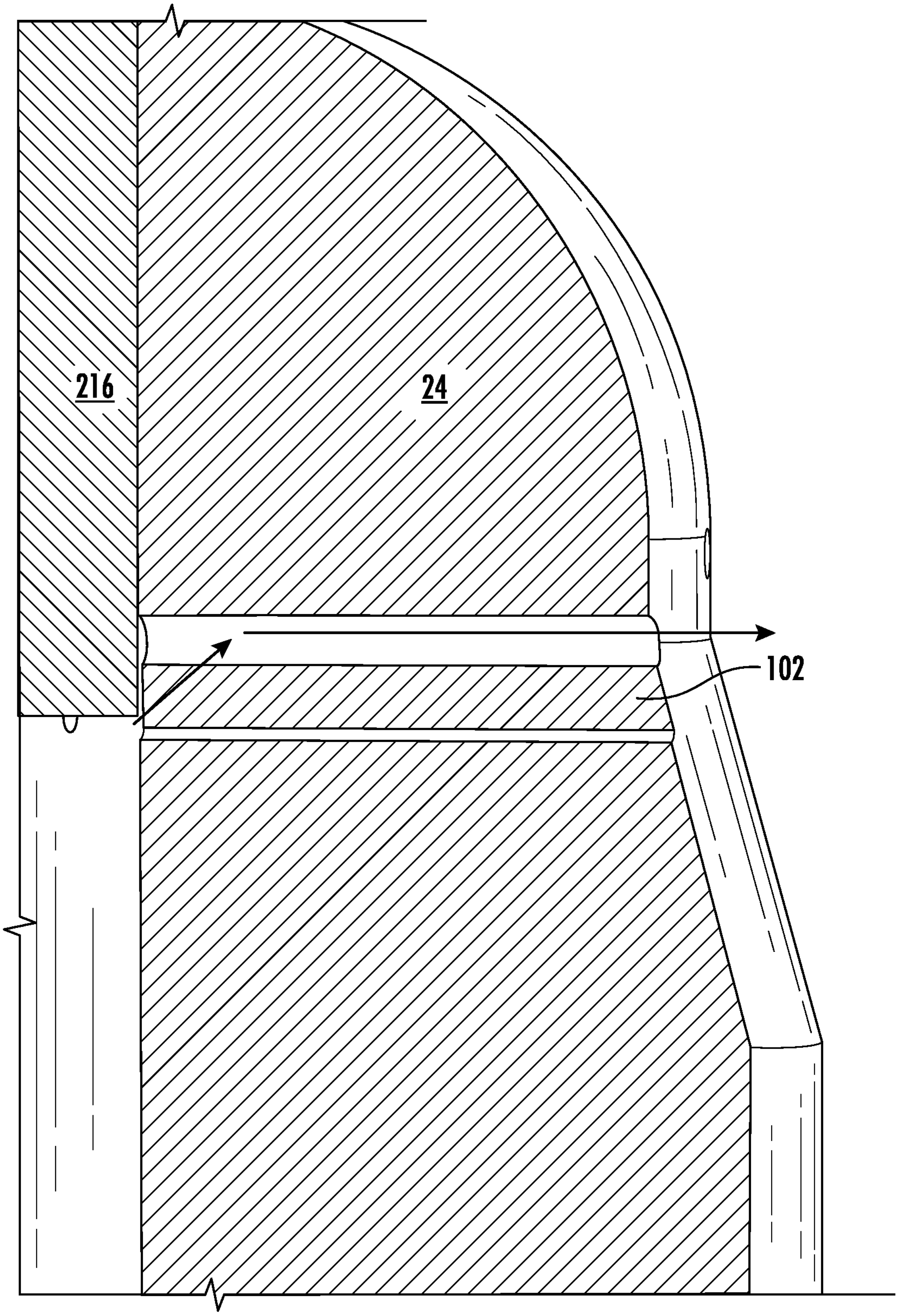
FIG. 46 shows a partial section view illustrating a keyhole aperture for fuel flow.
Figure 47:
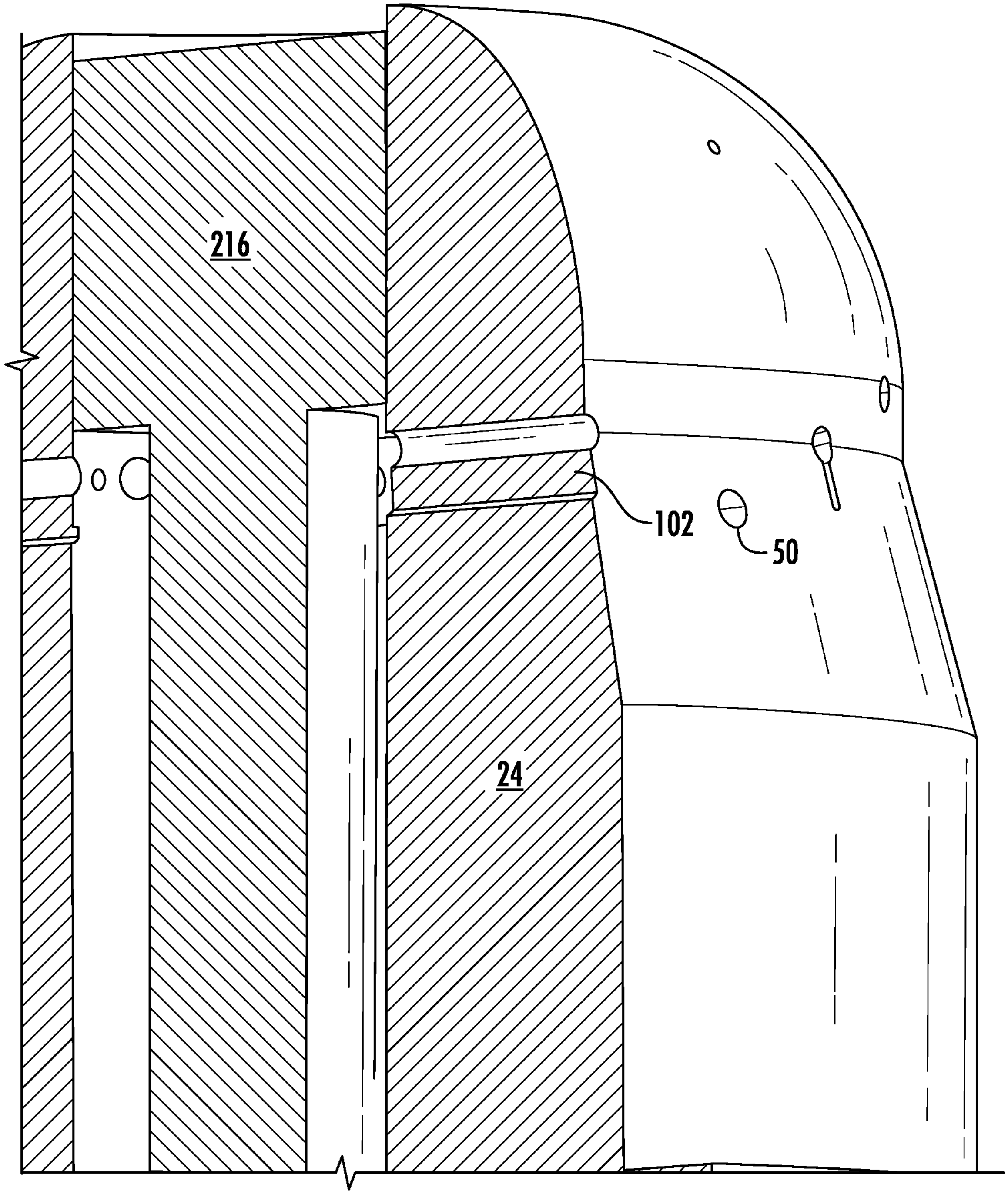
FIG. 47 shows a partial section view illustrating a keyhole aperture for fuel flow.
Figure 48:
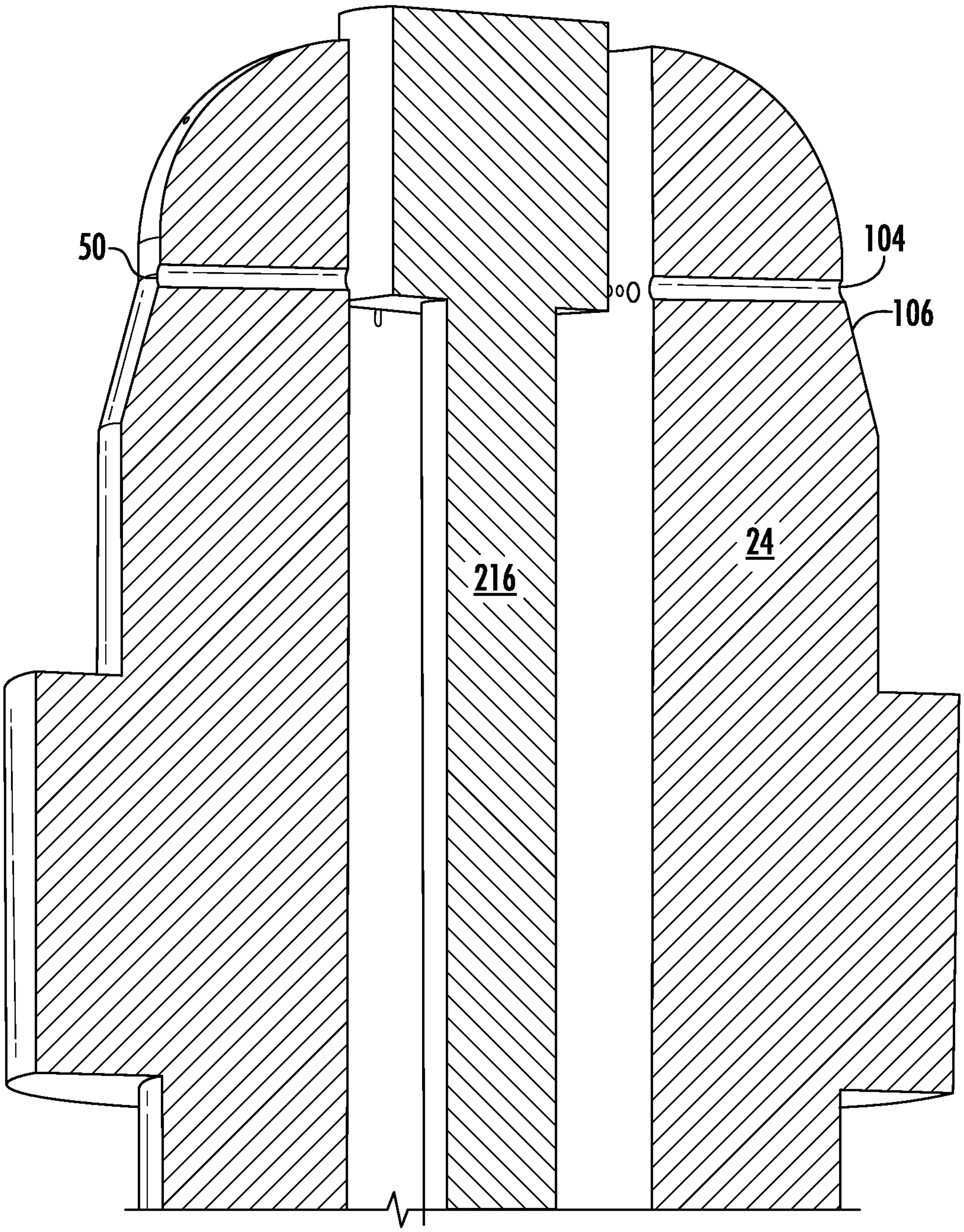
FIG. 48 shows a partial section view illustrating a tapering keyhole fuel orifice.
Figure 49:
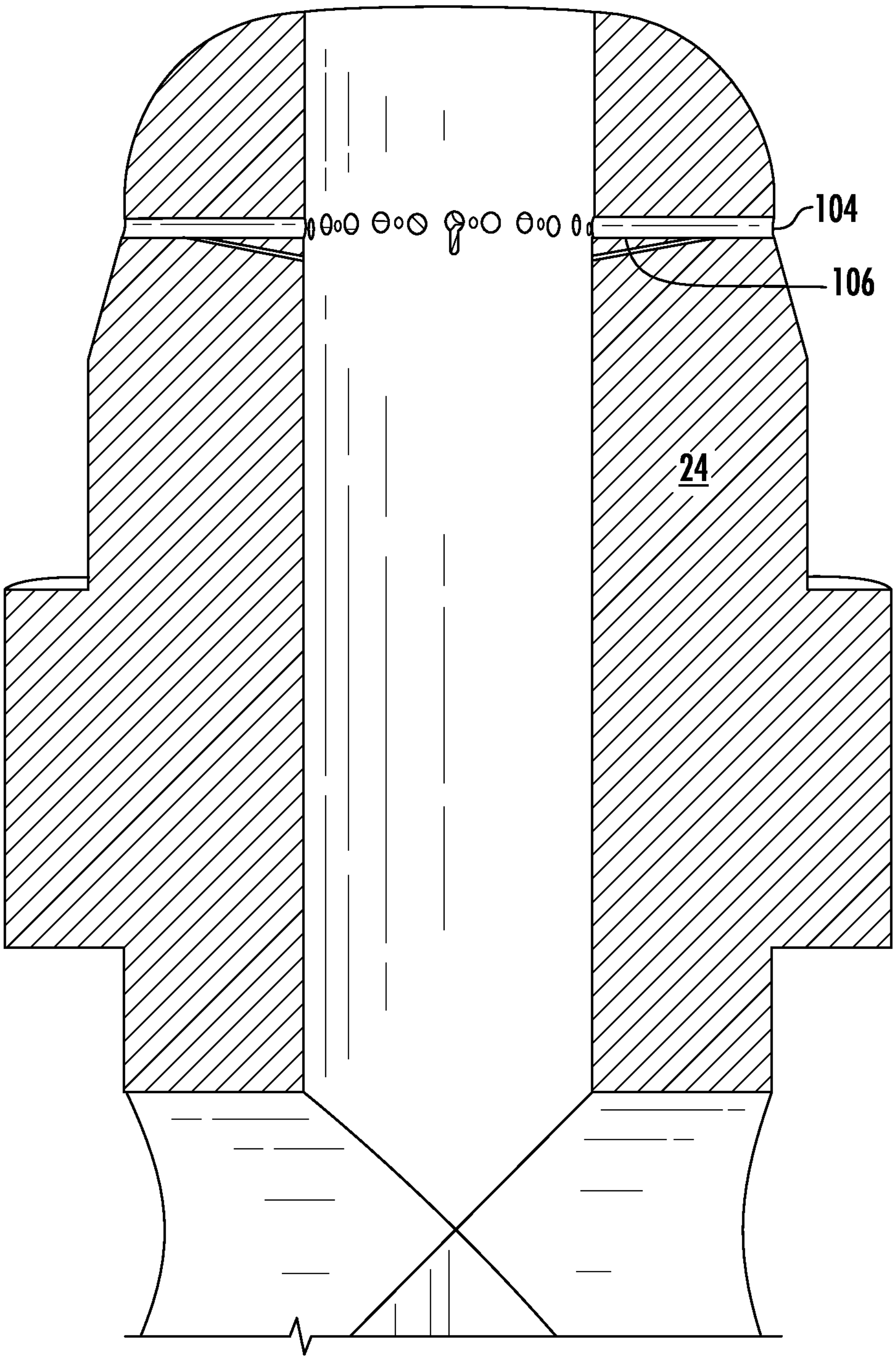
FIG. 49 shows a partial section view illustrating a tapering keyhole fuel orifice.
Figure 50:
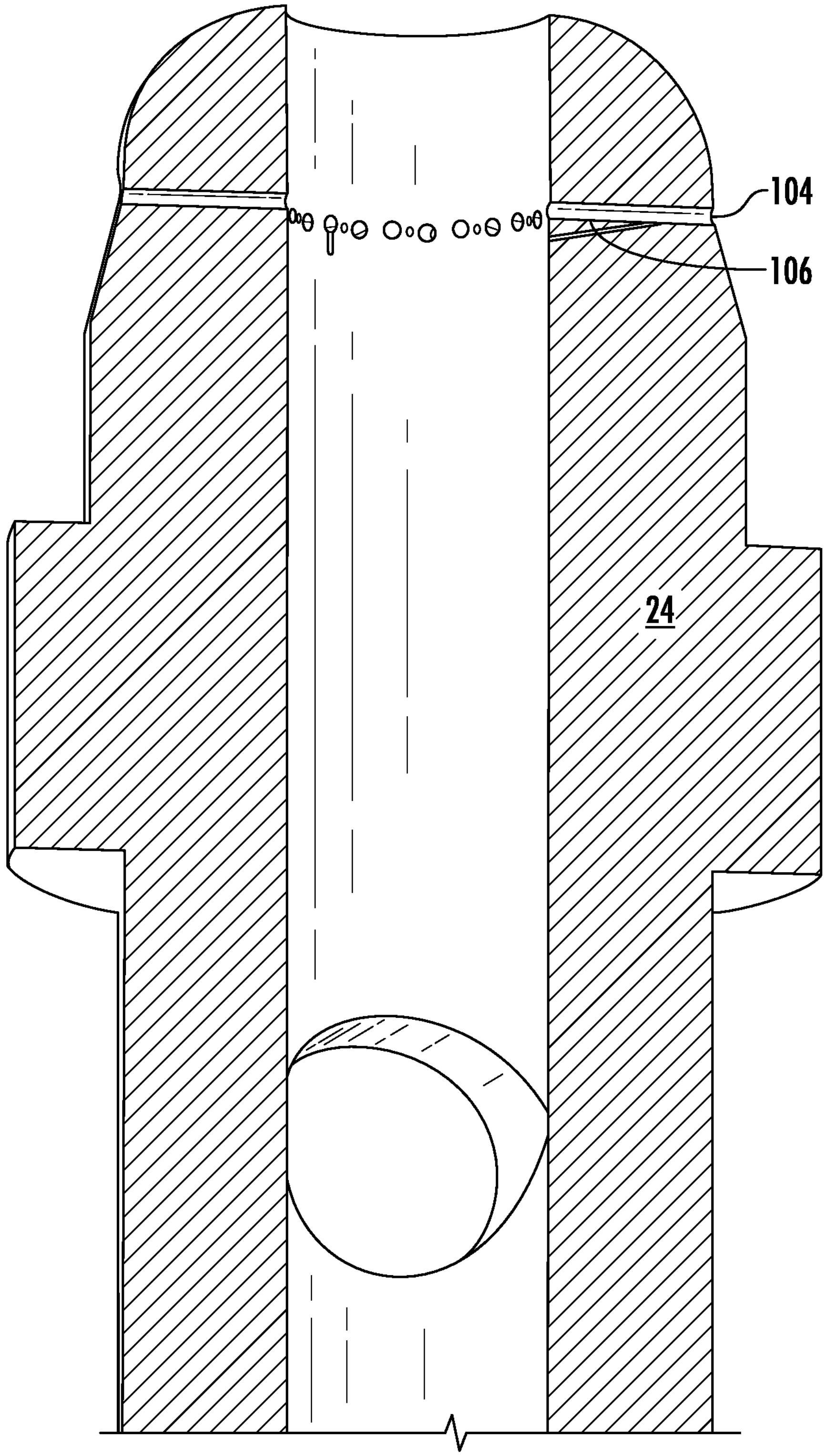
FIG. 50 shows a partial section view illustrating a tapering keyhole fuel orifice.
Figure 51A:
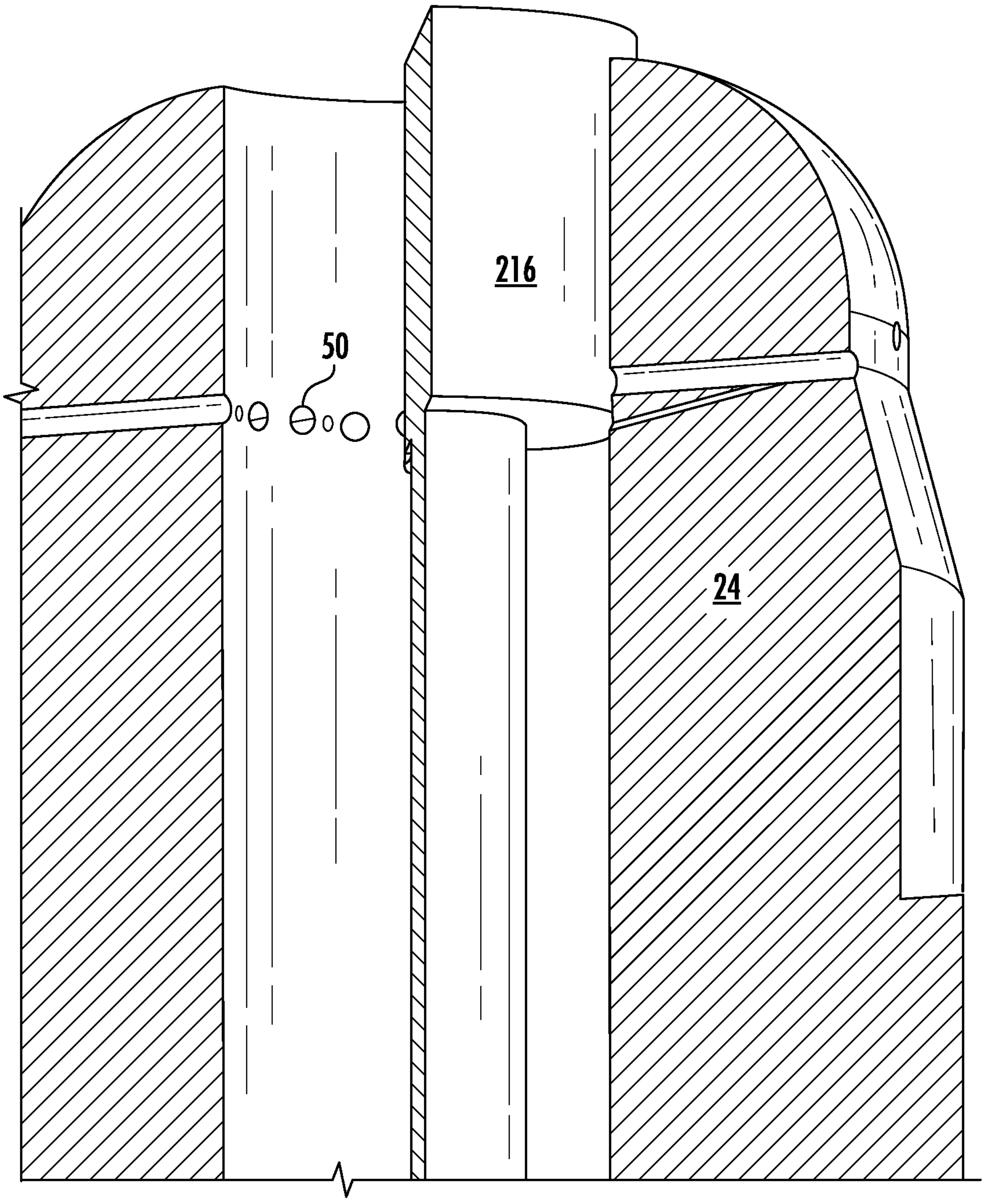
FIG. 51A shows a partial section view illustrating a tapering keyhole fuel orifice along with a sectioned pintle rod.
Figure 51B:
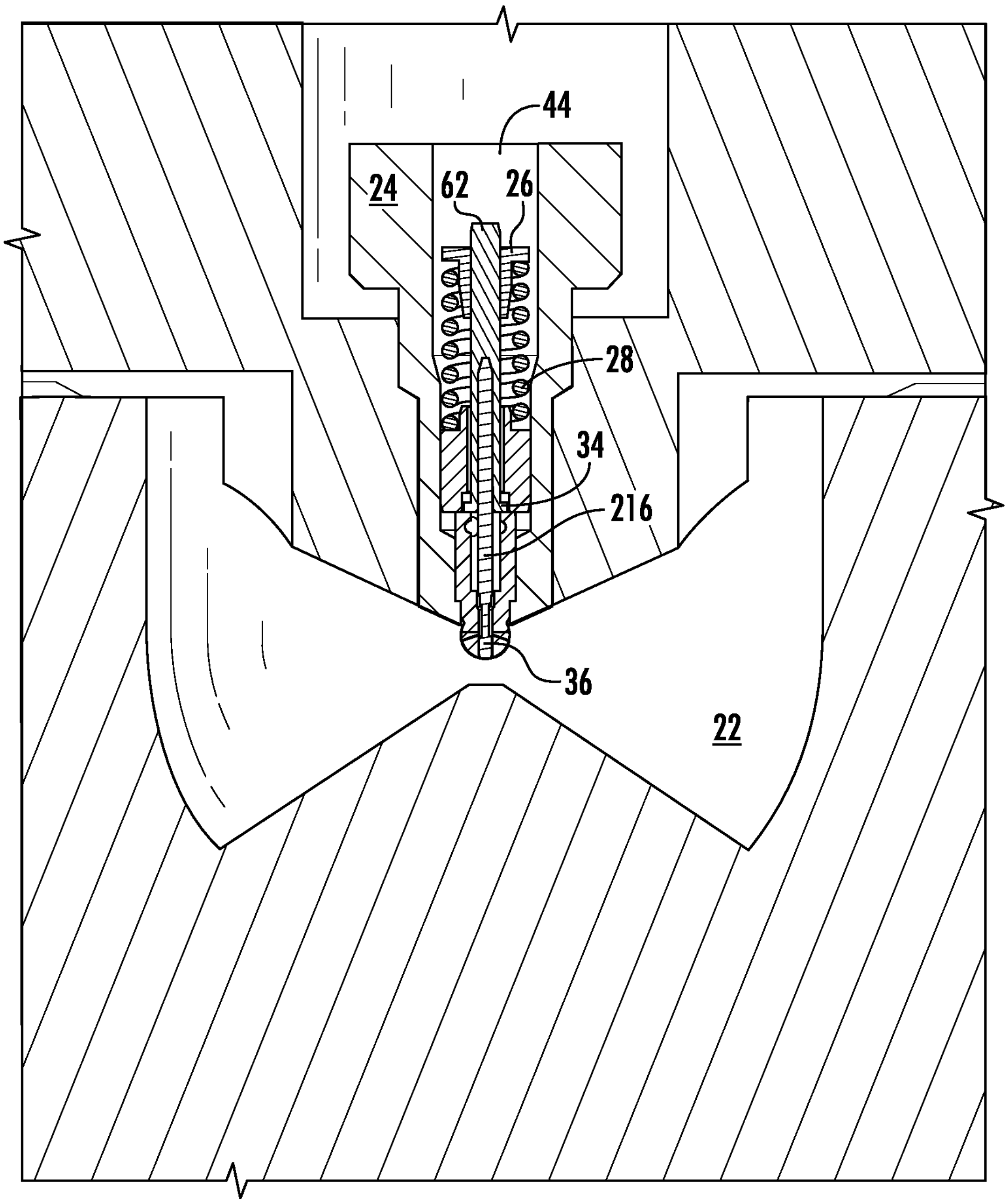
FIG. 51B shows a section view illustrating the injector nozzle positioned inside of a cylinder with the piston at close to top dead center for combustion.
Figure 51C:
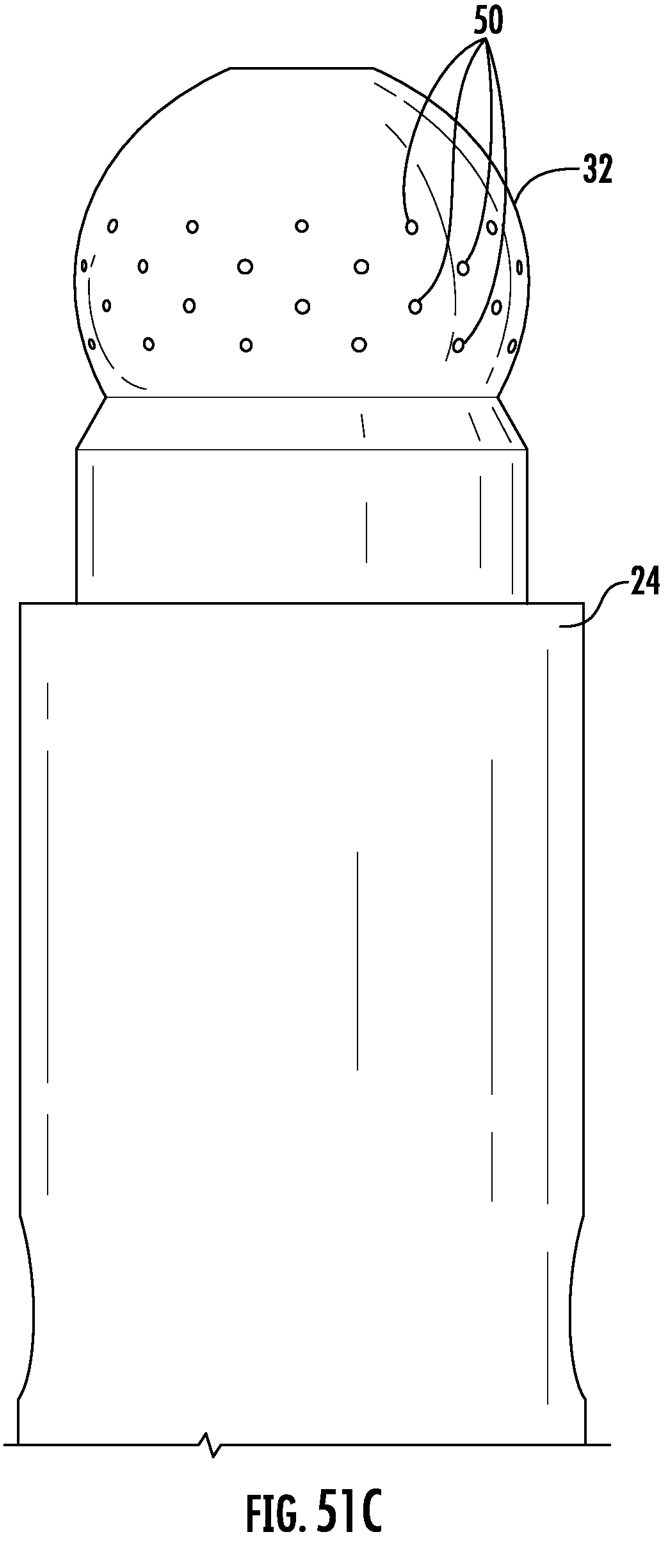
FIG. 51C shows a partial side view of the nozzle illustrating the fuel apertures arranged around a dome.
Figure 51D:
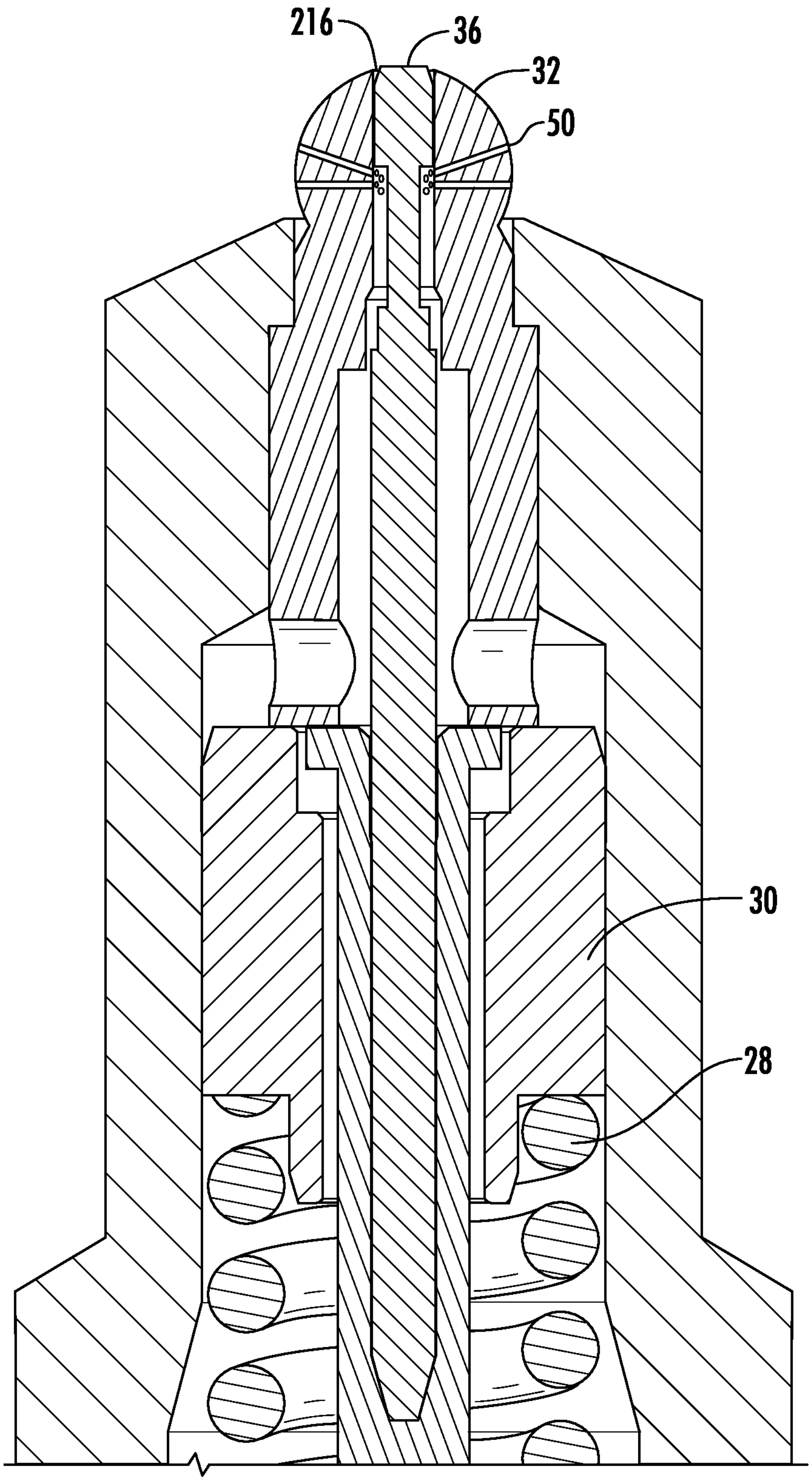
FIG. 51D shows a section view taken along the longitudinal centerline of FIG. 51C.
Figure 51E:
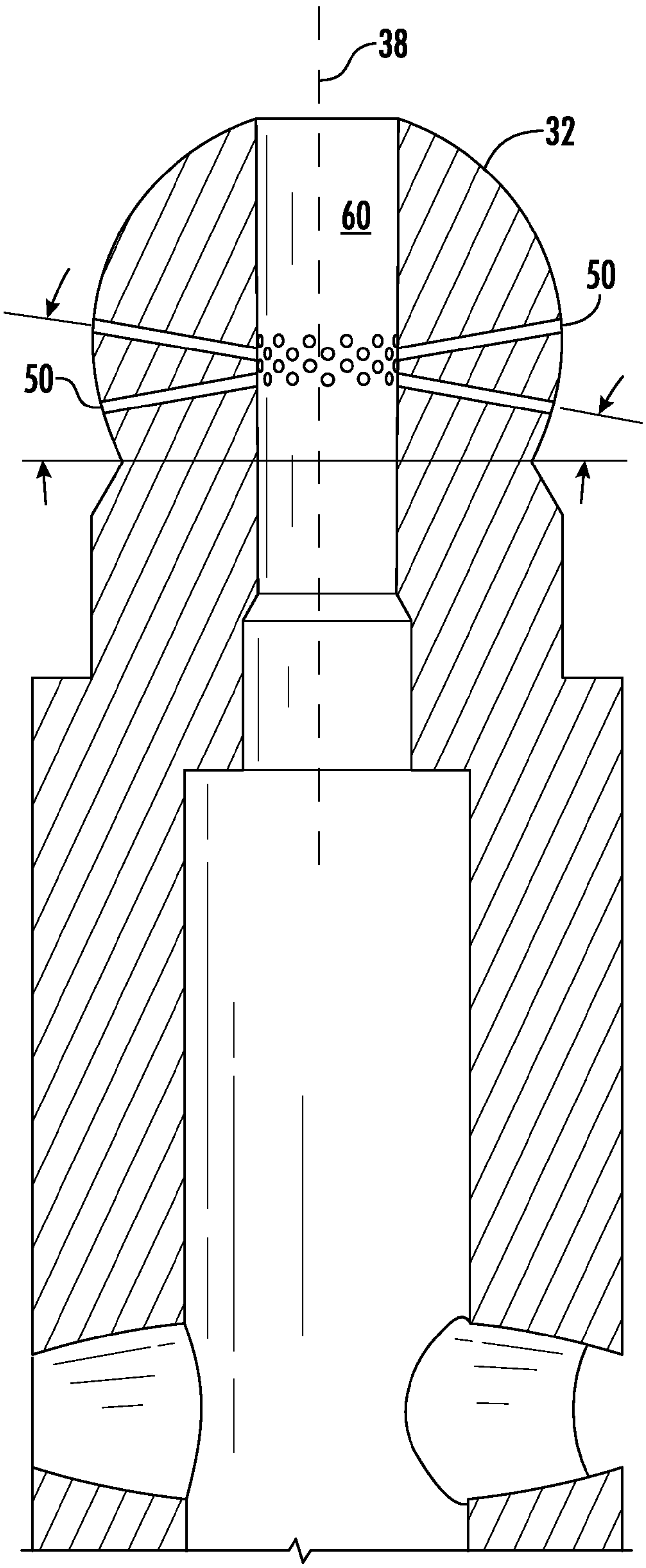
FIG. 51E shows a partial section view of the orifice body illustrating the angular orientation of the fuel apertures.
Figure 51F:
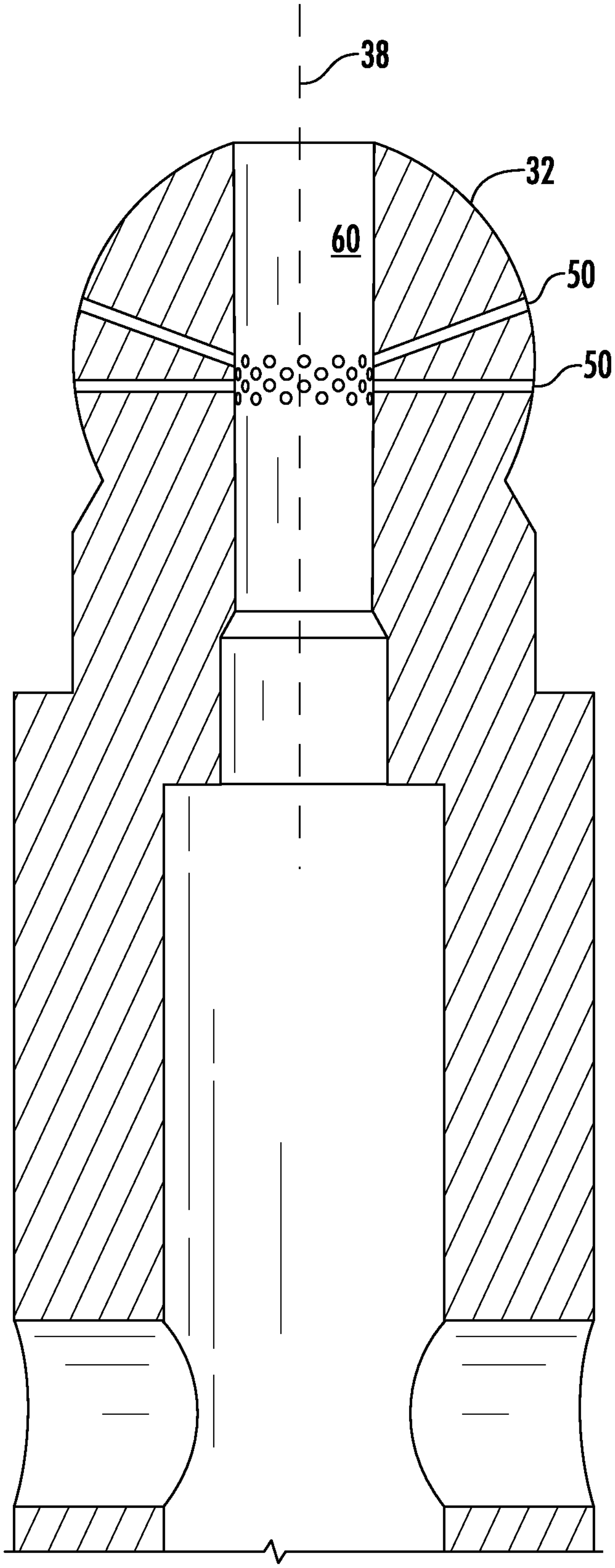
FIG. 51F shows a partial section view of the orifice body illustrating the angular orientation of the fuel apertures.
Figure 52:
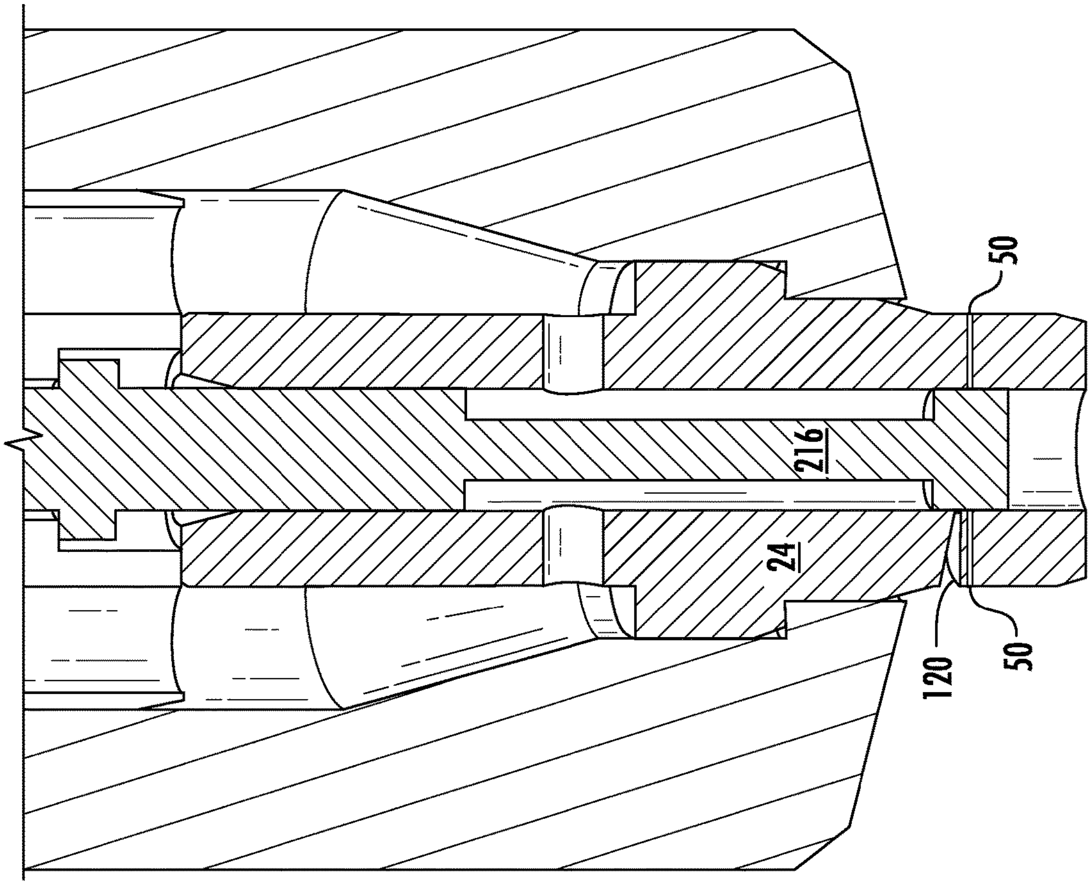
FIG. 52 shows a section view of a nozzle assembly including fuel apertures and a fuel notch.
Figure 53:
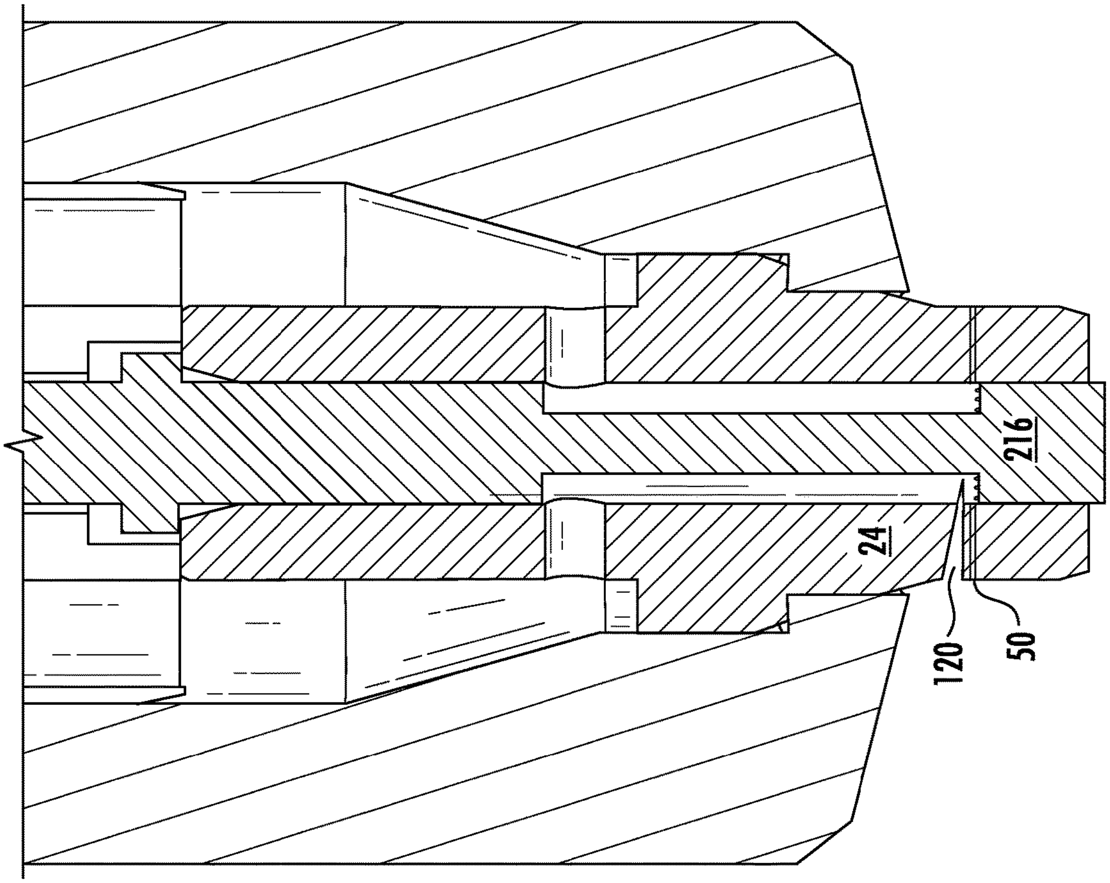
FIG. 53 shows the nozzle assembly of FIG. 52, illustrating the pintle in an open position.
Figure 54:
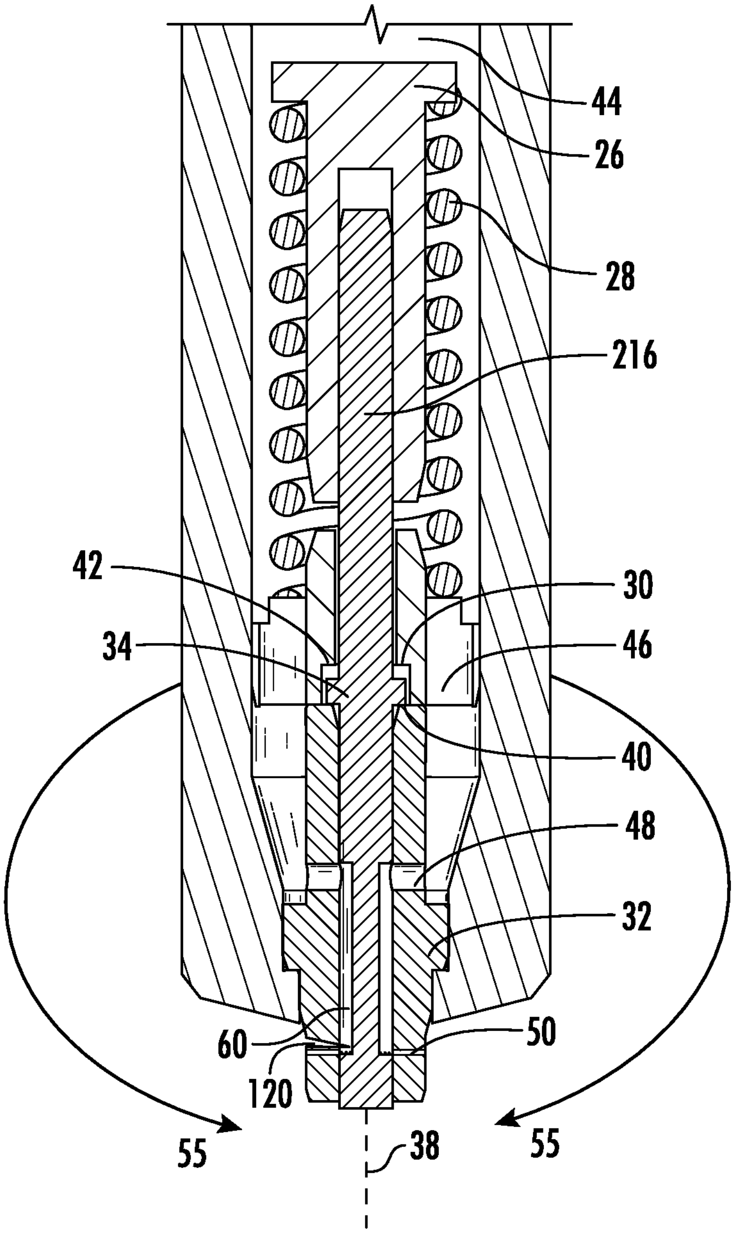
FIG. 54 shows the nozzle assembly of FIG. 52.
Figure 55:
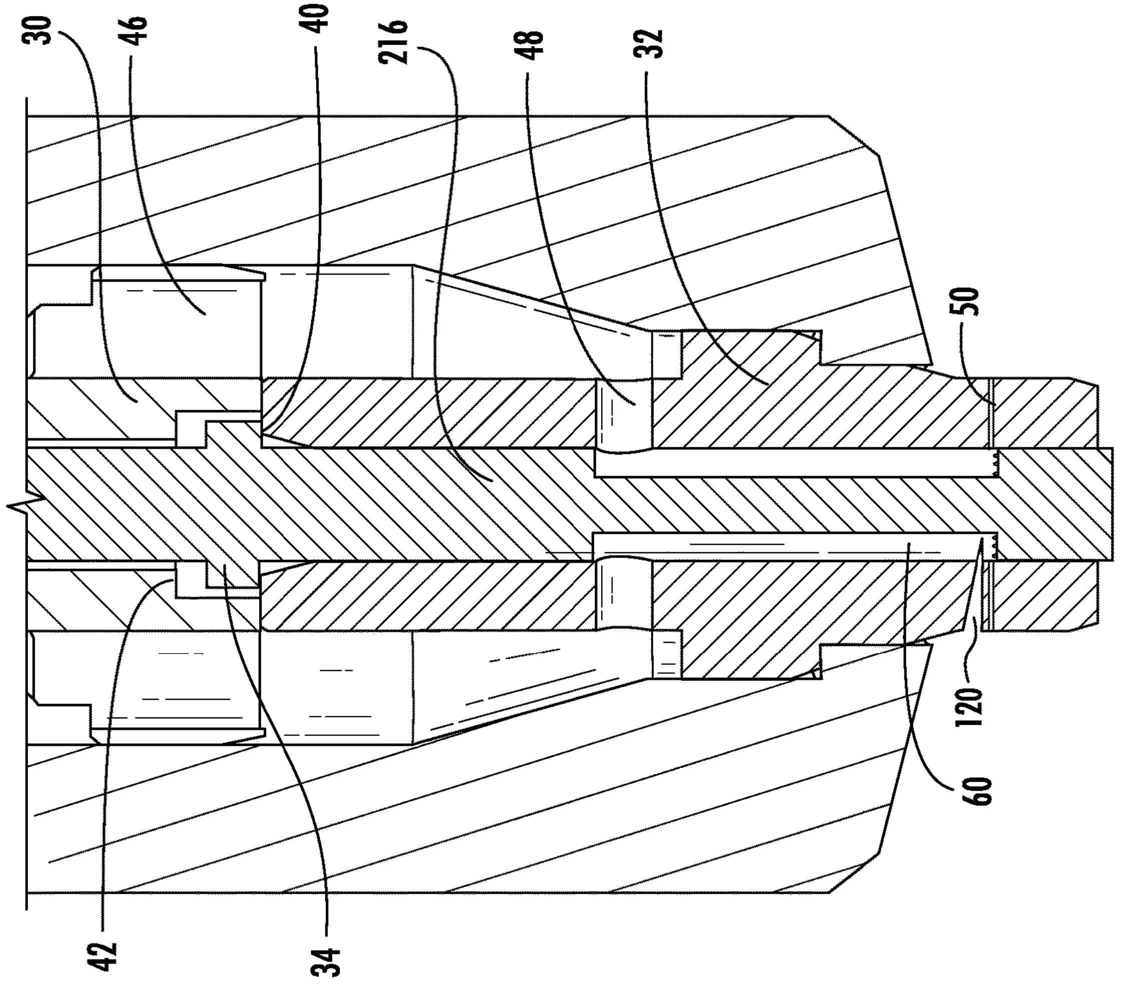
FIG. 55 shows a partial section view taken along lines 55-55 of FIG. 54.
Figure 56:
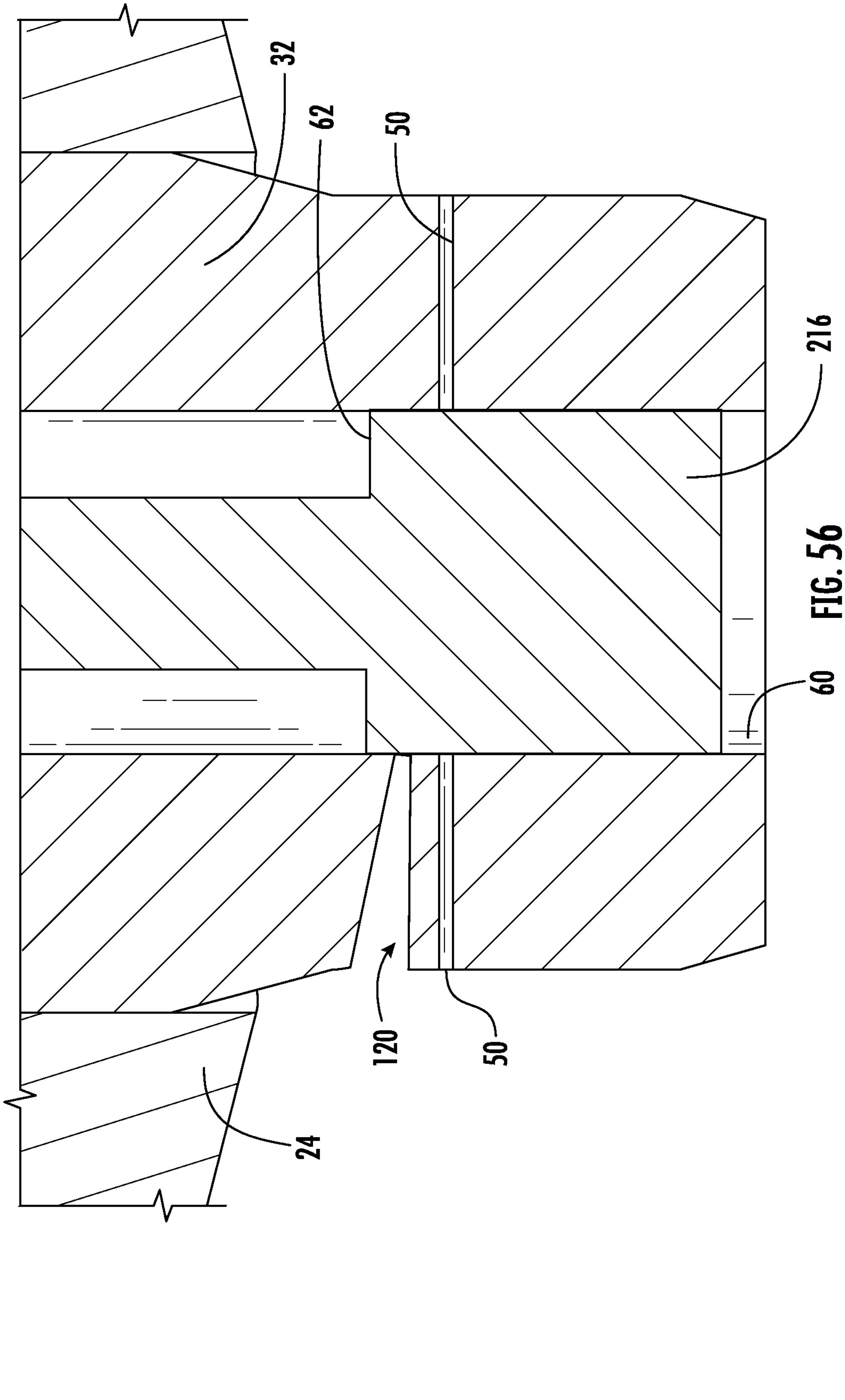
FIG. 56 shows a partial section view illustrating the pintle in a closed position.
Figure 57:
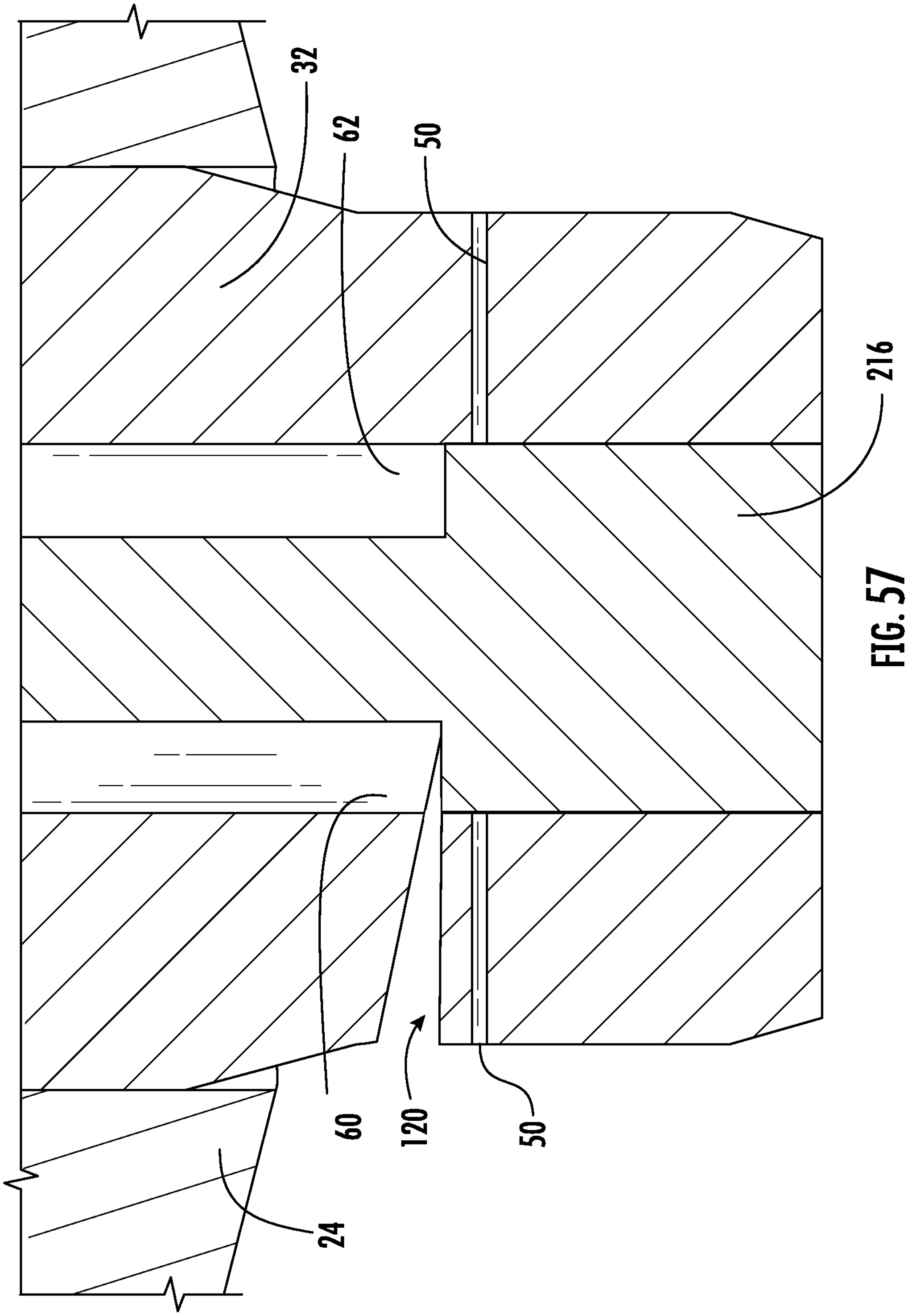
FIG. 57 shows a partial section view illustrating the pintle in a partially open position.
Figure 58:
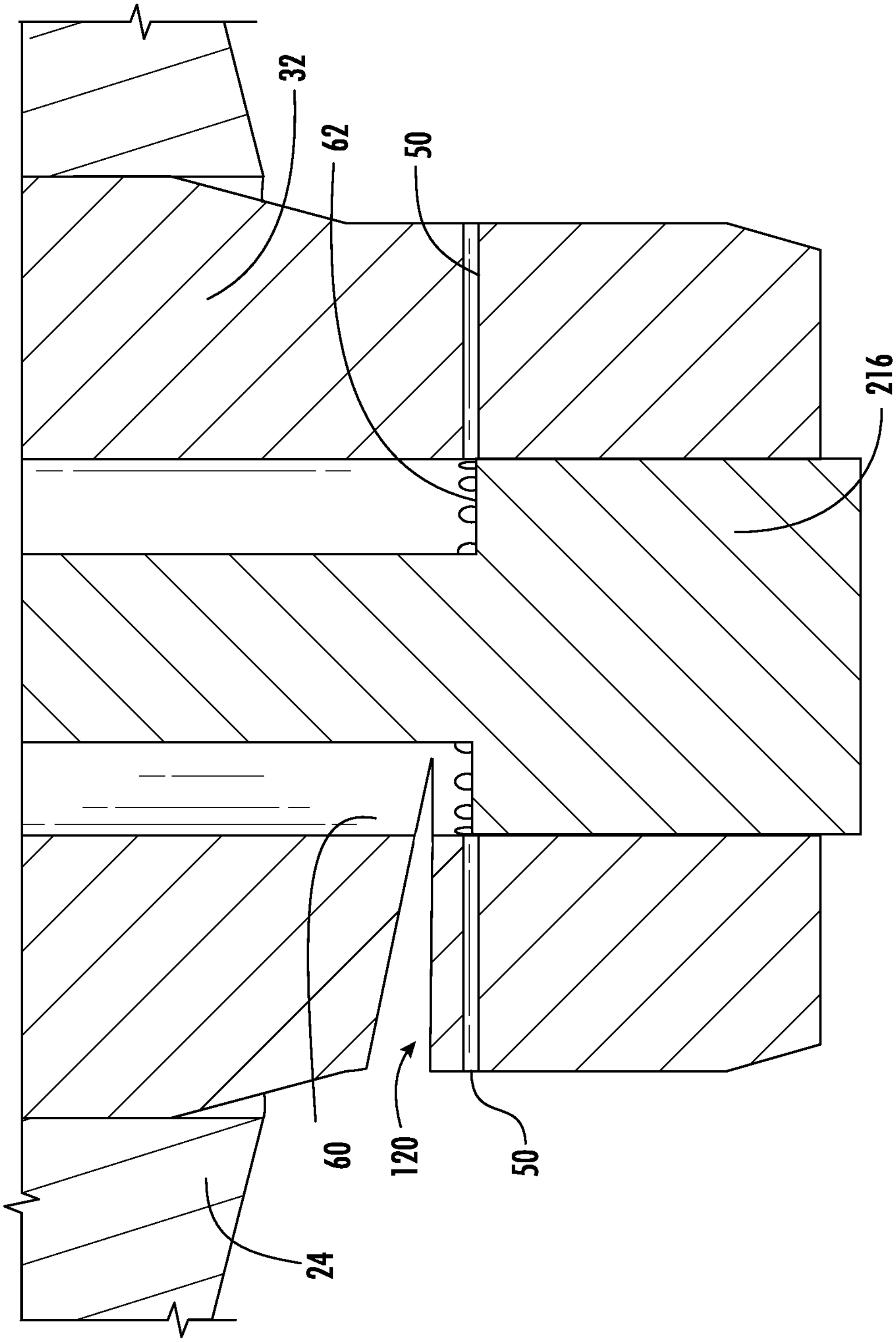
FIG. 58 shows a partial section view illustrating the pintle in an open position.
Figure 59:
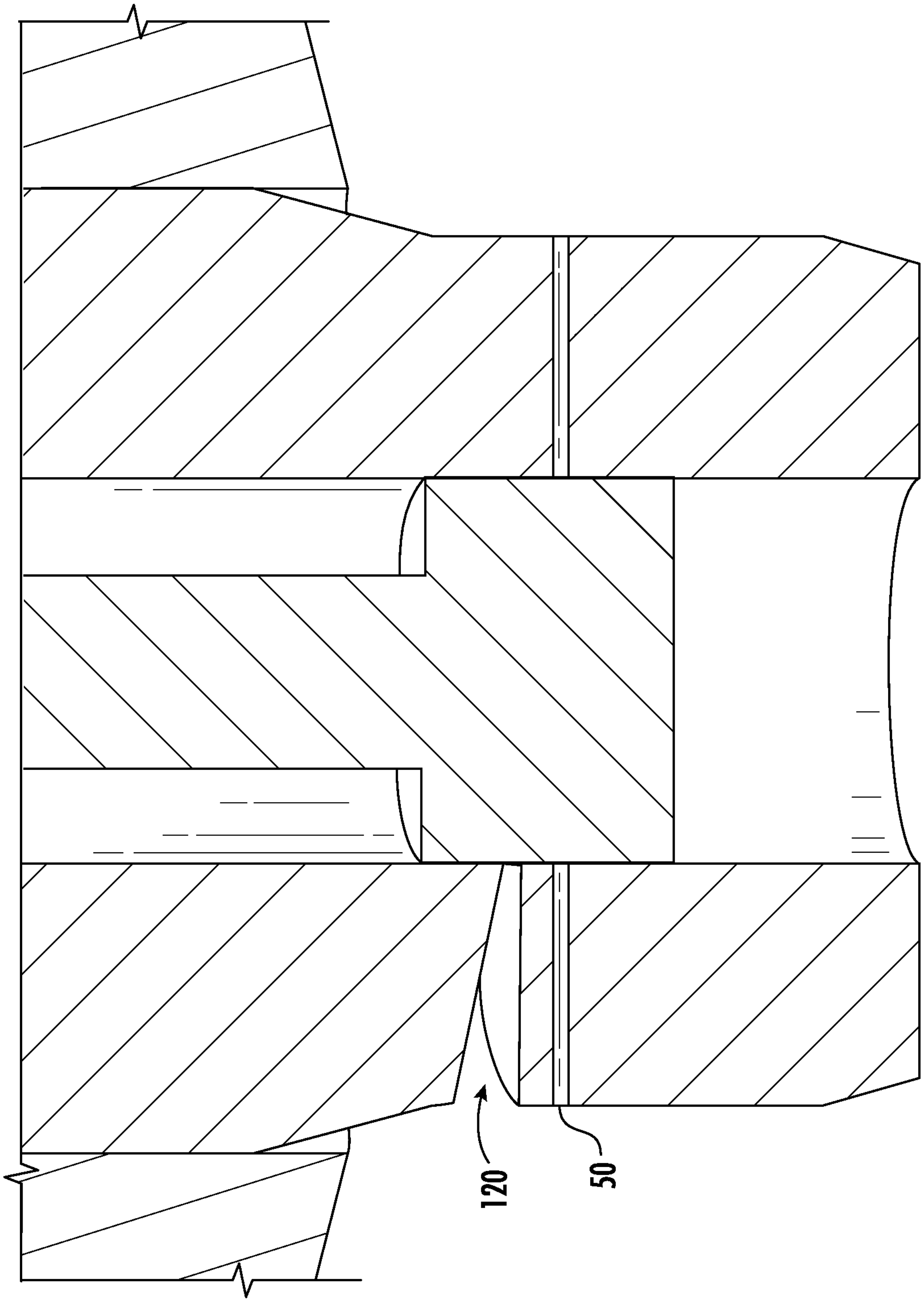
FIG. 59 shows a partial section view illustrating the pintle in a closed position.
Figure 60:
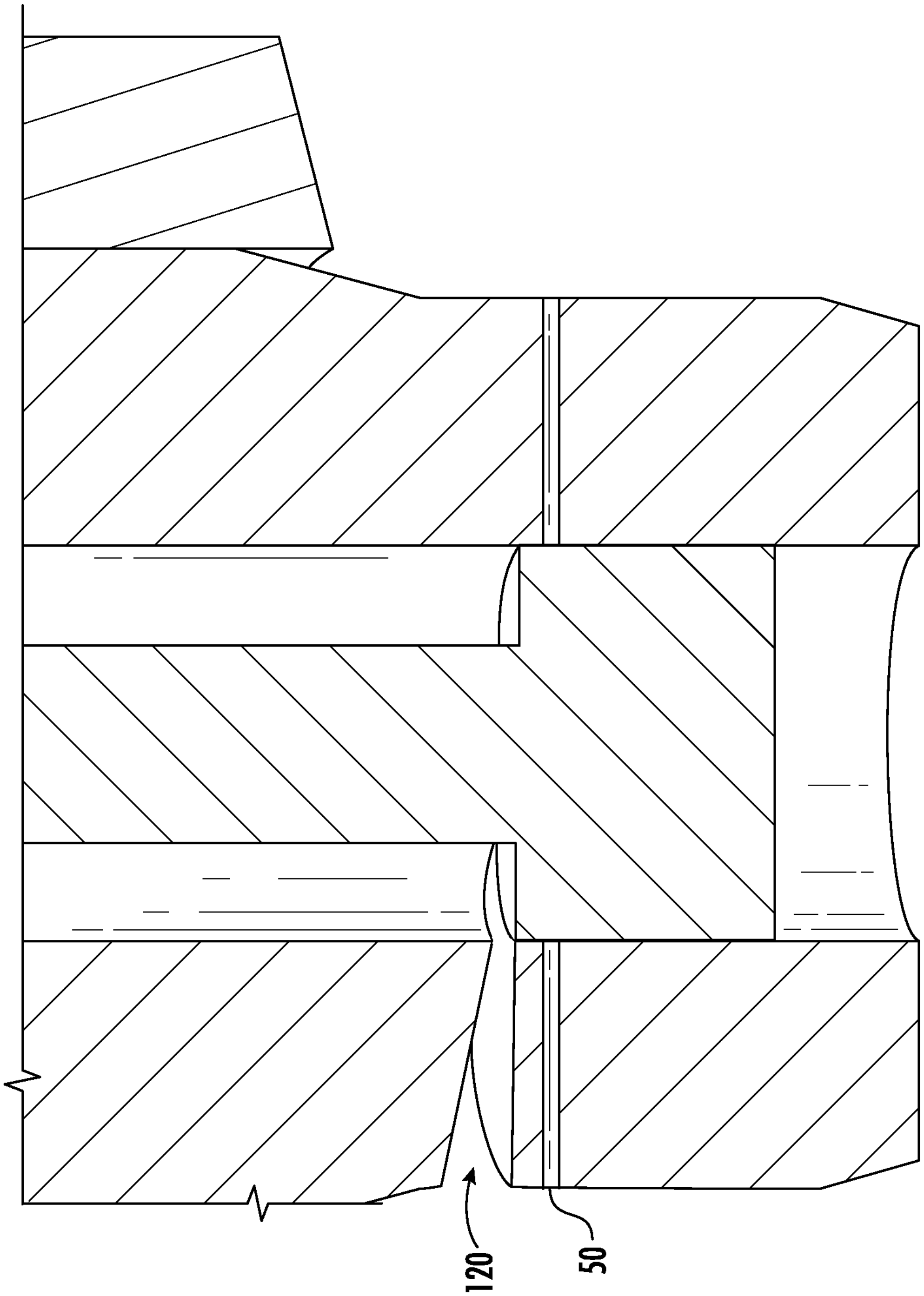
FIG. 60 shows a partial section view illustrating the pintle in a partially open position.
Figure 61:
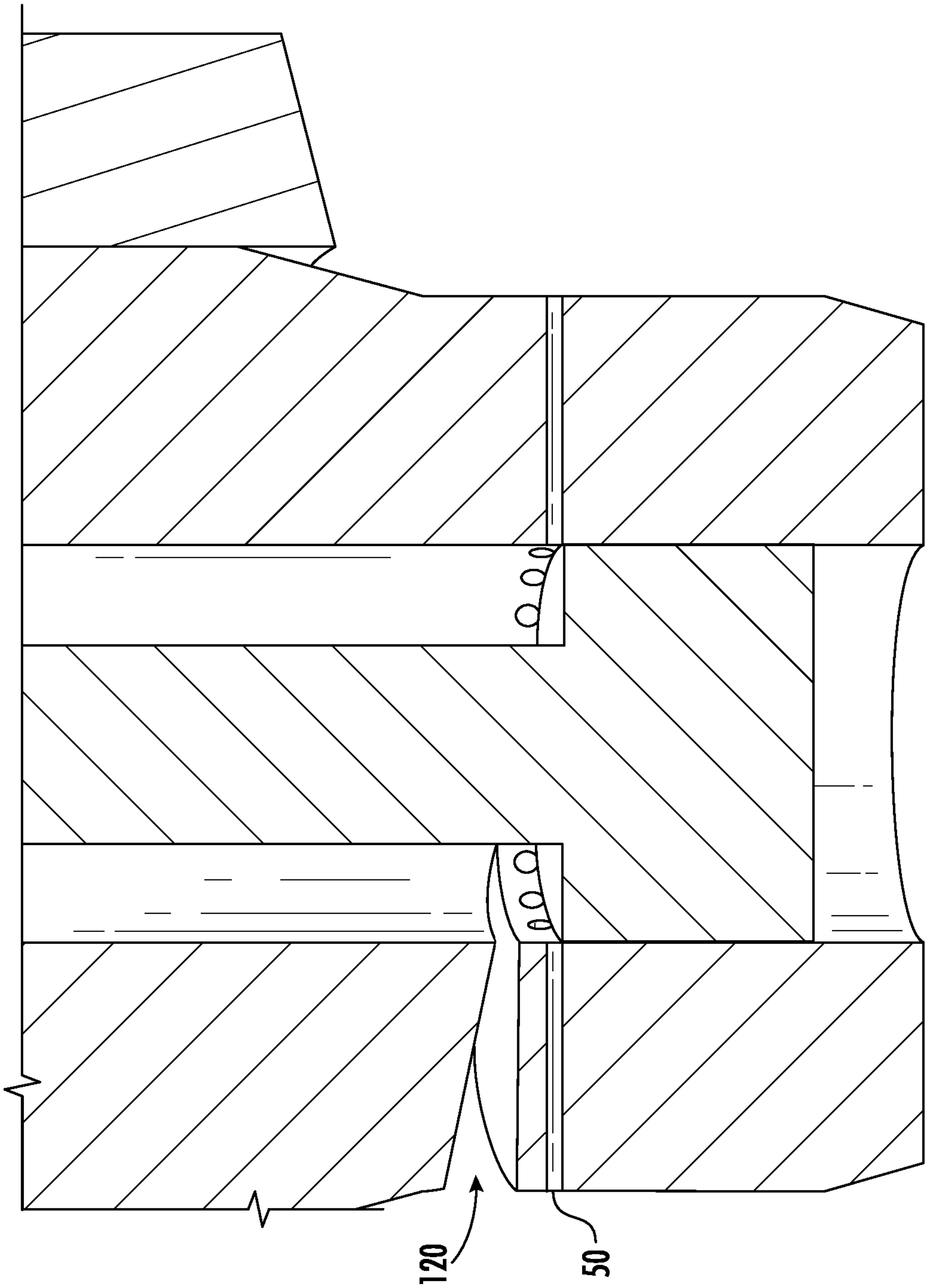
FIG. 61 shows a partial section view illustrating the pintle in an open position.
Figure 62:
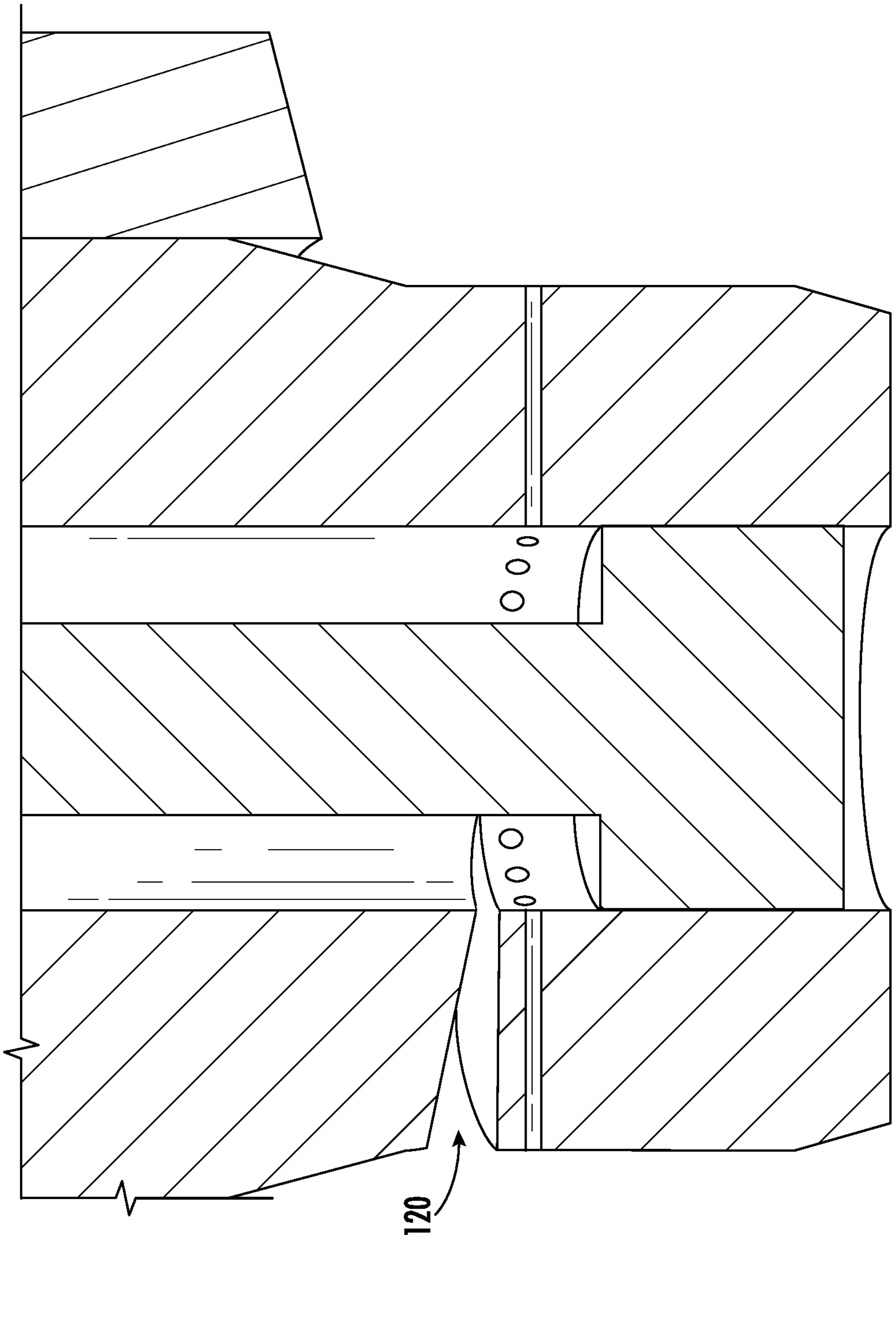
FIG. 62 shows a partial section view illustrating the pintle in an open position.
Figure 63:
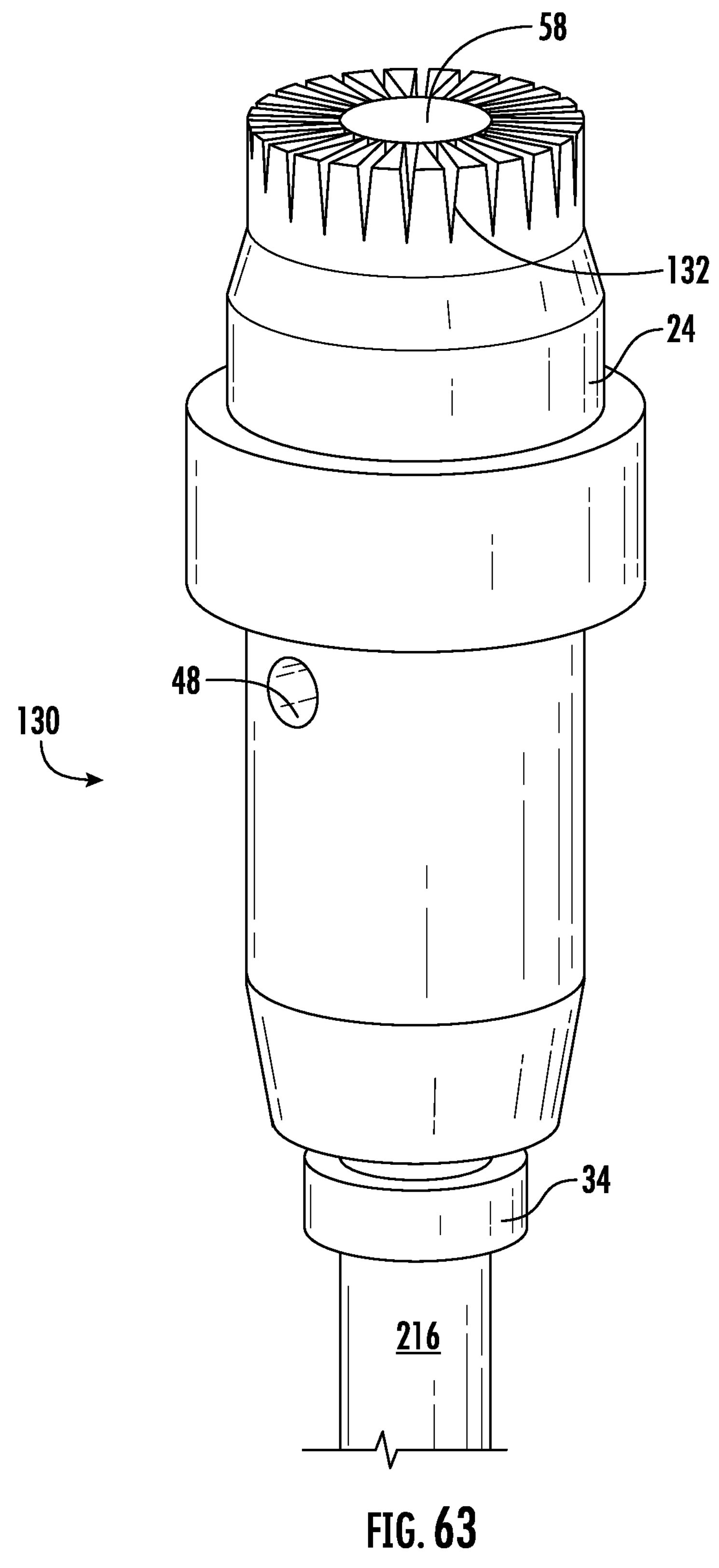
FIG. 63 shows a perspective view of another embodiment of the fuel nozzle assembly having a plurality of radially spaced V-notches for fuel distribution.
Figure 64:
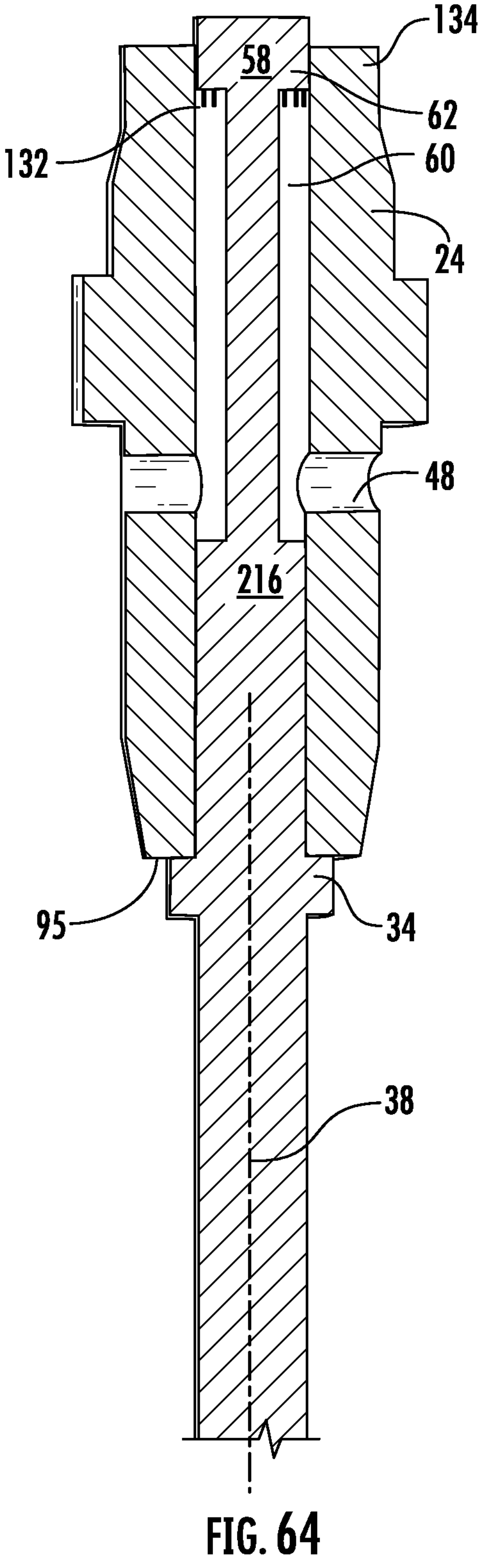
FIG. 64 shows a section view illustrating the nozzles and pintle in an open position.
Figure 65:
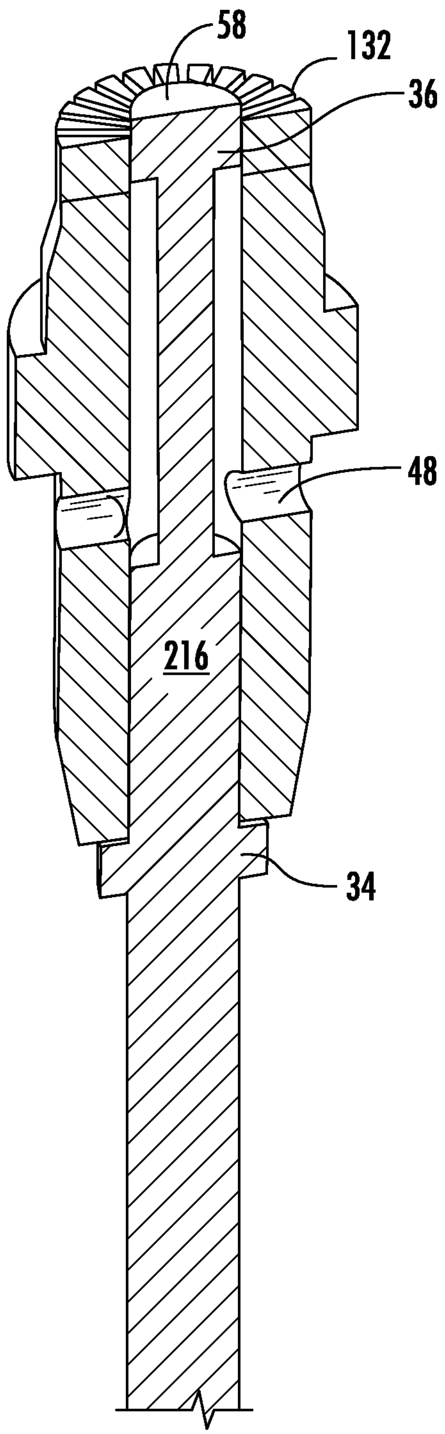
FIG. 65 shows a section view illustrating the nozzles and pintle in a closed position.
Figure 66:
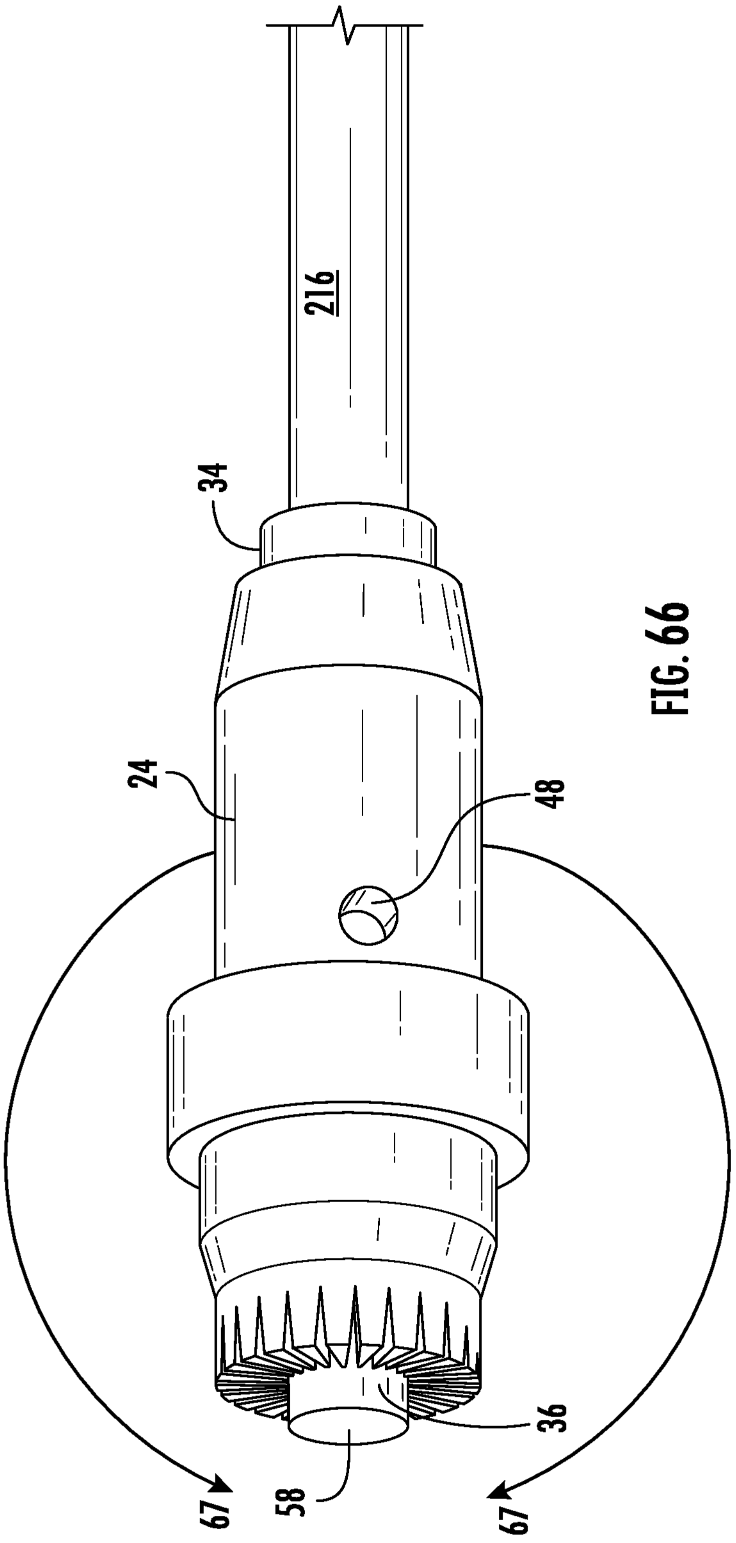
FIG. 66 shows a perspective view illustrating the nozzles and pintle in an open position.
Figure 67:
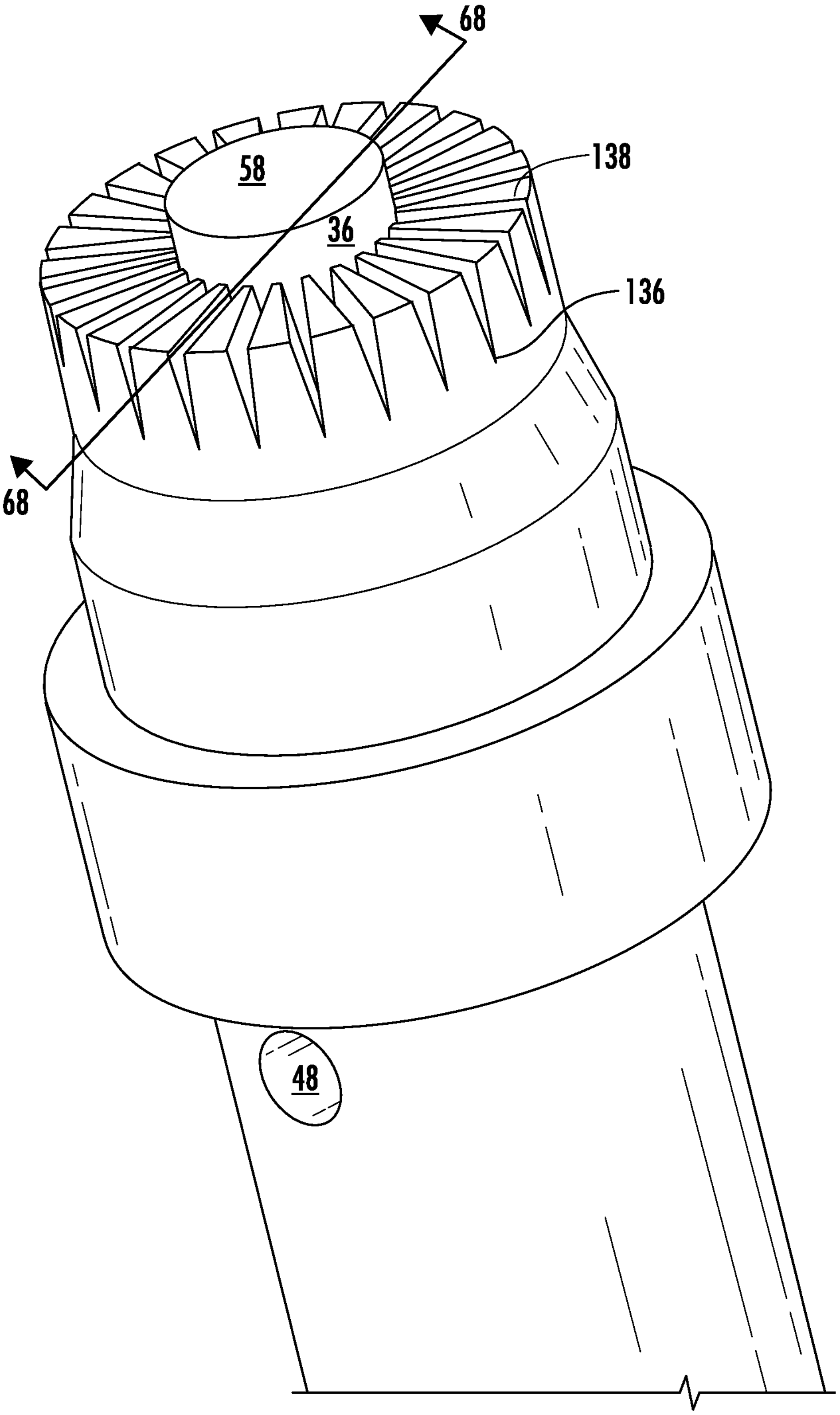
FIG. 67 shows a partial perspective view taken along lines 67-67 of FIG. 66.
Figure 68:
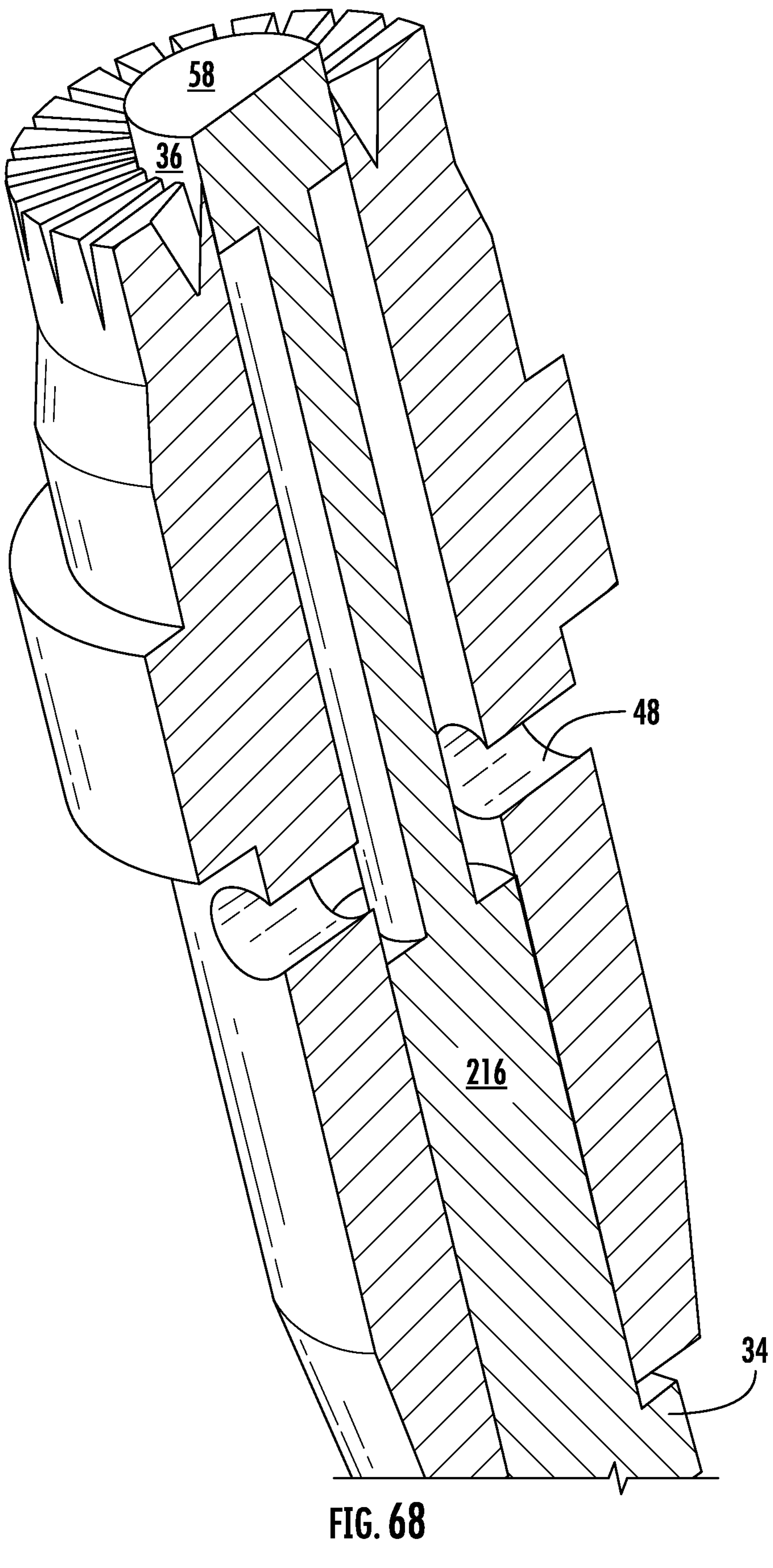
FIG. 68 shows a section view taken along lines 68-68 of FIG. 67.
Figure 69:
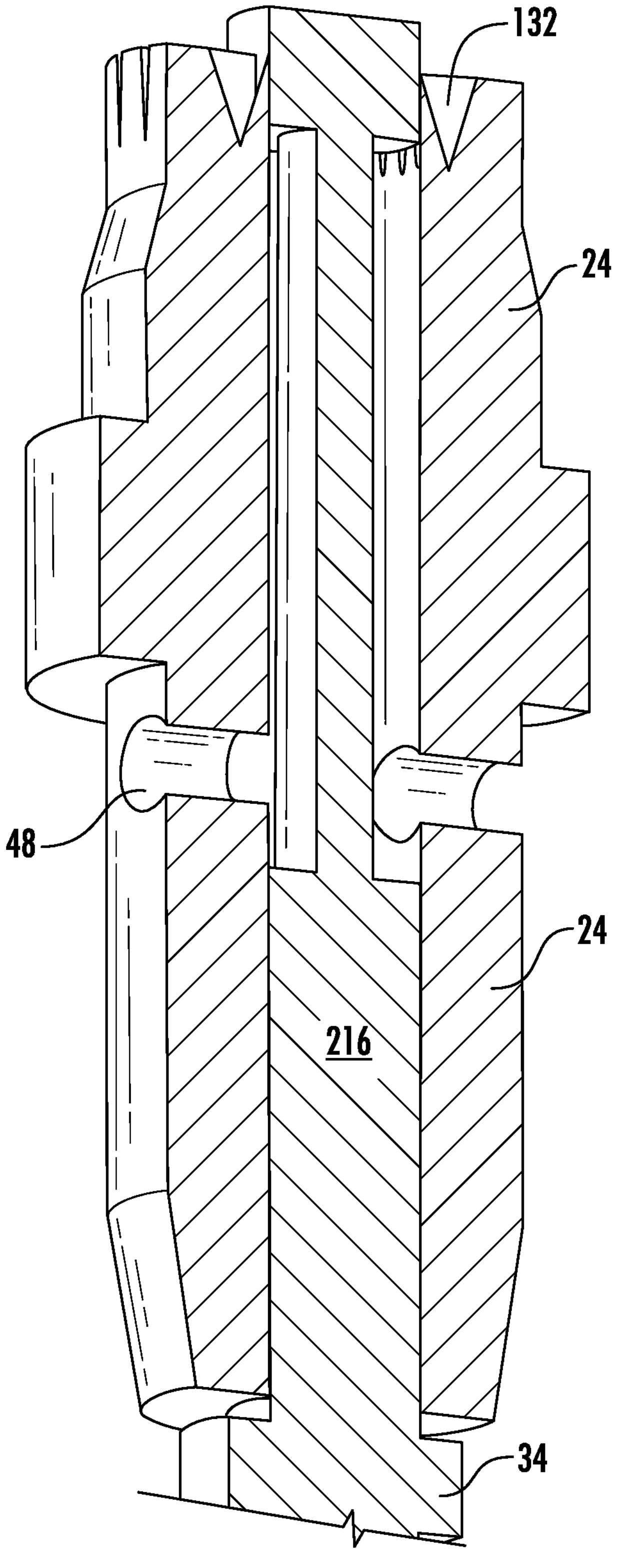
FIG. 69 shows a section view taken along lines 68-68 of FIG. 67.
Figure 70:
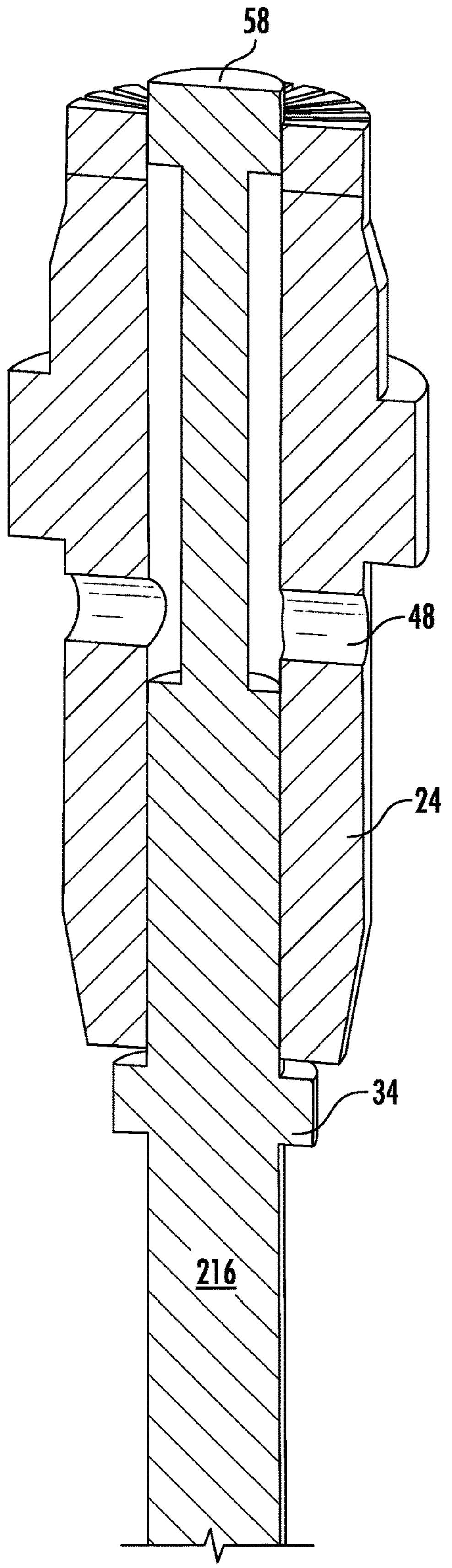
FIG. 70 shows a section view taken along lines 68-68 of FIG. 67.
Figure 71:
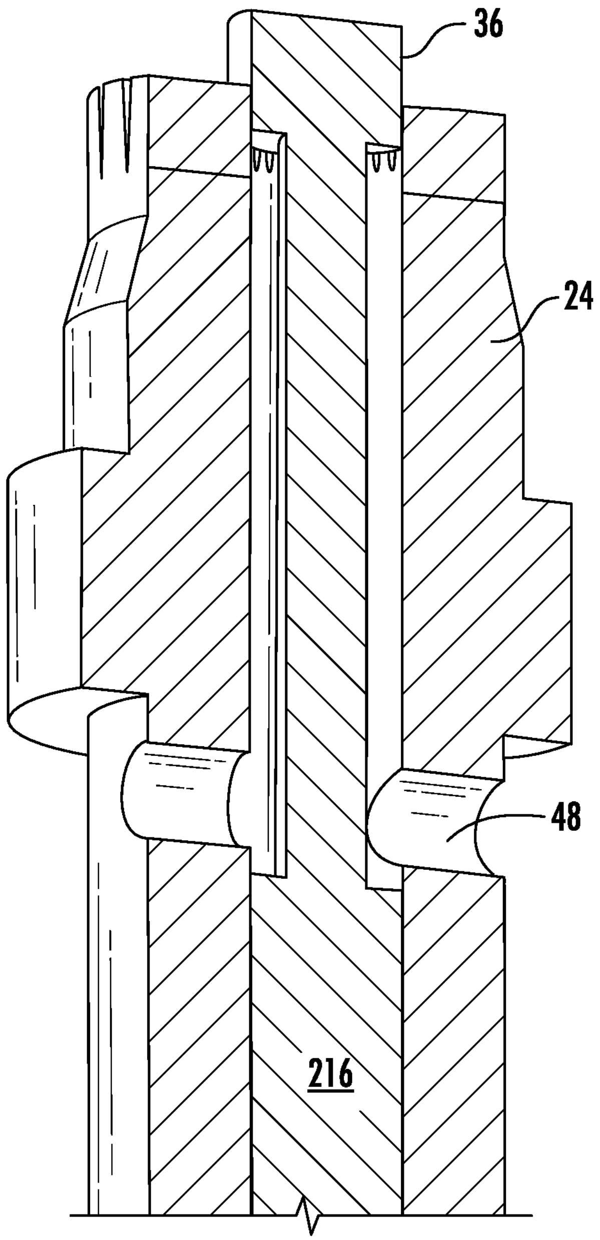
FIG. 71 shows a section view illustrating the pintle rod in an open position.
Figure 72:
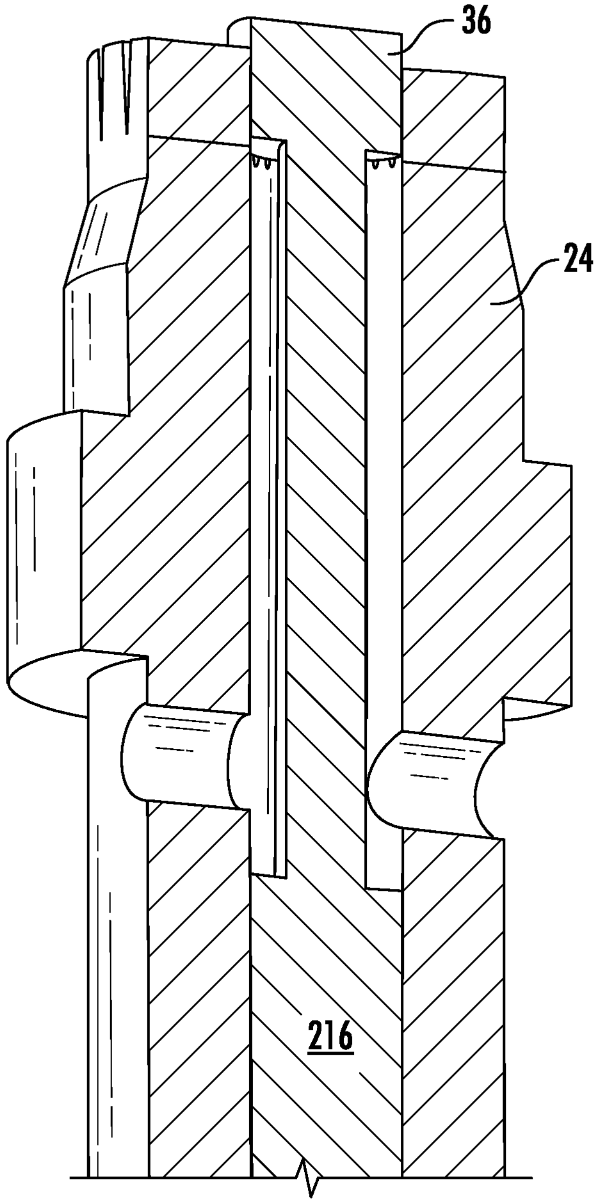
FIG. 72 shows a section view illustrating the pintle rod in a partially open position.
Figure 73A:
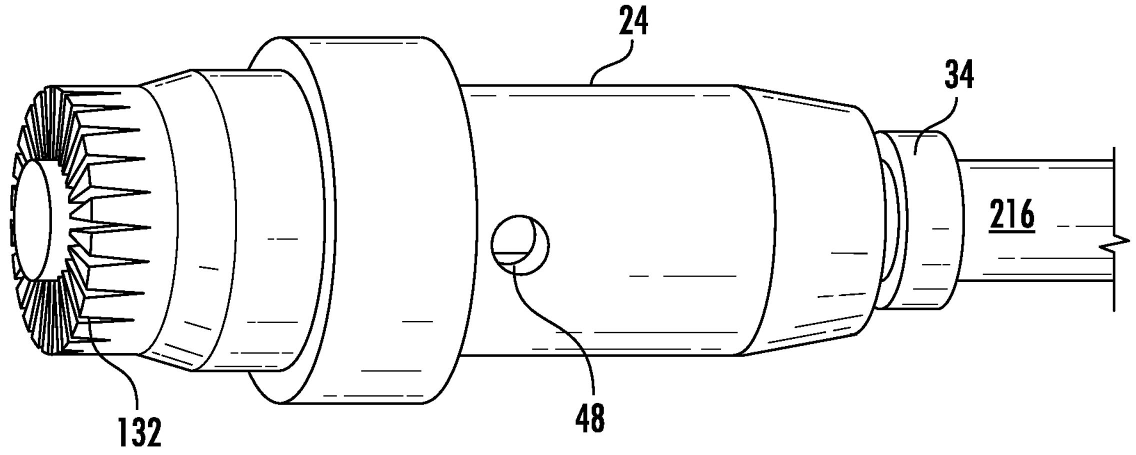
FIG. 73A shows a perspective view illustrating one embodiment of a fuel injector and nozzle assembly.
Figure 73B:
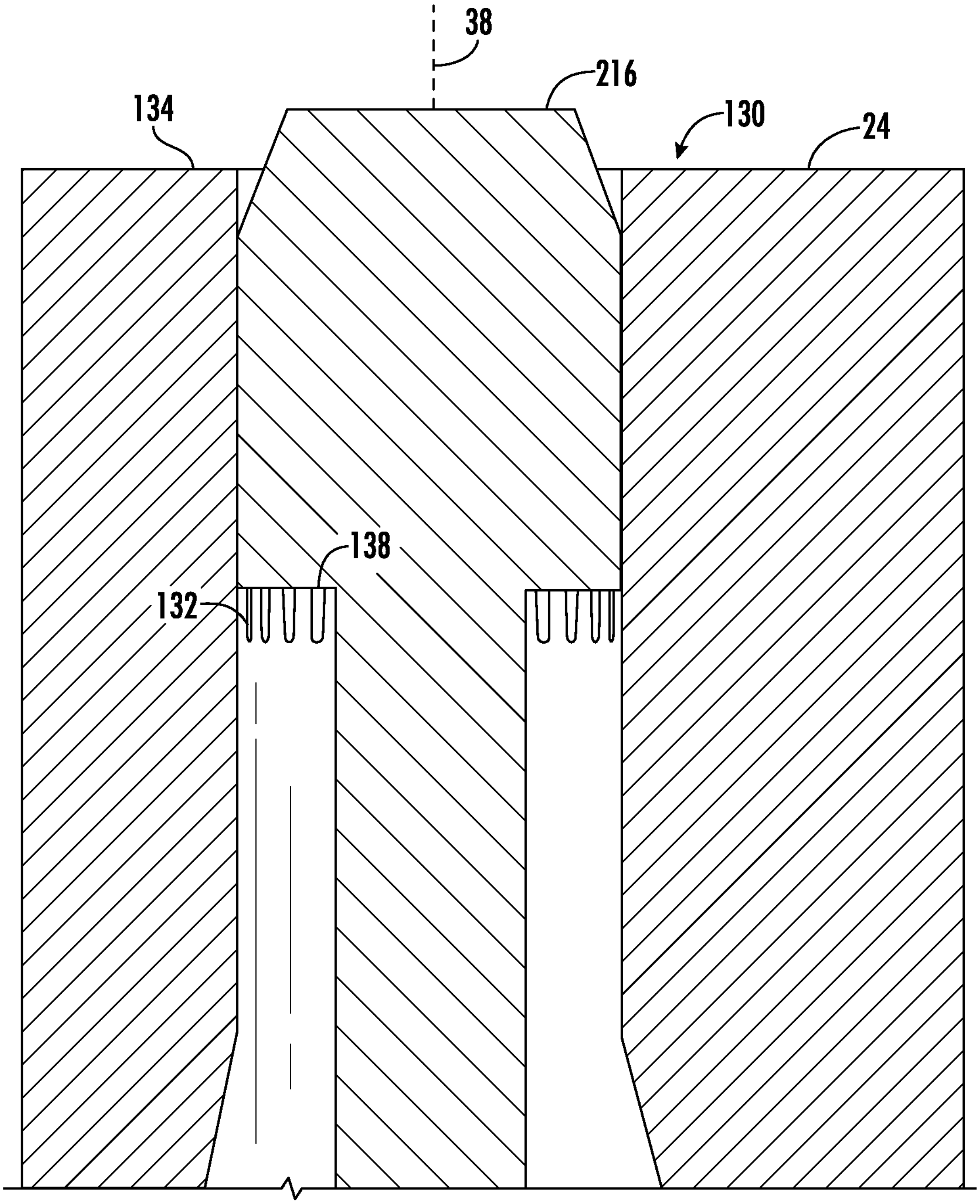
FIG. 73B shows a partial section view illustrating one embodiment of a fuel injector and nozzle assembly.
Figure 73C:
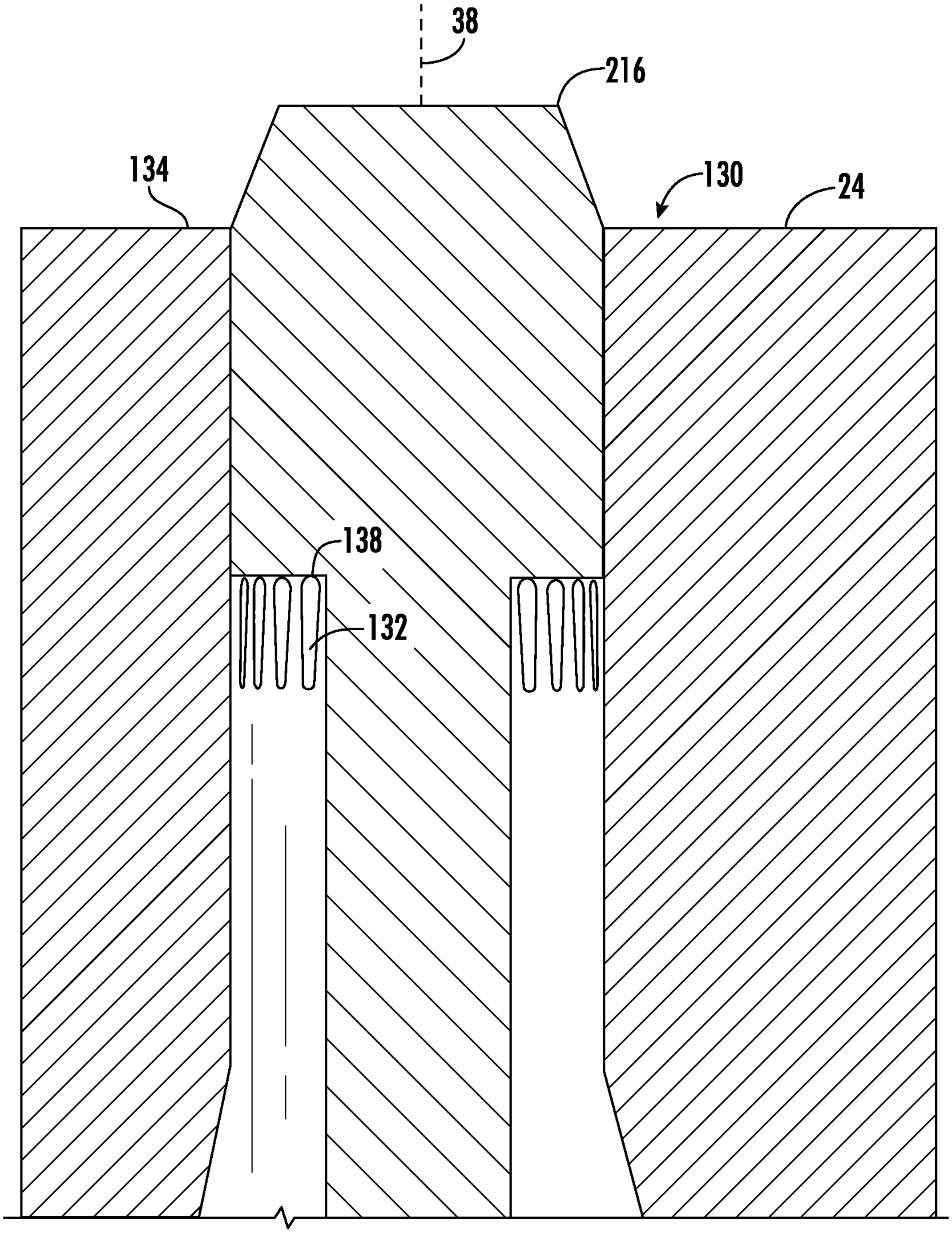
FIG. 73C shows a partial section view illustrating one embodiment of a fuel injector and nozzle assembly.
Figure 74:
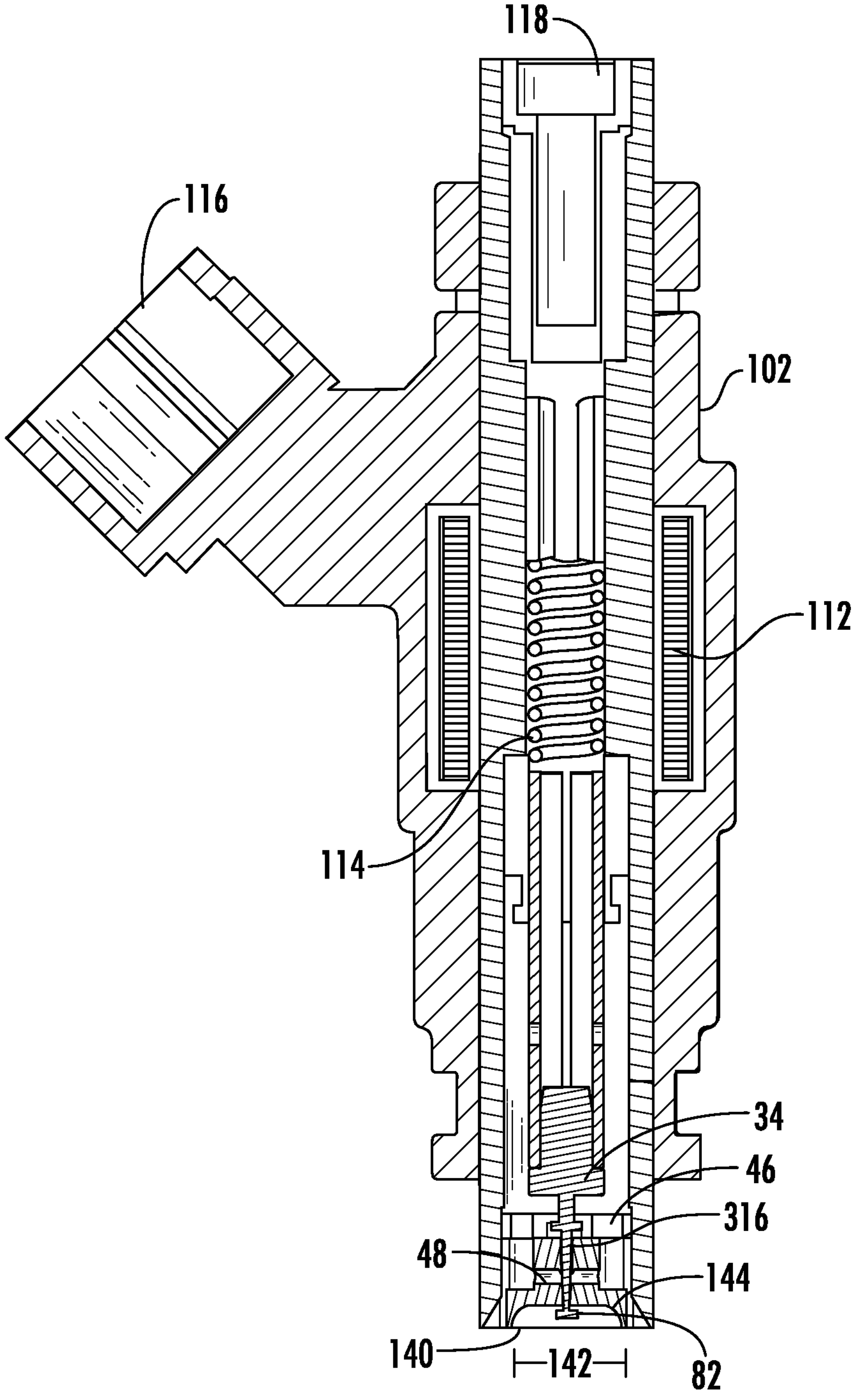
FIG. 74 shows a section view illustrating an alternative embodiment of a fuel injector and nozzle assembly.
Figure 75:
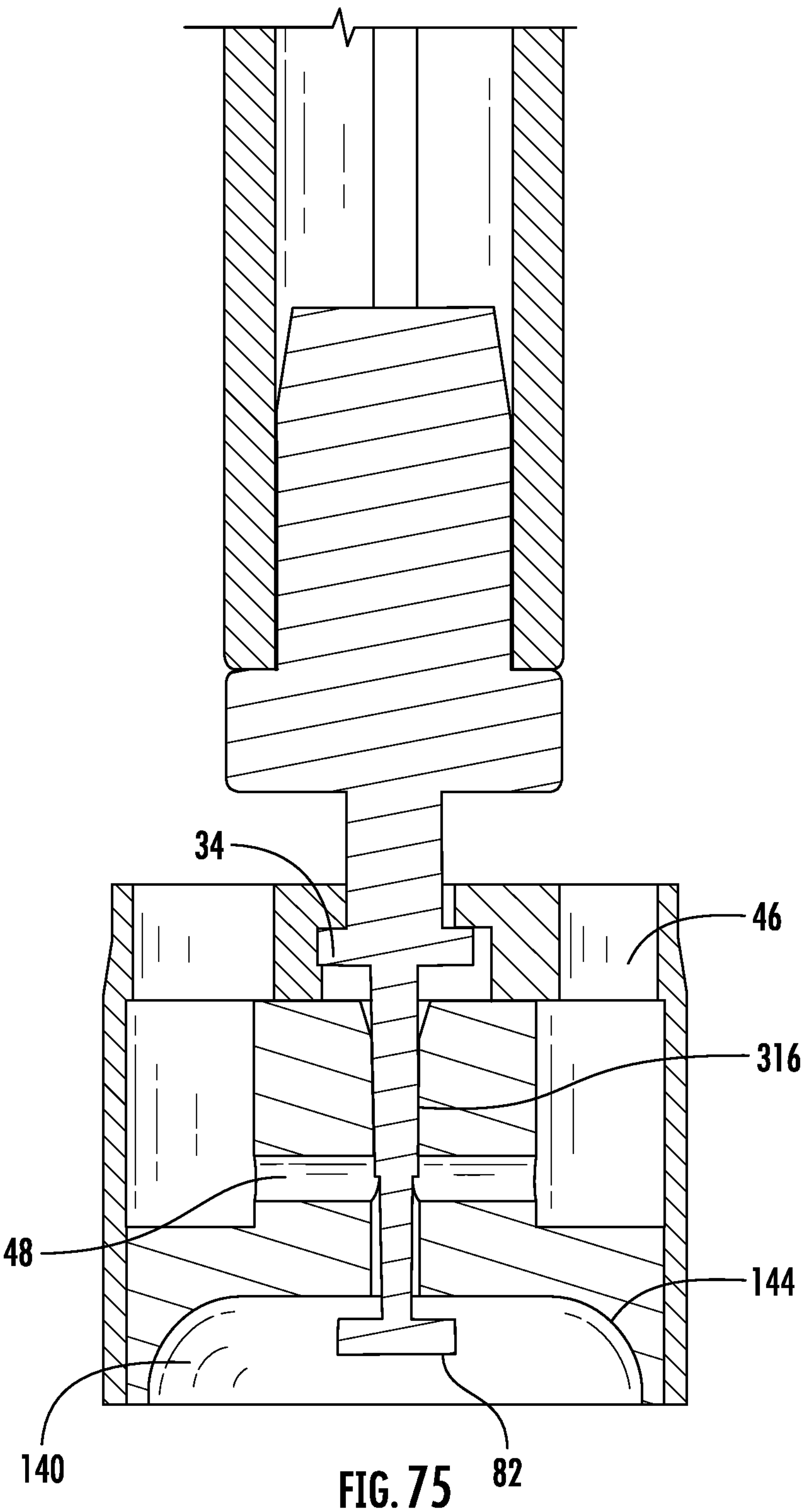
FIG. 75 shows a partial section view illustrating the fuel nozzle and pintle rod in an open position.
Figure 76:
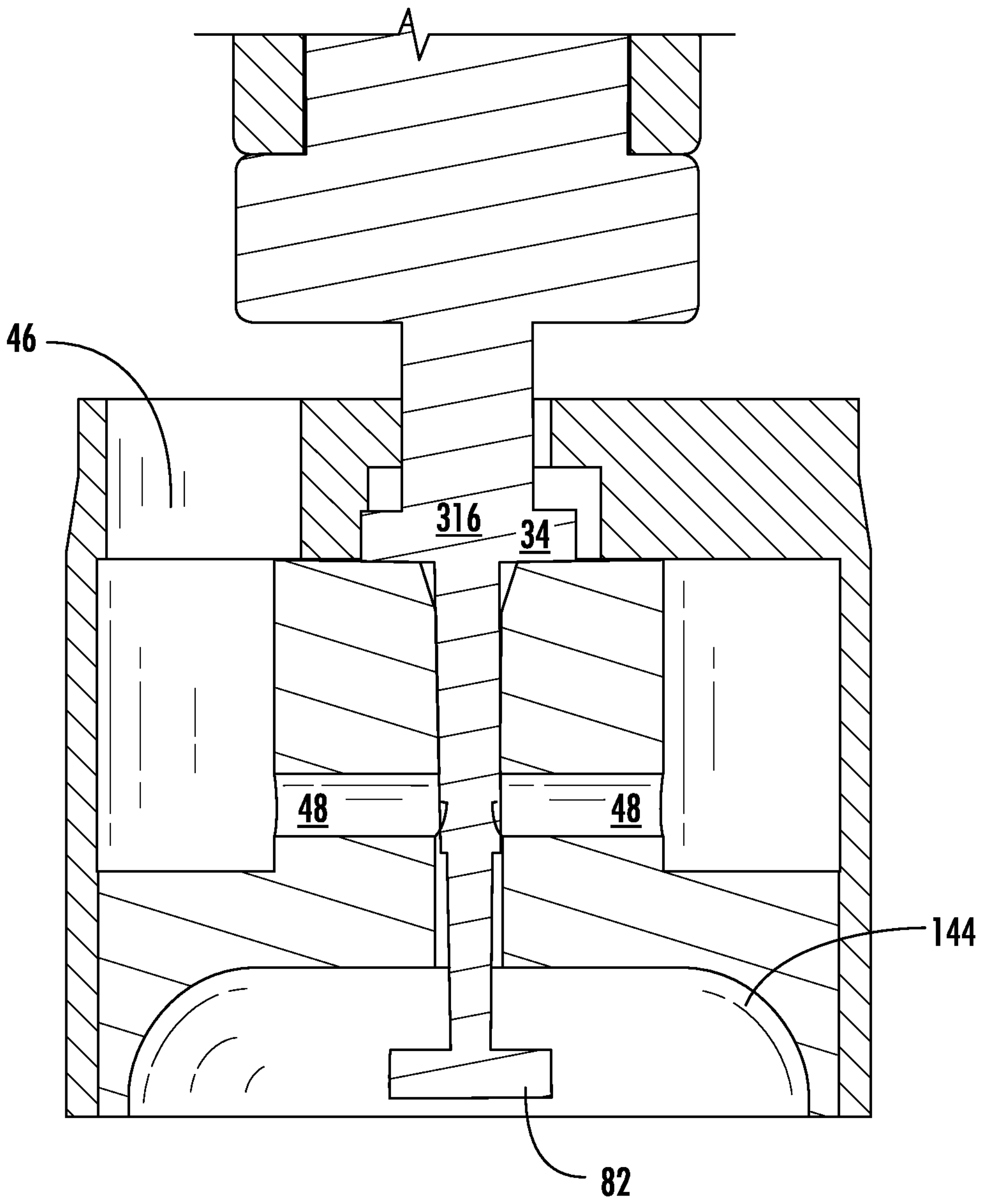
FIG. 76 shows a partial section view illustrating the fuel nozzle and pintle rod in a closed position.
Figure 77:
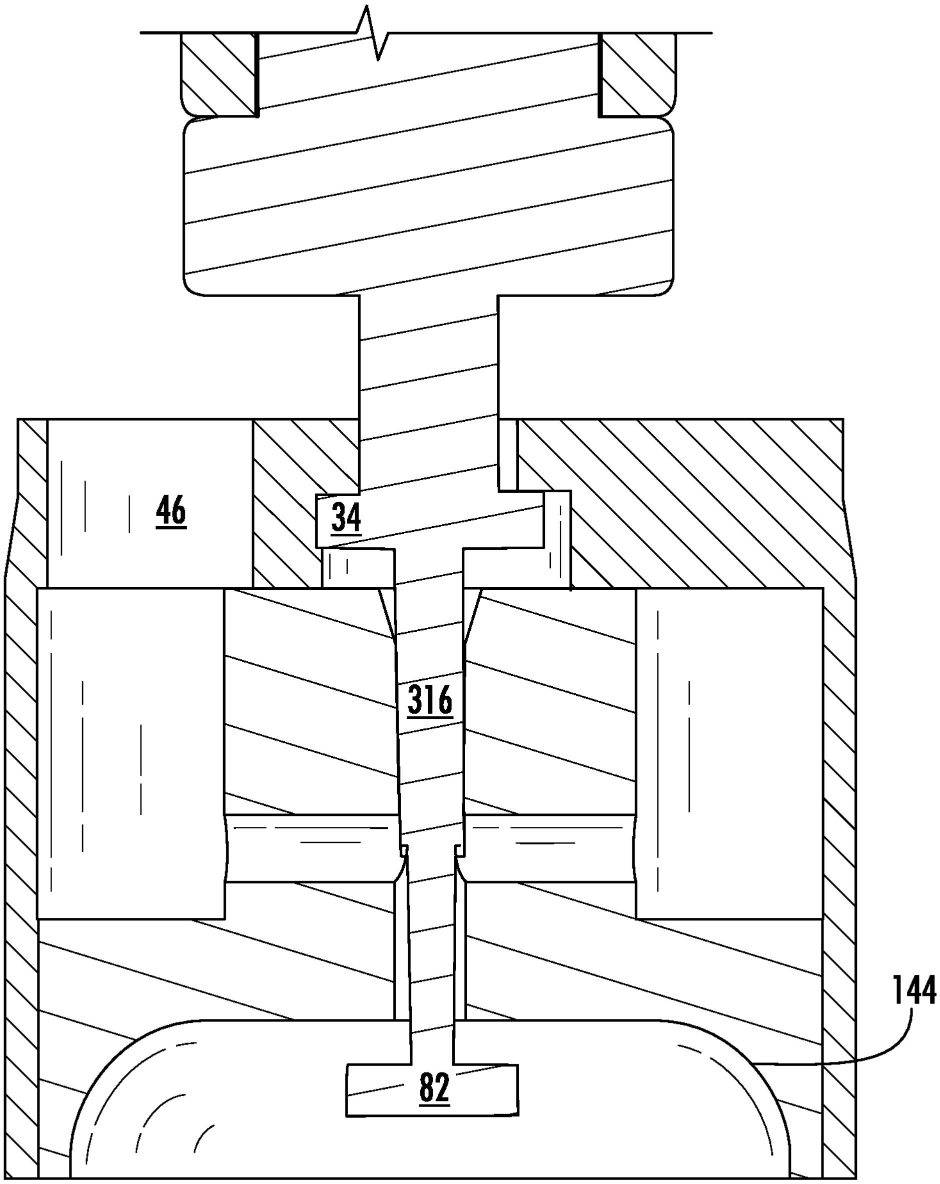
FIG. 77 shows a partial section view illustrating the fuel nozzle and pintle rod in an open position.
Figure 78:
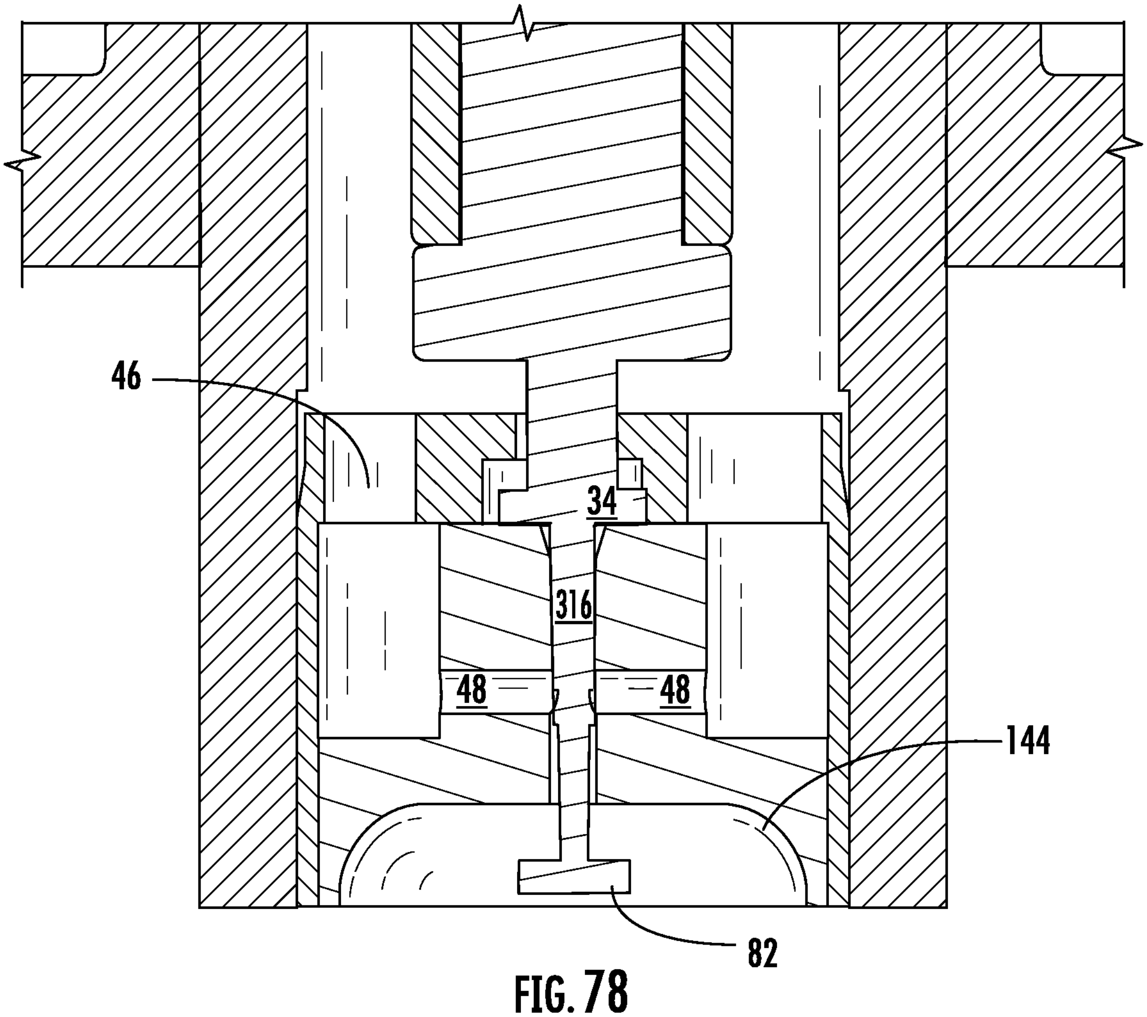
FIG. 78 shows a partial section view illustrating the fuel nozzle and pintle rod in a closed position.
Figure 79:
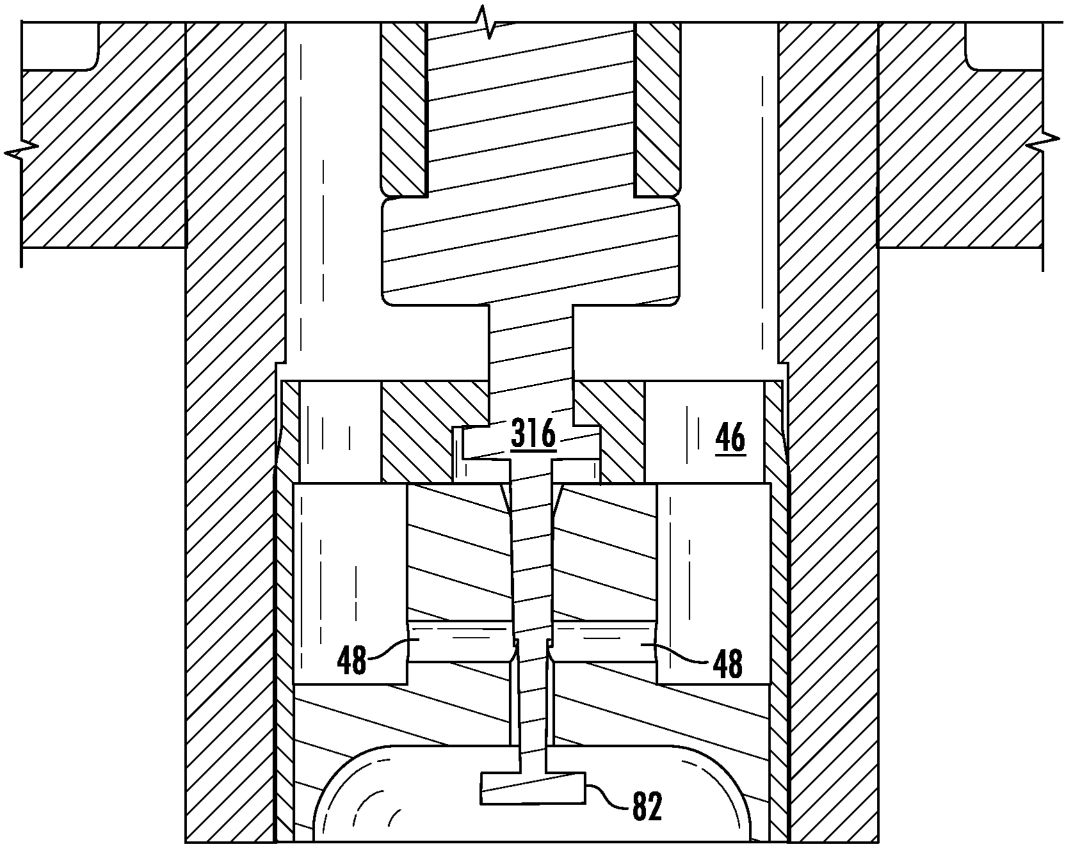
FIG. 79 shows a partial section view illustrating the fuel nozzle and pintle rod in an open position.
Figure 80:
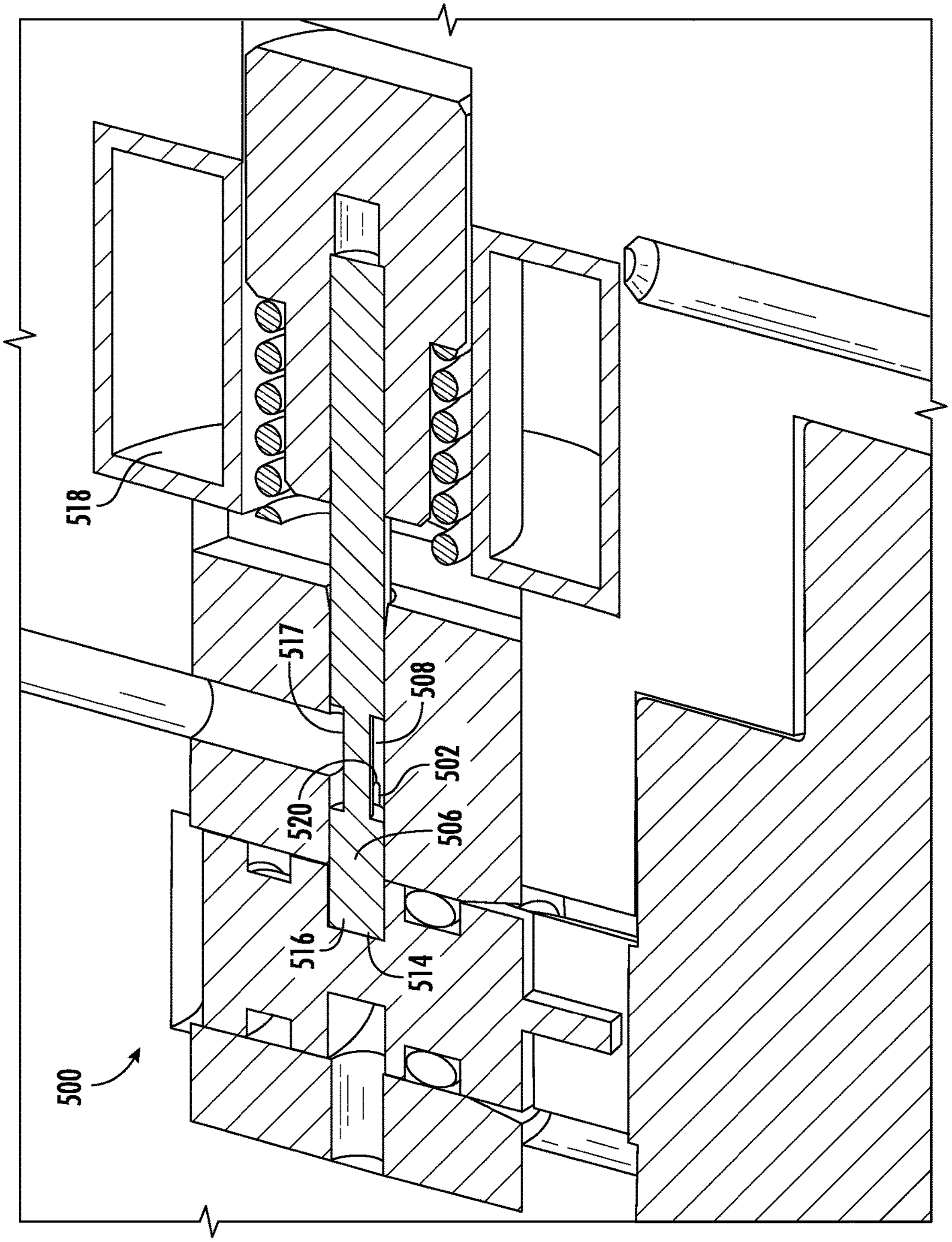
FIG. 80 shows a section view illustrating a metering valve in cooperation with a fuel injector nozzle assembly having a pintle rod operating at a right angle with respect to fuel flow.
Figure 81:
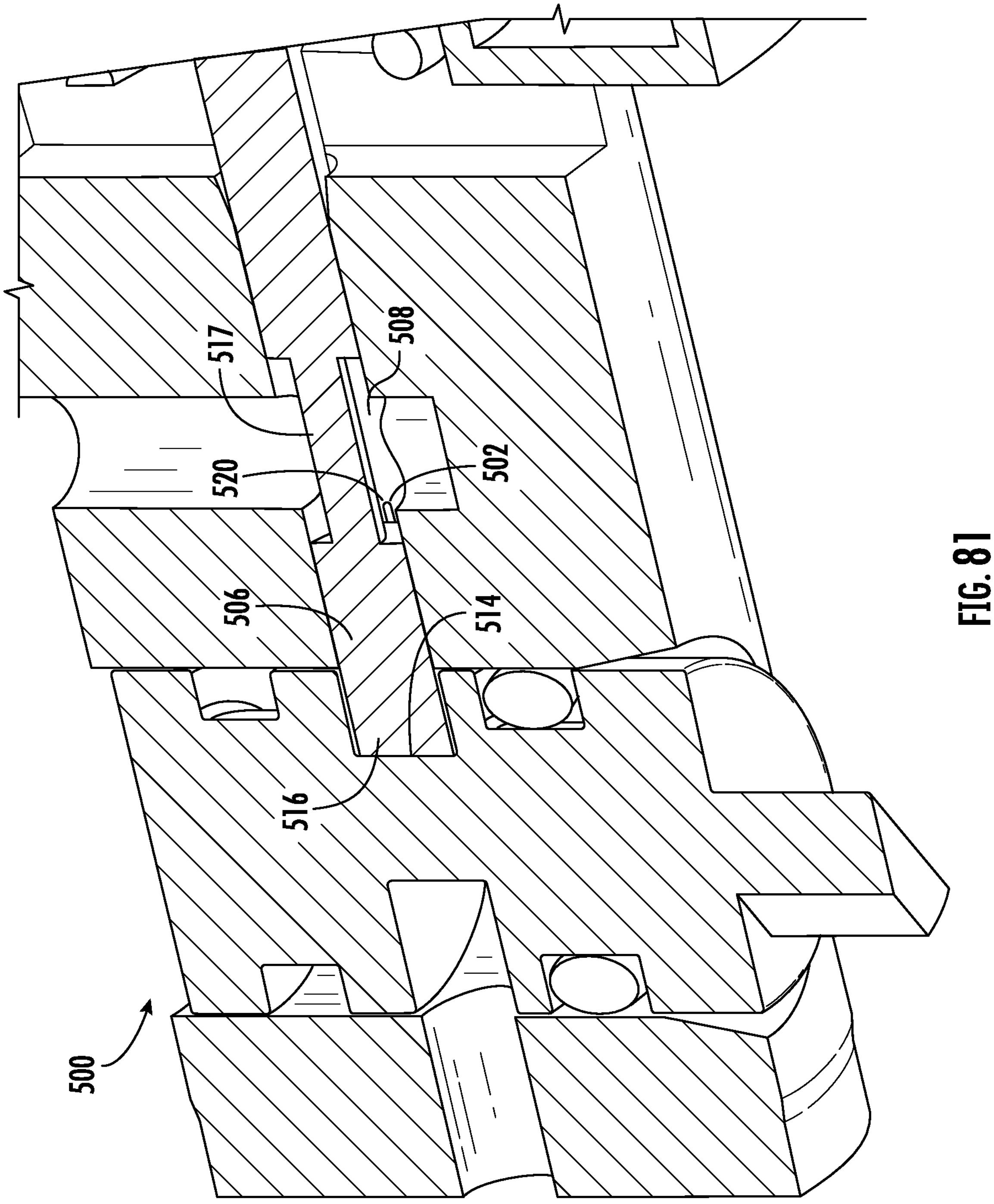
FIG. 81 shows a partial section view illustrating the pintle rod in cooperation with the metering cam.
Figure 82:
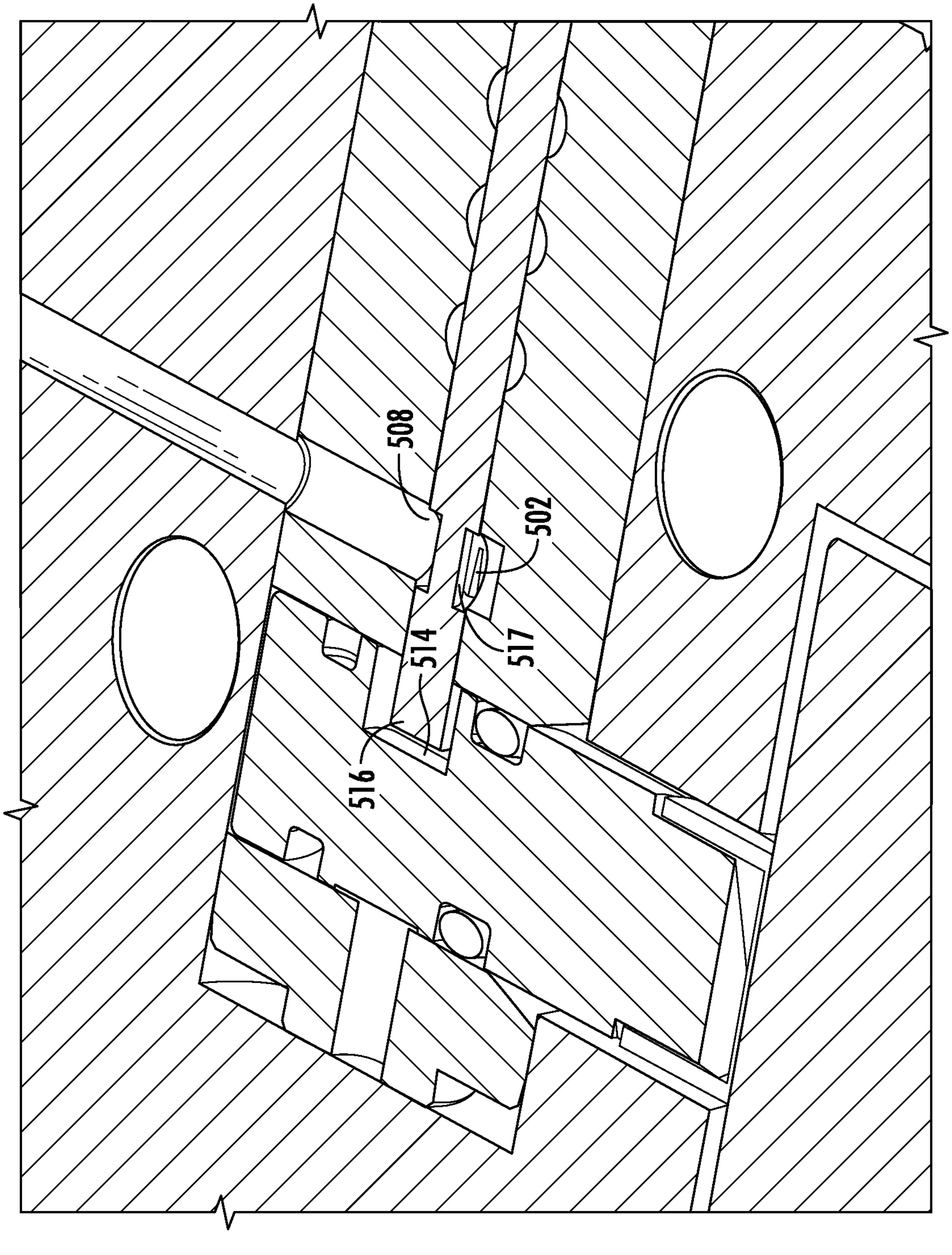
FIG. 82 shows a partial section view illustrating the pintle rod in cooperation with the metering cam.
Figure 83:
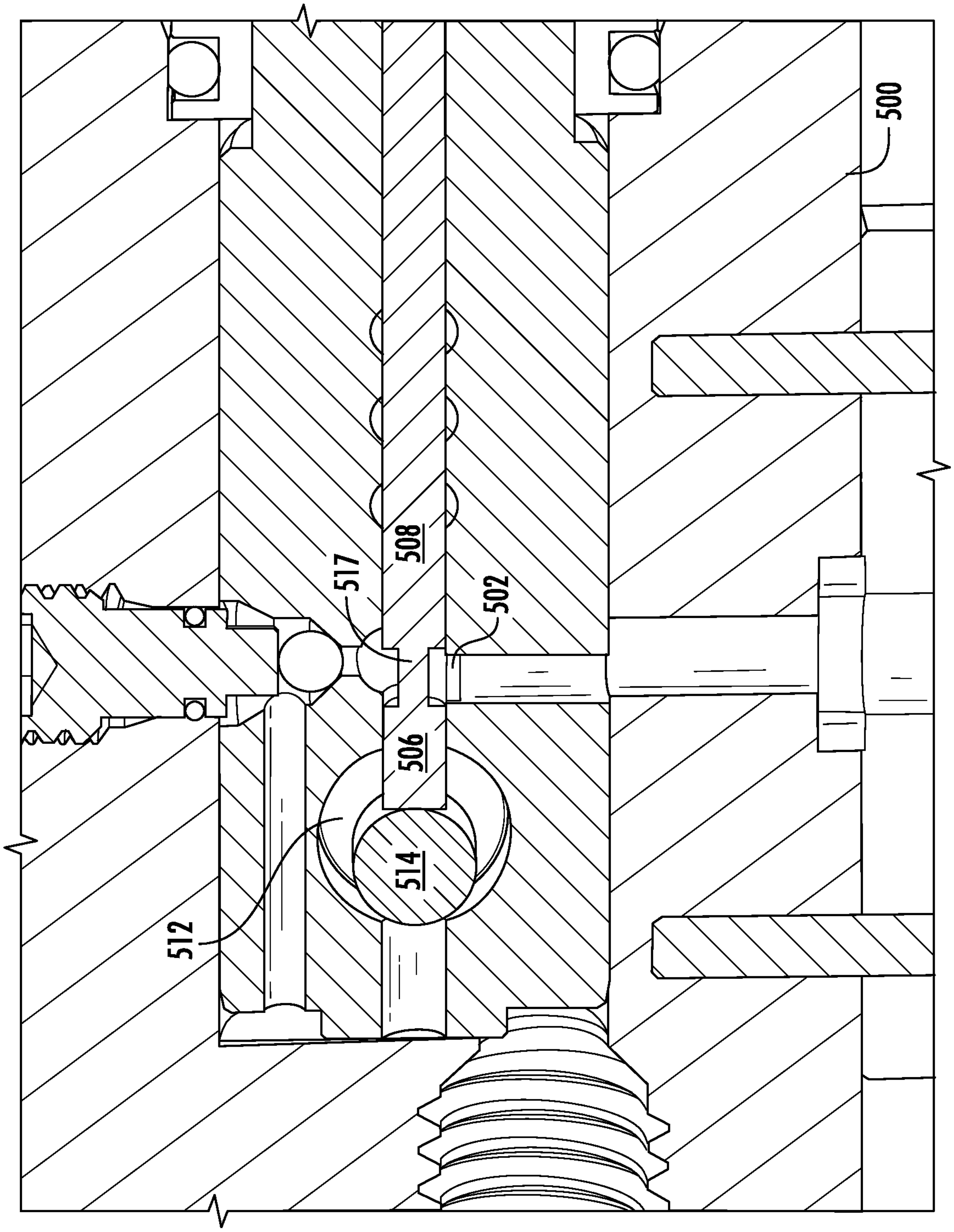
FIG. 83 shows a partial section view illustrating the pintle rod in cooperation with the metering cam.
Figure 84A:
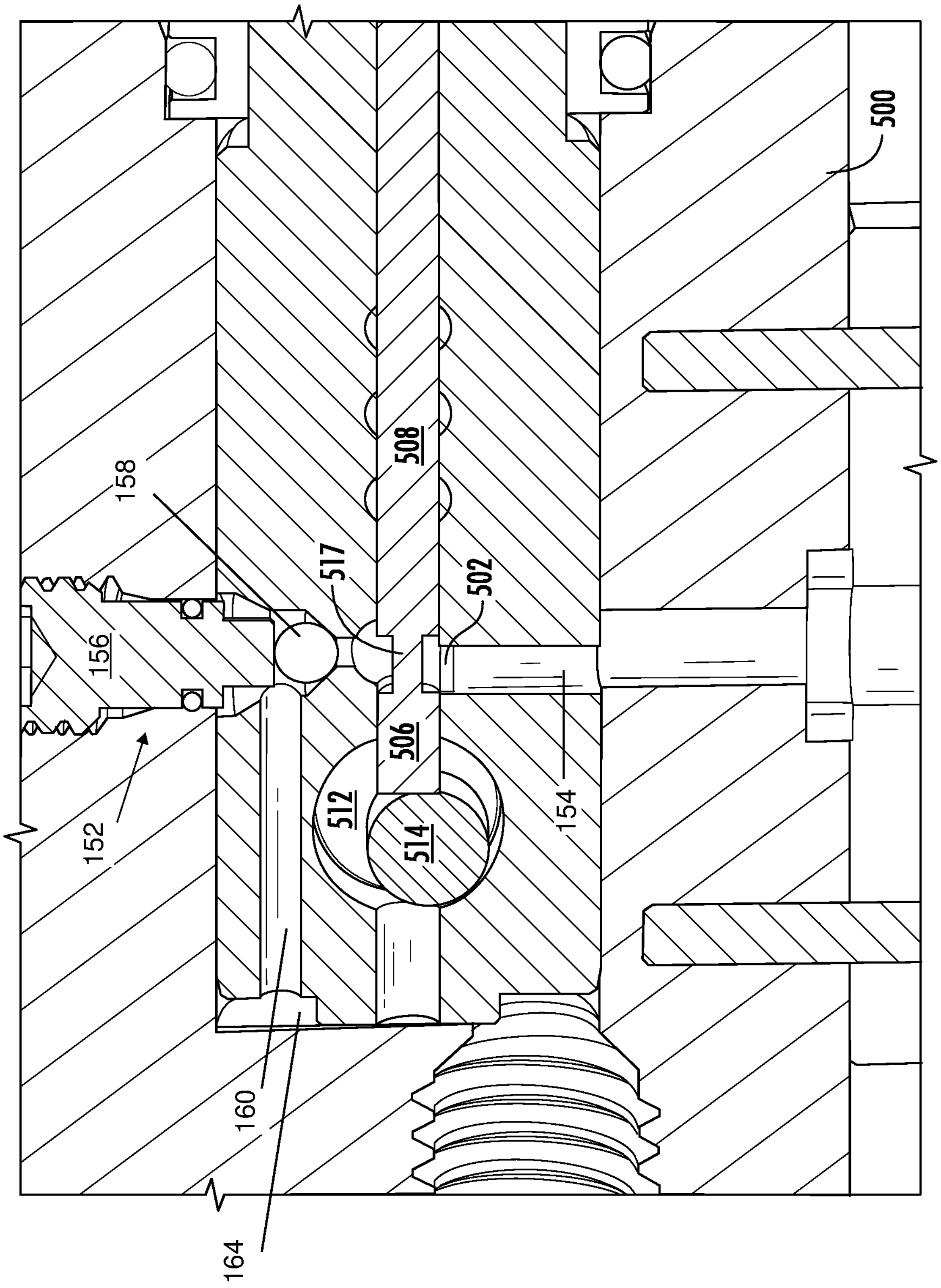
FIG. 84A shows a partial section view illustrating the pintle rod in cooperation with the metering cam.
Figure 84B:
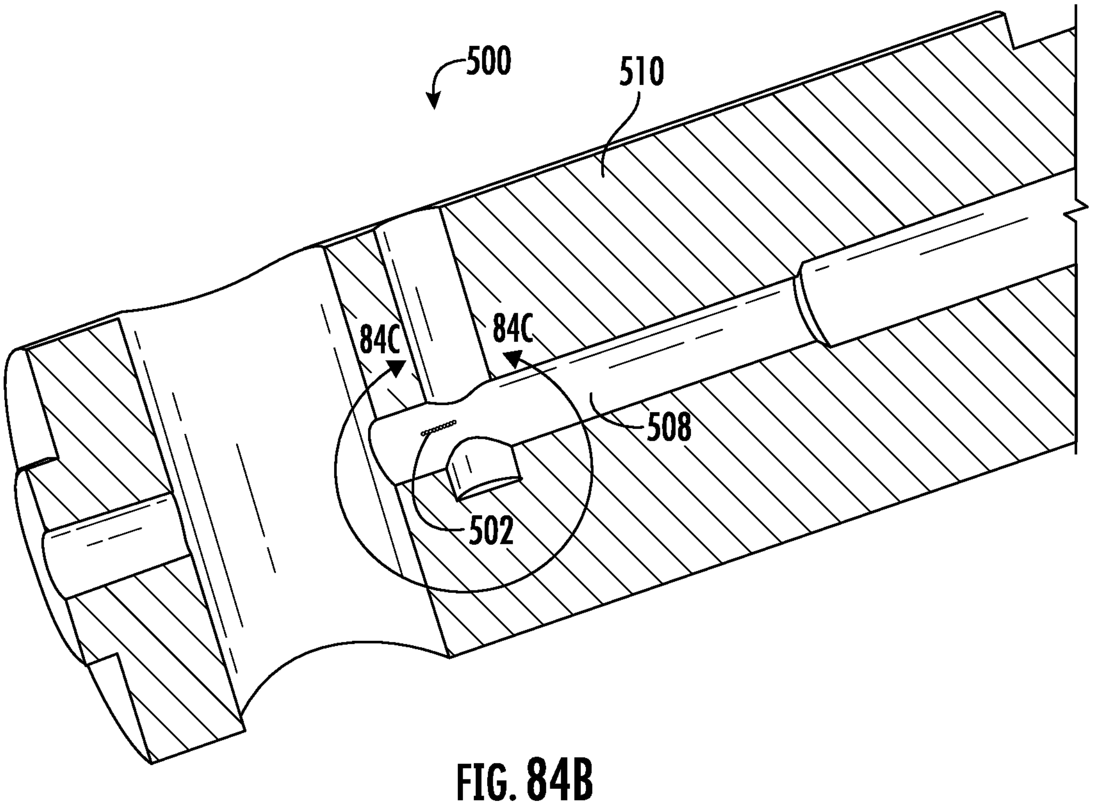
FIG. 84B shows a partial perspective view of the metering block.
Figure 84C:
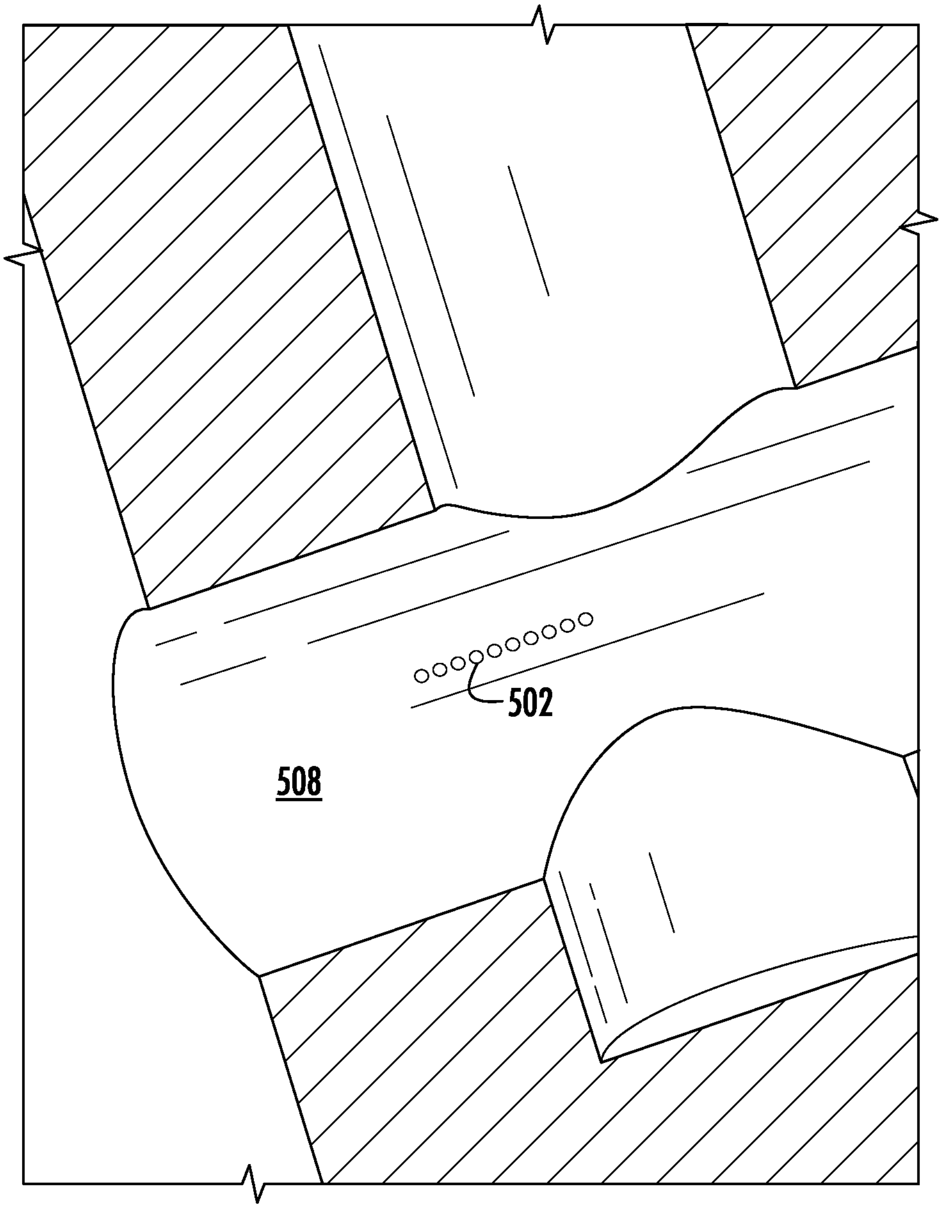
FIG. 84C is an enlarged partial view taken along line 84C-84C of FIG. 84B illustrating a portion of the metering block.
Figure 85:
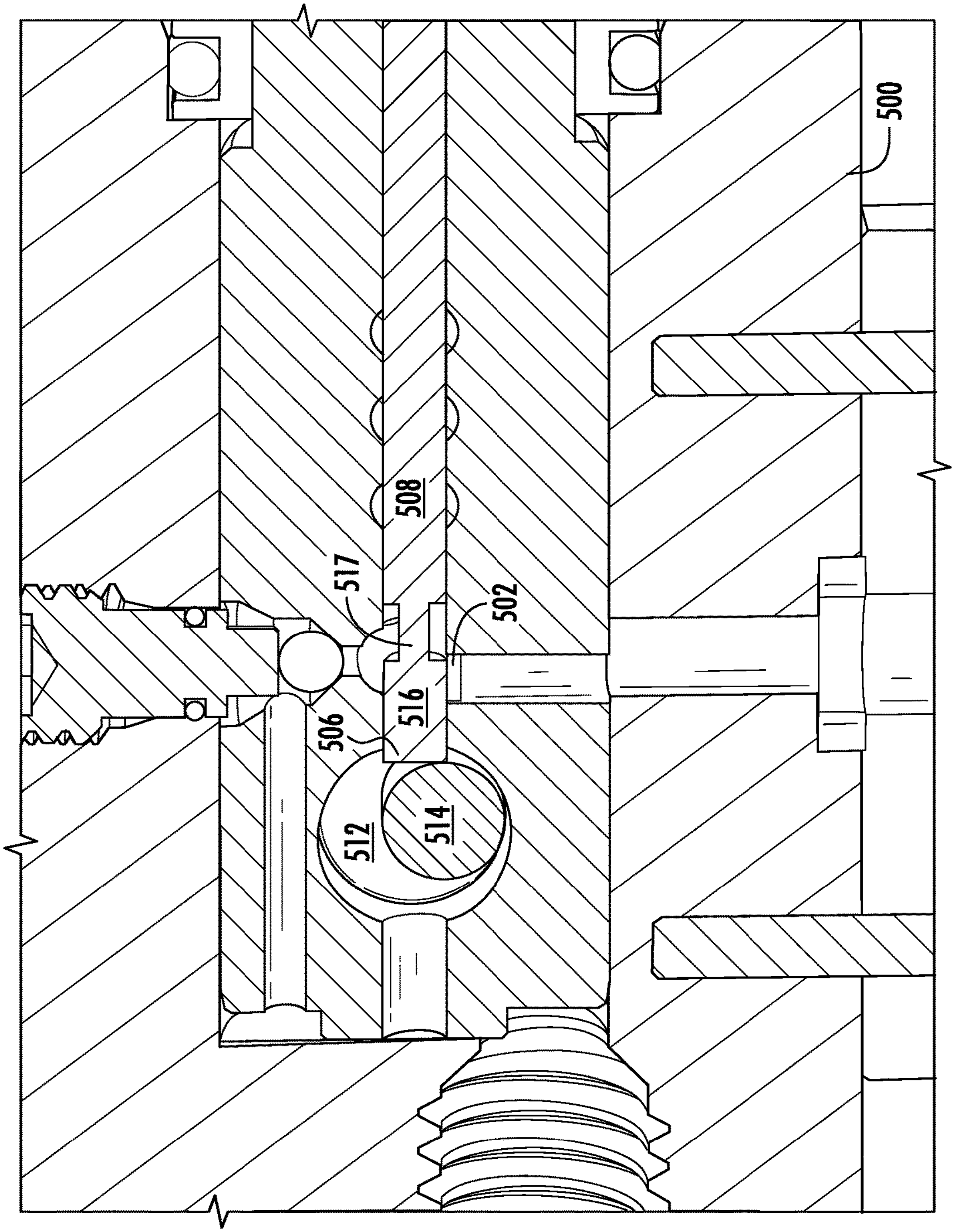
FIG. 85 shows a partial section view illustrating the pintle rod in cooperation with the metering cam.
Figure 86:
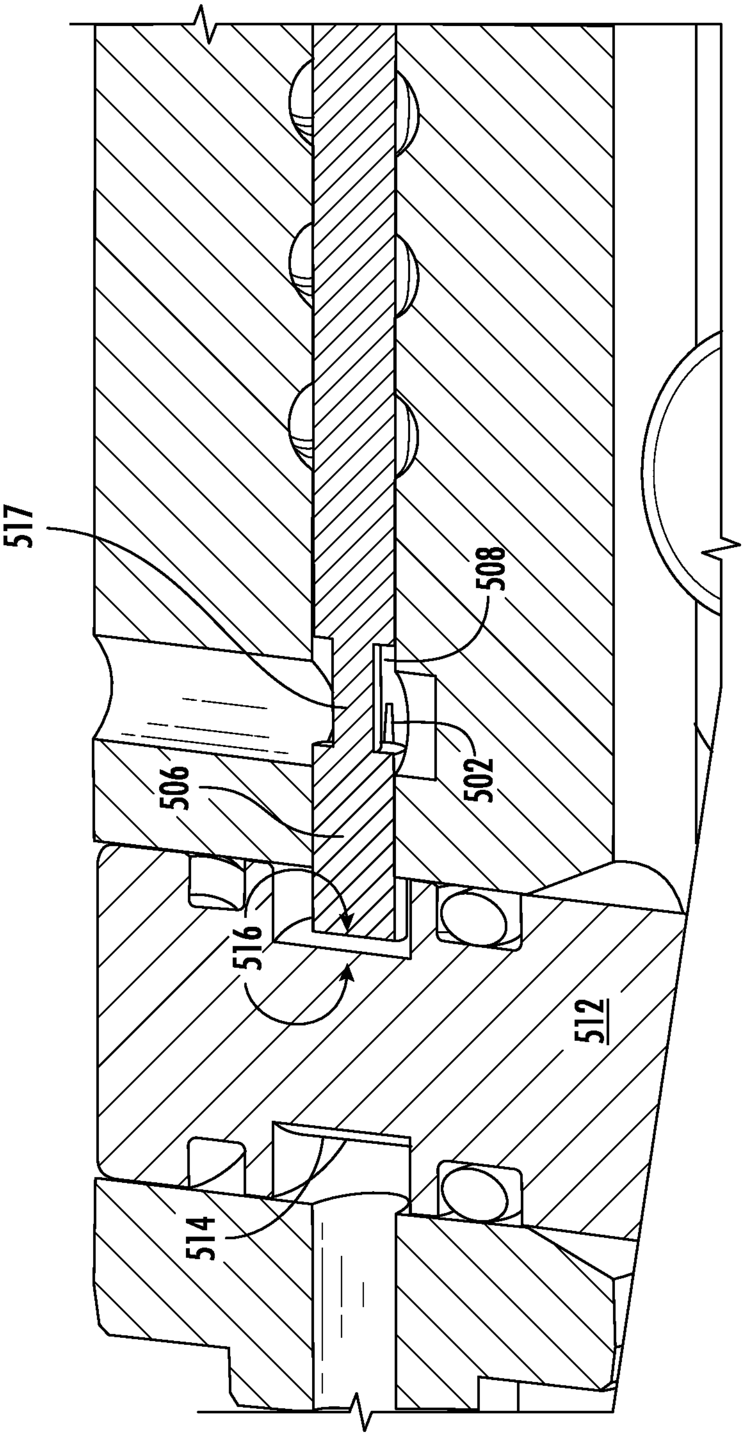
FIG. 86 shows a partial section view illustrating the pintle rod in a closed position.
Figure 87:
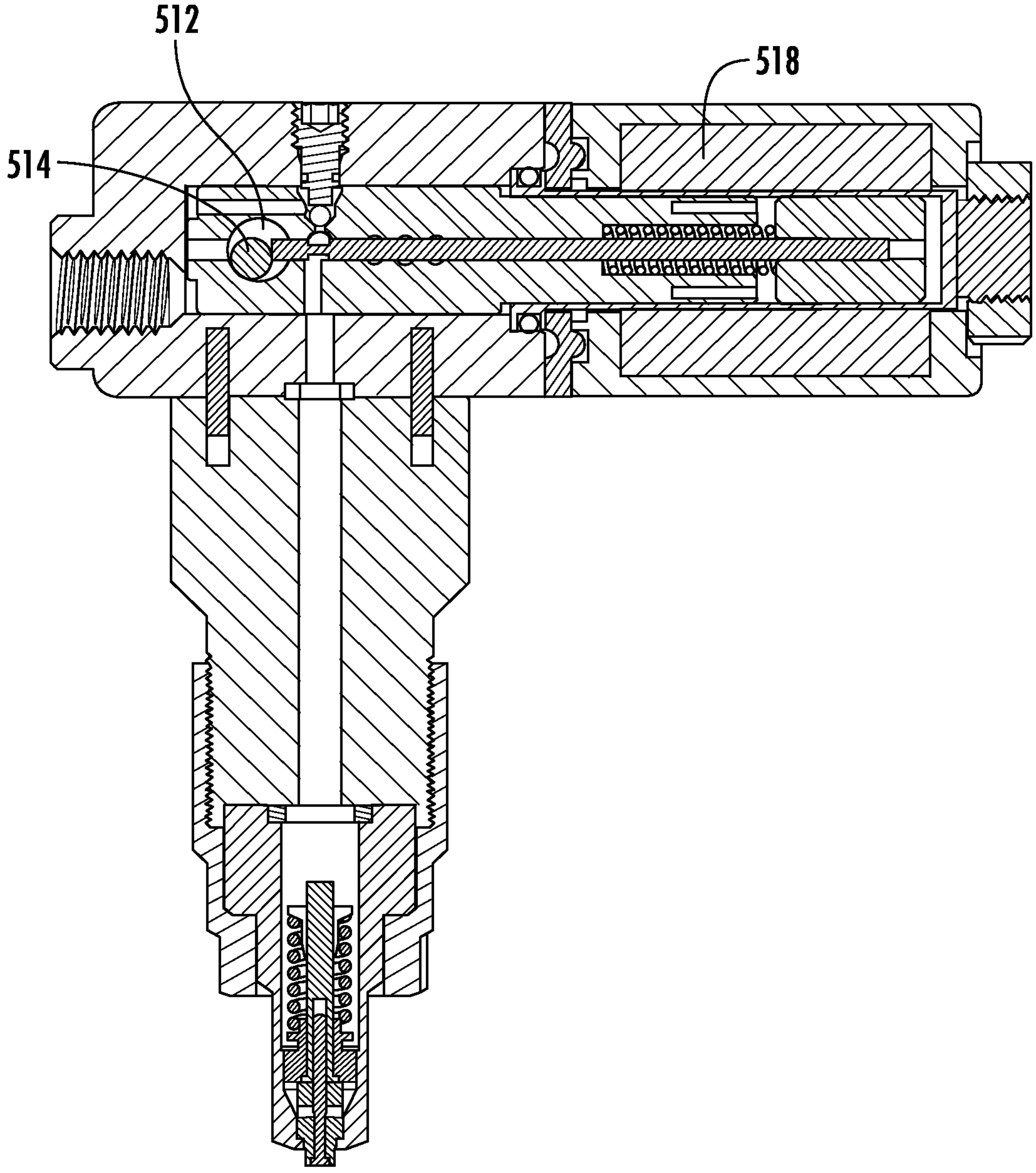
FIG. 87 shows a section view illustrating the servo controlled metering valve in cooperation with a fuel injector.
Figure 88:
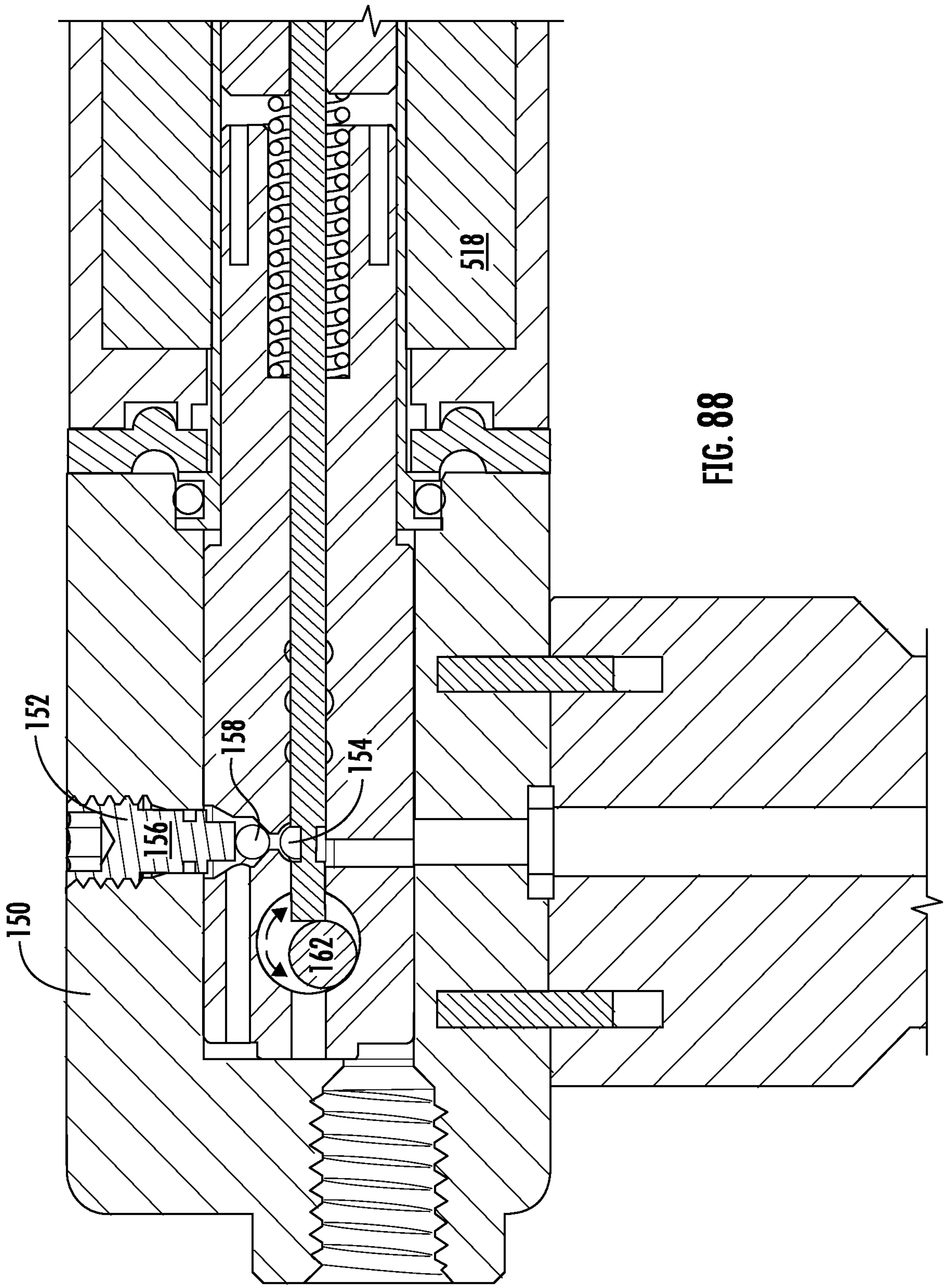
FIG. 88 shows a partial section view illustrating a fuel return path.
Figure 89:
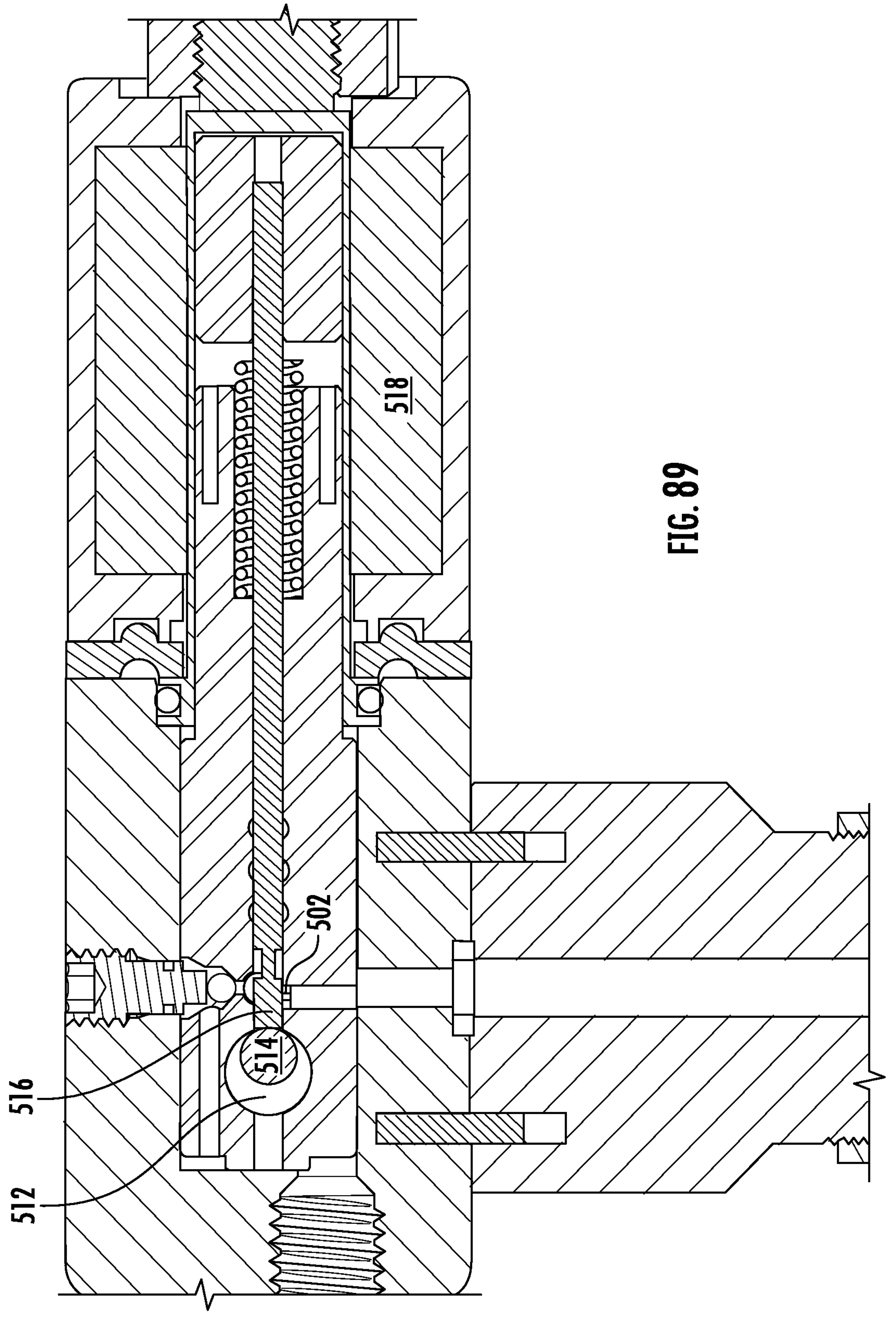
FIG. 89 shows a partial section view illustrating the metering rod in a closed position.
Figure 90:
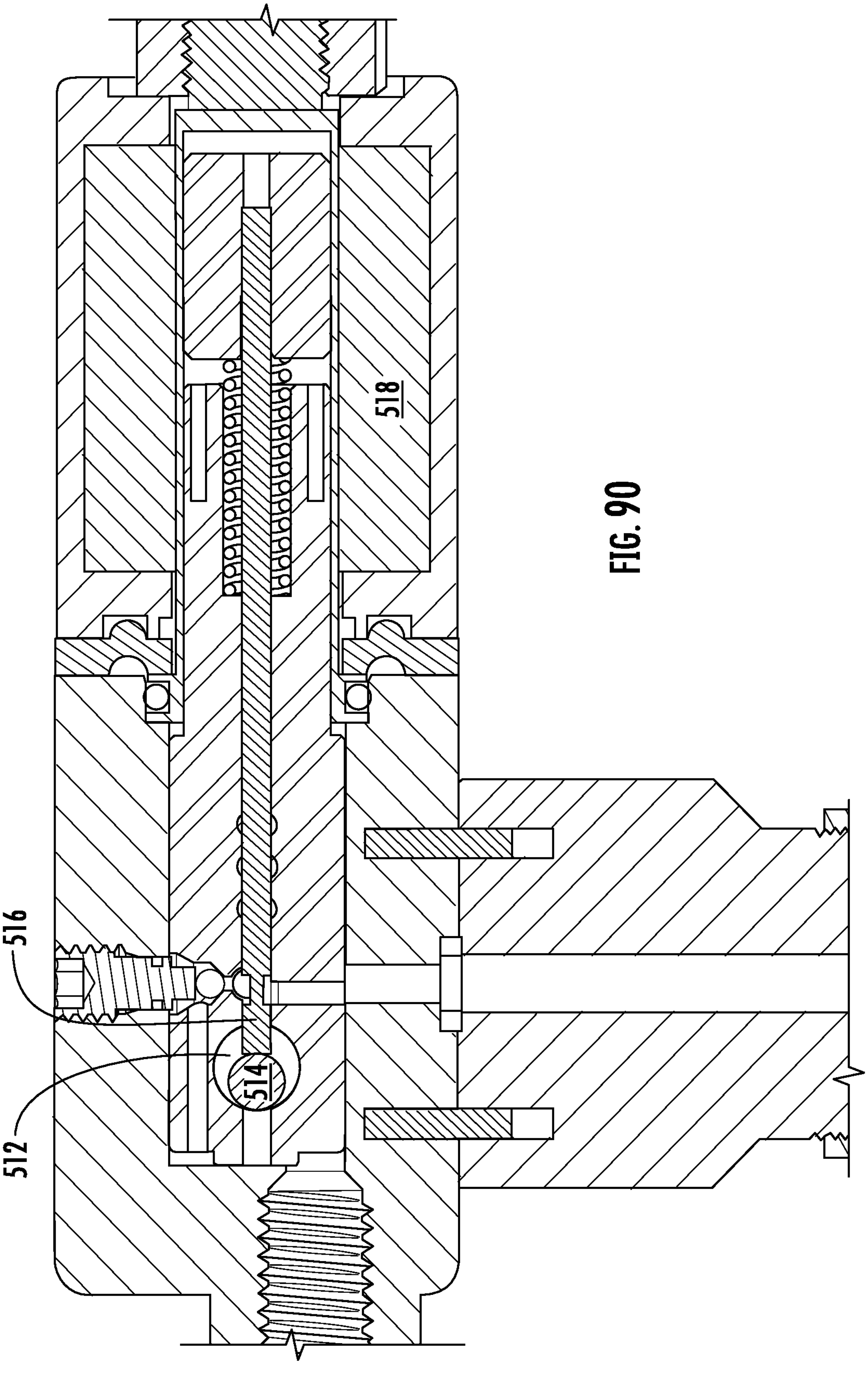
FIG. 90 shows a partial section view illustrating the metering rod in an open position.
Figure 91:
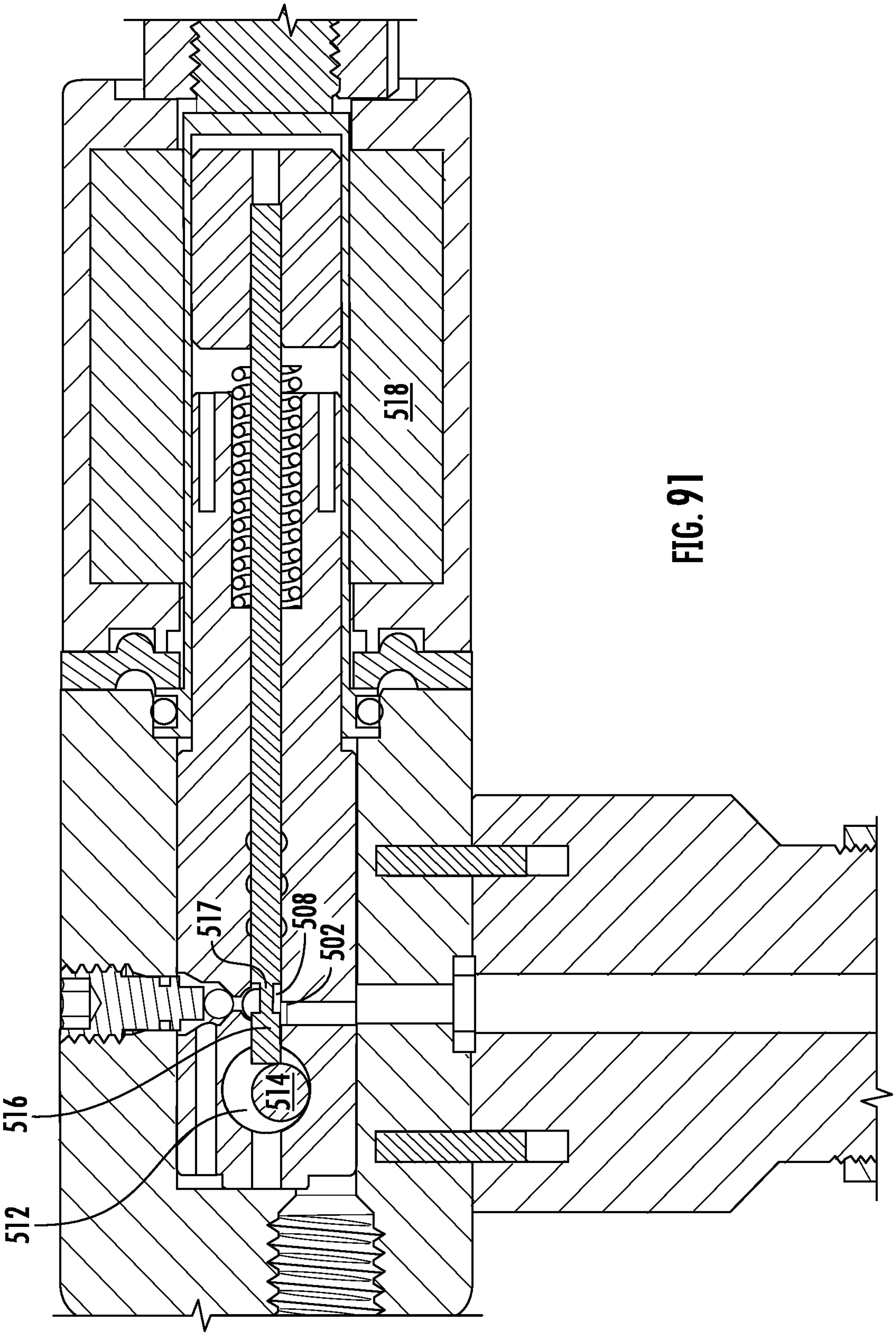
FIG. 91 shows a partial section view illustrating the metering rod in a partially open position.
Figure 92:
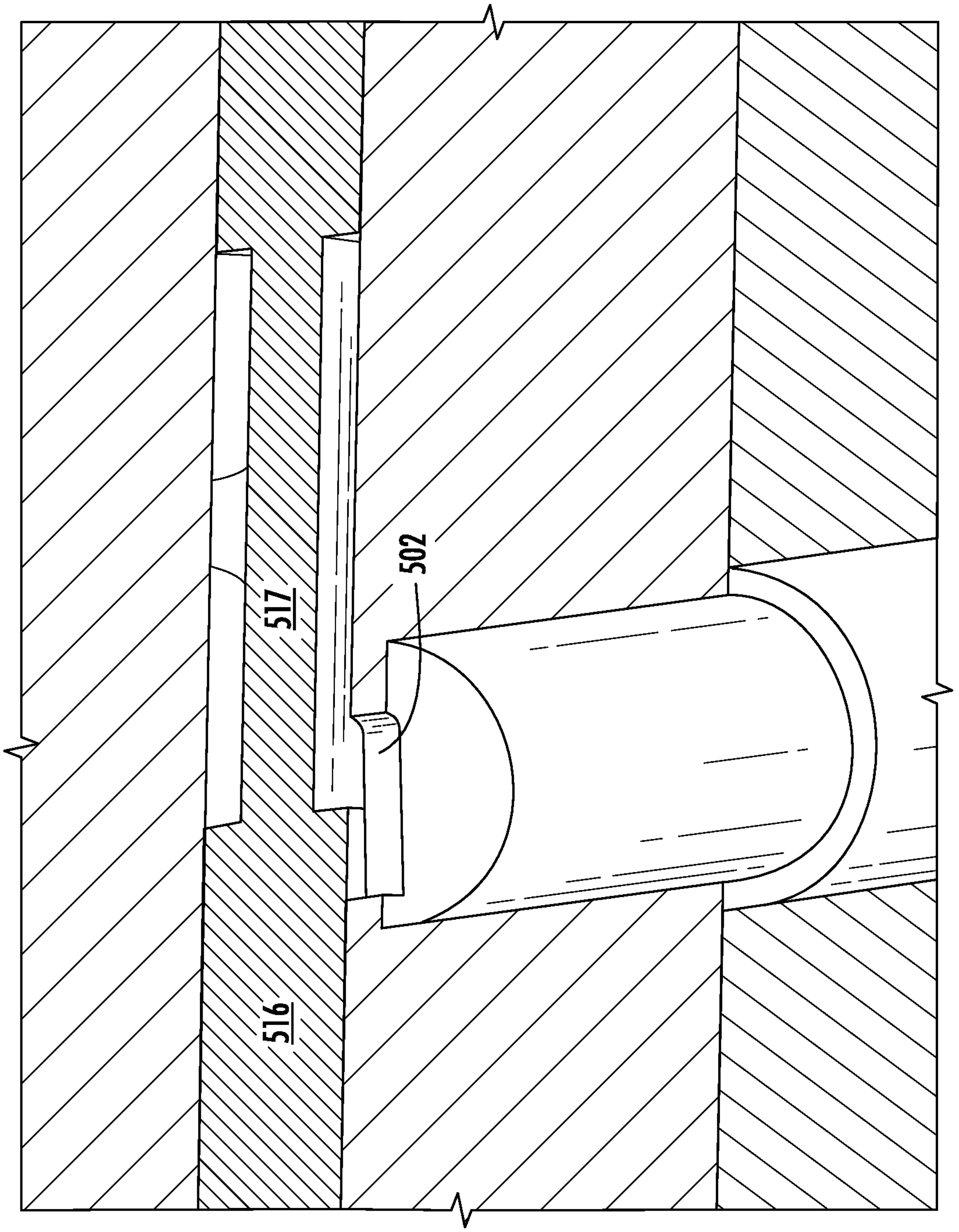
FIG. 92 shows a partial section view illustrating the metering rod in a partially open position.
Figure 93:
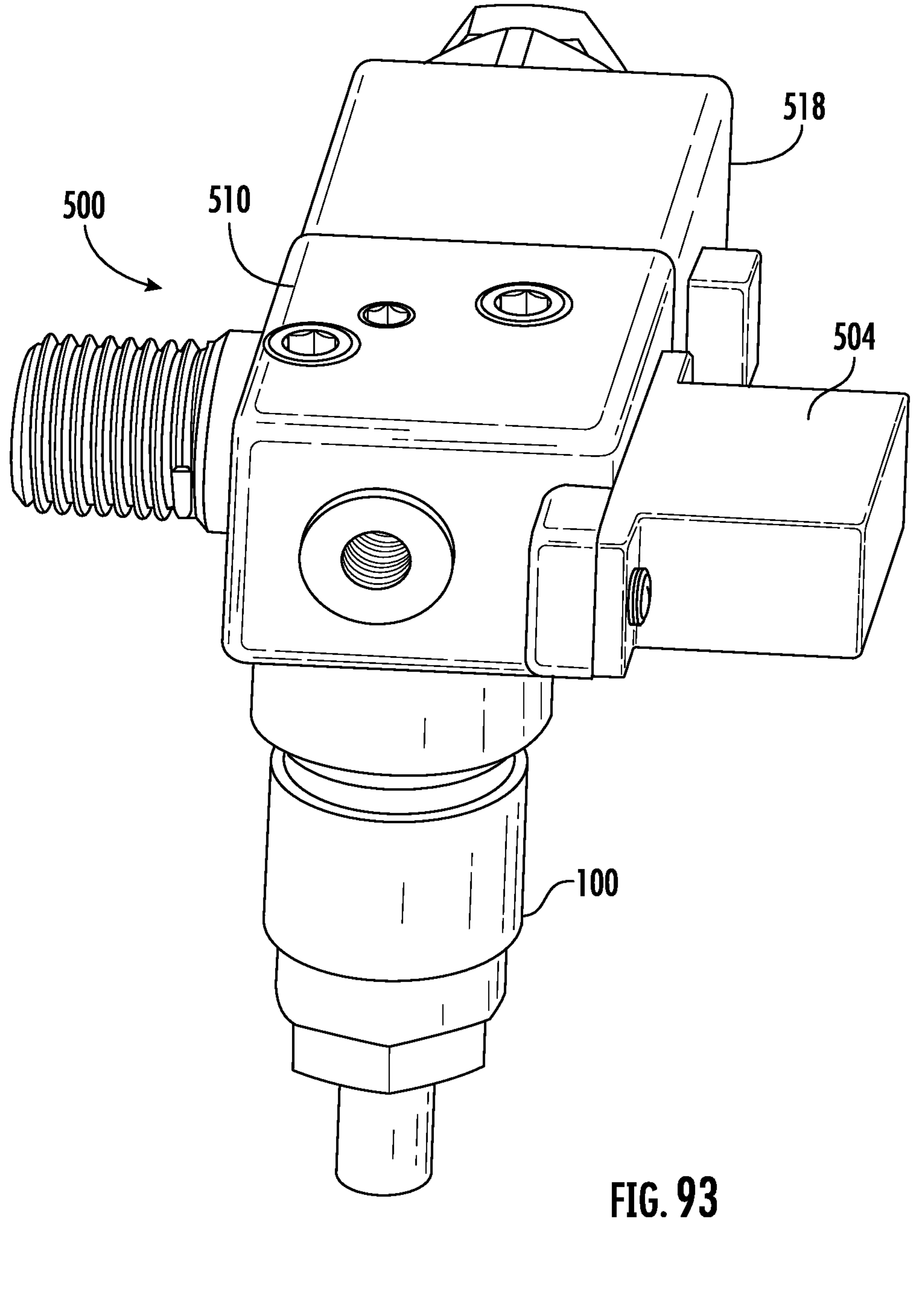
FIG. 93 shows a perspective view illustrating the servo controlled metering valve in cooperation with a fuel injector.
Figure 94:
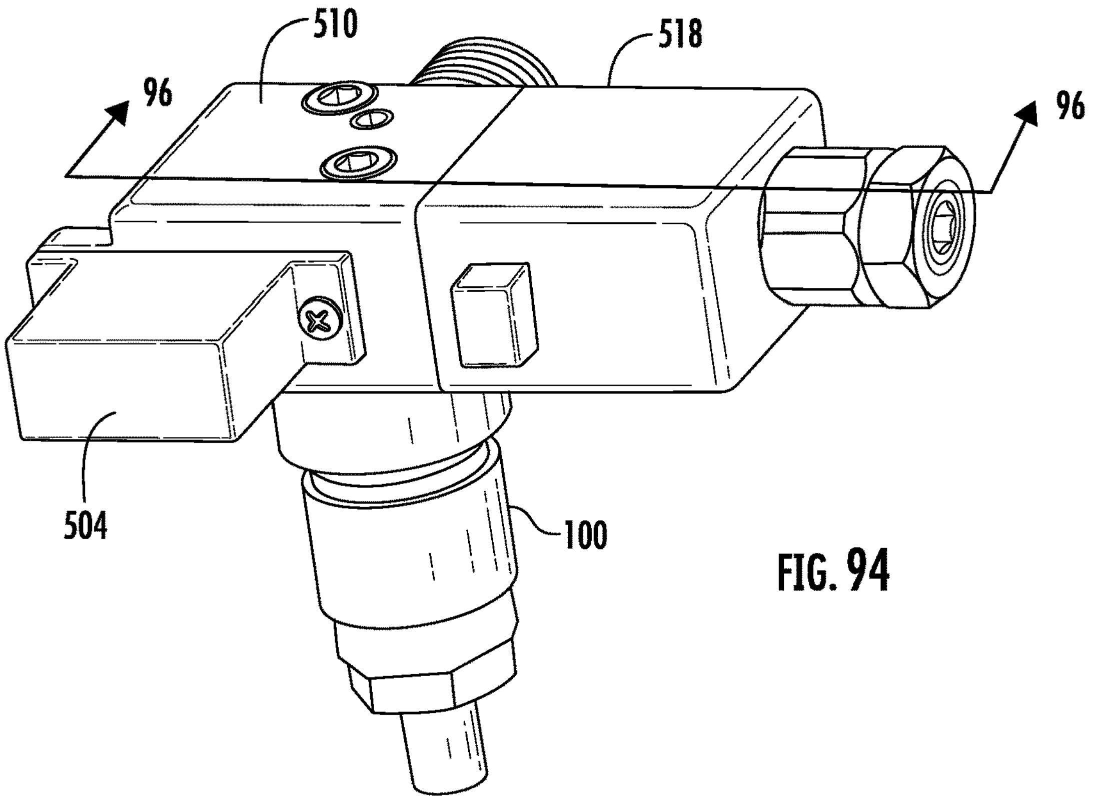
FIG. 94 shows a perspective view illustrating the servo controlled metering valve in cooperation with a fuel injector.
Figure 95:
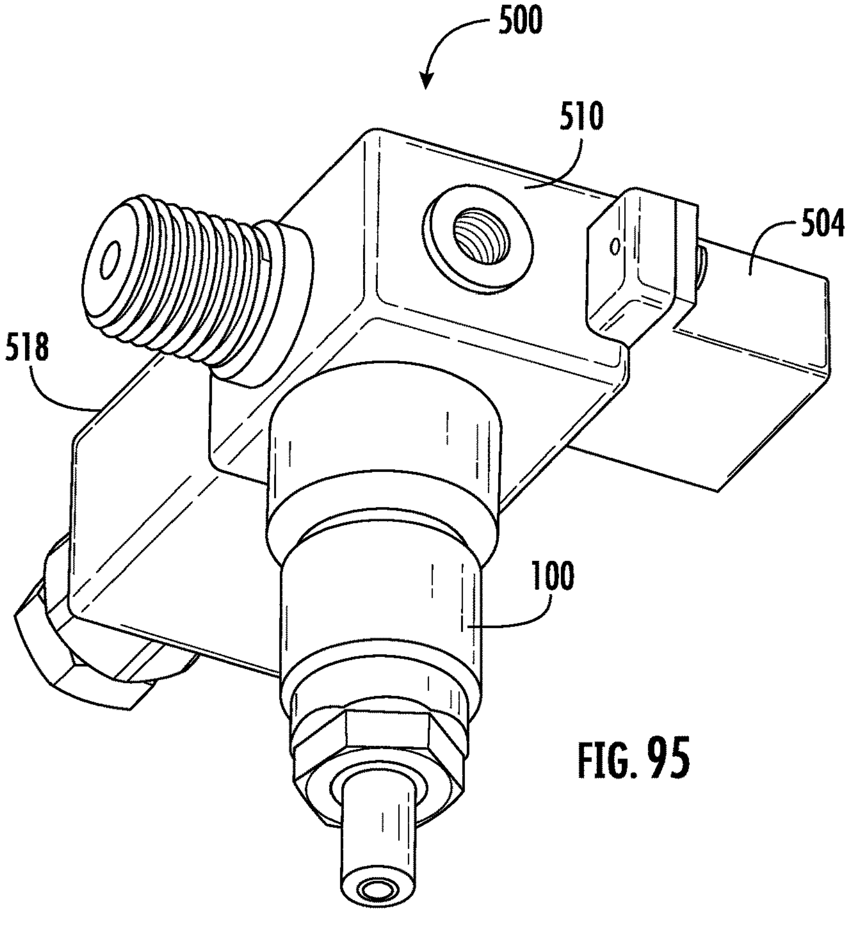
FIG. 95 shows a perspective view illustrating the servo controlled metering valve in cooperation with a fuel injector.
Figure 96:
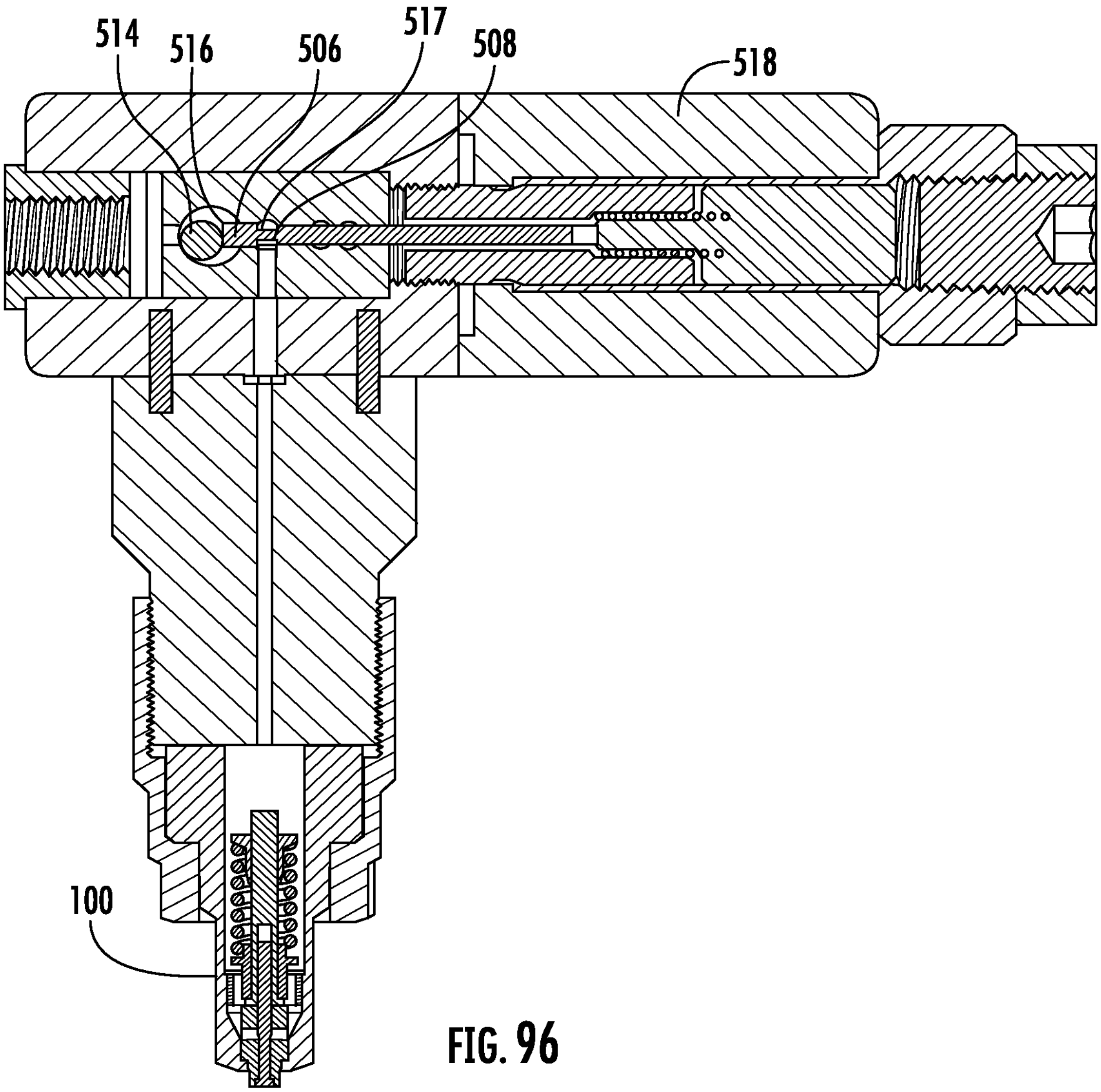
FIG. 96 shows a section view taken along lines 96-96 of FIG. 94.
Figure 97:
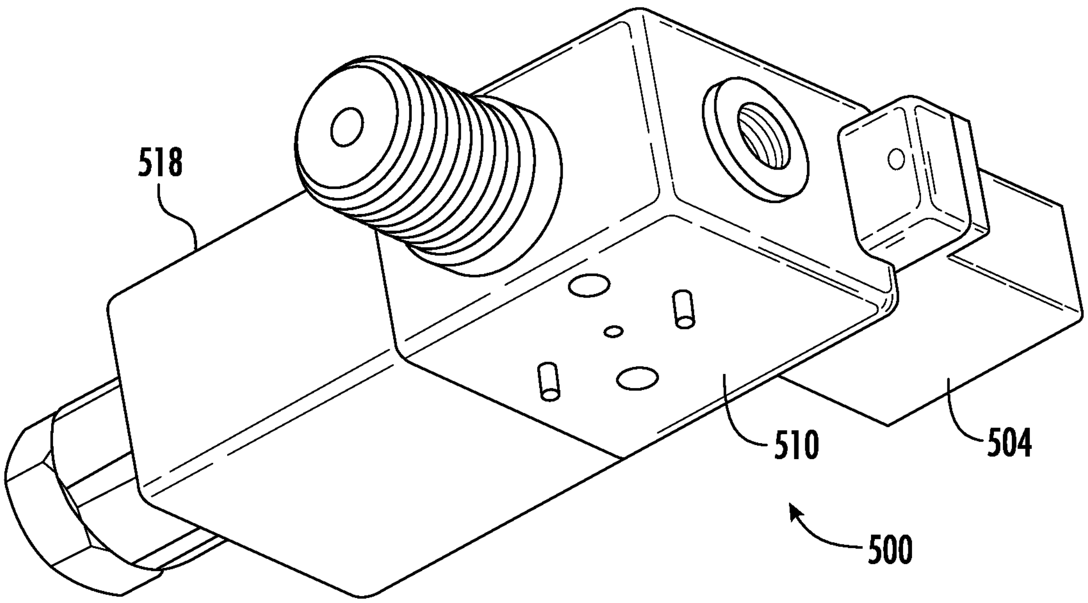
FIG. 97 shows a perspective view of the metering valve separated from the fuel injector.
Figure 98:
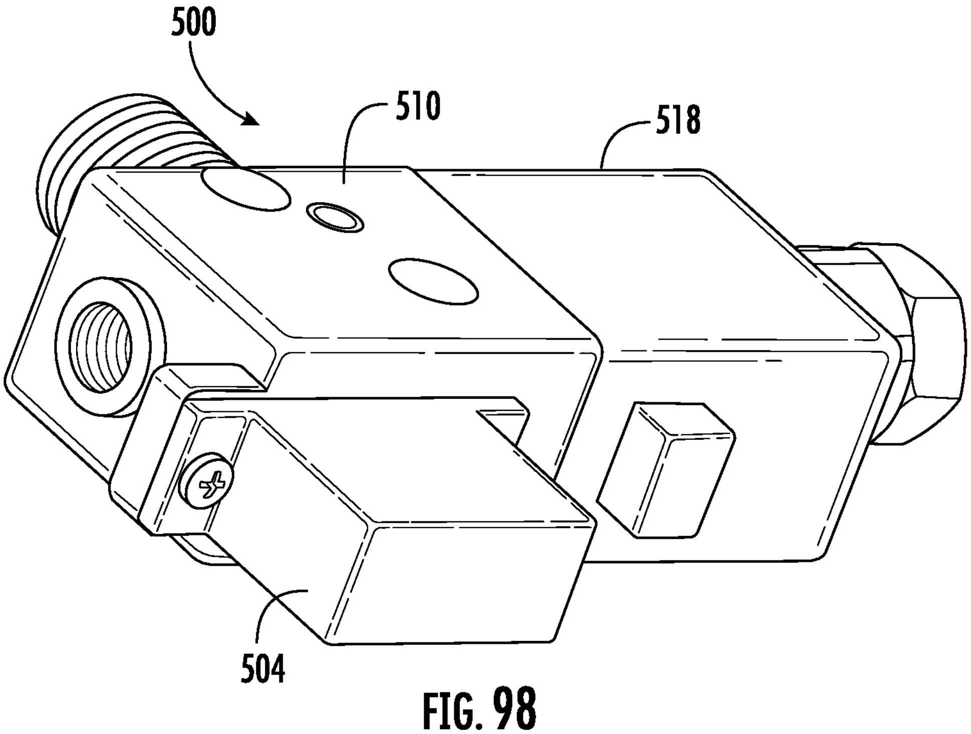
FIG. 98 shows a perspective view of the metering valve separated from the fuel injector.
Figure 99:
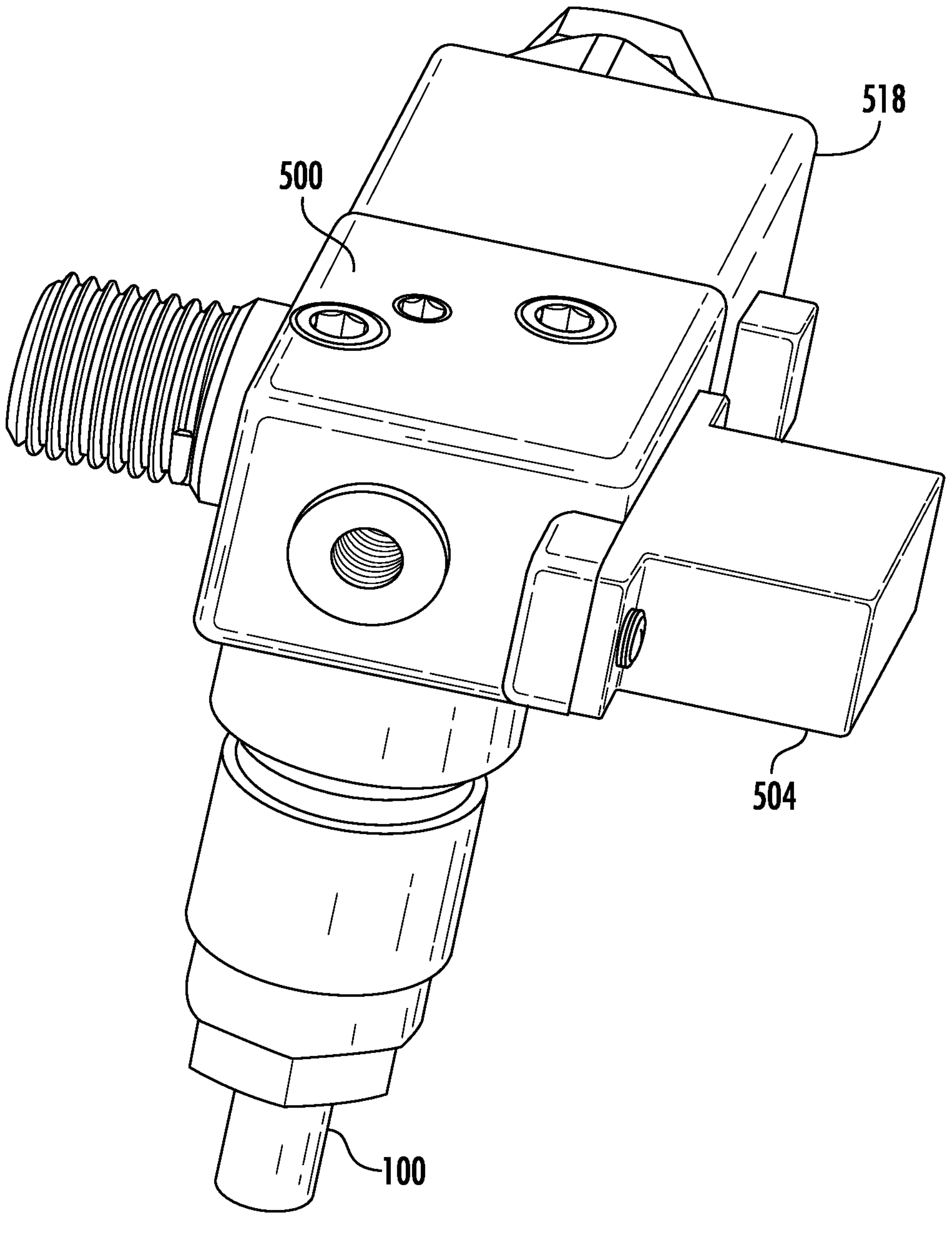
FIG. 99 shows a perspective view of the metering valve in combination with a fuel injector.
Figure 100:
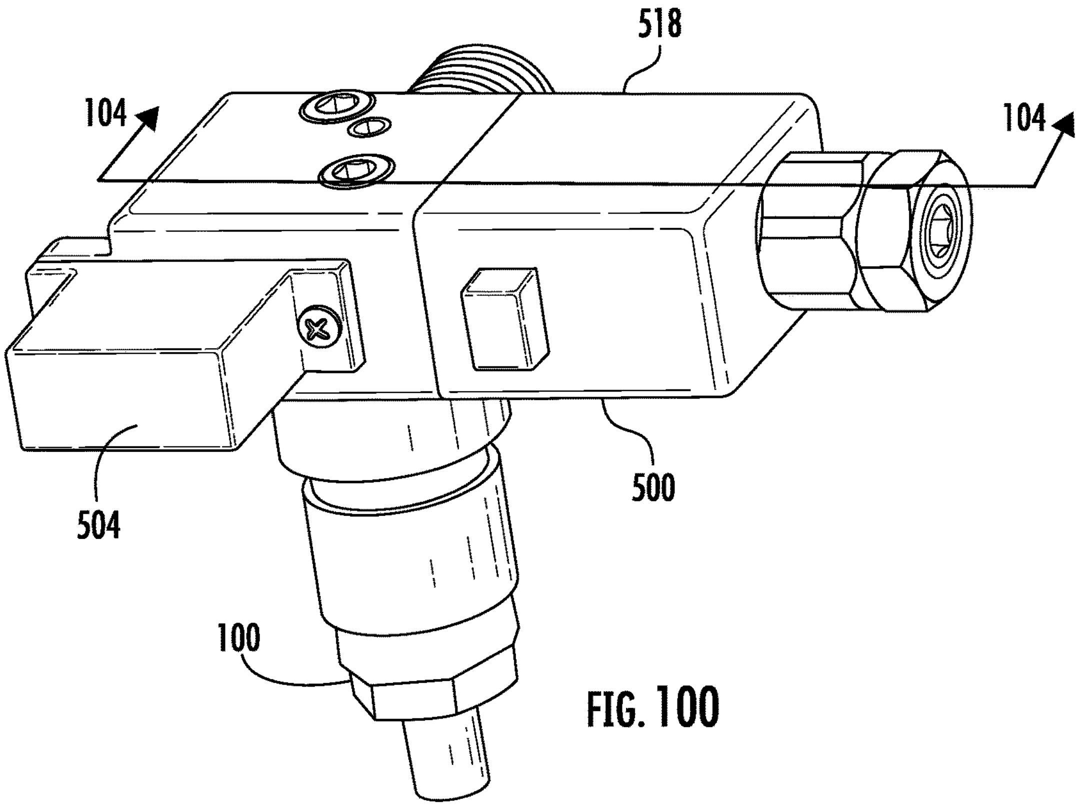
FIG. 100 shows a perspective view of the metering valve in combination with a fuel injector.
Figure 101:
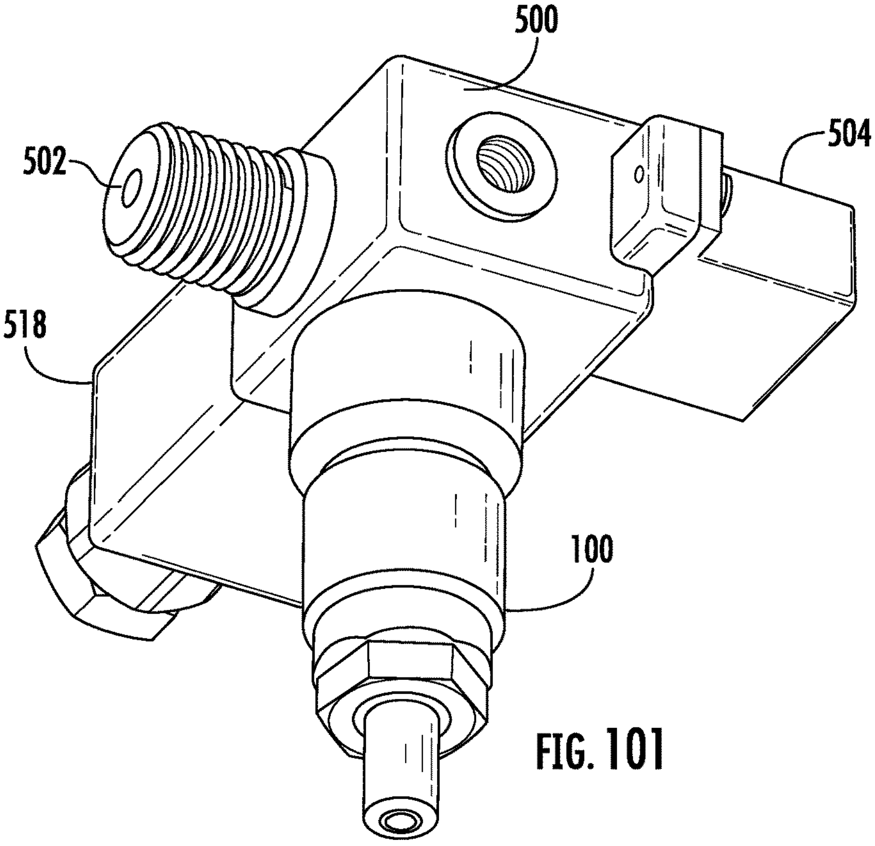
FIG. 101 shows a perspective view of the metering valve in combination with a fuel injector.
Figure 102:
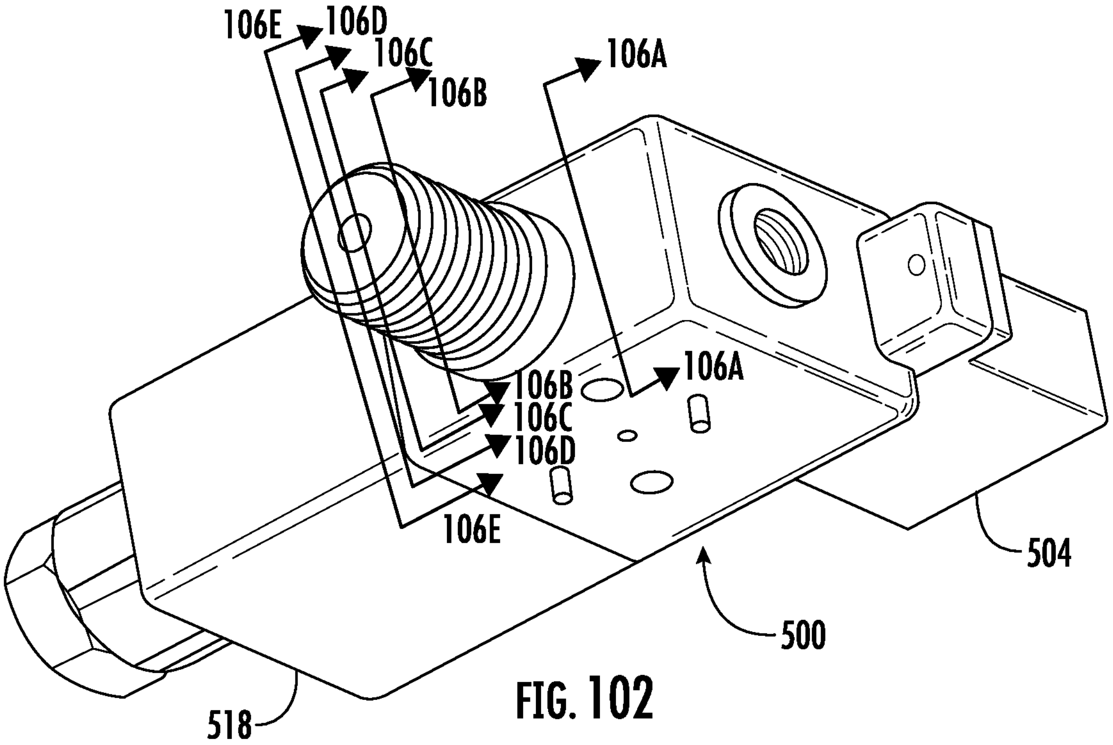
FIG. 102 shows a perspective view of the metering valve separated from the fuel injector.
Figure 103:
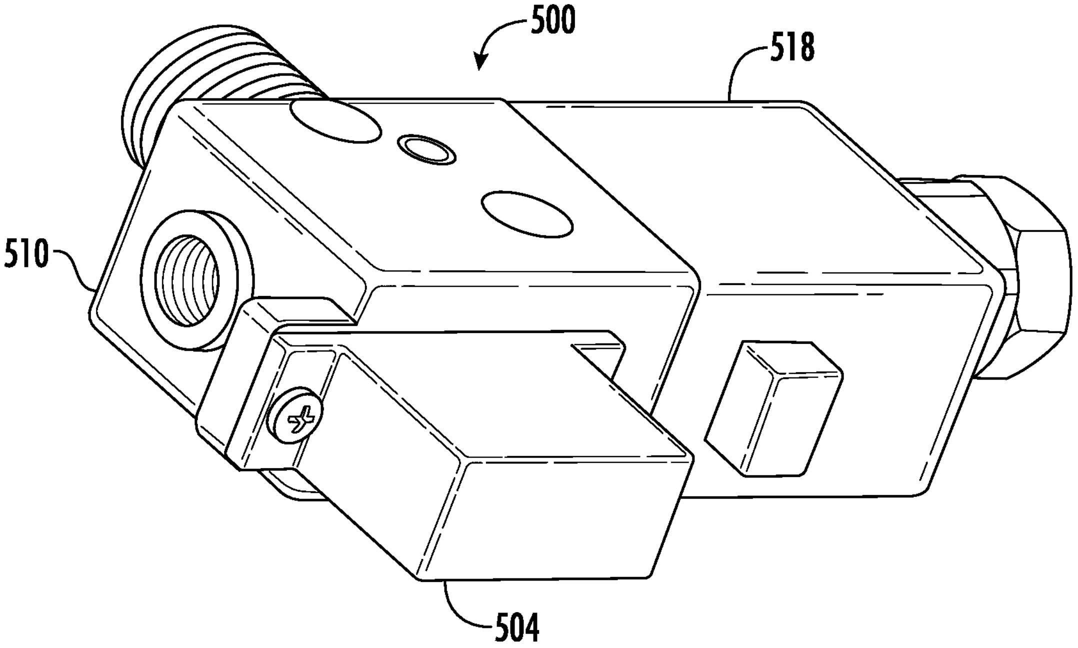
Figure 104:
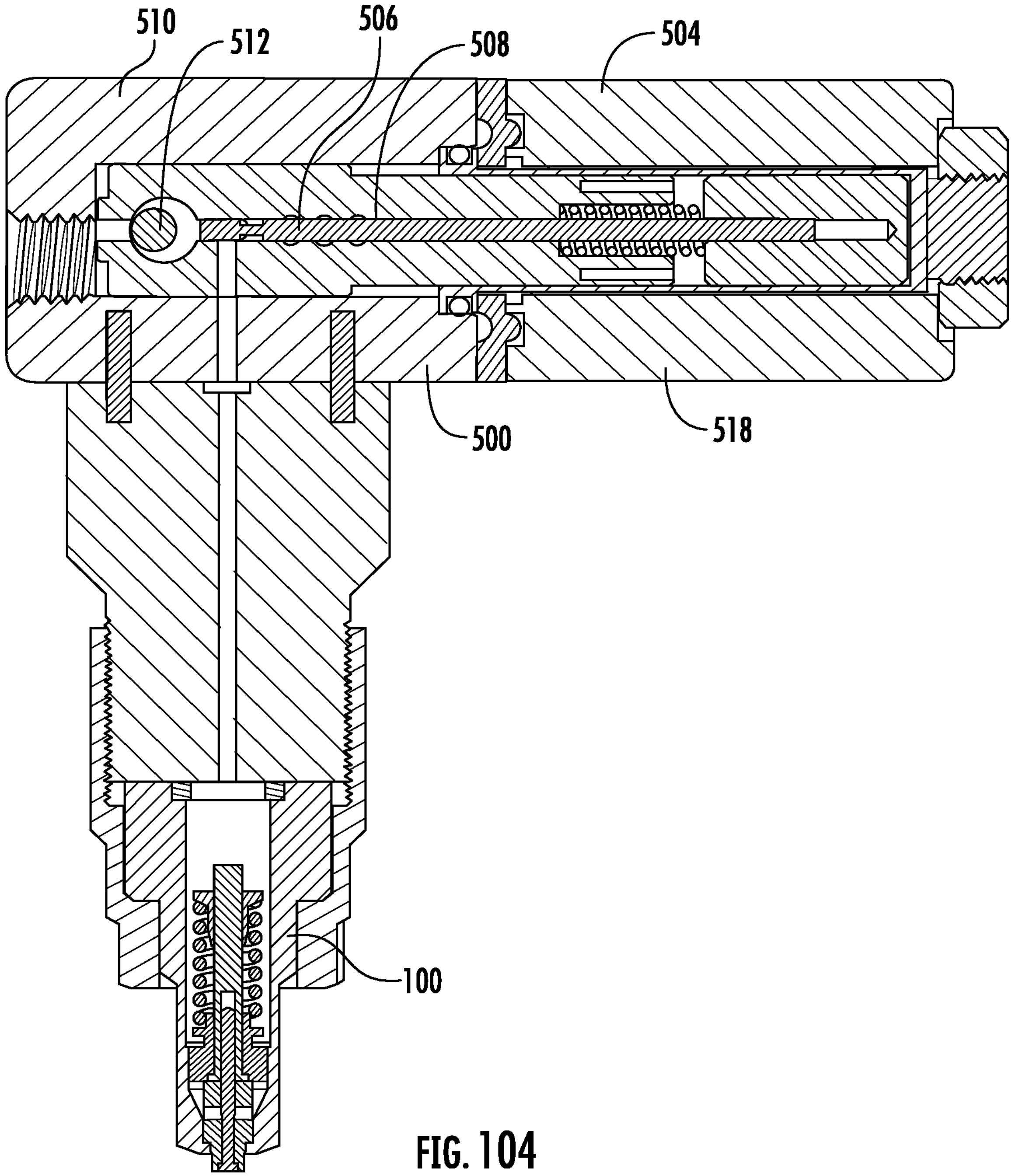
Figure 105:
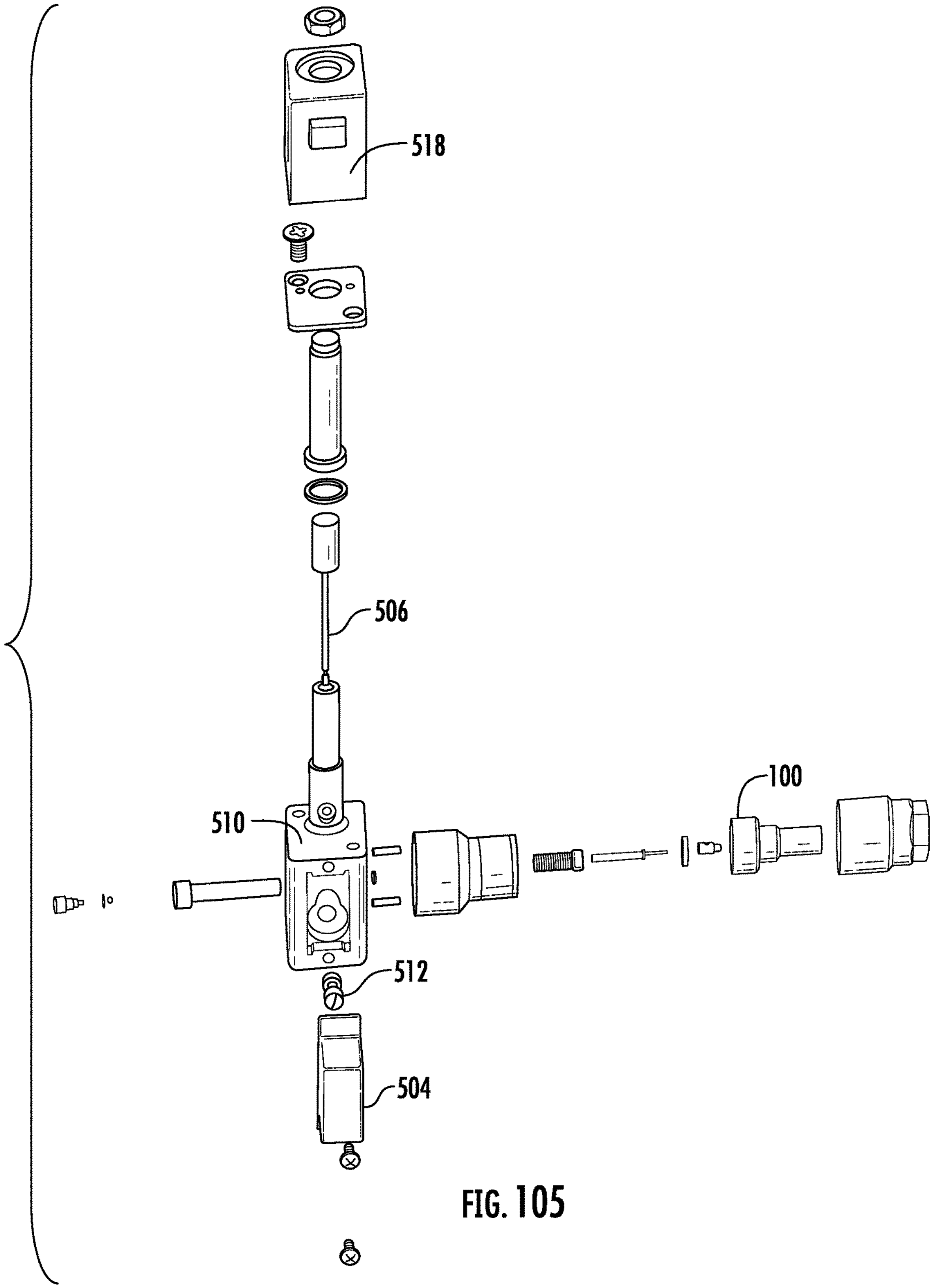
Figures 106A, 106B, 106C, 106D, 106E:
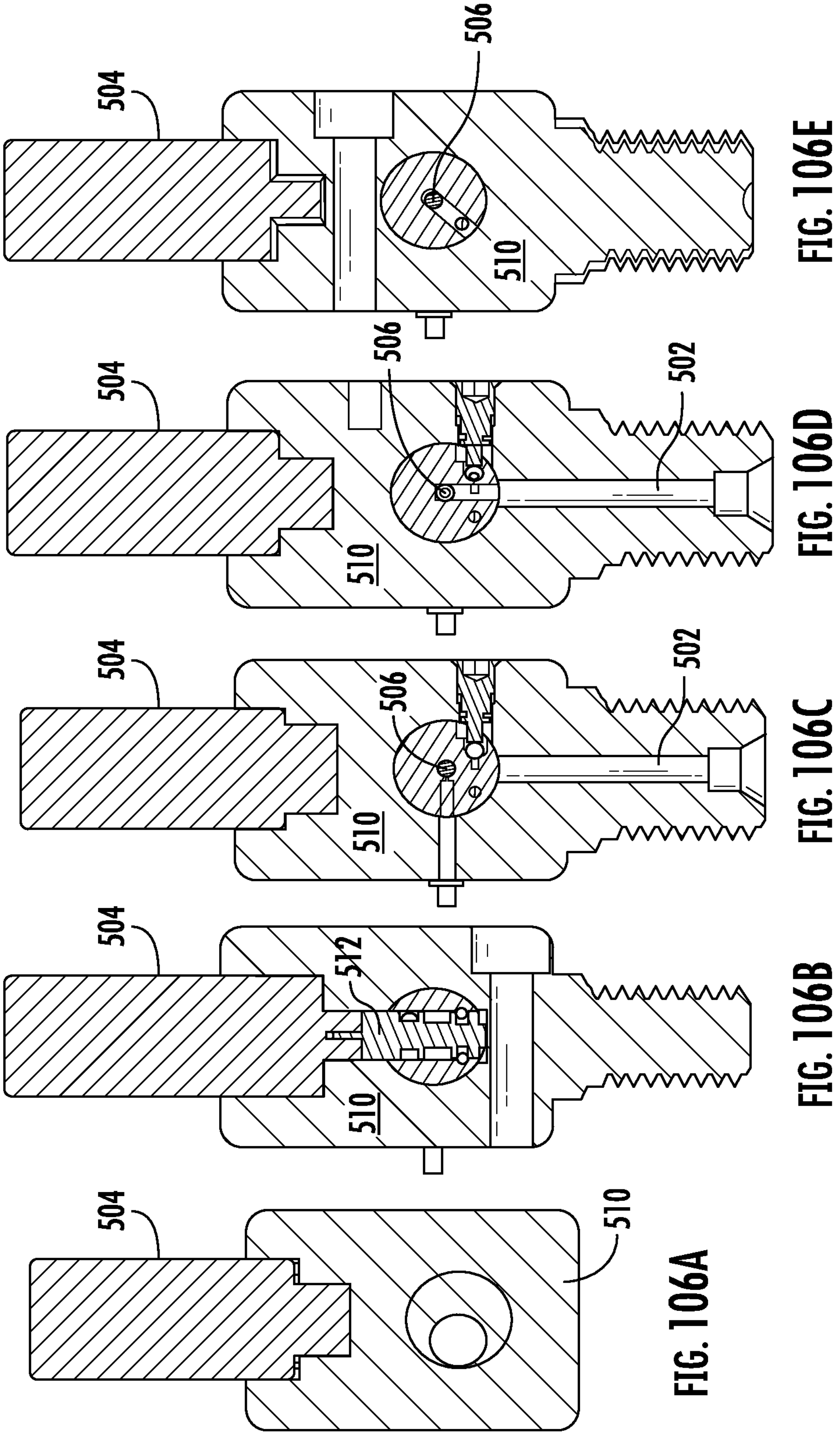
Figure 107:
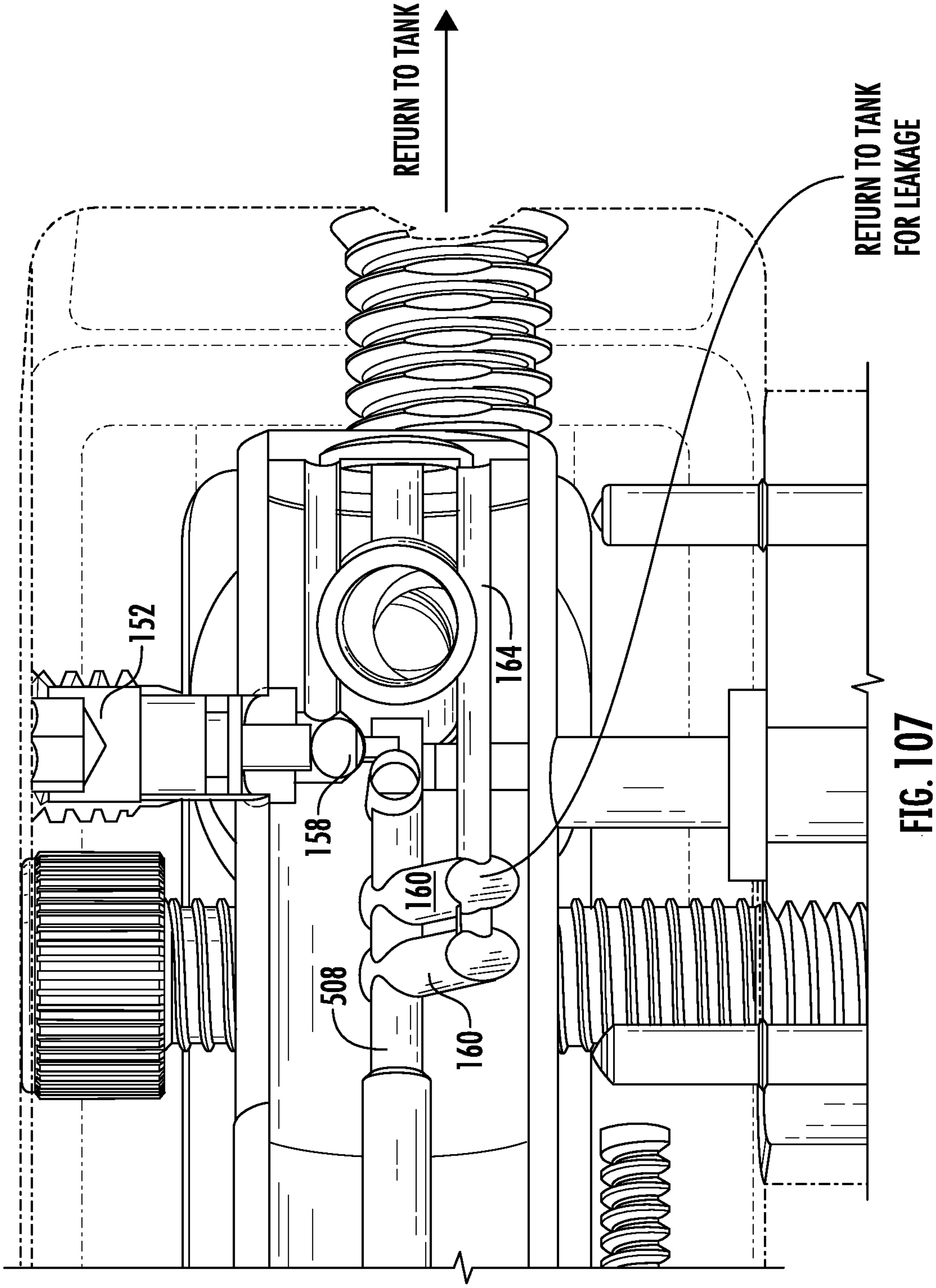
Figure 108:
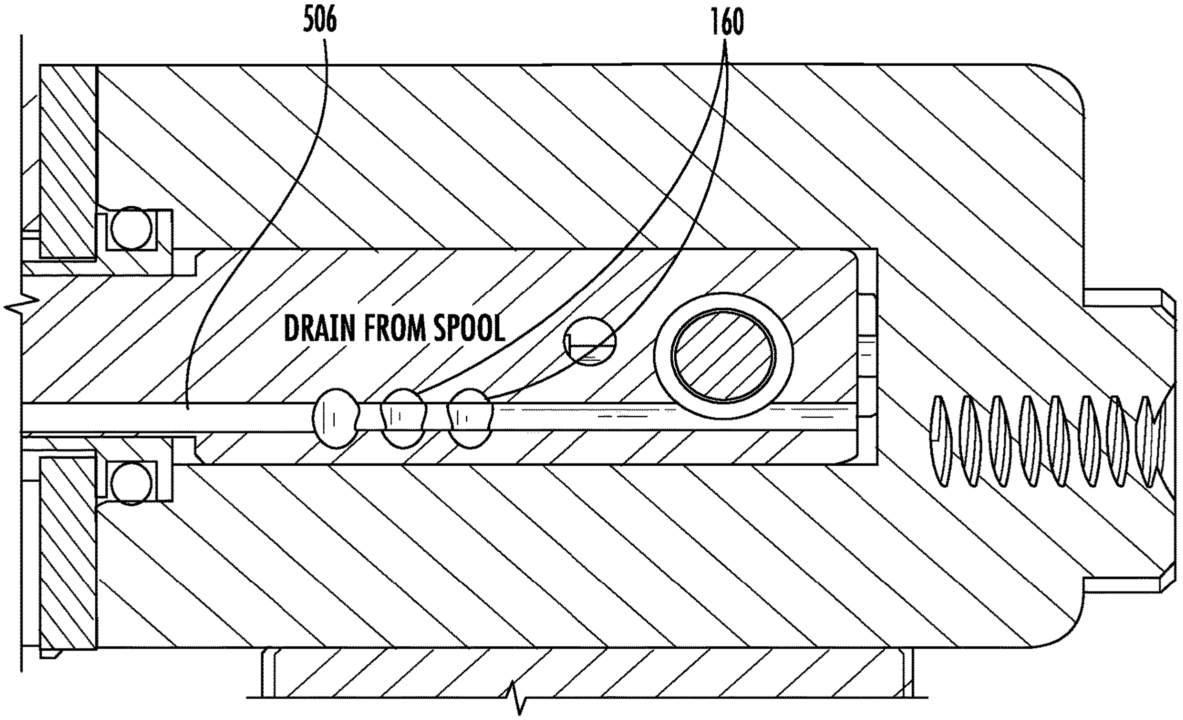
Figure 109:
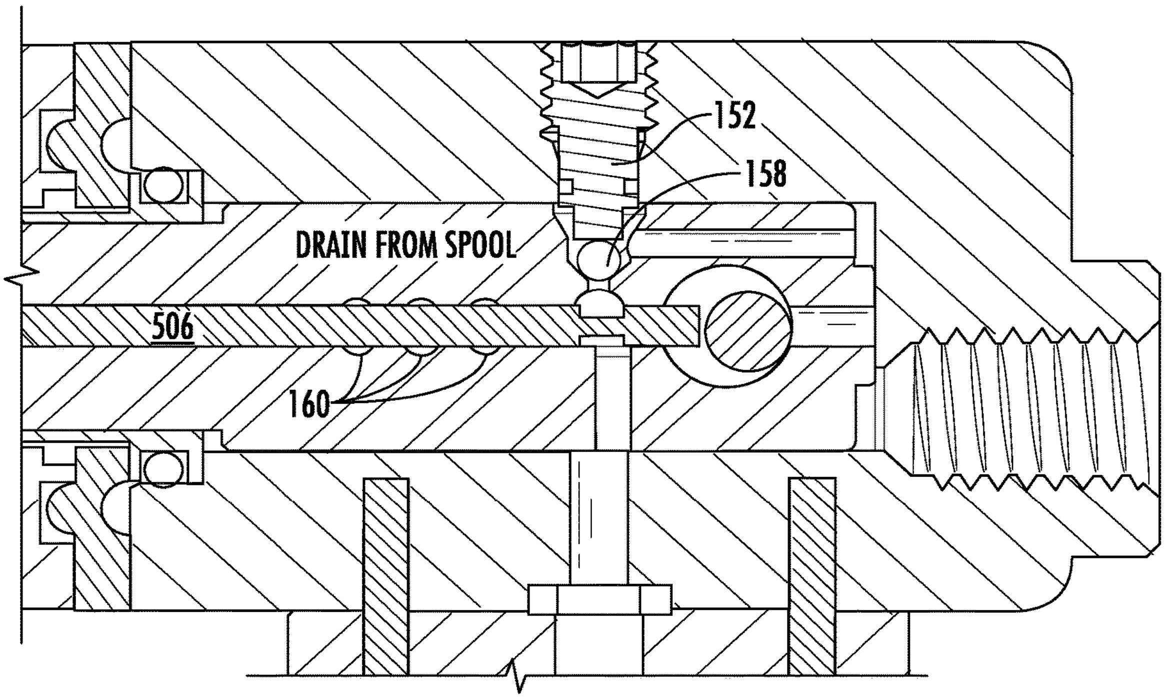
Figure 110:
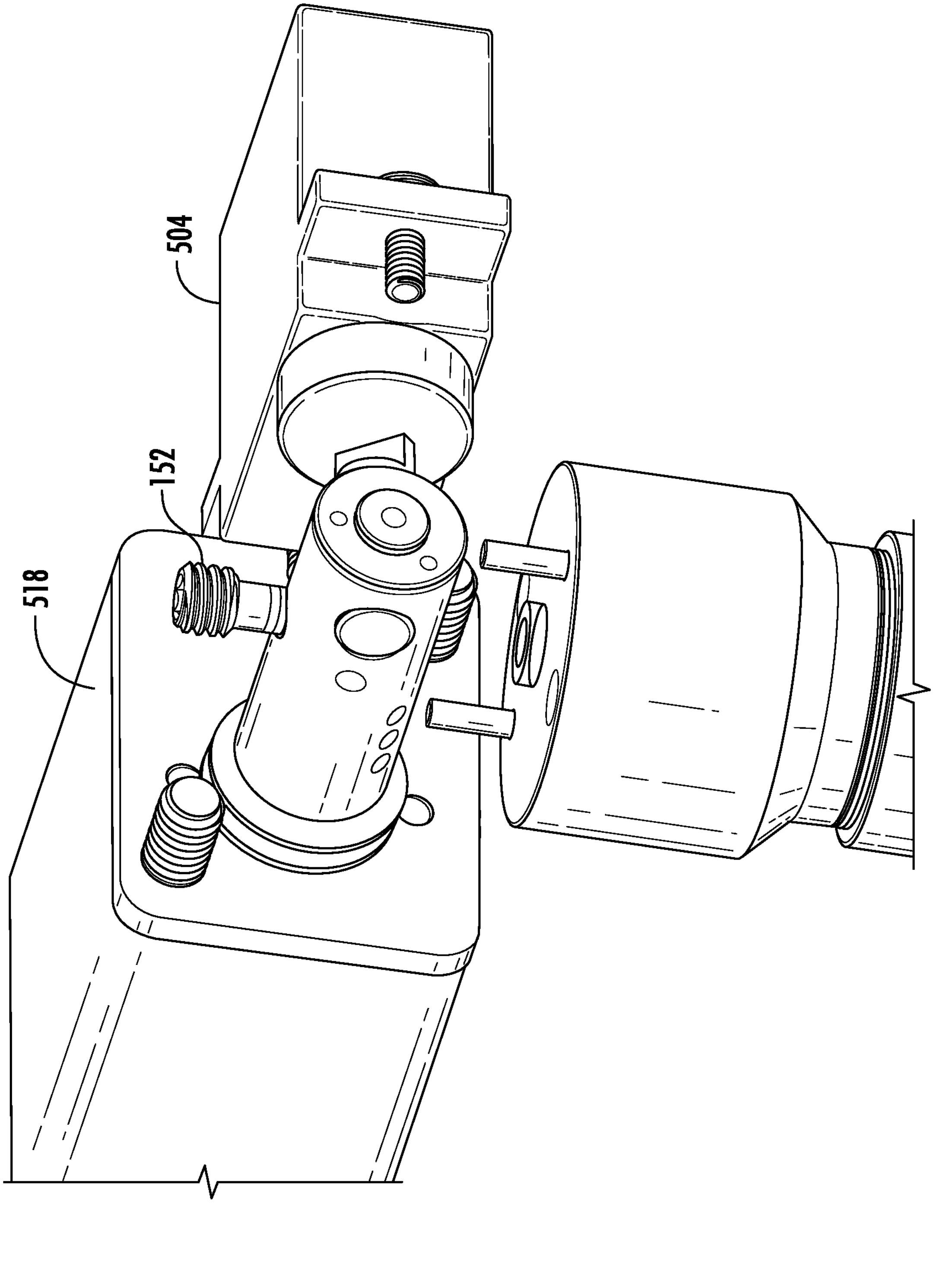

Referring generally to all of the figures and more specifically to FIGS. 1 and 34-51F, a directed radial flow injector nozzle 91 including a pintle rod 216 having controlled linear movement based upon desired fuel flow at a predetermined pressure is illustrated. The variations in fuel flow volume cause the pintle rod 216 to move linearly, sequentially exposing radially positioned orifices, causing the fuel to be directed to different areas within the cylinder 20 or piston 22, both vertically and/or radially. Thus, the more fuel that is delivered to the nozzle, the more apertures that are uncovered to direct the fuel to different places within the cylinder. The directed radial flow injector nozzle includes a nozzle body 24, plunger 26 (FIG. 1B), spring 28 (FIG. 1B), rear stop 95, and orifice body 32. The nozzle body 24 is preferably constructed from metal or ceramic, and is constructed and arranged to be secured to a front portion of a fuel injector 102 (FIG. 1A). The nozzle body 24 may be secured by fastener, weldment, adhesive, casting or the like, so long as the nozzle is suitably secured to the injector to not become detached during operation and use. The plunger 26 and spring 28 cooperate to move the tubular flow pintle rod 98 along the longitudinal axis 38 in response to a linear motor, servo or sufficient fuel pressure to overcome the resistance to movement provided by the spring 28. In this manner, the plunger 26 can be moved in precise increments to cause movement of the tubular pintle rod 98 to release fuel into the cylinder 20. The tubular pintle rod 98 is guided by the orifice body 32 and includes a rear stop surface 40 which cooperates with the pintle flange 34 to limit forward movement of the tubular pintle rod 98. The rear stop 30 provides a return stop surface 42 to prevent the flow of fuel through the nozzle when no external forces are present to move the tubular pintle rod 98 forward. The flow path of the fluid, e.g. fuel, is through a metering valve to the core chamber 44 of the nozzle body 24, through the fuel ports 46 in the rear stop 30 and through the side ports in the tubular pintle rod 98 to the nozzle orifices 50. The nozzle orifices 50 are arranged in a radial pattern around the perimeter of the orifice body 32. In a preferred embodiment, the nozzle orifices 50 are positioned at different heights or directed at different angles with respect to each other so that as the forward end of the pintle rod 216 is moved rearward, more orifice apertures are opened to release the liquid fuel. This construction allows the pressure of the liquid fuel to remain at higher and more constant pressures inside of the injector for low to mid throttle positions of the engine, as not all of the nozzle orifices 50 are open for flow. Thus, the nozzle orifices 50 are progressively uncovered as more fuel is needed for higher throttle positions. The movement of the pintle rod 216 may thus be automatic when a spring 28 is utilized to control the pressure to move the pintle rod 216. The higher pressures cause the liquid fuel to experience a larger pressure drop when exiting each nozzle orifice 50, causing the fuel to break into smaller particles that still carry sufficient momentum to penetrate the high density compressed air charge in the cylinder 20 of the engine 54. In a most preferred embodiment, the nozzle orifices 50 are directed through the orifice body 32 at various orifice angles 52 (FIG. 43) to cause the fuel to be directed throughout the cylinder vertically, thereby avoiding a stratified fuel charge in the cylinder. In a preferred embodiment, the nozzle orifice diameter 56 is about 0.002 inches or 0.0508 millimeters. However, it should be noted that other nozzle orifice diameters as small as 0.002 inches may be utilized so long as the liquid fuel is atomized prior to reaching the wall of the cylinder 20 to prevent wetting. It should also be noted that larger nozzle orifice diameters 56 may require higher fluid (fuel) pressures to create the pressure drop necessary to cause the atomization before the fuel reaches the wall of the cylinder 20. In at least one embodiment, at least one nozzle orifice 50 may be a keyhole orifice 102. The keyhole orifice 102 includes a slot portion 104 and a cylinder portion 106. In at least one embodiment, the slot portion 104 tapers to the cylinder portion 106, see FIG. 48, prior to the fuel exiting the fuel nozzle orifice 50 to the cylinder for combustion. The forward end 58 of the tubular pintle rod 98 is constructed as a cylinder to slip fit within the inner bore 60 of the orifice body 32. This construction prevents the unwanted flow of liquid fuel around the forward end 58, while the movement across the nozzle orifices 50 shears any small particles of dirt and debris that may block the orifice, thereby keeping the small diameter orifice from clogging. This construction allows orifice diameters as small as 0.002 of an inch or 0.0508 millimeters to be utilized without clogging issues.

Referring generally to all of the figures and more specifically to FIGS. 52-62, an embodiment similar to the embodiment described above in FIGS. 1 and 34-51F, a directed radial flow injector nozzle 91 including a pintle rod 216 having controlled linear movement based upon desired fuel flow is illustrated. This embodiment includes the same or similar structures to the embodiment shown and described in FIGS. 34-51F with the exception of a fuel notch 120 or fuel notch 132 for fuel flow at the beginning stages of opening the fuel injector. The V-notch 120 is a V-shaped notch that is cut across a side surface of the nozzle body 24. The V-notch 120 creates a fan shaped pattern of the liquid fuel when the liquid fuel is directed through the V-notch 120.

Referring generally to all of the figures and more specifically to FIGS. 1 and 63-73C, a radial jet injector nozzle 130 including a pintle rod 216 having controlled linear movement based upon desired fuel flow is illustrated. The variations in fuel flow volume cause the pintle rod 216 to move linearly, sequentially exposing radially positioned notches 132, causing the fuel to be directed to different areas within the cylinder 20 or piston 22, both vertically and/or radially. The directed radial jet injector nozzle 130 includes a nozzle body 24, plunger 26 (FIG. 1B), spring 28 (FIG. 1B), rear stop 42, and notch body 134. The notch body 134 includes a plurality of forward facing notches 132 which increase in size from their base 136 to the forward most surface 138. The nozzle body 24 is preferably constructed from metal or ceramic, and is constructed and arranged to be secured to a front portion of a fuel injector 102 (FIG. 1A). The nozzle body 24 may be secured by fastener, weldment, adhesive, casting or the like, so long as the nozzle is suitably secured to the injector to not become detached during operation and use. The plunger 26 and spring 28 cooperate to move the pintle rod 216 along the longitudinal axis 38 in response to a linear motor, servo or sufficient fuel pressure to overcome the resistance to movement provided by the spring 28. In this manner, the plunger 26 can be moved in precise increments to cause movement of the pintle rod 216 to release fuel into the cylinder 20. The pintle rod 216 is guided by the notch body 134 and includes a rear stop surface 40 which cooperates with the pintle flange 34 to limit forward movement of the pintle rod 216. The rear stop 30 provides a return stop surface 42 (FIG. 2) to prevent the flow of fuel through the nozzle when no external forces are present to move the pintle rod 216 forward. The flow path of the fluid, e.g. fuel, is through the core chamber 44 (FIG. 1B) of the nozzle body 24, through the fuel ports 46 (FIG. 1B) in the rear stop 30 (FIG. 1B) and through the side ports 48 in the notch body 134 to the nozzle notches 132. The distal end of the notch body 134 is blocked with the forward pintle guide 36 to prevent fuel from flowing straight out of the front surface of the injector. The fuel notches 132 are arranged in a radial pattern around the perimeter of the orifice body 32. In one embodiment, the fuel notches 132 are positioned at different heights or directed at different angles with respect to each other so that as the forward end of the pintle rod 216 is moved forward, more fuel notches 132 are opened to release the liquid fuel. This construction allows the pressure of the liquid fuel to remain at higher pressures inside of the injector for low to mid throttle positions of the engine, as not all of the fuel notches 132 are open for flow. Thus, the fuel notches 132 are progressively uncovered as more fuel is needed for higher throttle positions. The higher pressures cause the liquid fuel to experience a larger pressure drop when exiting each fuel notch 132, causing the fuel to break into smaller particles that still carry sufficient momentum to penetrate the high density compressed air charge in the cylinder 20 of the engine 54. In a most preferred embodiment, the fuel notches 132 are directed through the orifice body 32 at varying angles as the pintle rod 216 moves forward to cause the fuel to be directed throughout the cylinder vertically, thereby avoiding a stratified fuel charge in the cylinder 20. In a preferred embodiment, the fuel notches 132 have a root width that is about 0.002 of an inch or 0.0508 millimeters, expanding as the notch progresses to the distal end of the orifice body 32. However, it should be noted that other widths of fuel notches 132 may be utilized so long as the liquid fuel is atomized prior to reaching the wall of the cylinder 20 to reduce or prevent wetting. It should also be noted that larger fuel notches may require higher fluid (fuel) pressures to create the pressure drop necessary to cause the atomization before the fuel reaches the wall of the cylinder 20. The forward end 58 of the pintle rod 216 is constructed as a cylinder to slip fit within the inner bore 60 of the orifice body 32. This construction prevents the unwanted flow of liquid fuel around the forward end 58, while the movement across the fuel notches 132 shears any small particles of dirt and debris that may block the orifice, thereby keeping the small width from clogging. This construction allows widths as small as 0.002 of an inch or 0.0508 millimeters to be utilized without clogging issues.

Referring generally to the figures and more specifically to FIGS. 74-78, an alternative embodiment is illustrated. This embodiment is the same as the embodiment illustrated in FIGS. 12-13 without the air induction disc 90 and air induction plate 92. Thus, the liquid fuel is directed at the deflection disc 82 to cause the liquid fuel to atomize and be deflected outward. A deflection cup 140 is provided to cause the fuel particles to be deflected outward and downward. In this manner, the diameter 142 and corner radius 144 of the deflection cup 140 can be altered to control the pattern that the atomized liquid fuel is dispersed within the combustion chamber 23 (FIG. 1A). For example, a large diameter deflection disc cup 140 causes the atomized fuel to be dispersed in a thin radial pattern to contact the radius 144 which deflects the fuel radially and downwardly. Reducing the diameter of the deflection disc 82 causes the atomized fuel distribution pattern to be deflected, not only radially, but vertically toward the bottom of the combustion chamber 23. Thus, the smaller the deflection disc 82 is in diameter, the further toward the bottom of the combustion chamber 23 the atomized fuel is directed. Likewise, a large disc and the construction of the radius 144 allows the width and downward projection of the atomized fuel to be better controlled to reduce or prevent cylinder wetting while providing better distribution of the atomized fuel throughout the cylinder for combustion. The diameter of the atomized fuel pattern may be the same or smaller in diameter to prevent cylinder wall wetting. This construction allows the fuel distribution pattern to be modified to prevent atomized fuel stratification within the combustion chamber 23. The present system may be incorporated into a standard fuel injection cartridge 102 commonly used for port injection, as well as a direct injection injector (not shown) without departing from the scope of the invention. Electronic injection cartridges 102 typically include a linear motor 112, solenoid or the like for operation of the pintle rod 316 to control flow of the liquid fuel. Springs 114 or the like are used to return the pintle rod 316 to a fuel flow stop position. Thus, the solenoid 112 is utilized to allow fuel flow through the injector itself. A metering valve, such as those described herein, is preferably utilized to control the volume of fuel that is allowed to flow through the nozzle. An electrical connector 116 is provided to connect the injector to the electrical harness of the engine, which is commonly connected to an on-board computer or controller (not shown). A fuel connector 118 is provided for connection to the fuel supply line.

Referring generally to the figures and more specifically to FIGS. 20-31 and 80-110, a servo controlled metering valve 500 is illustrated in combination with a fuel injector nozzle 100. The servo controlled metering valve 500 includes a fuel delivery aperture 502 that can be varied in size and/or shape to provide liquid fuel to the injector nozzle, which may include any of the nozzles included herein, as well as other known nozzles. The servo controlled metering valve 500 may be a direct injection type, as illustrated in FIG. 20, or a port injector as illustrated in FIGS. 21 and 22, without departing from the scope of the invention. The servo 504 limits the movement of a metering rod 506. The metering rod 506 slides in a metering rod bore 508 positioned within a metering block 510. The metering block 510 is preferably constructed and arranged for connection, which may be direct to the injector as shown, or indirect through a fuel line extending to the injector without departing from the scope of the invention. The servo 504 includes a metering cam 512 having an offset journal 514. The offset journal 514 may cooperate with a distal end 516 of the metering rod 506 to limit the movement of the metering rod 506 within the metering rod bore 508. The metering rod 506 includes a stepped portion 517, which allows the flow of liquid fuel through the fuel delivery aperture 502, while the diameter of the metering rod 506 covers and prevents liquid flow through the fuel delivery aperture 502. The metering rod 506 is translated by a solenoid 518 to cause the stepped portion 517 of the metering rod 506 to cooperate with the fuel delivery aperture 502. In this manner, the flow volume of the liquid fuel passing through the variable orifice fuel nozzle 100 is controlled. The fuel delivery aperture 502 includes the unique shape of a circular segment having a radiused apex point 520. This construction approximates a circular aperture when the metering rod 506 is positioned for low throttling, as shown in FIG. 26, and provides increased flow then the metering rod 506 is moved to allow higher throttling positions, as shown in FIG. 25. This construction also provides precise metering of liquid fuel with the provision of the offset journal 514, upon which the metering rod 506 contacts to provide precise positioning. It should be noted that other shapes suitable for controlling the fuel flow rate to the fuel injector could be utilized without departing from the scope of the invention, such shapes may include but should not be limited to round, oval, polygonal etc. The servo 504 is generally an electrically operated motor having a gear train and position feedback to provide precise rotational positioning of the metering cam 512. At least one embodiment includes a pressure relief module 150 including an unloader valve 152 that allows pressurized fuel from the supply channel 154 to be relieved by turning a threaded lock 156 to allow movement of a seat ball 158. Movement of the seat ball 158 allows liquid pressurized fuel to move though one or more relief channels 160 and around a relief pin to a dump channel 164 which exits the injector. In this manner, pressurized liquid fuel can be safely released from the system in a controlled manner.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/FIGS. included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention, which are obvious to those skilled in the art, are intended to be within the scope of the following claims.

What is claimed is:

1. A self-cleaning fuel injector nozzle for a fuel injector comprising:

a nozzle body coupled to an end portion of the fuel injector, said nozzle body having at least one channel for receiving liquid fuel therein said nozzle body having an inner bore, wherein the nozzle body has a plurality of nozzle orifices extending from an inner surface to an outer surface of the nozzle body;

a pintle rod slidably disposed within said inner bore of said nozzle body wherein said pintle rod is slip fit within said inner bore of said nozzle body; and a spring coupled to said pintle rod, said spring configured to provide a closing force to the pintle rod to selectively move the pintle rod to prevent fuel flow;

wherein said pintle rod is configured to move within said inner bore flush against said plurality of nozzle orifices, and entirely across an inner entrance of said plurality of nozzle orifices allowing fuel to pass when said plurality of nozzle orifices are open, stopping fuel flow when said plurality of nozzle orifices are closed, and dislodging any blockage in at least one of the plurality of nozzle orifices when said pintle rod is closing at least one of said plurality of nozzle orifices;

wherein said pintle rod has an undercut positioned behind a forward end of the pintle rod, and the undercut provides a spool surface for operation of the pintle rod in response to fuel pressure;

wherein the spool surface includes a corner having a point, said point configured to chop up said blockage in at least one of said plurality of nozzle orifices and dislodge said blockage in at least one of the plurality of nozzle orifices.

2. The self-cleaning fuel injector nozzle as in claim 1, wherein said pintle rod has a cutter for chopping up said blockage in at least one of said plurality of nozzle orifices to dislodge said blockage in at least one of said plurality of nozzle orifices.

3. The self-cleaning fuel injector nozzle as in The self-cleaning fuel injector nozzle as in wherein said nozzle body has an orifice body positioned along a longitudinal axis of the nozzle body, wherein said plurality of nozzle orifices are disposed in said orifice body, and wherein said pintle rod having the forward end which is constructed as a cylinder to slip fit within the inner bore of the orifice body, wherein said pintle rod has the undercut positioned behind the forward end to provide for fuel flow between an outer diameter of the pintle rod and the inner bore of the undercut, and wherein the nozzle further comprises a plunger coupled to said spring.

4. The self-cleaning fuel injector nozzle for a fuel injector as claimed in claim 3, wherein the orifice body has multiple levels of varying diameter holes arranged in a radial pattern around the perimeter of the orifice body.

5. The self-cleaning fuel injector nozzle as in claim 3, wherein the nozzle is a direct replacement for a conventional fuel injector nozzle employing a return spring setup.

6. The self-cleaning fuel injector nozzle for a fuel injector as claimed in claim 3, wherein the orifice body is made of Tungsten carbide or ceramic to provide long life and wear resistant.

7. The self-cleaning fuel injector nozzle for a fuel injector as claimed in claim 3, wherein the pintle rod is made of Tungsten carbide or ceramic to provide long life and wear resistant.

8. The self-cleaning fuel injector nozzle for a fuel injector as claimed in claim 3, wherein said pintle rod moves back and forth in a repeating manner to repeatedly chop and dislodge said blockage while said blockage is positioned adjacent to at least one of said plurality of nozzle orifices.

9. The self-cleaning fuel injector nozzle for a fuel injector as in claim 1, wherein the pintle rod is configured such that wherein as the dislodging continues, a size of the blockage reduces until the blockage passes through at least one of the plurality of nozzle offices.

10. The self cleaning fuel injector nozzle for a fuel injector as in claim 1, wherein said blockage is in a form of a particle disposed in fuel, wherein said pintle rod has an edge that serves as a cutter, wherein said pintle rod is configured to repeatedly move back and forth inside said inner bore via said spring to chop said particle until it enters an opening of at least one of said nozzle orifices.

11. The self cleaning fuel injector nozzle for a fuel injector as in claim 1, wherein at least one of said nozzle orifices of said plurality of nozzle orifices varies in cross sectional area from an inside face of said at least one nozzle orifice to an outside face of said at least one nozzle orifice.

12. The self-cleaning fuel injector nozzle for a fuel injector as claimed in claim 3, including a pintle flange to limit forward movement to the pintle rod.

13. The self-cleaning fuel injector nozzle for a fuel injector as claimed in claim 3, wherein the spool surface includes said corner having the point.

14. The self-cleaning fuel injector nozzle for a fuel injector as claimed in claim 3, wherein the pintle rod includes a rear stop to limit travel of the pintle rod in a direction to prevent a flow of fuel through the nozzle when no external forces are present to move the radial flow pintle rod to an open position.

15. The self-cleaning fuel injector nozzle for a fuel injector as claimed in claim 3, wherein the plurality of nozzle orifices are all opened simultaneously with linear movement of the pintle rod.

16. The self-cleaning fuel injector nozzle for a fuel injector as claimed in claim 3, wherein the nozzle orifices are all opened sequentially with linear movement of the pintle rod.

17. The self-cleaning fuel injector nozzle for a fuel injector as claimed in claim 3, wherein the nozzle orifices are positioned in two or more radial levels so that the nozzle orifices are positioned in two or more radial levels so that the nozzle orifices are opened sequentially with linear movement of the pintle rod.

18. The self-cleaning fuel injector nozzle for a fuel injector as claimed in claim 3, wherein the nozzle orifices are all opened simultaneously with linear movement of the pintle rod.

19. The self-cleaning fuel injector nozzle for a fuel injector as claimed in claim 3, wherein the nozzle orifices are less than 0.006 inches or 0.15 mm.

20. The self-cleaning fuel injector nozzle for a fuel injector as claimed in claim 3, wherein the nozzle orifices have a diameter that is 0.058 millimeters or less.

21. The self-cleaning fuel injector nozzle for a fuel injector as claimed in claim 3, wherein the nozzle orifices a keyhole orifice.

22. The self-cleaning fuel injector nozzle for a fuel injector as claimed in claim 3, including a servo-controlled metering valve for controlling the flow and pressure of fuel provided to the nozzle body.

23. The self-cleaning fuel injector nozzle for a fuel injector as claimed in claim 22, wherein the servo-controlled metering valve provides the fuel flow at a predetermined pressure regardless of the fuel volume.

24. The self-cleaning fuel injector nozzle for a fuel injector as claimed in claim 23, wherein the servo-controlled metering valve includes a metering rod, the metering rod constructed and arranged to slide in a metering rod bore positioned within a metering block.

25. The self-cleaning fuel injector nozzle for a fuel injector as claimed in claim 24, wherein the servo includes a metering cam having an offset journal, the offset journal positioned to cooperate with a distal end of the metering rod to control the movement of the metering rod within the metering rod bore.

26. The self-cleaning fuel injector nozzle for a fuel injector as claimed in claim 3, wherein the pintle rod is tubular, a distal end of the inner bore is blocked with an end plug to prevent fuel from flowing straight out the front of the surface of the inner bore.

27. The self-cleaning fuel injector nozzle for a fuel injector as claimed in claim 3, wherein the orifice body includes fuel notches arranged in a radial pattern around a perimeter of the orifice body.

28. The self-cleaning fuel injector nozzle for a fuel injector as claimed in claim 27, wherein the fuel notches have a root width approaching a point expanding as the notch progresses to the end plug of the orifice body.

* * * * *